(12) United States Patent
Ehrich et al.

(10) Patent No.: US 12,462,935 B2
(45) Date of Patent: Nov. 4, 2025

(54) DEEP LEARNING-BASED METHODS, DEVICES, AND SYSTEMS FOR PRENATAL TESTING

(71) Applicant: Nucleix Ltd., Rehovot, IL (US)

(72) Inventors: Mathias Ehrich, San Diego, CA (US); Lawrence Du, San Diego, CA (US); Dirk Van Den Boom, Encinitas, CA (US)

(73) Assignee: Nucleix Ltd., Rehovot (IL)

( * ) Notice: Subject to any disclaimer, the term of this patent is extended or adjusted under 35 U.S.C. 154(b) by 793 days.

(21) Appl. No.: 17/043,629

(22) PCT Filed: Mar. 27, 2019

(86) PCT No.: PCT/US2019/024416
§ 371 (c)(1),
(2) Date: Sep. 29, 2020

(87) PCT Pub. No.: WO2019/191319
PCT Pub. Date: Oct. 3, 2019

(65) Prior Publication Data
US 2021/0020314 A1   Jan. 21, 2021

Related U.S. Application Data

(60) Provisional application No. 62/824,757, filed on Mar. 27, 2019, provisional application No. 62/650,879, filed on Mar. 30, 2018.

(51) Int. Cl.
| | |
|---|---|
| *G16H 50/20* | (2018.01) |
| *G16H 10/60* | (2018.01) |
| *G16H 50/30* | (2018.01) |
| *G16H 50/70* | (2018.01) |

(52) U.S. Cl.
CPC ............. *G16H 50/20* (2018.01); *G16H 10/60* (2018.01); *G16H 50/30* (2018.01); *G16H 50/70* (2018.01)

(58) Field of Classification Search
CPC ............................... G16H 10/60; G16H 50/20
See application file for complete search history.

(56) References Cited

U.S. PATENT DOCUMENTS

| | | |
|---|---|---|
| 6,156,879 A | 12/2000 | Rome et al. |
| 6,258,540 B1 | 7/2001 | Lo et al. |
| 6,410,278 B1 | 6/2002 | Notomi et al. |

(Continued)

FOREIGN PATENT DOCUMENTS

| | | |
|---|---|---|
| EP | 0097952 A2 | 1/1984 |
| EP | 1524321 A1 | 4/2005 |

(Continued)

OTHER PUBLICATIONS

Lefkowitz et al., Clinical validation of a noninvasive prenatal test for genomewide detection of fetal copy number variants. Am J Obstet Gynecol 215(2):227.e1-227.e16 (2016).

(Continued)

*Primary Examiner* — Jay M. Patel
(74) *Attorney, Agent, or Firm* — WILSON SONSINI GOODRICH & ROSATI

(57) ABSTRACT

Methods for applying machine learning algorithms to nucleic acid sequencing-based diagnostics tests for detection of copy number variation and other genomic abnormalities are described.

16 Claims, 40 Drawing Sheets

(56) References Cited

U.S. PATENT DOCUMENTS

| | | |
|---|---|---|
| 6,555,347 B1 | 4/2003 | Rome et al. |
| 6,558,928 B1 | 5/2003 | Landegren |
| 6,855,688 B2 | 2/2005 | McKerracher |
| 6,977,162 B2 | 12/2005 | Dhallan |
| 7,332,277 B2 | 2/2008 | Dhallan |
| 7,404,931 B2 | 7/2008 | Frey et al. |
| 7,442,506 B2 | 10/2008 | Dhallan |
| 7,479,393 B2 | 1/2009 | Noetzel et al. |
| 7,482,319 B2 | 1/2009 | Rome et al. |
| 7,582,420 B2 | 9/2009 | Oliphant et al. |
| 7,592,134 B2 | 9/2009 | Sato et al. |
| 7,598,060 B2 | 10/2009 | Dhallan |
| 7,718,370 B2 | 5/2010 | Dhallan |
| 7,727,720 B2 | 6/2010 | Dhallan |
| 7,736,907 B2 | 6/2010 | Blankenstein et al. |
| 7,807,450 B2 | 10/2010 | Samsoondar |
| 7,888,017 B2 | 2/2011 | Quake et al. |
| 7,955,794 B2 | 6/2011 | Shen et al. |
| 8,008,018 B2 | 8/2011 | Quake et al. |
| 8,101,404 B2 | 1/2012 | Samsoondar |
| 8,124,109 B2 | 2/2012 | Kickhoefer et al. |
| 8,195,415 B2 | 6/2012 | Fan et al. |
| 8,293,470 B2 | 10/2012 | Quake et al. |
| 8,296,076 B2 | 10/2012 | Fan et al. |
| 8,318,430 B2 | 11/2012 | Chuu et al. |
| 8,442,774 B2 | 5/2013 | Lo et al. |
| 8,532,936 B2 | 9/2013 | Rava |
| 8,632,740 B2 | 1/2014 | Dastane et al. |
| 8,682,592 B2 | 3/2014 | Rabinowitz et al. |
| 8,682,594 B2 | 3/2014 | Fan et al. |
| 8,703,652 B2 | 4/2014 | Quake et al. |
| 8,706,422 B2 | 4/2014 | Lo et al. |
| 8,709,726 B2 | 4/2014 | Oeth et al. |
| 8,920,807 B2 | 12/2014 | Rome et al. |
| 8,949,036 B2 | 2/2015 | Rabinowitz et al. |
| 8,956,530 B2 | 2/2015 | Dorrer et al. |
| 8,972,202 B2 | 3/2015 | Lo et al. |
| 9,051,616 B2 | 6/2015 | Lo et al. |
| 9,114,173 B2 | 8/2015 | Rome et al. |
| 9,121,069 B2 | 9/2015 | Lo et al. |
| 9,121,849 B2 | 9/2015 | Babu et al. |
| 9,163,282 B2 | 10/2015 | Rabinowitz et al. |
| 9,218,449 B2 | 12/2015 | Lo et al. |
| 9,353,414 B2 | 5/2016 | Fan et al. |
| 9,404,157 B2 | 8/2016 | Fan et al. |
| 9,423,399 B2 | 8/2016 | Espinosa et al. |
| 9,424,392 B2 | 8/2016 | Rabinowitz et al. |
| 9,441,273 B2 | 9/2016 | Quake et al. |
| 9,493,831 B2 | 11/2016 | Chuu et al. |
| 9,580,751 B2 | 2/2017 | Hahn et al. |
| 9,738,931 B2 | 8/2017 | Hahn et al. |
| 9,777,328 B2 | 10/2017 | Quake et al. |
| 9,777,329 B2 | 10/2017 | Quake et al. |
| 9,845,497 B2 | 12/2017 | Quake et al. |
| 9,892,230 B2 | 2/2018 | Lo et al. |
| 9,993,816 B2 | 6/2018 | Biesbrouck |
| 10,081,839 B2 | 9/2018 | Rabinowitz et al. |
| 10,131,947 B2 | 11/2018 | Oliphant et al. |
| 10,152,568 B2 | 12/2018 | Lo et al. |
| 10,154,808 B2 | 12/2018 | Fletcher et al. |
| 10,266,893 B2 | 4/2019 | Rabinowitz et al. |
| 10,329,607 B2 | 6/2019 | Quake et al. |
| 10,335,078 B2 | 7/2019 | Kvam et al. |
| 10,526,658 B2 | 1/2020 | Babiarz et al. |
| 10,538,814 B2 | 1/2020 | Babiarz et al. |
| 10,557,172 B2 | 2/2020 | Babiarz et al. |
| 10,590,482 B2 | 3/2020 | Ryan et al. |
| 10,597,708 B2 | 3/2020 | Zimmermann et al. |
| 10,597,724 B2 | 3/2020 | Rabinowitz et al. |
| 10,888,259 B2 | 1/2021 | Jordan et al. |
| 10,989,706 B2 | 4/2021 | Wilson et al. |
| 11,358,138 B2 | 6/2022 | Johnson |
| 11,358,139 B2 | 6/2022 | Johnson |
| 11,360,076 B2 | 6/2022 | Johnson |
| 11,525,134 B2 | 12/2022 | Van Den Boom et al. |
| 2001/0051341 A1 | 12/2001 | Lo et al. |
| 2003/0036710 A1 | 2/2003 | Matriano et al. |
| 2005/0048519 A1 | 3/2005 | Chien et al. |
| 2005/0164217 A1* | 7/2005 | Yoshii ................ G16B 25/00 435/6.16 |
| 2006/0252054 A1 | 11/2006 | Lin et al. |
| 2006/0254962 A1 | 11/2006 | Samsoondar |
| 2006/0276724 A1 | 12/2006 | Freeman et al. |
| 2008/0113357 A1 | 5/2008 | Baggio et al. |
| 2008/0120079 A1* | 5/2008 | Emler ................ G16B 30/10 703/11 |
| 2009/0029377 A1 | 1/2009 | Lo et al. |
| 2009/0170114 A1 | 7/2009 | Quake et al. |
| 2009/0317817 A1 | 12/2009 | Oeth et al. |
| 2010/0112575 A1 | 5/2010 | Fan et al. |
| 2010/0112590 A1 | 5/2010 | Lo et al. |
| 2010/0124751 A1 | 5/2010 | Quake et al. |
| 2010/0124752 A1 | 5/2010 | Quake et al. |
| 2010/0138165 A1 | 6/2010 | Fan et al. |
| 2010/0255492 A1 | 10/2010 | Quake et al. |
| 2010/0255493 A1 | 10/2010 | Quake et al. |
| 2010/0256013 A1 | 10/2010 | Quake et al. |
| 2010/0324449 A1 | 12/2010 | Rostaing et al. |
| 2011/0246083 A1 | 10/2011 | Fan et al. |
| 2011/0318734 A1 | 12/2011 | Lo et al. |
| 2011/0319272 A1 | 12/2011 | Fan et al. |
| 2012/0003201 A1 | 1/2012 | Nicholas et al. |
| 2012/0003635 A1 | 1/2012 | Lo et al. |
| 2012/0003636 A1 | 1/2012 | Lo et al. |
| 2012/0003637 A1 | 1/2012 | Lo et al. |
| 2012/0055798 A1 | 3/2012 | Selden et al. |
| 2012/0123297 A1 | 5/2012 | Brancazio |
| 2012/0190559 A1 | 7/2012 | Lo et al. |
| 2012/0208708 A1 | 8/2012 | Lo et al. |
| 2012/0208710 A1 | 8/2012 | Fan et al. |
| 2012/0219950 A1 | 8/2012 | Oliphant et al. |
| 2012/0315633 A1 | 12/2012 | Mantzaris et al. |
| 2013/0022974 A1 | 1/2013 | Chinnaiyan et al. |
| 2013/0245961 A1 | 9/2013 | Lo et al. |
| 2013/0275103 A1 | 10/2013 | Struble et al. |
| 2013/0310263 A1 | 11/2013 | Lo et al. |
| 2014/0045181 A1 | 2/2014 | Lo et al. |
| 2014/0051583 A1 | 2/2014 | Fan et al. |
| 2014/0178438 A1* | 6/2014 | Sahin ................ A61P 37/04 424/277.1 |
| 2014/0256559 A1 | 9/2014 | Lo et al. |
| 2014/0256560 A1 | 9/2014 | Lo et al. |
| 2014/0263059 A1 | 9/2014 | Burg et al. |
| 2014/0329691 A1 | 11/2014 | Fan et al. |
| 2014/0329695 A1 | 11/2014 | Lo et al. |
| 2014/0329696 A1 | 11/2014 | Lo et al. |
| 2014/0342371 A1 | 11/2014 | Holmes |
| 2015/0031035 A1 | 1/2015 | Kvam et al. |
| 2015/0104793 A1 | 4/2015 | Quake et al. |
| 2015/0136602 A1 | 5/2015 | Jovanovich et al. |
| 2015/0147815 A1 | 5/2015 | Babiarz et al. |
| 2016/0002621 A1 | 1/2016 | Nelson et al. |
| 2016/0029936 A1 | 2/2016 | Kvam et al. |
| 2016/0333416 A1 | 11/2016 | Babiarz et al. |
| 2016/0367653 A1 | 12/2016 | Rome et al. |
| 2016/0371428 A1 | 12/2016 | Ryan et al. |
| 2016/0374330 A1 | 12/2016 | Grolz |
| 2017/0014450 A1 | 1/2017 | Joyce et al. |
| 2017/0029890 A1 | 2/2017 | Fan et al. |
| 2017/0067803 A1 | 3/2017 | Jackson et al. |
| 2017/0073757 A1 | 3/2017 | Chuu et al. |
| 2017/0095187 A1 | 4/2017 | Svoboda et al. |
| 2017/0145507 A1 | 5/2017 | Koh et al. |
| 2017/0173585 A1 | 6/2017 | Mahony et al. |
| 2017/0218450 A1 | 8/2017 | Lo et al. |
| 2017/0233829 A1 | 8/2017 | Lo et al. |
| 2017/0321279 A1 | 11/2017 | Hahn et al. |
| 2017/0327881 A1 | 11/2017 | Rava et al. |
| 2017/0342500 A1 | 11/2017 | Marquard et al. |
| 2018/0030528 A1 | 2/2018 | Van Den Boom et al. |
| 2018/0089364 A1* | 3/2018 | Muzzey ................ A61P 35/00 |
| 2018/0148144 A1 | 5/2018 | Turner |
| 2018/0214878 A1 | 8/2018 | Chang et al. |
| 2018/0242896 A1 | 8/2018 | Li et al. |

(56) References Cited

U.S. PATENT DOCUMENTS

| | | | |
|---|---|---|---|
| 2018/0245072 | A1 | 8/2018 | Raymond et al. |
| 2018/0300450 | A1 | 10/2018 | Hogan et al. |
| 2018/0346963 | A1 | 12/2018 | Welker et al. |
| 2018/0346984 | A1 | 12/2018 | Quake et al. |
| 2018/0374582 | A1 | 12/2018 | Holmes et al. |
| 2019/0015790 | A1 | 1/2019 | Weber et al. |
| 2019/0017109 | A1 | 1/2019 | Song et al. |
| 2019/0024127 | A1 | 1/2019 | Yeh |
| 2019/0111423 | A1 | 4/2019 | Ismagilov et al. |
| 2019/0136323 | A1 | 5/2019 | Lo et al. |
| 2019/0144919 | A1 | 5/2019 | Jackson et al. |
| 2019/0216380 | A1 | 7/2019 | Ivosevic et al. |
| 2019/0338362 | A1 | 11/2019 | Tam et al. |
| 2020/0015725 | A1 | 1/2020 | Johnson et al. |
| 2020/0056242 | A1 | 2/2020 | Lo et al. |
| 2020/0087710 | A1* | 3/2020 | McCullough ........ C12Q 1/6809 |
| 2020/0121234 | A1 | 4/2020 | Johnson |
| 2020/0163603 | A1 | 5/2020 | Jordan et al. |
| 2020/0263167 | A1 | 8/2020 | Van Den Boom et al. |
| 2020/0299677 | A1 | 9/2020 | Van Den Boom et al. |
| 2021/0068730 | A1 | 3/2021 | Johnson et al. |
| 2022/0119801 | A1 | 4/2022 | Van Den Boom et al. |
| 2022/0162591 | A1 | 5/2022 | Van Den Boom et al. |
| 2022/0380752 | A1 | 12/2022 | Van Den Boom et al. |
| 2022/0404353 | A1 | 12/2022 | Bhargava et al. |

FOREIGN PATENT DOCUMENTS

| | | |
|---|---|---|
| EP | 2239583 A2 | 10/2010 |
| EP | 2264453 A1 | 12/2010 |
| EP | 2385143 A2 | 11/2011 |
| EP | 2514842 A2 | 10/2012 |
| EP | 2557517 A2 | 2/2013 |
| EP | 2557519 A2 | 2/2013 |
| EP | 2557520 A2 | 2/2013 |
| EP | 2684954 A1 | 1/2014 |
| EP | 3336197 A1 | 6/2018 |
| EP | 3378951 A1 | 9/2018 |
| EP | 3540739 A1 | 9/2019 |
| EP | 3591068 A1 | 1/2020 |
| EP | 3656870 A1 | 5/2020 |
| GB | 2428093 A | 1/2007 |
| JP | 2011518568 A | 6/2011 |
| JP | 2014501555 A | 1/2014 |
| JP | 2015523894 A | 8/2015 |
| WO | WO-2009132860 A1 | 11/2009 |
| WO | WO-2011053790 A2 | 5/2011 |
| WO | WO-2011063324 A2 | 5/2011 |
| WO | WO-2012064802 A1 | 5/2012 |
| WO | WO-2013191552 A1 | 12/2013 |
| WO | WO-2014145078 A1 | 9/2014 |
| WO | WO-2015014935 A1 | 2/2015 |
| WO | WO-2015183872 A1 | 12/2015 |
| WO | WO-2016019042 A1 | 2/2016 |
| WO | WO-2016019113 A1 | 2/2016 |
| WO | WO-2017017314 A1 | 2/2017 |
| WO | WO-2017062867 A1 | 4/2017 |
| WO | WO-2017136059 A1 | 8/2017 |
| WO | WO-2017136430 A1 | 8/2017 |
| WO | WO-2017176985 A1 | 10/2017 |
| WO | WO-2018057888 A1 | 3/2018 |
| WO | WO-2018212496 A2 | 11/2018 |
| WO | WO-2019067567 A1 | 4/2019 |
| WO | WO-2019084489 A1 | 5/2019 |
| WO | WO-2019191319 A1 | 10/2019 |
| WO | WO-2019219841 A1 | 11/2019 |
| WO | WO-2020018522 A1 | 1/2020 |
| WO | WO-2020049558 A1 | 3/2020 |
| WO | WO-2020198312 A1 | 10/2020 |
| WO | WO-2021061751 A1 | 4/2021 |
| WO | WO-2021108266 A1 | 6/2021 |
| WO | WO-2021188594 A1 | 9/2021 |
| WO | WO-2022251346 A1 | 12/2022 |

OTHER PUBLICATIONS

Mar. 3, 2022 Non-Final Office Action U.S. Appl. No. 17/547,920.
Mar. 4, 2022 Restriction Requirement U.S. Appl. No. 17/547,950.
Altschul et al. Basic local alignment search tool. J Mol Biol 215(3):403-410 (1990).
Banfi et al., The role of ethylenediamine tetraacetic acid (EDTA) as in vitro anticoagulant for diagnostic purposes. Clin Chem Lab Med. 2007;45(5):565-76. doi: 10.1515/CCLM.2007.110. PMID: 17484616.
BD Vacutainer Evacuated Blood Collection System, For In Vitro Diagnostic Use Pamphlet.
Breitbach et al., Direct measurement of cell-free DNA from serially collected capillary plasma during incremental exercise. J Appl Physiol (1985). Jul. 15, 2014;117(2):119-30. doi: 10.1152/japplphysiol. 00002.2014. Epub May 29, 2014. PMID: 24876361.
Chatterton et al.: Brain-derived circulating cell-free DNA defines the brain region and cell specific origins associated with neuronal atrophy; bioRxiv preprint pp. 1-19 (2019).
Chung et al., Magnetically-actuated blood filter unit attachable to biochips. Proceedings of the 16th International Conference on Miniaturized Systems for Chemistry and Life Sciences, MicroTAS 2012. 1180-1182.
Clarigo Patient Brochure. (2018). 12 pages.
Clinical Education Center. Quest Diagnostics. (2018). 3 pages.
Dahl et al., Imaging single DNA molecules for high precision NIPT. Scientific Reports 8,: 4549 (2018).
European Application No. 18860060 Search Report dated May 14, 2021.
European Application No. 18871059 Search Report dated Jul. 16, 2021.
European Application No. 20778285.5 Search Report dated Dec. 12, 2022.
European Patent Application No. 19777591.9 Search Report dated Nov. 26, 2021.
Fan, et al. Analysis of the size distributions of fetal and maternal cell-free DNA by paired-end sequencing. Clin Chem. Aug. 2010;56(8):1279-86. Epub Jun. 17, 2010.
Final Office Action issued in U.S. Appl. No. 17/547,920 on Jun. 30, 2022.
Gateway Genomics Previews Advanced Technology for the Future of Genetic Testing at the International Society for Prenatal Diagnosis, Aug. 4, 2015.
Haeberle et al., Centrifugal extraction of plasma from whole blood on a rotating disk. Lab Chip. Jun. 2006;6(6):776-81. doi: 10.1039/b604145k. Epub Apr. 13, 2006. PMID: 16738730.
Harmony-Test Information. Test Submission Instructions. Bioscientia Human Genetics (2014).
Hovelson et al., Rapid, ultra low coverage copy number profiling of cell-free DNA as a precision oncology screening strategy. Oncotarget. 8(52):89848-89866 (2017).
Hovelson et al., Rapid, ultra low coverage copy number profiling of cell-free DNA as a precision oncology screening strategy. Oncotarget. 8(52):89848-89866 (2017) (Supplementary Materials).
International Search Report and Written Opinion issued in International Application No. PCT.US2022/0300903 on Jul. 8, 2022.
International Search Report and Written Opinion issued in PCT/US2019/024416 on Sep. 4, 2019.
International Search Report and Written Opinion issued in PCt/US2020/024638 on Aug. 6, 2020.
International Search Report issued in PCT/US2020061599 on Feb. 25, 2021.
Karlin, et al. Applications and statistics for multiple high-scoring segments in molecular sequences. PNAS USA 90:5873-5877 (1993).
Karlin et al. Methods for assessing the statistical significance of molecular sequence features by using general scoring schemes. PNAS USA 87:2264-2268 (1990).
Kersaudy-Kerhoas et al., "Micro-scale blood plasma separation: from acoustophoresis to egg-beaters." Lab on a chip 13 17 (2013): 3323-46.
Liao, G.J.W. et al., "Targeted massively parallel sequencing of maternal plasma DNA permits efficient and unbiased detection of fetal alleles," Clin. Chem. 2011, 57(1), 92-101.

(56) References Cited

OTHER PUBLICATIONS

Lipton et al, Learning to Diagnose with LSTM Recurrent Neural Networks, retreived Aug. 14, 2019.
Marshall et al., Utility of amplification enhancers in low copy number DNA analysis. Int J Legal Med. Jan. 2015;129(1):43-52.
MaterniT21 PLUS Core + ESS. Test Details. Laboratory Corporation of America (2018). 3 pages.
Milot and Jacob, Finger Stick Self-Collection of Maternal Blood for Non-Invasive Prenatal Testing, Prenatal Diagnosis 2917, 37(Suppl. 1) P-70.
Min et al., Chromatin accessibility prediction via convolutional long short-term memory networks with k-mer embedding. Bioinformatics. Jul. 15, 2017;33(14):i92-i101. doi: 10.1093/bioinformatics/btx234. PMID: 28881969; PMCID: PMC5870572.
Mori et al., Real-time Turbidimetry of LAMP Reaction for Quantifying Template DNA. J Biochem Biophys Methods 59(2): 145-157 (2004).
Nakabayashi et al., Massively parallel sequencing of cell-free DNA in plasma for detecting gynecological tumour-associated copy number alteration. Scientific Report 8: 11205 (2018). 12 pages.
Nakano et al., Single-molecule PCR using water-in-oil emulsion. J Biotechnol. Apr. 24, 2003;102(2):117-24. doi: 10.1016/s0168-1656(03)00023-3. PMID: 12697388.
NEBNext Ultra II DNA Library Prep Kit for Illumina, Mar. 14, 2016.
Needleman et al. A general method applicable to the search for similarities in the amino acid sequence of two proteins. Journal of molecular biology 48(3):443-453 (1970).
Nguyen, N. et al., "Ultra-large alignments using phylogeny-aware profiles", Genome Biology, 2015, vol. 16, No. 1, 15 pages.
Non-Final Office Action issued in U.S. Appl. No. 16/648,819 on Aug. 9, 2022.
Non-Final Office Action issued in U.S. Appl. No. 16/648,819, filed Aug. 9, 2022.
Non-Final Office Action issued in U.S. Appl. No. 16/759,303, filed May 20, 2022.
Non-Final Office Action issued in U.S. Appl. No. 17/547,920 on Mar. 3, 2022.
Non-Final Office Action issued in U.S. Appl. No. 17/547,950 on Jun. 2, 2022.
Noninvasive prenatal screening Q&A. Quest Diagnostics. (2018). 3 pages.
PCT/US2018/052891 International Preliminary Report on Patentability dated Mar. 31, 2020.
PCT/US2018/052891 International Search Report and Written Opinion dated Feb. 27, 2019.
PCT/US2018/057844 International Patent Application Invitation to Pay Additional Fees dated Dec. 17, 2018.
PCT/US2018/057844 International Preliminary Report on Patentability dated Apr. 28, 2020.
PCT/US2018/057844 International Search Report and Written Opinion dated Feb. 8, 2019.
PCT/US2020/024638 International Search Report and Written Opinion dated Aug. 6, 2020.
PCT/US2020/025022 International Search Report and Written Opinion dated Jun. 29, 2020.
PCT/US2020/061599 International Preliminary Report on Patentability dated May 17, 2022.
PCT/US2020/061599 International Search Report and Written Opinion dated Feb. 25, 2021.
Pearson et al. Improved Tools for Biological Sequence Comparison. PNAS USA 85:2444-48 (1988).
Peng, Y. et al., "Robust Ensemble Learning for Cancer Diagnosis Based on Microarray Data Classification", In: Li X., Wang S., Dong Z.Y. (eds) Advanced Data Mining and Applications. ADMA, 2005, Lecture Notes in Computer Science, vol. 3584. pp. 564-574, Springer, Berlin, Heidelberg, https://doi.org/10.1007/11527503_67.
Picelli et al. Tn5 transposase and tagmentation procedures for massively scaled sequencing projectsGenome Res. 24:2033-2040 (2014).

Pickar-Oliver et al. The next generation of CRISPR-Cas technologies and applications. Nat Rev Mol Cell Biol 20:490-507 (2019).
Prenatal Screen, Cell-free DNA. The Regents of the University of California (2018). 2 pages.
Primacio et al., American Society of Human Genetics 65th Annual Meeting, Oct. 6-10, 2015, Baltimore, MD.
Raymond et al., Collection of Cell-Free DNA for Genomic Analysis of Solid Tumors in a Clinical Laboratory Setting. PLoS One 12(4):e0176241 (2017).
Remmerie et al., Validation of a targeted, multiplex PCR-based NIPT test in an international multi-centre study. Multiplicom (2016).
Restriction Requirement issued in U.S. Appl. No. 16/648,819 on May 24, 2022.
Shao et al., Chip-based analysis of exosomal mRNA mediating drug resistance in glioblastoma. Nature Communications 6(1): 9 pages (2015).
Shao et al., Protein typing of circulating microvesicles allows real-time monitoring of glioblastoma therapy. Nature Medicine 18(12): 1835-1840 (2012).
Shao et al., Supplementary Information—Protein typing of circulating microvesicles allows real-time monitoring of glioblastoma therapy. Nature Medicine 18(12): 1835-1840 (2012).
Sharma et al.: Point-of-Care Diagnostics in Low Resource Settings: Present Status and Future Role of microfluidics. Biosensors. 5:577-601 (2015).
Shin et al. CRISPR-Cas9-targeted fragmentation and selective sequencing enable massively parallel microsatellite analysis. Nature Communications 8: Article No. 14291 (2017).
Smith et al. Comparison of Biosequences. Advances in Applied Mathematics. 2:482-489 (1981).
SneakPeek Gender Early DNA Test Instruction Pamphlet disclosed on Aug. 19, 2021.
Stevens et al. A novel CRISPR/Cas9 associatedtechnology for sequence-specific nucleic acidenrichment. PLoS ONE 14(4):e0215441 (2019).
Tang et al., Comparison of paper-based nucleic acid extraction materials for point-of-care testing applications. Cellulose (Lond). 2022;29(4):2479-2495. doi: 10.1007/s10570-022-04444-6. Epub Jan. 29, 2022. PMID: 35125684; PMCID: PMC8799969.
Third Party Submisison for U.S. Appl. No. 17/547,920 on Jul. 12, 2022.
United States U.S. Appl. No. 17/597,619, filed Jan. 14, 2022.
United States U.S. Appl. No. 17/617,881, filed Dec. 9, 2021.
United States U.S. Appl. No. 17/632,966, filed Feb. 4, 2022.
U.S. Appl. No. 17/780,227, filed May 26, 2022.
U.S. Appl. No. 17/824,617, filed May 25, 2022.
Wang et al. An RNA-Guided Cas9 Nickase-Based Method for Universal Isothermal DNA Amplification. Angew Chem Int Ed Engl. 58(16):5382-5386 (2019).
Wang et al.: Translating epigenetics into clinic: focus on lupus; Clinical Epigentics; 9:78 (1-15) (2009).
Yuan, Y. et al., "DeepGene: an advanced cancer type classifier based on deep learning and somatic point mutations", BMC Bioinformatics, 2016, vol. 17, No. 17, pp. 243-256.
Afsahi et al. Novel Graphene-Based Biosensor for Early Detection of Zika Virus Infection. Biosens Bioelectron 100:85-88 (2018).
Benjamini, et al. Summarizing and correcting the GC content bias in high-throughput sequencing. Nucleic Acids Res. May 2012;40(10):e72. doi: 10.1093/nar/gks001. Epub Feb. 9, 2012.
Canick et al., DNA sequencing of maternal plasma to identify Down syndrome and other trisomies in multiple gestations. Prenat Diagn 32(8):730-734 (2012).
Cleveland, Lowess: A program for smoothing scatterplots by robust locally weighted regression, The American Statistician, 35:54 (1981).
Ellison et al., Using Targeted Sequencing of Paralogous Sequences for Noninvasive Detection of Selected Fetal Aneuploidies. Clin Chem 62(12):1621-1629 (2016).
Fakruddin et al., Nucleic Acid Amplification: Alternative Methods of Polymerase Chain Reaction. J Pharm Bioallied Sci 5(4) :245-252 (2013).
Fakruddin et al., Nucleic acid sequence based amplification (NASBA)—prospects and applications. Int. J. of Life Science and Pharma Res. 2(1): L106-L121 (2012).

(56) References Cited

OTHER PUBLICATIONS

Garrido-Cardenas et al. DNA Sequencing Sensors: An Overview. Sensors (Basel) 17(3): 588 (2017).
Howarka et al., Building Membrane Nanopores. Nat Nanotechnol 12(7): 619-630 (2017).
Kingma, et al. Adam: A Method for Stochastic Optimization. Published as a conference paper at the 3rd International Conference for Learning Representations, San Diego, 2015.
Koussa et al., DNA Nanoswitches: A quantitative platform for gel-based biomolecular interaction analysis. Nat Methods 12(2): 123-126 (2015).
Langmead et al. Ultrafast and memory-efficient alignment of short DNA sequences to the human genome. Genome biology 10:R25 (10 pgs) (2009).
Lefkowitz et al., Clinical validation of a noninvasive prenatal test for genomewide detection of fetal copy No. variants. Am J Obstet Gynecol 215(2):227.e1-227.e16 (2016).
Legler et al., Specific Magnetic Bead-Based Capture of Free Fetal DNA From Maternal Plasma. Transfus Apher Sci 40(3): 153-157 (2009).
Li et al. Fast and accurate short read alignment with Burrows-Wheeler transform. Bioinformatics 25:1754-60 (2009).
Li, et al. Mapping short DNA sequencing reads and calling variants using mapping quality scores. Genome Res. Nov. 2008; 18(11):1851-8. Epub Aug. 19, 2008.
Lipton et al., Learning to Diagnose with LSTM Recurrent Neural Networks. eprint arXiv:1511.03677 (2016) [online]. Retrieved from Internet URL:https://arxiv.org/pdf/1511.03677.pdf.
Liu et al.: A High-Efficiency Superhydrophobic Plasma Separator. Lab Chip. 16(3):553-560 (2016).
Min et al., Chromatin accessibility prediction via convolutional long short-term memory networks with k-mer embedding. Bioinformatics. 33(14):i92-i101 (2017).
Notomi, et al. Loop-mediated isothermal amplification of DNA. Nucleic Acids Res. Jun. 15, 2000;28(12):E63.
PCT/US2019/024416 International Preliminary Report on Patentability dated Oct. 6, 2020.
PCT/US2019/024416 International Search Report and Written Opinion dated Sep. 4, 2019.
Porreco, Richard P. et al. Noninvasive prenatal screening for fetal trisomies 21, 18, 13 and the common sex chromosome aneuploidies from maternal blood using massively parallel genomic sequencing of DNA. 211(4):365.e1-365.e12 (Oct. 2014).
Rothberg, et al. An integrated semiconductor device enabling non-optical genome sequencing. Nature. 475 (2011): 348-352.
Sanger et al., The nucleotide sequence of bacteriophage phix174. J Mol Biol 125(2):225-246 (1978).
Toley et al., Isothermal Strand Displacement Amplification (iSDA): A Rapid and Sensitive Method of Nucleic Acid Amplification for Point-Of-Care Diagnosis. Analyst 140(22): 7540-7549 (2015).
Weise et al., Microdeletion and Microduplication Syndromes. J Histochem Cytochem 60(5): 346-358.
Wu et al., Aligner-mediated cleavage of nucleic acids and its application to isothermal exponential amplification. Chem Sci. 9(11): 3050-3055 (2018).
Zanoli et al. Isothermal Amplification Methods for the Detection of Nucleic Acids in Microfluidic Devices. Biosensors 3:18-43 (2013).
Zimmerman et al., Non-invasive prenatal aneuploidy testing at chromosomes 13, 18, 21, X, and Y, using targeted sequencing of polymorphic loci. Prenat Diagn 32(13): 1233-1241 (2012).
U.S. Appl. No. 17/547,920 Office Action dated Jul. 22, 2025.
U.S. Appl. No. 17/598,041 Office Action dated Sep. 10, 2025.

* cited by examiner

AGTCTGGATCGATCG
GTAGCTAGTTATAGC
CCGATAGACTATAGG
TTTTGCGCTAGCCTA
...
...
...
ATGATGCGTGATCCC

FIG. 3

| | | |
|---|---|---|
| AGTCTGGATCG | chr10 | 1782725542 |
| GTAGCTAGTTATAGC | chr9 | 1825444346 |
| CCGATAGACTATAGG | chr21 | 1222235965 |
| TTTTGCGCTAGCCTA | chrX | 1200076687 |
| ::: ~~CGTGATAGCTGATCC~~ | ~~multiple locations~~ | |
| ::: ATGATGCCGTGATCCC | chr13 | 2435111789 |

FIG. 4

| Bin | Position | Count |
|---|---|---|
| bin00001 | chr1 1-50000 | 280 |
| bin00002 | chr1 50001-100000 | 276 |
| bin00003 | chr1 100001-150000 | 285 |
| ... | ... | ... |
| Bin44537 | chr21 10200001-10250000 | 294 |

FIG. 5

| Bin | Count (Raw) | Count (Normalized) |
|---|---|---|
| bin00001 | 280 | 281 |
| bin00002 | 276 | 280 |
| bin00003 | 285 | 282 |
| ... | ... | ... |
| ... | ... | ... |
| ... | ... | ... |
| bin44537 | 294 | 290 |

FIG. 8

{0.01,0.02,0.01,0.94,0.01,0.01}   0.01 | 0.02 | 0.01 | 0.94 | 0.01 | 0.01   Read 1

+{0.92,0.02,0.02,0.02,0.01,0.01}   0.93 | 0.04 | 0.03 | 0.96 | 0.02 | 0.02   Read 2

+{0.01,0.01,0.95,0.01,0.01,0.01}   0.94 | 0.05 | 0.98 | 0.97 | 0.03 | 0.03   Read 3

+{0.01,0.02,0.01,0.01,0.01,0.94}   0.95 | 0.07 | 0.99 | 0.98 | 0.04 | 0.97   Read 4

+{0.02,0.02,0.01,0.01,0.02,0.92}   0.97 | 0.09 | 1 | 0.99 | 0.06 | 1.89   Read 5

• 
• 
•

+{0.91,0.02,0.01,0.02,0.02,0.02}   6.2 | 1.27 | 4.07 | 3.59 | 3.1 | 6.77   Read 25

FIG. 15

$$\text{GATGNC} = \begin{bmatrix} G & A & T & C \\ 1 & 0 & 0 & 0 \\ 0 & 1 & 0 & 0 \\ 0 & 0 & 1 & 0 \\ 1 & 0 & 0 & 0 \\ 0.25 & 0.25 & 0.25 & 0.25 \\ 0 & 0 & 0 & 1 \end{bmatrix}$$

FIG. 31

Standard workflow

Part 1: Replace Z-score classification with Neural Network classification

Part 2: Replace counting with probability vectors

Part 3: Eliminate sequence read alignment

DEEP LEARNING-BASED METHODS, DEVICES, AND SYSTEMS FOR PRENATAL TESTING

CROSS-REFERENCE

This application is a national stage entry of International Patent Application No. PCT/US2019/024416, filed on Mar. 27, 2019, which claims the benefit of U.S. Provisional Application No. 62/650,879, filed on Mar. 30, 2018, and of U.S. Provisional Application No. 62/824,757, filed on Mar. 27, 2019, each of which is incorporated herein by reference in its entirety.

BACKGROUND

The present disclosure relates to the field of in vitro diagnostics, and specifically to the field of nucleic acid sequencing for determination of copy number variation and detection of related genomic abnormalities. In particular, this disclosure describes methods for applying machine learning techniques to the analysis of nucleic acid sequence data for determination of copy number variation and detection of related genomic abnormalities.

Due to recent advancements in nucleic acid sequencing methodologies that have dramatically reduced costs and time requirements, nucleic acid sequencing has been adopted for use in a variety of biomedical research and clinical diagnostic applications relating to the detection of genetic profiles and genomic variation. Examples include targeted and whole genome sequencing, detection of point mutations, insertions, deletions, and copy number variation, gene expression profiling, and transcriptome analysis. Some types of genomic variation, e.g., point mutations, insertions, deletions, inversions, translocations, and copy number variation, have been associated with particular genetic disorders or disease.

The phrase "copy number variation" refers to the situation in which the number of copies of a particular genomic region varies from one individual to the next. For example, the human genome is comprised of 23 pairs of chromosomes (one set inherited from each parent) so on average one would expect there to be two copies of each gene present in a given cell of an individual. In fact, as has become apparent from whole genome sequencing studies, gains and/or losses of genomic material may occur de-novo, may be inherited, or may be accumulated over time such that specific individuals (or different cells within a given individual) may contain greater or fewer than two copies of each gene. In some cases, these differences may be due to replication or deletion of specific genomic regions, genes, or gene fragments. In some cases, these differences may be due to replication or deletion of entire chromosomes or portions of chromosomes. The extent to which copy number variation contributes to human disease is currently an active area of research, but specific examples of strong correlations between copy number and disease have been identified. For example, it has long been recognized that some cancers are associated with elevated copy numbers of particular genes.

Copy number variation was originally studied using cytogenetic techniques, e.g., fluorescent in situ hybridization (FISH), multiplex FISH, spectral karyotyping, or comparative genomic hybridization (CGH), that allow one to observe the physical structure of a chromosome. The genomic resolution of these techniques is relatively low (e.g., on the order of kilobases to megabases), such that only fairly large structural variations can typically be detected. More recently, high-throughput whole genome sequencing techniques have enabled high genomic resolution detection of copy number variation and other genomic abnormalities. The approach typically used comprises the steps of: (i) collecting a biological sample from the subject, (ii) extracting DNA or other nucleic acid molecules, (iii) preparing a sequencing library, (iv) sequencing the nucleic acid molecules in the sample, and (v) analyzing the resulting sequence data, where the analysis further comprises: (vi) aligning the set of sequencing reads with a reference sequence, (vii) counting the number of sequencing reads associated with each of a specified set of subsections of the reference sequence, (viii) applying a bias correction to correct for systematic amplification and/or sequencing errors due, for example, to variations in the GC content of the specified set of reference sequence subsections, and (ix) determining whether the resulting count corresponds to a normal representation or an over- or under-representation of one or more of the reference sequence subsections.

Recent advances in computer technology in terms of processing speed and data storage capabilities, as well as advances in the development of machine learning algorithms, has led to the development of new problem-solving approaches and "big data" applications. Here, we describe novel methods for applying machine learning techniques to the analysis of nucleic acid sequence data for determination of copy number variation and detection of related genomic abnormalities. The disclosed methods have the potential for replacing all or a portion of the process steps in the conventional approach to detection of copy number variation, and may convey advantages in terms of standardization of test results across testing laboratories, multiplexed testing capability to monitor several genomic markers simultaneously, etc. In one preferred embodiment, the disclosed methods for applying machine learning techniques to the analysis of nucleic acid sequence data may be applied to the field of prenatal testing, e.g., non-invasive prenatal testing (NIPT).

SUMMARY

Disclosed herein are methods comprising: a) obtaining a biological sample from a subject, wherein the biological sample comprises nucleic acid molecules; b) sequencing at least a portion of the nucleic acid molecules to produce a set of sequencing reads; c) processing each sequencing read in the set of sequencing reads to generate one or more values, thereby generating an input data set comprising a set of values that represent the set of sequencing reads; and d) detecting a normal representation, an over-representation, or an under-representation of a subset of the sequencing reads based on an analysis of the input data set using a machine learning algorithm.

In some embodiments, the processing of step (c) does not include alignment of the set of sequencing reads. In some embodiments, the processing of step (c) includes alignment of the set of sequencing reads relative to a reference sequence, and counting the number of sequencing reads that are aligned with each of a series of pre-defined subsections of the reference sequence, thereby generating a set of numeric values that form all or part of the input data set. In some embodiments, the processing of step (c) includes alignment of the set of sequencing reads relative to a reference sequence using a machine learning algorithm, wherein the machine learning algorithm is used to determine an optimal number of subsections of the reference sequence required for the alignment step, and counting the number of sequencing reads that are aligned with each subsection of the reference sequence, thereby generating a set of values that form all or part of the input data set. In some embodiments, the method further comprises applying a bias correction to the number of sequencing reads counted for each subsection of the reference sequence. In some embodiments, the processing of step (c) includes alignment of the set of sequencing reads relative to one another using a machine learning algorithm, and wherein the machine learning algorithm is used to determine a set of values or features that represent the complete set of sequencing reads and that form all or a part of the input data set. In some embodiments, the processing of step (c) includes the use of a machine learning algorithm to determine a set of values or features that represent the complete set of sequencing reads and form all or a part of the input data set. In some embodiments, the processing of step (c) comprises a calculation of the length of each sequence read, the GC content of each sequencing read, a value corresponding to the number and ordering of nucleotide bases in each sequencing read, a feature weighting factor, or any combination thereof. In some embodiments, the processing of step (c) is performed by a machine learning algorithm that is different than the one that performs the analysis of step (d). In some embodiments, the processing of step (c) is performed by the same machine learning algorithm that performs the analysis of step (d). In some embodiments, the machine learning algorithm is a deep learning algorithm. In some embodiments, the deep learning algorithm comprises an artificial neural network architecture having an input layer, two or more hidden layers, and an output layer. In some embodiments, the artificial neural network is a feedforward neural network. In some embodiments, the feedforward neural network is a convolutional neural network. In some embodiments, the artificial neural network is a recurrent neural network. In some embodiments, the artificial neural network comprises 5 or more hidden layers. In some embodiments, the artificial neural network comprises 10 or more hidden layers. In some embodiments, the artificial neural network comprises 15 or more hidden layers. In some embodiments, the input data set comprises a value for each of one or more input nodes in the input layer. In some embodiments, the input layer comprises at least 1,000 input nodes. In some embodiments, the input layer comprises at least 10,000 input nodes. In some embodiments, the input layer comprises at least 100,000 input nodes. In some embodiments, the deep learning algorithm is trained using a training data set comprising one or more sets of sequencing reads from one or more control subjects. In some embodiments, the one or more control subjects are known euploid subjects, known aneuploid subjects, or any combination thereof. In some embodiments, the deep learning algorithm is trained using a training data set comprising in silico sequence data obtained from a publically-available database, a private institutional database, a commercial database, or any combination thereof. In some embodiments, the deep learning algorithm is trained using a training data set comprising simulated sequence data for normal subjects, abnormal subjects, or any combination thereof. In some embodiments, the deep learning algorithm is trained using a training data set comprising personal health data for one or more control subjects, wherein the personal health data is selected from the group consisting of subject age, gestational age, sex, weight, blood pressure, number of previous offspring (if female), ultrasound markers, biochemical screening results, smoking history, history of alcohol use, family history of disease, or any combination thereof. In some embodiments, the deep learning algorithm is trained using a training data set comprising one or more sets of sequencing reads, in silico sequence data, simulated sequence data, personal health data, or any combination thereof. In some embodiments, the input data set further comprises values corresponding to personal health data for the subject that is selected from the group consisting of subject age, gestational age, sex, weight, blood pressure, number of previous offspring (if female), ultrasound markers, biochemical screening results, smoking history, history of alcohol use, family history of disease, or any combination thereof. In some embodiments, at least one training data set resides in a cloud-based database that is periodically or continuously updated with sets of sequencing reads, input data sets, and previously-performed deep learning analysis results that are generated locally or remotely. In some embodiments, the detection of over-representation or under-representation of the subset of sequencing reads corresponds to detection of at least one genomic abnormality in the subject. In some embodiments, the at least one genomic abnormality comprises a copy number variation, a full or partial duplication of at least one chromosomal arm, a full or partial deletion of at least one chromosomal arm, or any combination thereof. In some embodiments, the detection of at least one genomic abnormality is at least 95% accurate. In some embodiments, the detection of at least one genomic abnormality is at least 98% accurate. In some embodiments, the detection of at least one genomic abnormality is at least 99% accurate. In some embodiments, the sequencing step uses a whole genome sequencing approach. In some embodiments, the sequencing step uses a targeted sequencing approach. In some embodiments, the sequencing step further comprises tagging the nucleic acid molecules to be sequenced with a molecular barcode. In some embodiments, the method further comprises amplifying the barcode-tagged nucleic acid molecules prior to sequencing. In some embodiments, the subject is an animal or plant. In some embodiments, the subject is a mammal. In some embodiments, the subject is a human. In some embodiments, the subject is a pregnant female. In some embodiments, the biological sample is blood, plasma, serum, urine, interstitial fluid, vaginal cells, vaginal fluid, buccal cells, or saliva. In some embodiments, the biological sample has a volume of less than about 100 µl. In some embodiments, the nucleic acid molecules are cell-free nucleic acid molecules. In some embodiments, the cell-free nucleic acid molecules are cell-free fetal nucleic acid molecules. In some embodiments, the biological sample comprises up to about $10^9$ cell-free fetal nucleic acid molecules. In some embodiments, the biological sample comprises less than 3 ng of total cell-free nucleic acid molecules. In some embodiments, the set of sequencing reads comprises at least $10^7$ sequencing reads. In some embodiments, the set of sequencing reads comprises at least $10^6$ sequencing reads. In some embodiments, the set of sequencing reads comprises at least $10^5$ sequencing reads. In some embodiments, the detection of a normal representation, an over-representation, or an under-representation of a subset of the sequencing reads in step (ii) is not determined with respect to a specific target chromosome.

Disclosed herein are computer software products comprising: a) a machine readable medium comprising processor-executable code, wherein the processor-executable code comprises a plurality of instructions for controlling a computer system to perform the method of: i) processing each sequencing read in a set of sequencing reads to generate one or more probability values using a first machine learning algorithm, thereby generating an input data set comprising a set of probability values that represent the set of sequencing reads; and ii) detecting a normal representation, an over-representation, or an under-representation of a subset of the sequencing reads based on an analysis of the input data set using a second machine learning algorithm.

Also disclosed herein are computer software products comprising: a) a machine readable medium comprising processor-executable code, wherein the processor-executable code comprises a plurality of instructions for controlling a computer system to perform the method of: i) processing each sequencing read in a set of sequencing reads and detecting a normal representation, an over-representation, or an under-representation of a subset of the sequencing reads based on an analysis using a machine learning algorithm.

In some embodiments, the processing does not comprise alignment of the sequencing reads to a reference sequence. In some embodiments, the detection of a normal representation, an over-representation, or an under-representation of a subset of the sequencing reads is not determined with respect to a specific target chromosome. In some embodiments, the one or more machine learning algorithms are deep learning algorithms. In some embodiments, the one or more machine learning algorithms are trained using at least one training data set that resides in a cloud-based database that is periodically or continuously updated with training data that is generated locally or remotely. In some embodiments, the one or more machine learning algorithms are trained using a training data set comprising one or more sets of sequencing reads or simulated sequence data for known euploid or aneuploid subjects; in silico sequence data obtained from a publically-available database, a private institutional database, or a commercial database; personal health data for one or more control subjects, wherein the personal health data is selected from the group consisting of subject age, gestational age, sex, weight, blood pressure, number of previous offspring (if female), ultrasound markers, biochemical screening results, smoking history, history of alcohol use, and family history of disease; or any combination thereof.

In some embodiments, the disclosed machine learning-based methods for analysis of nucleic acid sequence data may be applied to any of a variety of sequencing-based assays where the ability to reliably detect a normal representation, an overrepresentation or an underrepresentation of at least one target sequence, even in very low volume samples or samples comprising very low quantities of nucleic acid molecules is critical to the performance of the assay.

Accordingly, disclosed herein are methods comprising: obtaining a biological sample from a subject, wherein the biological sample comprises cell-free nucleic acids; optionally tagging at least a portion of the cell-free nucleic acids to produce a library of optionally tagged cell-free nucleic acids; optionally amplifying the optionally tagged cell-free nucleic acids; sequencing at least a portion of the optionally tagged cell-free nucleic acids; and detecting a normal representation, an overrepresentation or an underrepresentation of at least one target sequence in the at least a portion of the optionally tagged cell-free nucleic acids using a machine learning-based analysis of the nucleic acid sequencing data.

Also disclosed herein are prenatal paternity testing methods comprising: obtaining a biological sample from a subject pregnant with a fetus, wherein the biological sample comprises cell-free nucleic acids; optionally tagging at least a portion of the cell-free nucleic acids to produce a library of optionally tagged cell-free nucleic acids; optionally amplifying the optionally tagged cell-free nucleic acids; sequencing at least a portion of the optionally tagged cell-free nucleic acids; receiving paternal genotype information from an individual suspected to be a paternal father of the fetus; and comparing the paternal genotype information with a fetal component of the cell-free nucleic acids identified by a machine learning-based analysis of the sequencing data to determine whether there is a genotypic match between the fetal component and paternal genotype.

Disclosed herein are methods of analyzing a biological sample obtained from a subject, the method comprising: obtaining a biological sample from a subject, wherein the biological sample comprises cell-free nucleic acids; optionally, tagging at least a portion of the cell-free nucleic acids to produce a library of tagged cell-free nucleic acids; amplifying the optionally tagged cell-free nucleic acids by massively multiplexed amplification assay; optionally, pooling the amplified optionally tagged cell-free nucleic acids; sequencing at least a portion of the amplified optionally tagged cell-free nucleic acids; and detecting a normal representation, an overrepresentation or an underrepresentation of at least one target sequence in the at least a portion of the optionally tagged cell-free nucleic acids using a machine learning-based analysis of the nucleic acid sequence data.

In some embodiments of these methods, the biological sample comprises blood, plasma, serum, urine, interstitial fluid, vaginal cells, vaginal fluid, cervical cells, buccal cells, or saliva. In some embodiments, the blood comprises capillary blood. In some embodiments, the capillary blood comprises not more than 1 milliliter of blood. In some embodiments, the capillary blood comprises not more than 100 microliters of blood. In some embodiments, the capillary blood comprises not more than 40 microliters of blood. In some embodiments, the methods further comprise pooling two or more biological samples, each sample obtained from a different subject. In some embodiments, the methods further comprise contacting the biological sample with a white blood cell stabilizer following obtaining the biological sample from the subject. In some embodiments, the biological sample obtained from the subject was collected by transdermal puncture. In some embodiments, the biological sample obtained from the subject was not collected by transdermal puncture. In some embodiments, the biological sample obtained from the subject was collected using a device configured to lyse intercellular junctions of an epidermis of the subject. In some embodiments, the biological sample obtained from the subject was collected by a process of: (a) inducing a first transdermal puncture to produce a first fraction of a biological sample; (b) discarding the first fraction of the biological sample; and (c) collecting a second fraction of the biological sample, thereby reducing or eliminating contamination of the biological sample due to white blood cell lysis. In some embodiments, the tagging of (c) comprises: generating ligation competent cell-free DNA by one or more steps comprising: generating a blunt end of the cell-free DNA, wherein a 5' overhang or a 3' recessed end is removed using one or more polymerase and one or more exonuclease dephosphorylating the blunt end of the cell-free DNA; contacting the cell-free DNA with a crowding reagent thereby enhancing a reaction between the one or more polymerases, one or more exonucleases, and the cell-free DNA; or repairing or remove DNA damage in the cell-free DNA using a ligase; and ligating the ligation competent cell-free DNA to adaptor oligonucleotides by contacting the ligation competent cell-free DNA to adaptor oligonucleotides in the presence of a ligase, crowding reagent, and/or a small molecule enhancer. In some embodiments, the one or more polymerases comprises T4 DNA polymerase or DNA polymerase I. In some embodiments, the one or more exonucleases comprises T4 polynucleotide kinase or exonuclease III. In some embodiments, the ligase comprises T3 DNA ligase, T4 DNA ligase, T7 DNA ligase, Taq Ligase, Ampligase, E. coli Ligase, or Sso7-ligase fusion protein. In some embodiments, the crowding reagent comprises polyethylene glycol (PEG), glycogen, or dextran, or a combination thereof. In some embodiments, the small molecule enhancer comprises dimethyl sulfoxide (DMSO), polysorbate 20, formamide, or a diol, or a combination thereof. In some embodiments, the ligating in (b) comprises blunt end ligating, or single nucleotide overhang ligating. In some embodiments, the adaptor oligonucleotides comprise Y shaped adaptors, hairpin adaptors, stem loop adaptors, degradable adaptors, blocked self-ligating adaptors, or barcoded adaptors, or a combination thereof. In some embodiments, the library in step (c) is produced with an efficiency of at least 0.5. In some embodiments, the target cell-free nucleic acids are cell-free nucleic acids from a tumor. In some embodiments, the target cell-free nucleic acids are cell-free nucleic acids from a fetus. In some embodiments, the target cell-free nucleic acids are cell-free nucleic acids from a transplanted tissue or organ. In some embodiments, the target cell-free nucleic acids are genomic nucleic acids from one or more pathogens. In some embodiments, the pathogen comprises a bacterium or component thereof. In some embodiments, the pathogen comprises a virus or a component thereof. In some embodiments, the pathogen comprises a fungus or a component thereof. In some embodiments, the cell-free nucleic acids comprise one or more single nucleotide polymorphisms (SNPs), insertion or deletion (indel), or a combination thereof. In some embodiments, the massively multiplex amplification assay is isothermal amplification. In some embodiments, the massively multiplex amplification assay is polymerase chain reaction (mmPCR). In some embodiments, the biological sample comprises a cell type or tissue type in which fetal cell-free nucleic acids are low, as compared to peripheral blood.

Disclosed herein are methods comprising: obtaining about 1-100 microliters (l) of a biological sample from a subject comprising deoxyribose nucleic acid (DNA); and detecting an epigenetic modification of the DNA using a machine learning-based analysis of DNA sequence data.

In some embodiments, the epigenetic modification comprises DNA methylation at a genetic locus, a histone methylation, histone, ubiquitination, histone acetylation, histone phosphorylation, micro RNA (miRNA). In some embodiments, the DNA methylation comprises CpG methylation or CpH methylation. In some embodiments, the genetic locus comprises a promoter or regulatory element of a gene. In some embodiments, the genetic locus comprises a variable long terminal repeat (LTR). In some embodiments, the genetic locus comprises a cell-free DNA or fragment thereof. In some embodiments, the genetic locus comprises a single nucleotide polymorphism (SNP). In some embodiments, histone acetylation is indicated by a presence or level of histone deacetylases. In some embodiments, the histone modification is at a histone selected from the group consisting of histone 2A (H2A), histone 2B (H2B), histone 3 (H3), and histone 4 (H4). In some embodiments, the histone methylation is methylation of H3 lysine 4 (H3K4me2). In some embodiments, the histone acetylation is deacetylation at H4. In some embodiments, the miRNA are selected from the group consisting of miR-21, miR-126, mi-R142, mi-R146a, mi-R12a, mi-R181a, miR-29c, miR-29a, miR-29b, miR-101, miRNA-155, and miR-148a. In some embodiments, the biological sample comprises blood, plasma, serum, urine, interstitial fluid, vaginal cells, vaginal fluid, cervical cells, buccal cells, or saliva. In some embodiments, the blood comprises capillary blood. In some embodiments, the capillary blood comprises not more than 40 microliters of blood. In some embodiments, the method further comprises pooling two or more biological samples, each sample obtained from a different subject. In some embodiments, the biological sample obtained from the subject was collected by transdermal puncture. In some embodiments, the biological sample obtained from the subject was not collected by transdermal puncture. In some embodiments, the biological sample obtained from the subject was collected using a device configured to lyse intercellular junctions of an epidermis of the subject. In some embodiments, the biological sample obtained from the subject was collected by a process of: (a) inducing a first transdermal puncture to produce a first fraction of a biological sample; (b) discarding the first fraction of the biological sample; and (c) collecting a second fraction of the biological sample, thereby reducing or eliminating contamination of the biological sample due to white blood cell lysis. In some embodiments, the method further comprises contacting the biological sample with a white blood cell stabilizer following obtaining the biological sample from the subject.

Disclosed herein are methods comprising: obtaining a biological sample from a subject, wherein the biological sample contains up to about $10^9$ cell-free nucleic acid molecules; sequencing at least a portion of the cell-free nucleic acid molecules to produce sequencing reads; analyzing at least a portion of the sequencing reads corresponding to at least one chromosomal region using a machine learning-based approach; and detecting a normal representation, an overrepresentation or an underrepresentation of the at least one chromosomal region.

Disclosed herein are prenatal paternity testing methods comprising: obtaining a biological sample from a subject pregnant with a fetus, wherein the biological sample contains up to about $10^9$ cell-free nucleic acid molecules; sequencing at least a portion of the cell-free nucleic acid molecules to produce sequencing reads; analyzing at least a portion of sequencing reads corresponding to at least one chromosomal region using a machine learning-based approach; receiving paternal genotype information from an individual suspected to be a paternal father of the fetus; and comparing the paternal genotype information with a fetal component of the cell-free nucleic acids identified by the machine learning-based analysis to determine whether there is a genotypic match between the fetal component and paternal genotype.

In some embodiments, these methods further comprise amplifying the cell-free nucleic acids. In some embodiments, these methods further comprise tagging at least a portion of the cell-free nucleic acids to produce a library of tagged cell-free nucleic acids.

Also disclosed herein are methods comprising: obtaining a biological sample from a subject, wherein the biological sample contains up to about $10^9$ cell-free nucleic acid molecules; amplifying the cell-free nucleic acids; optionally tagging at least a portion of the cell-free nucleic acids to produce a library of tagged cell-free nucleic acids; amplifying the optionally tagged cell-free nucleic acids by a massively multiplexed amplification assay; optionally, pooling the amplified optionally tagged cell-free nucleic acids; sequencing at least a portion of the amplified optionally tagged cell-free nucleic acid molecules to produce sequencing reads; analyzing at least a portion of sequencing reads corresponding to at least one chromosomal region using a machine learning-based approach; and detecting a normal representation, an overrepresentation or an underrepresentation of the at least one chromosomal region.

In some embodiments, the tagging comprises: generating ligation competent cell-free DNA by one or more steps comprising: generating a blunt end of the cell-free DNA, wherein a 5' overhang or a 3' recessed end is removed using one or more polymerase and one or more exonuclease; dephosphorylating the blunt end of the cell-free DNA; contacting the cell-free DNA with a crowding reagent thereby enhancing a reaction between the one or more polymerases, one or more exonucleases, and the cell-free DNA; or repairing or remove DNA damage in the cell-free DNA using a ligase; and ligating the ligation competent cell-free DNA to adaptor oligonucleotides by contacting the ligation competent cell-free DNA to adaptor oligonucleotides in the presence of a ligase, crowding reagent, and/or a small molecule enhancer. In some embodiments, the method further comprises pooling two or more biological samples, each sample obtained from a different subject. In some embodiments, the method further comprises contacting the biological sample with a white blood cell stabilizer following obtaining the biological sample from the subject. In some embodiments, the one or more polymerases comprises T4 DNA polymerase or DNA polymerase I. In some embodiments, the one or more exonucleases comprises T4 polynucleotide kinase or exonuclease III. In some embodiments, the ligase comprises T3 DNA ligase, T4 DNA ligase, T7 DNA ligase, Taq Ligase, Ampligase, E. coli Ligase, or Sso7-ligase fusion protein. In some embodiments, the crowding reagent comprises polyethylene glycol (PEG), glycogen, or dextran, or a combination thereof. In some embodiments, the small molecule enhancer comprises dimethyl sulfoxide (DMSO), polysorbate 20, formamide, or a diol, or a combination thereof. In some embodiments, the ligating in (b) comprises blunt end ligating, or single nucleotide overhang ligating. In some embodiments, the adaptor oligonucleotides comprise Y shaped adaptors, hairpin adaptors, stem loop adaptors, degradable adaptors, blocked self-ligating adaptors, or barcoded adaptors, or a combination thereof. In some embodiments, the biological sample is a biological sample having a volume of less than about 500 µl. In some embodiments, the biological sample is a biological sample having a volume of about 1 µL to about 100 µl. In some embodiments, the biological sample is a biological sample having a volume of about 5 µL to about 80 µl. In some embodiments, the biological sample comprises blood, plasma, serum, urine, interstitial fluid, vaginal cells, vaginal fluid, cervical cells, buccal cells, or saliva. In some embodiments, the biological sample is serum or plasma. In some embodiments, the method further comprises separating the plasma or serum from a blood sample. In some embodiments, separating comprises filtering the blood sample to remove cells, cell fragments, microvesicles, or a combination thereof, from the blood sample to produce the plasma sample. In some embodiments, obtaining the blood sample comprises pricking a finger. In some embodiments, the biological sample obtained from the subject was collected using a device configured to lyse intercellular junctions of an epidermis of the subject. In some embodiments, the biological sample obtained from the subject was collected by a process of: (a) inducing a first transdermal puncture to produce a first fraction of a biological sample; (b) discarding the first fraction of the biological sample; and (c) collecting a second fraction of the biological sample, thereby reducing or eliminating contamination of the biological sample due to white blood cell lysis. In some embodiments, the biological sample contains about 104 to about 109 cell-free nucleic acid molecules. In some embodiments, the biological sample contains about 104 to about 107 cell-free nucleic acid molecules. In some embodiments, the biological sample contains less than 300 pg of cell-free nucleic acid molecules. In some embodiments, the biological sample contains less than 3 ng of cell-free nucleic acid molecules. In some embodiments, the subject is a pregnant subject and the cell-free nucleic acid molecules comprise cell-free fetal nucleic acid molecules. In some embodiments, the cell-free nucleic acids comprise nucleic acids from a tumor in a tissue. In some embodiments, the target cell-free nucleic acids are cell-free nucleic acids from a fetus. In some embodiments, the target cell-free nucleic acids are cell-free nucleic acids from a transplanted tissue or organ. In some embodiments, the target cell-free nucleic acids are genomic nucleic acids from one or more pathogens. In some embodiments, the pathogen comprises a bacterium or component thereof. In some embodiments, the pathogen comprises a virus or a component thereof. In some embodiments, the pathogen comprises a fungus or a component thereof. In some embodiments, the cell-free nucleic acids comprise one or more single nucleotide polymorphisms (SNPs), insertion or deletion (indel), or a combination thereof. In some embodiments, the massively multiplex amplification assay is isothermal amplification. In some embodiments, the massively multiplex amplification assay is polymerase chain reaction (mmPCR). In some embodiments, the biological sample comprises a cell type or tissue type in which fetal cell-free nucleic acids are low, as compared to peripheral blood.

Disclosed herein are systems comprising: a sample collector configured to collect a biological sample of a subject; a sample processor that is configured to isolate a sample component from the biological sample; a nucleic acid detector that is configured to detect nucleic acids in the biological sample or the sample component; and a nucleic acid information output. In some embodiments, the nucleic acid information output is based on a machine learning-based analysis of nucleic acid sequence data. In some embodiments, the system further comprises a white blood cell stabilizer. In some embodiments, the sample collector comprises a transdermal puncture device. In some embodiments, the transdermal puncture device comprises at least one of a needle, a lancet, a microneedle, a vacuum, and a microneedle array. In some embodiments, the sample collector comprises a device that is configured to lyse intercellular junctions of an epidermis of the subject. In some embodiments, the sample component is selected from a cell, a carbohydrate, a phospholipid, a protein, a nucleic acid, and a microvesicle. In some embodiments, the sample component is a blood cell. In some embodiments, the sample component does not comprise a cell-free nucleic acid. In some embodiments, the sample component comprises a cell-free nucleic acid. In some embodiments, the cell-free nucleic acids are from a tumor. In some embodiments, the cell-free nucleic acids are from a fetus. In some embodiments, the cell-free nucleic acids are from a transplanted tissue or organ. In some embodiments, the cell-free nucleic acids are from one or more pathogens. In some embodiments, the pathogen comprises a bacterium or component thereof. In some embodiments, the pathogen comprises a virus or a component thereof. In some embodiments, the pathogen comprises a fungus or a component thereof. In some embodiments, the cell-free nucleic acids are from a cell type or a tissue type with low abundance of cell-free nucleic acids, as compared to peripheral blood. In some embodiments, the sample component comprises one or more single nucleotide polymorphisms (SNPs), one or more indels, or a combination thereof. In some embodiments, the nucleic acid detector is configured to perform a genotyping assay. In some embodiments, the genotyping assay comprises quantitative real-time polymerase chain reaction (qPCR), a genotype array, or automated sequencing. In some embodiments, the qPCR comprises multiplexed polymerase chain reaction (mmPCR). In some embodiments, the sample component is plasma or serum. In some embodiments, the sample purifier is configured to isolate plasma from less than 1 milliliter of blood. In some embodiments, the sample purifier is configured to isolate plasma from less than 250 µl of blood. In some embodiments, the volume of the biological sample is not greater than 50 µl. In some embodiments, the volume of the biological sample is between about 10 µl and about 40 µl. In some embodiments, the biological sample contains about 25 pg to about 250 pg of total circulating cell-free DNA. In some embodiments, the sample contains about 5 to about 100 copies of a sequence of interest in the biological sample or the sample component. In some embodiments, the biological sample contains about 104 to about 109 cell-free nucleic acid molecules. In some embodiments, the biological sample contains about 104 to about 107 cell-free nucleic acid molecules. In some embodiments, the biological sample contains less than 300 pg of cell-free nucleic acid molecules. In some embodiments, the biological sample contains less than 3 ng of cell-free nucleic acid molecules. In some embodiments, the nucleic acid detector comprises a nucleic acid sequencer. In some embodiments, the system comprises at least one nucleic acid amplification reagent and at least one crowding agent. In some embodiments, the system comprises at least a first tag for producing a library of cell-free nucleic acids from the biological sample, and at least one amplification reagent. In some embodiments, the at least one nucleic acid amplification reagent comprises a primer, a polymerase, and a combination thereof. In some embodiments, the nucleic acid detector is further configured to tag nucleic acids by: generating ligation competent nucleic acids by one or more steps comprising: generating a blunt end of the nucleic acids, wherein a 5' overhang or a 3' recessed end is removed using one or more polymerase and one or more exonuclease; dephosphorylating the blunt end of the nucleic acids; contacting the nucleic acids with a crowding reagent thereby enhancing a reaction between the one or more polymerases, one or more exonucleases, and the nucleic acids; or repairing or remove damaged nucleic acids in the nucleic acids using a ligase; and ligating the ligation competent nucleic acids to adaptor oligonucleotides by contacting the ligation competent nucleic acids to adaptor oligonucleotides in the presence of a ligase, crowding reagent, and/or a small molecule enhancer. In some embodiments, the one or more polymerases comprises T4 DNA polymerase or DNA polymerase I. In some embodiments, the one or more exonucleases comprises T4 polynucleotide kinase or exonuclease III. In some embodiments, the ligase comprises T3 DNA ligase, T4 DNA ligase, T7 DNA ligase, Taq Ligase, Ampligase, *E. coli* Ligase, or Sso7-ligase fusion protein. In some embodiments, the crowding reagent comprises polyethylene glycol (PEG), glycogen, or dextran, or a combination thereof. In some embodiments, the small molecule enhancer comprises dimethyl sulfoxide (DMSO), polysorbate 20, formamide, or a diol, or a combination thereof. In some embodiments, the ligating in (b) comprises blunt end ligating, or single nucleotide overhang ligating. In some embodiments, the adaptor oligonucleotides comprise Y shaped adaptors, hairpin adaptors, stem loop adaptors, degradable adaptors, blocked self-ligating adaptors, or barcoded adaptors, or a combination thereof. In some embodiments, the nucleic acid detector is further configured to count the tags to detect a representation of the nucleic acids of interest in the sample. In some embodiments, the nucleic acid sequence output is selected from a wireless communication device, a wired communication device, a cable port, and an electronic display. In some embodiments, all components of the system are present in a single location. In some embodiments, all components of the system are housed in a single device. In some embodiments, the sample collector is located at a first location and at least one of the sample purifier and nucleic acid detector are second location. In some embodiments, the sample collector and at least one of the sample purifier and nucleic acid detector are at the same location. In some embodiments, the sample purifier comprises a filter. In some embodiments, the filter has a pore size of about 0.05 microns to about 2 microns. In some embodiments, the system further comprises a transport or storage compartment for transporting or storing at least a portion of the biological sample. In some embodiments, the transport or storage compartment comprises an absorption pad, a fluid container, a sample preservative, or a combination thereof. In some embodiments, the system further comprises a nucleic acid amplifier configured to the amplify nucleic acids from the sample component or the biological sample, and wherein the nucleic acid detector is further configured to detect amplified nucleic acids in the biological sample or the sample component. In some embodiments, the nucleic acid amplifier is a polymerase chain reaction (PCR) device. In some embodiments, the PCR device is a massively multiplexed PCR device (mmPCR).

Disclosed herein are systems comprising a sample collector configured to collect about 1-100 microliter (µl) a biological sample of a subject; a sample processor that is configured to isolate a sample component from the biological sample; a detector that is configured to detect an epigenetic modification in the biological sample or the sample component; and an information output. In some embodiments, the information output is based on a machine learning-based analysis of nucleic acid sequence data derived from the biological sample. In some embodiments, the epigenetic modification comprises DNA methylation at a genetic locus, a histone methylation, histone, ubiquitination, histone acetylation, histone phosphorylation, micro RNA (miRNA). In some embodiments, the DNA methylation comprises CpG methylation or CpH methylation. In some embodiments, the genetic locus comprises a promoter or regulatory element of a gene. In some embodiments, the genetic locus comprises a variable long terminal repeat (LTR). In some embodiments, the genetic locus comprises a cell-free DNA or fragment thereof. In some embodiments, the genetic locus comprises a single nucleotide polymorphism (SNP). In some embodiments, histone acetylation is indicated by a presence or level of histone deacetylases. In some embodiments, the histone modification is at a histone selected from the group consisting of histone 2A (H2A), histone 2B (H2B, histone 3 (H3), and histone 4 (H4). In some embodiments, the histone methylation is methylation of H3 lysine 4 (H3K4me2). In some embodiments, the histone acetylation is deacetylation at H4. In some embodiments, the miRNA are selected from the group consisting of miR-21, miR-126, mi-R142, mi-R146a, mi-R12a, mi-R181a, miR-29c, miR-29a, miR-29b, miR-101, miRNA-155, and miR-148a. In some embodiments, the biological sample comprises blood, plasma, serum, urine, interstitial fluid, vaginal cells, vaginal fluid, cervical cells, buccal cells, or saliva. In some embodiments, the blood comprises capillary blood. In some embodiments, the capillary blood comprises not more than 40 microliters of blood. In some embodiments, the biological sample obtained from the subject was collected by transdermal puncture. In some embodiments, the biological sample obtained from the subject was not collected by transdermal puncture. In some embodiments, the biological sample obtained from the subject was collected using a device configured to lyse intercellular junctions of an epidermis of the subject. In some embodiments, the biological sample obtained from the subject was collected by a process of: (a) inducing a first transdermal puncture to produce a first fraction of a biological sample; (b) discarding the first fraction of the biological sample; and (c) collecting a second fraction of the biological sample, thereby reducing or eliminating contamination of the biological sample due to white blood cell lysis. In some embodiments, the system further comprises a white blood cell stabilizer.

Also disclosed herein are devices comprising: a sample collector for obtaining a biological sample from a subject in need thereof, a sample purifier for removing a cell from the biological sample to produce a cell-depleted sample; and a nucleic acid detector configured to detect a plurality of cell-free DNA fragments in the cell-depleted sample.

In some embodiments, the detection of cell-free DNA fragments comprises the use of a machine learning-based analysis of nucleic acid sequence data. In some embodiments, the device further comprises a white blood cell stabilizer. In some embodiments, the sample collector is configured to lyse intercellular junctions of an epidermis of the subject. In some embodiments, the sample collector is configured to collect a sample from a transdermal puncture. In some embodiments, a first sequence is present on a first cell-free DNA fragment of the plurality of cell-free DNA fragments and a second sequence is present on a second cell-free DNA fragment of the plurality of cell-free DNA fragments, and wherein the first sequence is at least 80% identical to the second sequence. In some embodiments, at least one of the first sequence and the second sequence is repeated at least twice in a genome of a subject. In some embodiments, the first sequence and the second sequence are each at least 10 nucleotides in length. In some embodiments, the first sequence is on a first chromosome and the second sequence is on a second chromosome. In some embodiments, the first sequence and the second sequence are on the same chromosome but separated by at least 1 nucleotide. In some embodiments, the first sequence and the second sequence are in functional linkage. In some embodiments, the nucleic acid detector comprises at least one of a detection reagent. In some embodiments, the at least one detection reagent comprises an oligonucleotide probe capable of detecting the at least one cell-free DNA fragment of the plurality. In some embodiments, the device further comprises a nucleic acid amplifier configured to the amplify nucleic acids from the sample component or the biological sample, and wherein the nucleic acid detector is further configured to detect amplified nucleic acids in the biological sample or the sample component. In some embodiments, the nucleic acid amplifier is an isothermal polymerase chain reaction (PCR) device. In some embodiments, the isothermal PCR device is a massively multiplexed PCR device (mmPCR). In some embodiments, the device further comprises a genotype analyzer configured to compare the plurality of cell-free DNA fragments detected with a known genotype. In some embodiments, the plurality of cell-free DNA fragments comprise a fetal component, and the known genotype is a paternal genotype. In some embodiments, the nucleic acid amplifier comprises at least one nucleic acid amplification reagent and a single pair of primers to amplify the first sequence and the second sequence. In some embodiments, the nucleic acid detector comprises a nucleic acid sequencer. In some embodiments, the nucleic acid sequencer comprises a signal detector. In some embodiments, the nucleic acid detector is a lateral flow strip. In some embodiments, the cell-free DNA comprise one or more single nucleotide polymorphisms (SNPs), insertion or deletion (indel), or a combination thereof. In some embodiments, the cell-free DNA is from a tumor. In some embodiments, the cell-free DNA is from a fetus. In some embodiments, the cell-free DNA is from a transplanted tissue or organ. In some embodiments, the cell-free nucleic acids are from a cell type or a tissue type with low abundance of cell-free nucleic acids, as compared to peripheral blood. In some embodiments, the cell-free DNA is from one or more pathogens. In some embodiments, the pathogen comprises a bacterium or component thereof. In some embodiments, the pathogen comprises a virus or a component thereof. In some embodiments, the pathogen comprises a fungus or a component thereof. In some embodiments, the sample purifier comprises a filter, and wherein the filter has a pore size of about 0.05 microns to about 2 microns. In some embodiments, the filter is a vertical filter. In some embodiments, the sample purifier comprises a binding moiety selected from an antibody, antigen binding antibody fragment, a ligand, a receptor, a peptide, a small molecule, and a combination thereof. In some embodiments, the binding moiety is capable of binding an extracellular vesicle. In some embodiments, the nucleic acid detector is configured to generate a library of tagged cell-free DNA fragments by: generating ligation competent cell-free DNA fragments by one or more steps comprising: generating a blunt end of the cell-free DNA fragments, wherein a 5' overhang or a 3' recessed end is removed using one or more polymerase and one or more exonuclease; dephosphorylating the blunt end of the cell-free DNA fragments; contacting the cell-free DNA fragments with a crowding reagent thereby enhancing a reaction between the one or more polymerases, one or more exonucleases, and the cell-free DNA fragments; or repairing or remove DNA damage in the cell-free DNA fragments using a ligase; an ligating the ligation competent cell-free DNA fragments to adaptor oligonucleotides by contacting the ligation competent cell-free DNA fragments to adaptor oligonucleotides in the presence of a ligase, crowding reagent, and/or a small molecule enhancer. In some embodiments, the one or more polymerases comprises T4 DNA polymerase or DNA polymerase I. In some embodiments, the one or more exonucleases comprises T4 polynucleotide kinase or exonuclease III. In some embodiments, the ligase comprises T3 DNA ligase, T4 DNA ligase, T7 DNA ligase, Taq Ligase, Ampligase, *E. coli* Ligase, or Sso7-ligase fusion protein. In some embodiments, the crowding reagent comprises polyethylene glycol (PEG), glycogen, or dextran, or a combination thereof. In some embodiments, the small molecule enhancer comprises dimethyl sulfoxide (DMSO), polysorbate 20, formamide, or a diol, or a combination thereof. In some embodiments, the ligating in (b) comprises blunt end ligating, or single nucleotide overhang ligating. In some embodiments, the adaptor oligonucleotides comprise Y shaped adaptors, hairpin adaptors, stem loop adaptors, degradable adaptors, blocked self-ligating adaptors, or barcoded adaptors, or a combination thereof. In some embodiments, the device is further configured to pool two or more biological samples, each sample obtained from a different subject. In some embodiments, the nucleic acid detector is further configured to count the tags to detect a representation of the nucleic acids of interest in the sample. In some embodiments, the device further comprises a nucleic acid sequence output comprising a wireless communication device, a wired communication device, a cable port, or an electronic display. In some embodiments, the device is contained in a single housing. In some embodiments, the device operates at room temperature. In some embodiments, the device is capable of detecting the plurality of biomarkers in the cell-depleted sample within about five minutes to about twenty minutes of receiving the biological fluid. In some embodiments, the device comprises a communication connection. In some embodiments, the biological sample comprises blood, plasma, serum, urine, interstitial fluid, vaginal cells, vaginal fluid, cervical cells, buccal cells, or saliva. In some embodiments, the blood comprises capillary blood. In some embodiments, the sample purifier is configured to isolate plasma from less than 250 µl of blood. In some embodiments, the volume of the biological sample is not greater than 50 µl. In some embodiments, the volume of the biological sample is between about 10 µl and about 40 µl. In some embodiments, the biological sample contains about 25 pg to about 250 pg of total circulating cell-free DNA. In some embodiments, the biological sample contains about 5 to about 100 copies of a sequence of interest in the biological sample or the sample component. In some embodiments, the biological sample contains about 104 to about $10^9$ cell-free nucleic acid molecules. In some embodiments, the biological sample contains about $10^4$ to about $10^7$ cell-free nucleic acid molecules. In some embodiments, the biological sample contains less than 300 pg of cell-free nucleic acid molecules. In some embodiments, the biological sample contains less than 3 ng of cell-free nucleic acid molecules.

Disclosed herein are devices comprising: a sample collector configured to collect about 1-100 microliter (µl) a biological sample of a subject; a sample processor that is configured to isolate a sample component from the biological sample; a detector that is configured to detect an epigenetic modification in the biological sample or the sample component; and an information output.

In some embodiments, the information output is based on a machine learning analysis of nucleic acid sequence data derived from the biological sample. In some embodiments, the sample collector is configured to collect a sample from a transdermal puncture. In some embodiments, the sample collector is configured to lyse intercellular junctions of an epidermis of the subject. In some embodiments, the epigenetic modification comprises DNA methylation at a genetic locus, a histone methylation, histone, ubiquitination, histone acetylation, histone phosphorylation, micro RNA (miRNA). In some embodiments, the DNA methylation comprises CpG methylation or CpH methylation. In some embodiments, the genetic locus comprises a promoter or regulatory element of a gene. In some embodiments, the genetic locus comprises a variable long terminal repeat (LTR). In some embodiments, the genetic locus comprises a cell-free DNA or fragment thereof. In some embodiments, the genetic locus comprises a single nucleotide polymorphism (SNP). In some embodiments, the histone acetylation is indicated by a presence or level of histone deacetylases. In some embodiments, the histone modification is at a histone selected from the group consisting of histone 2A (H2A), histone 2B (H2B), histone 3 (H3), and histone 4 (H4). In some embodiments, the histone methylation is methylation of H3 lysine 4 (H3K4me2). In some embodiments, the histone acetylation is deacetylation at H4. In some embodiments, the miRNA are selected from the group consisting of miR-21, miR-126, mi-R142, mi-R146a, mi-R12a, mi-R181a, miR-29c, miR-29a, miR-29b, miR-101, miRNA-155, and miR-148a. In some embodiments, the biological sample comprises blood, plasma, serum, urine, interstitial fluid, vaginal cells, vaginal fluid, cervical cells, buccal cells, or saliva. In some embodiments, the blood comprises capillary blood. In some embodiments, the capillary blood comprises not more than 40 microliters of blood. In some embodiments, the biological sample obtained from the subject was collected by transdermal puncture. In some embodiments, the biological sample obtained from the subject was not collected by transdermal puncture. In some embodiments, the biological sample obtained from the subject was collected by a process of: (a) inducing a first transdermal puncture to produce a first fraction of a biological sample; (b) discarding the first fraction of the biological sample; and (c) collecting a second fraction of the biological sample, thereby reducing or eliminating contamination of the fluid. In some embodiments, the device further comprises a white blood cell stabilizer.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3 provides a non-limiting example of sequencing read data used for a nucleic acid sequencing-based diagnostic test procedure.

FIG. 4 provides a non-limiting example of the conventional process for alignment of sequencing read data to determine the chromosomal origin of each of the sequence fragments. Sequencing reads that do not have a unique origin are typically discarded from the data set.

FIG. 5 provides a non-limiting example of the conventional process of binning sequencing read data to determine the number of sequencing reads identified for each of a series of pre-defined segments of a reference sequence.

FIG. 7A: bin count data versus genomic location prior to normalization for GC content. FIG. 7B: bin count data versus genomic location following normalization for GC content.

FIG. 8 provides a non-limiting example of bin count data for different sequencing read bins before and after normalization for GC content.

FIG. 15 provides an illustration of the summation of probability vector data for classifying sequencing reads according to the probability that they arise from a particular genomic region. No alignment of the individual sequencing reads to a reference sequence is required in this approach. Many bins may change in value as a result of adding the probability values that represent the current sequencing read.

FIG. 30A: bin GC fraction versus number of sequence counts per bin. FIG. 30B: genomic bin number versus number of sequence counts per bin.

FIG. 31 provides a non-limiting example of the "one-hot" style of encoding for a nucleotide sequence.

FIG. 32A: the count normalized softmax probability sum vectors created from PhiX174 sequencing reads show a uniform distribution across genomic bins/classes. The first 10 bins/classes were 500 bp wide, whereas the last bin/class was only 386 bp wide. FIG. 32B: percent sequencing reads mapped per bin for neural network-based bin assignment matches the percent reads mapped per bin using a conventional Bowtie alignment process followed by bin assignment. FIG. 32C: plot of the count normalized softmax probability sum from neural network-based bin assignment versus conventional Bowtie alignment followed by bin assignment.

FIG. 35A: data plotted as the number of sequencing counts per bin versus the GC fraction of the bin without GC-normalization. The red lines indicate seeded polynomial values for each bin, with the higher line representing simulated trisomy 21 bin counts. FIG. 35B: same data as shown in FIG. 35A after GC-normalization using the non-trisomy bins. FIG. 35C: GC-normalized data plotted as the number of GC-normalized counts per bin versus genomic bin.

DETAILED DESCRIPTION

Figure 1:
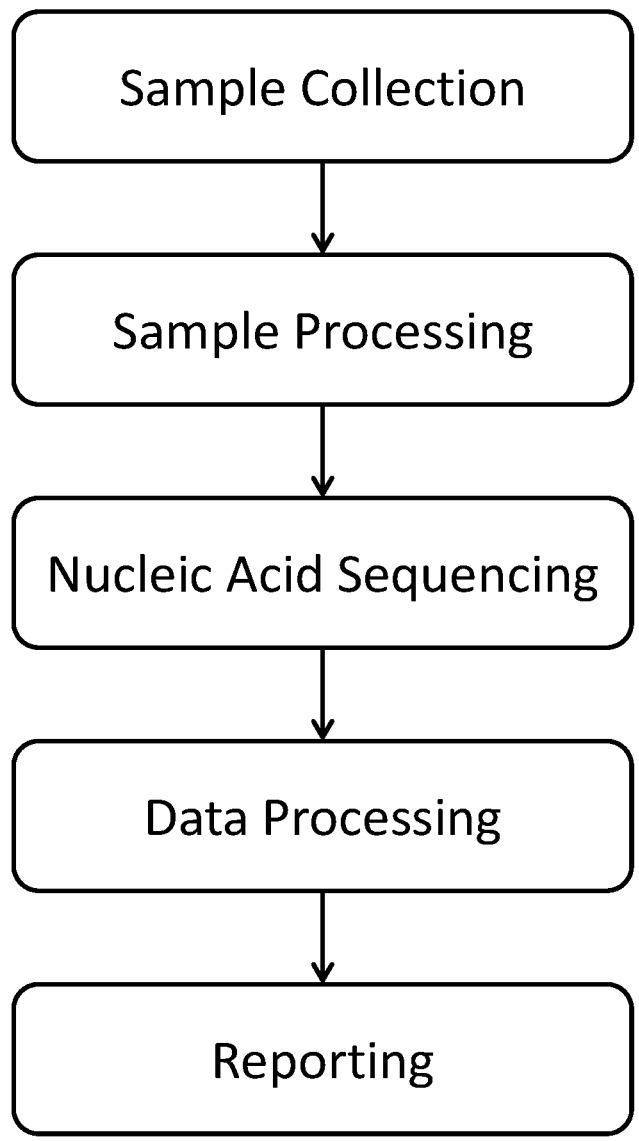
FIG. 1 provides a schematic illustration of the workflow for a typical nucleic acid sequencing-based screening/diagnostic test procedure.

Disclosed herein are novel methods for applying machine learning algorithms to nucleic acid sequencing-based research methods and diagnostic testing. In particular, novel methods for applying machine learning techniques to the analysis of nucleic acid sequence data for determination of copy number variations and detection of related genomic abnormalities are described. Also disclosed, are devices, systems, and kits which may be used to implement the disclosed methods. In some aspects, the disclosed methods, devices, systems, and kits are optimized for use with ultra-low volume samples. For example, in some instances, the disclosed methods, devices, systems, and kits may be applied to the analysis of cell-free DNA in "ultra-low volume liquid biopsy" applications. In some instances, the implementation of the disclosed machine learning-based approaches enables improved assay performance for the detection and characterization of genomic abnormalities in low volume samples and/or samples comprising very small quantities of a nucleic acid analyte.

In a first aspect of the invention, disclosed herein are methods for using machine learning algorithms, e.g., deep learning neural networks, to replace the alignment step of conventional nucleic acid sequencing-based diagnostic test procedures with a classification approach based on the probability that a given sequencing read originates from a given genomic region, i.e., a "bin" or "class", wherein any of a variety of different criteria known to those of skill in the art (in addition to genome sequence) may be used to define the bins or classes.

In a second aspect of the invention, disclosed herein are methods for using machine learning algorithms, e.g., deep learning neural networks, to map input data derived from a set of nucleic acid sequencing reads (e.g., sequencing read class probability data as generated using a first machine learning-based approach) to output data comprising a sample classification result (e.g., classification of the sample as comprising a trisomy, a monosomy, or other genomic abnormality), wherein the machine learning algorithm used for sample classification is trained separately from that used for classifying sequencing read data.

In a third aspect of the invention, disclosed herein are methods for using machine learning algorithms, e.g., deep learning neural networks, to map input data derived from a set of nucleic acid sequencing reads (e.g., raw sequencing read data) directly to output data comprising a sample classification result (e.g., a trisomy, a monosomy, or other genomic abnormality).

The disclosed methods have the potential for replacing all or a portion of the process steps in the conventional approach to detection of copy number variation through the use of a machine learning approach, and may convey advantages in terms of standardization of test results across testing laboratories, multiplexed testing capability to monitor several genetic markers simultaneously, etc. In one preferred embodiment, the disclosed methods for applying machine learning techniques to the analysis of nucleic acid sequence data may be applied to the field of prenatal testing, e.g., non-invasive prenatal testing (NIPT).

Various aspects of the disclosed invention may be applied to any of the particular embodiments set forth below, or to any other type of nucleic acid sequencing-based biomedical research, agricultural diagnostics, or clinical diagnostics applications. It shall be understood that different aspects of the invention can be appreciated individually, collectively, or in combination with each other.

Definitions

Unless otherwise defined, all technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated.

As used herein, when referring to a numeric value the term "about" refers to that number plus or minus 20% of that number. The term "about" when used in the context of a range of values refers to that range minus 20% of its lowest value and plus 20% of its greatest value.

As used herein, the phrase "genomic region" refers to any portion of the complete genome of an organism, including exons, introns, repeat sequence regions, regulatory regions, or any combination thereof. In some instances, genomic regions may be defined by any number of criteria known to those of skill in the art including, but not limited to, genome sequence position, sequence composition, nucleosomal patterns, epigenetic markers, etc.

As used herein, the phrases "genomic variation" or "genomic abnormality" refer to differences in one or more genomic regions from one individual to another, or to differences in one or more genomic regions of one individual relative to those of a population, respectively. In some instances, these differences may include point mutations, insertions, deletions, inversions, translocations, and/or copy number variations, or any combination thereof, where the genomic differences may occur in one or more exon regions, intron regions, repeat sequence regions, regulatory regions, or any combination thereof. In some instances, genomic variations or abnormalities that may be detected may comprise insertions, deletions, inversions, translocations, and/or copy number variations, or any combination thereof, of entire chromosomes, of partial chromosomes, of both arms of a chromosome, of one arm of a chromosome, or of a portion of either or both arms of a chromosome. In some instances, genomic variation or abnormality may or may not be correlated with known disease states in a given individual that exhibits the genomic variation or abnormality. In some instances, genomic variations or abnormalities may be referred to herein as "genomic markers".

In some instances, the genomic variations or abnormalities that may be detected using the disclosed machine learning-based analyses of nucleic acid sequencing data may range in size from about 1,000 base pairs to about 500,000 base pairs. In some instances, the genomic variations or abnormalities may be at least 1,000 base pairs in length, at least 10,000 base pairs in length, at least 50,000 base pairs in length, at least 100,000 base pairs in length, at least 200,000 base pairs in length, at least 300,000 base pairs in length, at least 400,000 base pairs in length, or at least 500,000 base pairs in length. In some instances, the genomic variations or abnormalities may be at most 500,000 base pairs in length, at most 400,000 base pairs in length, at most 300,000 base pairs in length, at most 200,000 base pairs in length, at most 100,000 base pairs in length, at most 50,000 base pairs in length, at most 10,000 base pairs in length, or at most 1,000 base pairs in length. Any of the lower and upper values described in this paragraph may be combined to form a range included within the present disclosure, for example, the genomic variations or abnormalities may range from about 10,000 base pairs to about 400,000 base pairs in length. Those of skill in the art will recognize that the length of the genomic variations or abnormalities may have any value within this range, e.g., about 265,000 base pairs.

In some instances, genomic variations or abnormalities that may be detected using the disclosed machine learning-based analyses of nucleic acid sequencing data may range in size from about 500 kilobases to about 1,000 kilobases in length. In some instances, the genomic variations or abnormalities may be at least 500 kilobases, at least 600 kilobases, at least 700 kilobases, at least 800 kilobases, at least 900 kilobases, or at least 1,000 kilobases. In some instances, the genomic variations or abnormalities may be at most 1,000 kilobases, at most 900 kilobases, at most 800 kilobases, at most 700 kilobases, at most 600 kilobases, or at most 500 kilobases. Any of the lower and upper values described in this paragraph may be combined to form a range included within the present disclosure, for example, the genomic variations or abnormalities may range from about 600 kilobases to about 900 kilobases in length. Those of skill in the art will recognize that the length of the genomic variations or abnormalities may have any value within this range, e.g., about 865 kilobases.

In some instances, genomic variations or abnormalities that may be detected using the disclosed machine learning-based analyses of nucleic acid sequencing data may range in size from about 1 megabase to about 3 megabases in length. In some instances, the genomic variations or abnormalities may be at least 1 megabase, at least 1.5 megabases, at least 2 megabases, at least 2.5 megabases, or at least 3 megabases. In some instances, the genomic variations or abnormalities may be at most 3 megabases, at most 2.5 megabases, at most 2 megabases, at most 1.5 megabases, or at most 1 megabase. Any of the lower and upper values described in this paragraph may be combined to form a range included within the present disclosure, for example, the genomic variations or abnormalities may range from about 1.5 megabases to about 2.5 megabases in length. Those of skill in the art will recognize that the length of the genomic variations or abnormalities may have any value within this range, e.g., about 2.85 megabases.

In some instances genomic variations or abnormalities that may be detected using the disclosed machine learning-based analyses of nucleic acid sequencing data may range in size from about 3 megabases to about 10 megabases in length. In some instances, the genomic variations or abnormalities may be at least 3 megabase, at least 4 megabases, at least 5 megabases, at least 6 megabases, at least 7 megabases, at least 8 megabases, at least 9 megabases, or at least 10 megabases. In some instances, the genomic variations or abnormalities may be at most 10 megabases, at most 9 megabases, at most 8 megabases, at most 7 megabases, at most 6 megabases, at most 5 megabases, at most 4 megabases, or at most 3 megabase. Any of the lower and upper values described in this paragraph may be combined to form a range included within the present disclosure, for example, the genomic variations or abnormalities may range from about 5 megabases to about 9 megabases in length. Those of skill in the art will recognize that the length of the genomic variations or abnormalities may have any value within this range, e.g., about 8.6 megabases.

In some instances genomic variations or abnormalities that may be detected using the disclosed machine learning-based analyses of nucleic acid sequencing data may range in size from about 10 megabases to about 100 megabases in length. In some instances, the genomic variations or abnormalities may be at least 10 megabases, at least 20 megabases, at least 30 megabases, at least 40 megabases, at least 50 megabases, at least 60 megabases, at least 70 megabases, at least 80 megabases, at least 90 megabases, or at least 100 megabases. In some instances, the genomic variations or abnormalities may be at most 100 megabases, at most 90 megabases, at most 80 megabases, at most 70 megabases, at most 60 megabases, at most 50 megabases, at most 40 megabases, at most 30 megabases, at most 20 megabases, or at most 10 megabases. Any of the lower and upper values described in this paragraph may be combined to form a range included within the present disclosure, for example, the genomic variations or abnormalities may range from about 30 megabases to about 70 megabases in length. Those of skill in the art will recognize that the length of the genomic variations or abnormalities may have any value within this range, e.g., about 95 megabases.

As used herein, the phrase "copy number variation" refers to the situation in which the number of copies of a particular genomic region in a given individual differs from that of the population at large. It is an example of genomic abnormality. In some instances, these differences may be due to replication or deletion of specific genomic regions (including non-coding regions), genes, or gene fragments. In some cases, these differences may be due to replication or deletion of entire chromosomes or portions of chromosomes, in which case it may be referred to as a "chromosomal abnormality". In some instances, copy number variations ranging from replications or deletions of entire chromosomes down to replications or deletions of genomic regions as small as, e.g., a thousand base pairs, may permit differentiation between abnormal and normal cells within the same tissue or organism, or may permit detection of cells, cell-derived nucleic acids (e.g., DNA, RNA, or modifications thereof), or circulating cell-free nucleic acids (e.g., DNA, RNA, or modifications thereof) originating from different sources, e.g., transplants, infectious agents, a fetus in a pregnant female subject, etc. In some instances, copy number variation may or may not be correlated with known disease states in a given individual.

As used herein, the phrase "sequencing read" may refer not just to the sequence of bases for a particular nucleic acid fragment (e.g., a sequence of A (adenine), G (guanine), C (cytosine), or T (thymine) for a DNA fragment), but to any unit of information that is derived from an analysis of a nucleic acid molecule. In some instances, for example, the unit of information may comprise base composition rather than base sequence, or the presence or absence of specific bases and/or the separation distance between them. In some instances, for example, a "sequencing read" may refer to a series of trinucleotides that each have a recognizable electrical signal or "signature" in nanopore-based single molecule sequencing, to a series of sequence-specific optical tags (in fluorescence-based sequencing) or mass tags (in mass spectrometry-based sequencing), or to the mass of a nucleic acid fragment (as an indicator of the base composition in MassARRAY®-based testing).

As used herein, the phrase "input data" (or "input data set") may refer to a single datum or to a set of data used as input for a machine learning algorithm of the present disclosure. In some instances, the input data may comprise single-valued data points, vectors (e.g., one-dimensional arrays of length n comprising a scalar coordinate value corresponding to each unit vector in a given basis set of n linearly independent unit vectors), matrices (e.g., two-dimensional m×n arrays of scalar coordinate values with respect to a given basis), tensors (e.g., multidimensional arrays of scalar coordinate values with respect to a given basis), or any combination thereof.

As used herein, the phrase "output data" (or "output data set") may similarly refer to a single datum or to a set of data that is output by a machine learning algorithm of the present disclosure. In some instances, the output data may comprise single-valued data points, vectors (e.g., one-dimensional arrays of length n comprising a scalar coordinate value corresponding to each unit vector in a given basis set of n linearly independent unit vectors), matrices (e.g., two-dimensional m×n arrays of scalar coordinate values with respect to a given basis), tensors (e.g., multidimensional arrays of scalar coordinate values with respect to a given basis), or any combination thereof.

Conventional nucleic acid sequencing-based screening/diagnostic test procedures: The work flow for a typical nucleic acid sequencing-based diagnostic test procedure is illustrated schematically in FIG. 1. The process begins with sample collection and processing steps to: (i) extract all or a portion of the nucleic acid molecules contained in the sample, and (ii) to construct a sequencing library that presents the individual nucleic acid molecules in a format that is compatible with the specific sequencing system to be used. Following the nucleic acid sequencing step, the sequencing read data that is generated is processed to extract information relevant to the test objective, and the results of the test are provided in a summary report. In the present disclosure, a machine learning approach is used to augment or replace all or a portion of the data processing steps in this workflow, as will be discussed in more detail below.

Obtaining samples: In some instances, methods disclosed herein comprise obtaining a biological sample described herein. A sample may be obtained directly (e.g., a doctor takes a blood sample from a subject). A sample may be obtained indirectly (e.g., through shipping, by a technician from a doctor or a subject). In some instances, the biological sample is a biological fluid. In some instances, the biological sample is a swab sample (e.g., buccal swab, vaginal and/or cervical swab). In some instances, methods disclosed herein comprise obtaining whole blood, plasma, serum, urine, saliva, interstitial fluid, or vaginal fluid. In some instances, methods disclosed herein comprise obtaining a blood sample via a finger prick. In some instances, methods disclosed herein comprise obtaining a blood sample via a single finger prick. In some instances, methods disclosed herein comprise obtaining a blood sample with not more than a single finger prick. In some instances, the blood sample is obtained via a finger prick only after the initial perfusion of blood is discarded (e.g., finger is pricked, initial blood sample is wiped clean, and second blood sample is collected). In some instances, methods disclosed herein comprise obtaining capillary blood (e.g., blood obtained from a finger or a prick of the skin). In some instances, methods comprise squeezing or milking blood from a prick to obtain a desired volume of blood. In other instances, methods do not comprise squeezing or milking blood from a prick to obtain a desired volume of blood. While a finger prick is a common method for obtaining capillary blood, other locations on the body would also be suitable, e.g., toe, heel, arm, palm, shoulder, earlobe. In some instances, methods disclosed herein comprise obtaining a blood sample without a phlebotomy. In some instances, methods disclosed herein comprise obtaining capillary blood. In some instances, methods disclosed herein comprise obtaining venous blood. In some instances, methods disclosed herein do not comprise obtaining venous blood (e.g., blood obtained from a vein). In some instances, methods comprise obtaining a biological sample via a biopsy. In some instances, methods comprise obtaining a biological fluid via a liquid biopsy.

In some instances, methods, systems, and devices described herein comprise obtaining a biological sample containing reliable genetic information, without a need for transdermal puncture. In some embodiments, the tight junctions in the skin of the subject are lysed, making them permeable to fluid that may be pushed into the intercellular space and reabsorbed in the capillary, and which may be extracted from the permeable skin without transdermal puncture.

In some instances, the disclosed methods comprise obtaining samples with fragmented nucleic acids. The sample may have been subjected to conditions that are not conducive to preserving the integrity of nucleic acids. By way of non-limiting example, the sample may be a forensic sample. Forensic samples are often contaminated, exposed to air, heat, light, etc. The sample may have been frozen and thawed. The sample may have been exposed to chemicals or enzymes that degrade nucleic acids. In some instances, methods comprise obtaining a tissue sample wherein the tissue sample comprises fragmented nucleic acids. In some instances, methods comprise obtaining a tissue sample wherein the tissue sample comprises nucleic acids and fragmenting the nucleic acids to produced fragmented nucleic acids. In some instances, the tissue sample is a frozen sample. In some instances, the sample is a preserved sample. In some instances the tissue sample is a fixed sample (e.g. formaldehyde-fixed). Methods may comprise isolating the (fragmented) nucleic acids from the sample. Methods may comprise providing the fragmented nucleic acids in a solution for genetic analysis.

Disclosed herein, in some embodiments, are machine-learning based methods, devices and systems can analyze a "biological sample" or "biological fluid sample" of any volume or copy number (e.g., phlebotomy, finger prick, and the like). In some instances, methods disclosed herein are performed with not more than 50 µl of the biological fluid sample. In some instances, methods disclosed herein are performed with not more than 75 µl of the biological fluid sample. In some instances, methods disclosed herein are performed with not more than 100 µl of the biological fluid sample. In some instances, methods disclosed herein are performed with not more than 125 µl of the biological fluid sample. In some instances, methods disclosed herein are performed with not more than 150 µl of the biological fluid sample. In some instances, methods disclosed herein are performed with not more than 200 µl of the biological fluid sample. In some instances, methods disclosed herein are performed with not more than 300 µl of the biological fluid sample. In some instances, methods disclosed herein are performed with not more than 400 µl of the biological fluid sample. In some instances, methods disclosed herein are performed with not more than 500 µl of the biological fluid sample.

In some instances, methods disclosed herein comprise obtaining an ultra-low volume of a biological fluid sample, wherein the ultra-low volume falls within a range of sample volumes. In some instances, the range of sample volumes is about 5 µl to about one milliliter. In some instances, the range of sample volumes is about 5 µl to about 900 µl. In some instances, the range of sample volumes is about 5 µl to about 800 µl. In some instances, the range of sample volumes is about 5 µl to about 700 µl. In some instances, the range of sample volumes is about 5 µl to about 600 µl. In some instances, the range of sample volumes is about 5 µl to about 500 µl. In some instances, the range of sample volumes is about 5 µl to about 400 µl. In some instances, the range of sample volumes is about 5 µl to about 300 µl. In some instances, the range of sample volumes is about 5 µl to about 200 µl. In some instances, the range of sample volumes is about 5 µl to about 150 µl. In some instances, the range of sample volumes is 5 µl to about 100 µl. In some instances, the range of sample volumes is about 5 µl to about 90 µl. In some instances, the range of sample volumes is about 5 µl to about 85 µl. In some instances, the range of sample volumes is about 5 µl to about 80 µl. In some instances, the range of sample volumes is about 5 µl to about 75 µl. In some instances, the range of sample volumes is about 5 µl to about 70 µl. In some instances, the range of sample volumes is about 5 µl to about 65 µl. In some instances, the range of sample volumes is about 5 µl to about 60 µl. In some instances, the range of sample volumes is about 5 µl to about 55 µl. In some instances, the range of sample volumes is about 5 µl to about 50 µl. In some instances, the range of sample volumes is about 15 µl to about 150 µl. In some instances, the range of sample volumes is about 15 µl to about 120 µl. In some instances, the range of sample volumes is 15 µl to about 100 µl. In some instances, the range of sample volumes is about 15 µl to about 90 µl. In some instances, the range of sample volumes is about 15 µl to about 85 µl. In some instances, the range of sample volumes is about 15 µl to about 80 µl. In some instances, the range of sample volumes is about 15 µl to about 75 µl. In some instances, the range of sample volumes is about 15 µl to about 70 µl. In some instances, the range of sample volumes is about 15 µl to about 65 µl. In some instances, the range of sample volumes is about 15 µl to about 60 µl. In some instances, the range of sample volumes is about 15 µl to about 55 µl. In some instances, the range of sample volumes is about 15 µl to about 50 µl.

In some instances, methods disclosed herein comprise obtaining an ultra-low volume of a biological fluid sample, wherein the ultra-low volume is about 100 µl to about 500 µl. In some instances, methods disclosed herein comprise obtaining an ultra-low volume of the biological fluid sample, wherein the ultra-low volume about 100 µl to about 1000 µl. In some instances, the ultra-low volume is about 500 µl to about 1 ml. In some instances, the ultra-low volume is about 500 µl to about 2 ml. In some instances, the ultra-low volume is about 500 µl to about 3 ml. In some instances, the ultra-low volume is about 500 µl to about 5 ml.

In some instances, methods disclosed herein comprise obtaining an ultra-low volume of a biological sample, wherein the biological sample is whole blood. The ultra-low volume may be about 1 µl to about 250 µl. The ultra-low volume may be about 5 µl to about 250 µl. The ultra-low volume may be about 10 µl to about 25 µl. The ultra-low volume may be about 10 µl to about 35 µl. The ultra-low volume may be about 10 µl to about 45 µl. The ultra-low volume may be about 10 µl to about 50 µl. The ultra-low volume may be about 10 µl to about 60 µl. The ultra-low volume may be about 10 µl to about 80 µl. The ultra-low volume may be about 10 µl to about 100 µl. The ultra-low volume may be about 10 µl to about 120 µl. The ultra-low volume may be about 10 µl to about 140 µl. The ultra-low volume may be about 10 µl to about 150 µl. The ultra-low volume may be about 10 µl to about 160 µl. The ultra-low volume may be about 10 µl to about 180 µl. The ultra-low volume may be about 10 µl to about 200 µl.

In some instances, methods disclosed herein comprise obtaining a ultra-low volume of a biological sample wherein the biological sample is plasma or serum. The ultra-low volume may be about 1 µl to about 200 µl. The ultra-low volume may be about 1 µl to about 190 µl. The ultra-low volume may be about 1 µl to about 180 µl. The ultra-low volume may be about 1 µl to about 160 µl. The ultra-low volume may be about 1 µl to about 150 µl. The ultra-low volume may be about 1 µl to about 140 µl. The ultra-low volume may be about 5 µl to about 15 µl. The ultra-low volume may be about 5 µl to about 25 µl. The ultra-low volume may be about 5 µl to about 35 µl. The ultra-low volume may be about 5 µl to about 45 µl. The ultra-low volume may be about 5 µl to about 50 µl. The ultra-low volume may be about 5 µl to about 60 µl. The ultra-low volume may be about 5 µl to about 70 µl. The ultra-low volume may be about 5 µl to about 80 µl. The ultra-low volume may be about 5 µl to about 90 µl. The ultra-low volume may be about 5 µl to about 100 µl. The ultra-low volume may be about 5 µl to about 125 µl. The ultra-low volume may be about 5 µl to about 150 µl. The ultra-low volume may be about 5 µl to about 175 µl. The ultra-low volume may be about 5 µl to about 200 µl.

In some instances, methods disclosed herein comprise obtaining an ultra-low volume of a biological sample, wherein the biological sample is urine. Generally, the concentration of DNA in urine is about 40 ng/ml to about 200 ng/ml. In some instances, the ultra-low volume of urine is about 0.25 µl to 1 milliliter. In some instances, the ultra-low volume of urine is about 0.25 µl to about 1 milliliter. In some instances, the ultra-low volume of urine is at least about 0.25 µl. In some instances, the ultra-low volume of urine is at most about 1 milliliter. In some instances, the ultra-low volume of urine is about 0.25 µl to about 0.5 µl, about 0.25 µl to about 0.75 µl, about 0.25 µl to about 1 µl, about 0.25 µl to about 5 µl, about 0.25 µl to about 10 µl, about 0.25 µl to about 50 µl, about 0.25 µl to about 100 µl, about 0.25 µl to about 150 µl, about 0.25 µl to about 200 µl, about 0.25 µl to about 500 µl, about 0.25 µl to about 1 milliliter, about 0.5 µl to about 0.75 µl, about 0.5 µl to about 1 µl, about 0.5 µl to about 5 µl, about 0.5 µl to about 10 µl, about 0.5 µl to about 50 µl, about 0.5 µl to about 100 µl, about 0.5 µl to about 150 µl, about 0.5 µl to about 200 µl, about 0.5 µl to about 500 µl, about 0.5 µl to about 1 milliliter, about 0.75 µl to about 1 µl, about 0.75 µl to about 5 µl, about 0.75 µl to about 10 µl, about 0.75 µl to about 50 µl, about 0.75 µl to about 100 µl, about 0.75 µl to about 150 µl, about 0.75 µl to about 200 µl, about 0.75 µl to about 500 µl, about 0.75 µl to about 1 milliliter, about 1 µl to about 5 µl, about 1 µl to about 10 µl, about 1 µl to about 50 µl, about 1 µl to about 100 µl, about 1 µl to about 150 µl, about 1 µl to about 200 µl, about 1 µl to about 500 µl, about 1 µl to about 1 milliliter, about 5 µl to about 10 µl, about 5 µl to about 50 µl, about 5 µl to about 100 µl, about 5 µl to about 150 µl, about 5 µl to about 200 µl, about 5 µl to about 500 µl, about 5 µl to about 1 milliliter, about 10 µl to about 50 µl, about 10 µl to about 100 µl, about 10 µl to about 150 µl, about 10 µl to about 200 µl, about 10 µl to about 500 µl, about 10 µl to about 1 milliliter, about 50 µl to about 100 µl, about 50 µl to about 150 µl, about 50 µl to about 200 µl, about 50 µl to about 500 µl, about 50 µl to about 1 milliliter, about 100 µl to about 150 µl, about 100 µl to about 200 µl, about 100 µl to about 500 µl, about 100 µl to about 1 milliliter, about 150 µl to about 200 µl, about 150 µl to about 500 µl, about 150 µl to about 1 milliliter, about 200 µl to about 500 µl, about 200 µl to about 1 milliliter, or about 500 µl to about 1 milliliter. In some instances, the volume of urine used is about 0.25 µl, about 0.5 µl, about 0.75 µl, about 1 µl, about 5 µl, about 10 µl, about 50 µl, about 100 µl, about 150 µl, about 200 µl, about 500 µl, or about 1 milliliter.

In some instances, methods disclosed herein comprise obtaining at least about 5 µL of blood to provide a test result with at least about 90% confidence or accuracy. In some instances, methods disclosed herein comprise obtaining at least about 10 µL of blood to provide a test result with at least about 90% confidence or accuracy. In some instances, methods disclosed herein comprise obtaining at least about 15 µL of blood to provide a test result with at least about 90% confidence or accuracy. In some instances, methods disclosed herein comprise obtaining at least about 20 µL of blood to provide a test result with at least about 90% confidence or accuracy. In some instances, methods disclosed herein comprise obtaining at least about 20 µL of blood to provide a test result with at least about 90% confidence or accuracy. In some instances, methods disclosed herein comprise obtaining at least about 20 µL of blood to provide a test result with at least about 95% confidence or accuracy. In some instances, methods disclosed herein comprise obtaining at least about 20 µL of blood to provide a test result with at least about 98% confidence or accuracy. In some instances, methods disclosed herein comprise obtaining at least about 20 µL of blood to provide a test result with at least about 99% confidence or accuracy. In some instances, methods disclosed herein comprise obtaining only about 20 µL to about 120 µL of blood to provide a test result with at least about 90% confidence or accuracy. In some instances, methods disclosed herein comprise obtaining only about 20 µL to about 120 µL of blood to provide a test result with at least about 95% confidence or accuracy. In some instances, the methods disclosed herein comprise obtaining only about 20 µL to about 120 µL of blood to provide a test result with at least about 97% confidence or accuracy. In some instances, methods disclosed herein comprise obtaining only about 20 µL to about 120 µL of blood to provide a test result with at least about 98% confidence or accuracy. In some instances, the methods disclosed herein comprise obtaining only about 20 µL to about 120 µL of blood to provide a test result with at least about 99% confidence or accuracy. In some instances, methods disclosed herein comprise obtaining only about 20 µL to about 120 µL of blood to provide a test result with at least about 99.5% confidence or accuracy.

In some instances, the biological fluid sample is plasma or serum. Plasma or serum makes up roughly 55% of whole blood. In some instances, methods disclosed herein comprise obtaining at least about 10 µL of plasma or serum to provide a test result with at least about 90% confidence or accuracy. In some instances, methods disclosed herein comprise obtaining at least about 10 µL of plasma or serum to provide a test result with at least about 98% confidence or accuracy. In some instances, methods disclosed herein comprise obtaining at least about 12 µL of plasma or serum to provide a test result with at least about 90% confidence or accuracy. In some instances, methods disclosed herein comprise obtaining at least about 12 µL of plasma or serum to provide a test result with at least about 95% confidence or accuracy. In some instances, methods disclosed herein comprise obtaining at least about 12 µL of plasma or serum to provide a test result with at least about 98% confidence or accuracy. In some instances, methods disclosed herein comprise obtaining at least about 12 µL of plasma or serum to provide a test result with at least about 99% confidence or accuracy. In some instances, methods disclosed herein comprise obtaining only about 10 µL to about 60 µL of plasma or serum to provide a test result with at least about 90% confidence or accuracy. In some instances, methods disclosed herein comprise obtaining only about 10 µL to about 60 µL of plasma or serum to provide a test result with at least about 95% confidence or accuracy. In some instances, methods disclosed herein comprise obtaining only about 10 µL to about 60 µL of plasma or serum to provide a test result with at least about 97% confidence or accuracy. In some instances, methods disclosed herein comprise obtaining only about 10 µL to about 60 µL of plasma or serum to provide a test result with at least about 98% confidence or accuracy. In some instances, v only about 10 µL to about 60 µL of plasma or serum to provide a test result with at least about 99% confidence or accuracy. In some instances, methods disclosed herein comprise obtaining only about 10 µL to about 60 µL of plasma or serum to provide a test result with at least about 99.5% confidence or accuracy.

In some instances, methods disclosed herein comprise obtaining a biological sample from a subject, wherein the biological sample contains an amount of cell-free nucleic acid molecules. In some instances, obtaining the biological sample results in disrupting or lysing cells in the biological sample. Thus, in some instances, the biological sample comprises cellular nucleic acid molecules. In some instances, cellular nucleic acid molecules make up less than about 1% of the total cellular nucleic acid molecules in the biological sample. In some instances, cellular nucleic acid molecules make up less than about 5% of the total cellular nucleic acid molecules in the biological sample. In some instances, cellular nucleic acid molecules make up less than about 10% of the total cellular nucleic acid molecules in the biological sample. In some instances, cellular nucleic acid molecules make up less than about 20% of the total cellular nucleic acid molecules in the biological sample. In some instances, cellular nucleic acid molecules make up more than about 50% of the total cellular nucleic acid molecules in the biological sample. In some instances, cellular nucleic acid molecules make up less than about 90% of the total cellular nucleic acid molecules in the biological sample.

In some instances, methods disclosed herein comprise obtaining an ultra-low volume of a biological fluid sample from a subject, wherein the biological fluid sample contains an ultra-low amount of cell-free nucleic acids. In some instances, the ultra-low amount is between about 4 pg to about 100 pg. In some instances, the ultra-low amount is between about 4 pg to about 150 pg. In some instances, the ultra-low amount is between about 4 pg to about 200 pg. In some instances, the ultra-low amount is between about 4 pg to about 300 pg. In some instances, the ultra-low amount is between about 4 pg to about 400 pg. In some instances, the ultra-low amount is between about 4 pg to about 500 pg. In some instances, the ultra-low amount is between about 4 pg to about 1 ng. In some instances, the ultra-low amount is between about 10 pg to about 100 pg. In some instances, the ultra-low amount is between about 10 pg to about 150 pg. In some instances, the ultra-low amount is between about 10 pg to about 200 pg. In some instances, the ultra-low amount is between about 10 pg to about 300 pg. In some instances, the ultra-low amount is between about 10 pg to about 400 pg. In some instances, the ultra-low amount is between about 10 pg to about 500 pg. In some instances, the ultra-low amount is between about 10 pg to about 1 ng. In some instances, the ultra-low amount is between about 20 pg to about 100 pg. In some instances, the ultra-low amount is between about 20 pg to about 200 pg. In some instances, the ultra-low amount is between about 20 pg to about 500 pg. In some instances, the ultra-low amount is between about 20 pg to about 1 ng. In some instances, the ultra-low amount is between about 30 pg to about 150 pg. In some instances, the ultra-low amount is between about 30 pg to about 180 pg. In some instances, the ultra-low amount is between about 30 pg to about 200 pg. In some instances, the ultra-low amount is between is about 30 pg to about 300 pg. In some instances, the ultra-low amount is between about 30 pg to about 400 pg. In some instances, the ultra-low amount is between about 30 pg to about 500 pg. In some instances, the ultra-low amount is between is about 30 pg to about 1 ng. In some instance, the subject is a pregnant subject and the cell-free nucleic acids comprise cell-free fetal DNA. In some instances, the subject has a tumor and the cell-free nucleic acids comprise cell-free tumor DNA. In some instances, the subject is an organ transplant recipient and the cell-free nucleic acids comprise organ donor DNA.

In some instances, methods comprise obtaining less than about 1 ng of cell-free fetal nucleic acids. In some instances, methods comprise obtaining less than about 500 pg of cell-free fetal nucleic acids. In some instances, methods comprise obtaining less than about 100 pg of cell-free fetal nucleic acids. In some instances, methods comprise obtaining at least 3.5 pg of cell-free fetal nucleic acids. In some instances, methods comprise obtaining at least 10 pg of cell-free fetal nucleic acids. In some instances, methods comprise obtaining not more than about 100 pg of cell-free fetal nucleic acids. In some instances, methods comprise obtaining not more than about 500 pg of cell-free fetal nucleic acids. In some instances, methods comprise obtaining not more than about 1 ng of cell-free fetal nucleic acids.

In some instances, methods disclosed herein comprise obtaining a biological fluid sample from a subject, wherein the biological fluid sample contains at least 1 genome equivalent of cell-free DNA. One skilled in the art understands that a genome equivalent is the amount of DNA necessary to be present in a sample to guarantee that all genes will be present. Ultra-low volumes of biological fluid samples disclosed herein may contain an ultra-low number of genome equivalents. In some instances, the biological fluid sample contains less than 1 genome equivalent of cell-free nucleic acids. In some instances, the biological fluid sample contains at least 5 genome equivalents of cell-free nucleic acids. In some instances, the biological fluid sample contains at least 10 genome equivalents of cell-free nucleic acids. In some instances, the biological fluid sample contains at least 15 genome equivalents of cell-free nucleic acids. In some instances, the biological fluid sample contains at least 20 genome equivalents of cell-free nucleic acids. In some instances, the biological fluid sample contains about 5 to about 50 genome equivalents. In some instances, the biological fluid sample contains about 10 to about 50 genome equivalents. In some instances, the biological fluid sample contains about 10 to about 100 genome equivalents. In some instances, the biological fluid sample contains not more than 50 genome equivalents of cell-free nucleic acids. In some instances, the biological fluid sample contains not more than 60 genome equivalents of cell-free nucleic acids. In some instances, the biological fluid sample contains not more than 80 genome equivalents of cell-free nucleic acids. In some instances, the biological fluid sample contains not more than 100 genome equivalents of cell-free nucleic acids.

Ultra-low volumes of biological fluid samples disclosed herein may contain an ultra-low number of cell equivalents. In some instances, methods disclosed herein comprise obtaining a biological fluid sample from a subject, wherein the biological fluid sample contains at least 1 cell equivalent of cell-free DNA. In some instances, the biological fluid sample contains at least 2 cell equivalents of cell-free nucleic acids. In some instances, the biological fluid sample contains at least 5 cell equivalents of cell-free nucleic acids. In some instances, the biological fluid sample contains about 5 cell equivalents of cell-free nucleic acids to about 40 cell equivalents. In some instances, the biological fluid sample contains at least 5 cell equivalents to about 100 cell equivalents of cell-free nucleic acids. In some instances, the biological fluid sample contains not more than 30 cell equivalents of cell-free nucleic acids. In some instances, the biological fluid sample contains not more than 50 cell equivalents of cell-free nucleic acids. In some instances, the biological fluid sample contains not more than 80 cell equivalents of cell-free nucleic acids. In some instances, the biological fluid sample contains not more than 100 cell equivalents of cell-free nucleic acids.

In some instances, methods disclosed herein comprise obtaining a biological sample from a subject, wherein the biological sample contains at least one cell-free nucleic acid of interest. By way of non-limiting example, the cell-free nucleic acid of interest may be a cell-free fetal nucleic acid, cell-free tumor DNA, or DNA from a transplanted organ. In some instances, methods disclosed herein comprise obtaining a biological sample from the subject, wherein the biological sample contains about 1 to about 5 cell-free nucleic acids. In some instances, methods disclosed herein comprise obtaining a biological sample from the subject, wherein the biological sample contains about 1 to about 15 cell-free nucleic acids. In some instances, methods disclosed herein comprise obtaining a biological sample from the subject, wherein the biological sample contains about 1 to about 25 cell-free nucleic acids. In some instances, methods disclosed herein comprise obtaining a biological sample from the subject, wherein the biological sample contains about 1 to about 100 cell-free nucleic acids. In some instances, methods disclosed herein comprise obtaining a biological sample from the subject, wherein the biological sample contains about 5 to about 100 cell-free nucleic acids. In some instances, the at least one cell-free nucleic acid is represented by a sequence that is unique to a target chromosome disclosed herein.

In some instances, methods disclosed herein comprise obtaining a biological sample from a subject, wherein the biological sample contains about $10^2$ cell-free nucleic acids to about $10^{10}$ cell-free nucleic acids. In some instances, the biological sample contains about $10^2$ cell-free nucleic acids to about $10^9$ cell-free nucleic acids. In some instances, the biological sample contains about $10^2$ cell-free nucleic acids to about $10^8$ cell-free nucleic acids. In some instances, the biological sample contains about $10^2$ cell-free nucleic acids to about $10^7$ cell-free nucleic acids. In some instances, the biological sample contains about $10^2$ cell-free nucleic acids to about $10^6$ cell-free nucleic acids. In some instances, the biological sample contains about $10^2$ cell-free nucleic acids to about $10^5$ cell-free nucleic acids.

In some instances, methods disclosed herein comprise obtaining a biological sample from a subject, wherein the biological sample contains about $10^3$ cell-free nucleic acids to about $10^{10}$ cell-free nucleic acids. In some instances, the biological sample contains about $10^3$ cell-free nucleic acids to about $10^9$ cell-free nucleic acids. In some instances, the biological sample contains about $10^3$ cell-free nucleic acids to about $10^8$ cell-free nucleic acids. In some instances, the biological sample contains about $10^3$ cell-free nucleic acids to about $10^7$ cell-free nucleic acids. In some instances, the biological sample contains about $10^3$ cell-free nucleic acids to about $10^6$ cell-free nucleic acids. In some instances, the biological sample contains about $10^3$ cell-free nucleic acids to about $10^5$ cell-free nucleic acids.

In some instances, methods disclosed herein comprise obtaining a biological sample from a subject, wherein the biological sample has a number of cell-free nucleic acids that correspond to a typical sample type volume. By way of non-limiting example, 4 ml of human blood from a pregnant subject typically contains about $10^{10}$ cell-free fetal nucleic acids. However, the concentration of cell-free fetal nucleic acids in a sample, and thus, the sample volume required to be informative about fetal genetics, will depend on the sample type.

Sample processing: In some instances, methods disclosed herein comprise isolating or purifying cell-free nucleic acid molecules from a biological sample. In some instances, methods disclosed herein comprise isolating or purifying nucleic cell-free fetal nucleic acid molecules from a biological sample. In some instances, methods disclosed herein comprise removing non-nucleic acid components from a biological sample described herein. In some instances, isolating or purifying comprises reducing unwanted non-nucleic acid components from a biological sample. In some instances, isolating or purifying comprises removing unwanted non-nucleic acid components from a biological sample. In some instances, isolating or purifying comprises removing at least 5%, at least 10%, at least 20%, at least 30%, at least 40%, at least 50%, at least 60%, at least 70%, at least 80%, or at least 90% of unwanted non-nucleic acid components from a biological sample. In some instances, isolating or purifying comprises removing at least 95% of unwanted non-nucleic acid components from a biological sample. In some instances, isolating or purifying comprises removing at least 97% of unwanted non-nucleic acid components from a biological sample. In some instances, isolating or purifying comprises removing at least 98% of unwanted non-nucleic acid components from a biological sample. In some instances, isolating or purifying comprises removing at least 99% of unwanted non-nucleic acid components from a biological sample. In some instances, isolating or purifying comprises removing at least 95% of unwanted non-nucleic acid components from a biological sample. In some instances, isolating or purifying comprises removing at least 97% of unwanted non-nucleic acid components from a biological sample. In some instances, isolating or purifying comprises removing at least 98% of unwanted non-nucleic acid components from a biological sample. In some instances, isolating or purifying comprises removing at least 99% of unwanted non-nucleic acid components from a biological sample.

In some instances, methods disclosed herein comprise isolating or purifying nucleic acids from one or more non-nucleic acid components of a biological sample. Non-nucleic acid components may also be considered unwanted substances. Non-limiting examples of non-nucleic acid components include cells (e.g., blood cells), cell fragments, extracellular vesicles, lipids, proteins or a combination thereof. Additional non-nucleic acid components are described herein and throughout. It should be noted that while methods may comprise isolating/purifying nucleic acids, they may also comprise analyzing a non-nucleic acid component of a sample that is considered an unwanted substance in a nucleic acid purifying step. Isolating or purifying may comprise removing components of a biological sample that would inhibit, interfere with or otherwise be detrimental to the later process steps such as nucleic acid amplification or detection.

Isolating or purifying may be performed with a device or system disclosed herein. Isolating or purifying may be performed within a device or system disclosed herein. Isolating and/or purifying may occur with the use of a sample purifier disclosed herein. In some instances, isolating or purifying nucleic acids comprises removing non-nucleic acid components from a biological sample described herein. In some instances, isolating or purifying nucleic acids comprises discarding non-nucleic acid components from a biological sample. In some instances, isolating or purifying comprises collecting, processing and analyzing the non-nucleic acid components. In some instances, the non-nucleic acid components may be considered biomarkers because they provide additional information about the subject.

In some instances, isolating or purifying nucleic acids comprise lysing a cell. In some instances, isolating or purifying nucleic acids avoids lysing a cell. In some instances, isolating or purifying nucleic acids does not comprise lysing a cell. In some instances, isolating or purifying nucleic acids does not comprise an active step intended to lyse a cell. In some instances, isolating or purifying nucleic acids does not comprise intentionally lysing a cell. Intentionally lysing a cell may include mechanically disrupting a cell membrane (e.g., shearing). Intentionally lysing a cell may include contacting the cell with a lysis reagent. Exemplary lysis reagents are described herein.

In some instances, isolating or purifying nucleic acids comprises lysing and performing sequence specific capture of a target nucleic acid with "bait" in a solution followed by binding of the "bait" to solid supports such as magnetic beads, e.g. Legler et al., Specific magnetic bead-based capture of free fetal DNA from maternal plasma, Transfusion and Apheresis Science 40 (2009), 153-157. In some instances, methods comprise performing sequence specific capture in the presence of a recombinase or helicase. Use of a recombinase or helicase may avoid the need for heat denaturation of a nucleic acid and speed up the detection step.

In some instances, isolating or purifying comprises separating components of a biological sample disclosed herein. By way of non-limiting example, isolating or purifying may comprise separating plasma from blood. In some instances, isolating or purifying comprises centrifuging the biological sample. In some instances, isolating or purifying comprises filtering the biological sample in order to separate components of a biological sample. In some instances, isolating or purifying comprises filtering the biological sample in order to remove non-nucleic acid components from the biological sample. In some instances, isolating or purifying comprises filtering the biological sample in order to capture nucleic acids from the biological sample.

In some instances, the biological sample is blood and isolating or purifying a nucleic acid comprises obtaining or isolating plasma from blood. Obtaining plasma may comprise separating plasma from cellular components of a blood sample. Obtaining plasma may comprise centrifuging the blood, filtering the blood, or a combination thereof. Obtaining plasma may comprise allowing blood to be subjected to gravity (e.g., sedimentation). Obtaining plasma may comprise subjecting blood to a material that wicks a portion of the blood away from non-nucleic acid components of the blood. In some instances, methods comprise subjecting the blood to vertical filtration. In some instances, methods comprise subjecting the blood to a sample purifier comprising a filter matrix for receiving whole blood, the filter matrix having a pore size that is prohibitive for cells to pass through, while plasma can pass through the filter matrix uninhibited. Such vertical filtration and filter matrices are described for devices disclosed herein.

In some instances, isolating or purifying comprises subjecting a biological sample, or a fraction thereof, or a modified version thereof, to a binding moiety. The binding moiety may be capable of binding to a component of a biological sample and removing it to produce a modified sample depleted of cells, cell fragments, nucleic acids or proteins that are unwanted or of no interest. In some instances, isolating or purifying comprises subjecting a biological sample to a binding moiety to reduce unwanted substances or non-nucleic acid components in a biological sample. In some instances, isolating or purifying comprises subjecting a biological sample to a binding moiety to produce a modified sample enriched with target cell, target cell fragments, target nucleic acids or target proteins. By way of non-limiting example, isolating or purifying may comprise subjecting a biological sample to a binding moiety for capturing placenta educated platelets, which may contain fetal DNA or RNA fragments. The resulting cell-bound binding moieties can be captured/enriched for with antibodies or other methods, e.g., low speed centrifugation.

Isolating or purifying may comprise capturing an extracellular vesicle or extracellular microparticle in the biological sample with a binding moiety. In some instances, the extracellular vesicle contains at least one of DNA and RNA. In some instances, the extracellular vesicle is fetal/placental in origin. Methods may comprise capturing an extracellular vesicle or extracellular microparticle in the biological sample that comes from a maternal cell. In some instances, methods disclosed herein comprise capturing and discarding an extracellular vesicle or extracellular microparticle from a maternal cell to enrich the sample for fetal/placental nucleic acids.

In some instances, methods comprise capturing a nucleosome in a biological sample and analyzing nucleic acids attached to the nucleosome. In some instances, methods comprise capturing an exosome in a biological sample and analyzing nucleic acids attached to the exosome. Capturing nucleosomes and/or exosomes may preclude the need for a lysis step or reagent, thereby simplifying the method and reducing time from sample collection to detection.

In some instances, methods comprise subjecting a biological sample to a cell-binding moiety for capturing placenta educated platelets, which may contain fetal DNA or RNA fragments. Capturing may comprise contacting the placenta educated platelets with a binding moiety (e.g., an antibody for a cell surface marker), subjecting the biological sample to low speed centrifugation, or a combination thereof. In some instances, the binding moiety is attached to a solid support disclosed herein, and methods comprise separating the solid support from the rest of the biological sample after the binding moiety has made contact with the biological sample.

In some instances, methods disclosed herein comprise removing unwanted non-nucleic acid components from a biological sample. In some instances, methods disclosed herein comprise removing and discarding non-nucleic acid components from a biological sample. Non-limiting examples of non-nucleic acid components include cells (e.g., blood cells), cell fragments, extracellular vesicles, lipids, proteins or a combination thereof. In some instances, removing non-nucleic acid components may comprise centrifuging the biological sample. In some instances, removing non-nucleic acid components may comprise filtering the biological fluid sample. In some instances, removing non-nucleic acid components may comprise contacting the biological sample with a binding moiety described herein.

In some embodiments, methods disclosed herein comprise purifying nucleic acids in a sample. In some instances, purifying does not comprise washing the nucleic acids with a wash buffer. In some instances, the nucleic acids are cell-free fetal nucleic acids. In some embodiments, purifying comprises capturing the nucleic acids with a nucleic acid capturing moiety to produce captured nucleic acids. Non-limiting examples of nucleic acid capturing moieties are silica particles and paramagnetic particles. In some embodiments, purifying comprises passing the sample containing the captured nucleic acids through a hydrophobic phase (e.g., a liquid or wax). The hydrophobic phase retains impurities in the sample that would otherwise inhibit further manipulation (e.g., amplification, sequencing) of the nucleic acids.

In some instances, methods disclosed herein comprise removing nucleic acid components from a biological sample described herein. In some instances, the removed nucleic acid components are discarded. By way of non-limiting example, methods may comprise analyzing only DNA. Thus, RNA is unwanted and creates undesirable background noise or contamination to the DNA. In some instances, methods disclosed herein comprise removing RNA from a biological sample. In some instances, methods disclosed herein comprise removing mRNA from a biological sample. In some instances, methods disclosed herein comprise removing microRNA from a biological sample. In some instances, methods disclosed herein comprise removing maternal RNA from a biological sample. In some instances, methods disclosed herein comprise removing DNA from a biological sample. In some instances, methods disclosed herein comprise removing maternal DNA from a biological sample of a pregnant subject. In some instances, removing nucleic acid components comprises contacting the nucleic acid components with an oligonucleotide capable of hybridizing to the nucleic acid, wherein the oligonucleotide is conjugated, attached or bound to a capturing device (e.g., bead, column, matrix, nanoparticle, magnetic particle, etc.). In some instances, the removed nucleic acid components are discarded.

In some instances, removing nucleic acid components comprises separating the nucleic acid components on a gel by size. For example, circulating cell-free fetal DNA fragments are generally less than 200 base pairs in length. In some instances, methods disclosed herein comprise removing cell-free DNA from the biological sample. In some instances, methods disclosed herein comprise capturing cell-free DNA from the biological sample. In some instances, methods disclosed herein comprise selecting cell-free DNA from the biological sample. In some instances, the cell-free DNA has a minimum length. In some instances, the minimum length is about 50 base pairs. In some instances, the minimum length is about 100 base pairs. In some instances, the minimum length is about 110 base pairs. In some instances, the minimum length is about 120 base pairs. In some instances, the minimum length is about 140 base pairs. In some instances, the cell-free DNA has a maximum length. In some instances, the maximum length is about 180 base pairs. In some instances, the maximum length is about 200 base pairs. In some instances, the maximum length is about 220 base pairs. In some instances, the maximum length is about 240 base pairs. In some instances, the maximum length is about 300 base pairs. Size based separation would be useful for other categories of nucleic acids having limited size ranges, which are well known in the art (e.g., microRNAs).

In some instances, methods disclosed herein comprise removing nucleic acid components from a biological sample comprising a mixture of maternal cells and fetal trophoblasts, the fetal trophoblasts in some cases, contain the genetic information of a fetus (e.g., RNA, DNA). In some instances, fetal trophoblasts are enriched in the biological sample. Non-limiting examples of methods to enrich fetal trophoblasts in a biological sample include, enrichment by morphology (e.g., size) and marker antigens (e.g., cell surface antigens). In some cases, enrichment of trophoblasts is performed using the isolation by size of epithelial tumor cells (ISET) method. In some cases, enrichment of trophoblasts in a biological sample comprises contacting the biological sample with an antibody or antigen-binding fragment specific to a cell-surface antigen of a fetal trophoblast. Non-limiting examples of trophoblast cell-surface antigens include tropomyosin-1 (Trop1), tropomyosin-2 (Trop2), cyto and syncytio-trophoblast marker, GB25, human placental lactogen (HPL), and alpha human chorionic gonadotrophin (alpha HCG). There are many suitable techniques for purifying trophoblasts from a biological sample using the monoclonal antibodies described herein, including but not limited to, fluoresce-activated cell sorting (FACS), column chromatography, magnetic sorting (e.g., Dynabeads). In some instances, the fetal genetic information is extracted from the enriched and/or purified trophoblasts, using any suitable DNA extraction method.

In some instances, the fetal trophoblasts are (1) isolated from the biological sample; (2) the isolated trophoblasts are lysed; (3) the fetal nuclei from the lysed fetal trophoblasts are isolated; (4) lysing the isolated fetal nuclei; and (5) purifying the genomic DNA from the isolated fetal nuclei. In some instances, the fetal nuclei are treated with a DNAase prior to lysing isolation. In some instances. In a non-limiting example, the biological sample contain fetal and maternal cells (e.g., trophoblasts) are centrifuged and resuspended in media. Next, the cells are mechanically separated using a magnetic separation procedure (e.g., magnetic nanoparticles conjugated to a cell surface antigen-specific monoclonal antibody). Cells are washed and suspended in media. Maternal cells (e.g., cell-surface antigen negative) are separated from magnetized (cell-surface antigen positive) fetal trophoblast cells using a DynaMag™ Spin magnet (Life Technologies). The fetal trophoblast cells are washed multiple times using a magnet to remove residual maternal cells. The isolated fetal trophoblast cells are resuspended in a solution. isolated fetal trophoblast cells are lysed by addition of a lysing buffer, followed by centrifugation at low speed to pellet intact fetal trophoblast cell nuclei. The supernatant is removed and the nuclei are washed multiple times. Genomic DNA is extracted from the fetal trophoblast cell nuclei by addition of 25 microliters of 3× concentrated DNA extraction buffer to the fetal trophoblast cell nuclei, and incubated for about 3 hours. Optionally the DNA is still further purified, for example using commercial DNA purification and concentration kits.

Amplifying nucleic acids: In some instances, methods disclosed herein comprise amplifying at least one nucleic acid in a sample to produce at least one amplification product. The at least one nucleic acid may be a cell-free nucleic acid. The sample may be a biological sample disclosed herein or a fraction or portion thereof. In some instances, methods comprise producing a copy of the nucleic acid in the sample and amplifying the copy to produce the at least one amplification product. In some instances, methods comprise producing a reverse transcript of the nucleic acid in the sample and amplifying the reverse transcript to produce the at least one amplification product.

In some instances, methods comprise performing whole genome amplification. In some instances, methods do not comprise performing whole genome amplification. The term, "whole genome amplification" may refer to amplifying all of the cell-free nucleic acids in a biological sample. The term, "whole genome amplification" may refer to amplifying at least 90% of the cell-free nucleic acids in a biological sample. Whole genome may refer to multiple genomes. Whole genome amplification may comprise amplifying cell-free nucleic acids from a biological sample of a subject, wherein the biological sample comprises cell-free nucleic acids from the subject and a foreign tissue. For example, whole genome amplification may comprise amplifying cell-free nucleic acids from both a subject (a host genome) and an organ or tissue that has been transplanted into the subject (a donor genome). Also by way of non-limiting example, whole genome amplification may comprise amplifying cell-free nucleic acids from a biological sample of a pregnant subject, wherein the biological sample comprises cell-free nucleic acids from the pregnant subject and her fetus. Whole genome amplification may comprise amplifying cell-free nucleic acids from a biological sample of a subject having cancer, wherein the biological sample comprises cell-free nucleic acids from benign tissue of the subject and a tumor in the subject. Whole genome amplification may comprise amplifying cell-free nucleic acids from a biological sample of a subject having an infection, wherein the biological sample comprises cell-free nucleic acids from the subject and a pathogen.

In some instances, methods disclosed herein comprise amplifying a nucleic acid, wherein amplifying comprises performing an isothermal amplification of the nucleic acid. Non-limiting examples of isothermal amplification are as follows: loop-mediated isothermal amplification (LAMP), strand displacement amplification (SDA), helicase dependent amplification (HDA), nicking enzyme amplification reaction (NEAR), and recombinase polymerase amplification (RPA). In some instances, the isothermal amplification is high throughput involving parallel sample processing. In some instances, the high throughput isothermal amplification involves amplifying a nucleic acid in 12, 24, 36, 48, 60, 72, 84, 96, 108, or more samples in parallel. In some instances, the high throughput isothermal amplification involves amplifying a nucleic acid in between 12-24, 24-36, 36-48, 48-60, 70-72, 72-84, 84-96, 96-108, 108-120, 120-132, 132-144, 144-156-156-168, 168-180, 180-192, 192-204, 204-216, 216-228, 228-240, 240-252, or252-264, samples in parallel. In some instances, the high throughput isothermal amplification involves amplifying a nucleic acid in at least 90, 100, 200, 300, 400, 500, 600, 700, 800, 900, 1,000, 1,100, 1,200, 1,300, 1,400, or 1,500 samples in parallel.

Any appropriate nucleic acid amplification method known in the art is contemplated for use in the devices and methods described herein. In some instances, isothermal amplification is used. In some instances, amplification is isothermal with the exception of an initial heating step before isothermal amplification begins. A number of isothermal amplification methods, each having different considerations and providing different advantages, are known in the art and have been discussed in the literature, e.g., by Zanoli and Spoto, 2013, "Isothermal Amplification Methods for the Detection of Nucleic Acids in Microfluidic Devices," Biosensors 3: 18-43, and Fakruddin, et al., 2013, "Alternative Methods of Polymerase Chain Reaction (PCR)," Journal of Pharmacy and Bioallied Sciences 5(4): 245-252, each incorporated herein by reference in its entirety. In some instances, any appropriate isothermic amplification method is used. In some instances, the isothermic amplification method used is selected from: Loop Mediated Isothermal Amplification (LAMP); Nucleic Acid Sequence Based Amplification (NASBA); Multiple Displacement Amplification (MDA); Rolling Circle Amplification (RCA); Helicase Dependent Amplification (HDA); Strand Displacement Amplification (SDA); Nicking Enzyme Amplification Reaction (NEAR); Ramification Amplification Method (RAM); and Recombinase Polymerase Amplification (RPA).

In some instances, the amplification method used is LAMP (see, e.g., Notomi, et al., 2000, "Loop Mediated Isothermal Amplification" NAR 28(12): e63 i-vii, and U.S. Pat. No. 6,410,278, "Process for synthesizing nucleic acid" each incorporated by reference herein in its entirety). LAMP is a one-step amplification system using auto-cycling strand displacement deoxyribonucleic acid (DNA) synthesis. In some instances, LAMP is carried out at 60-65° C. for 45-60 min in the presence of a thermostable polymerase, e.g., *Bacillus stearothermophilus* (Bst) DNA polymerase I, deoxyribonucleotide triphosphate (dNTPs), specific primers and the target DNA template. In some instances, the template is RNA and a polymerase having both reverse transcriptase activity and strand displacement-type DNA polymerase activity, e.g., Bca DNA polymerase, is used, or a polymerase having reverse transcriptase activity is used for the reverse transcriptase step and a polymerase not having reverse transcriptase activity is used for the strand displacement-DNA synthesis step.

In some instances, the amplification method is Nucleic Acid Sequence Based Amplification (NASBA). NASBA (also known as 3SR, and transcription-mediated amplification) is an isothermal transcription-based RNA amplification system. Three enzymes (avian myeloblastosis virus reverse transcriptase, RNase H and T7 DNA dependent RNA polymerase) are used to generate single-stranded RNA. In certain cases NASBA can be used to amplify DNA. The amplification reaction is performed at 41° C., maintaining constant temperature, typically for about 60 to about 90 minutes (see, e.g., Fakruddin, et al., 2012, "Nucleic Acid Sequence Based Amplification (NASBA) Prospects and Applications," Int. J. of Life Science and Pharma Res. 2(1):L106-L121, incorporated by reference herein).

In some instances, the NASBA reaction is carried out at about 40° C. to about 42° C. In some instances, the NASBA reaction is carried out at 41° C. In some instances, the NASBA reaction is carried out at at most about 42° C. In some instances, the NASBA reaction is carried out at about 40° C. to about 41° C., about 40° C. to about 42° C., or about 41° C. to about 42° C. In some instances, the NASBA reaction is carried out at about 40° C., about 41° C., or about 42° C.

In some instances, the amplification method is Strand Displacement Amplification (SDA). SDA is an isothermal amplification method that uses four different primers. A primer containing a restriction site (a recognition sequence for HincII exonuclease) is annealed to the DNA template. An exonuclease-deficient fragment of *Eschericia coli* DNA polymerase 1 (exo-Klenow) elongates the primers. Each SDA cycle consists of (1) primer binding to a displaced target fragment, (2) extension of the primer/target complex by exo-Klenow, (3) nicking of the resultant hemiphosphothioate HincII site, (4) dissociation of HincII from the nicked site and (5) extension of the nick and displacement of the downstream strand by exo-Klenow.

In some instances, methods comprise contacting DNA in a sample with a helicase. In some instances, the amplification method is Helicase Dependent Amplification (HDA). HDA is an isothermal reaction because a helicase, instead of heat, is used to denature DNA.

In some instances, the amplification method is Multiple Displacement Amplification (MDA). The MDA is an isothermal, strand-displacing method based on the use of the highly processive and strand-displacing DNA polymerase from bacteriophage 029, in conjunction with modified random primers to amplify the entire genome with high fidelity. It has been developed to amplify all DNA in a sample from a very small amount of starting material. In MDA 029 DNA polymerase is incubated with dNTPs, random hexamers and denatured template DNA at 30° C. for 16 to18 hours and the enzyme must be inactivated at high temperature (65° C.) for 10 min. No repeated recycling is required, but a short initial denaturation step, the amplification step, and a final inactivation of the enzyme are needed.

In some instances, the amplification method is Rolling Circle Amplification (RCA). RCA is an isothermal nucleic acid amplification method which allows amplification of the probe DNA sequences by more than 109 fold at a single temperature, typically about 30° C. Numerous rounds of isothermal enzymatic synthesis are carried out by 029 DNA polymerase, which extends a circle-hybridized primer by continuously progressing around the circular DNA probe. In some instances, the amplification reaction is carried out using RCA, at about 28° C. to about 32° C.

Additional amplification methods can be found in the art that could be incorporated into devices and methods disclosed herein. Ideally, the amplification method is isothermal and fast relative to traditional PCR. In some instances, amplifying comprises performing an exponential amplification reaction (EXPAR), which is an isothermal molecular chain reaction in that the products of one reaction catalyze further reactions that create the same products. In some instances, amplifying occurs in the presence of an endonuclease. The endonuclease may be a nicking endonuclease. See, e.g., Wu et al., "Aligner-Mediated Cleavage of Nucleic Acids," Chemical Science (2018). In some instances, amplifying does not require initial heat denaturation of target DNA. See, e.g., Toley et al., "Isothermal strand displacement amplification (iSDA): a rapid and sensitive method of nucleic acid amplification for point-of-care diagnosis," The Analyst (2015). Pulse controlled amplification in an ultrafast amplification method developed by GNA Biosolutions GmbH.

In some instances, methods comprise performing multiple cycles of nucleic acid amplification with a pair of primers. The number of amplification cycles is important because amplification may introduce a bias into the representation of regions. With ultra low input amounts, amplification is even more prone to create biases and hence increasing efficiency prior to amplification is important for high accuracy. Not all regions amplify with the same efficiency and therefore the overall representation may not be uniform which will impact the accuracy of the analysis. Usually fewer cycles are ideal if amplification is necessary at all. In some instances, methods comprise performing fewer than 30 cycles of amplification. In some instances, methods comprise performing fewer than 25 cycles of amplification. In some instances, methods comprise performing fewer than 20 cycles of amplification. In some instances, methods comprise performing fewer than 15 cycles of amplification. In some instances, methods comprise performing fewer than 12 cycles of amplification. In some instances, methods comprise performing fewer than 11 cycles of amplification. In some instances, methods comprise performing fewer than 10 cycles of amplification. In some instances, methods comprise performing at least 3 cycles of amplification. In some instances, methods comprise performing at least 5 cycles of amplification. In some instances, methods comprise performing at least 8 cycles of amplification. In some instances, methods comprise performing at least 10 cycles of amplification.

In some instances, the amplification reaction is carried for about 30 5 to about 90 minutes. In some instances, the amplification reaction is carried out for at least about 30 minutes. In some instances, the amplification reaction is carried out for at most about 90 minutes. In some instances, the amplification reaction is carried out for about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 30 minutes to about 65 minutes, about 30 minutes to about 70 minutes, about 30 minutes to about 75 minutes, about 30 minutes to about 80 minutes, about 30 minutes to about 90 minutes, about 35 minutes to about 40 minutes, about 35 minutes to about 45 minutes, about 35 minutes to about 50 minutes, about 35 minutes to about 55 minutes, about 35 minutes to about 60 minutes, about 35 minutes to about 65 minutes, about 35 minutes to about 70 minutes, about 35 minutes to about 75 minutes, about 35 minutes to about 80 minutes, about 35 minutes to about 90 minutes, about 40 minutes to about 45 minutes, about 40 minutes to about 50 minutes, about 40 minutes to about 55 minutes, about 40 minutes to about 60 minutes, about 40 minutes to about 65 minutes, about 40 minutes to about 70 minutes, about 40 minutes to about 75 minutes, about 40 minutes to about 80 minutes, about 40 minutes to about 90 minutes, about 45 minutes to about 50 minutes, about 45 minutes to about 55 minutes, about 45 minutes to about 60 minutes, about 45 minutes to about 65 minutes, about 45 minutes to about 70 minutes, about 45 minutes to about 75 minutes, about 45 minutes to about 80 minutes, about 45 minutes to about 90 minutes, about 50 minutes to about 55 minutes, about 50 minutes to about 60 minutes, about 50 minutes to about 65 minutes, about 50 minutes to about 70 minutes, about 50 minutes to about 75 minutes, about 50 minutes to about 80 minutes, about 50 minutes to about 90 minutes, about 55 minutes to about 60 minutes, about 55 minutes to about 65 minutes, about 55 minutes to about 70 minutes, about 55 minutes to about 75 minutes, about 55 minutes to about 80 minutes, about 55 minutes to about 90 minutes, about 60 minutes to about 65 minutes, about 60 minutes to about 70 minutes, about 60 minutes to about 75 minutes, about 60 minutes to about 80 minutes, about 60 minutes to about 90 minutes, about 65 minutes to about 70 minutes, about 65 minutes to about 75 minutes, about 65 minutes to about 80 minutes, about 65 minutes to about 90 minutes, about 70 minutes to about 75 minutes, about 70 minutes to about 80 minutes, about 70 minutes to about 90 minutes, about 75 minutes to about 80 minutes, about 75 minutes to about 90 minutes, or about 80 minutes to about 90 minutes. In some instances, the amplification reaction is carried out for about 30 minutes, about 35 minutes, about 40 minutes, about 45 minutes, about 50 minutes, about 55 minutes, about 60 minutes, about 65 minutes, about 70 minutes, about 75 minutes, about 80 minutes, or about 90 minutes.

In some instances, methods disclosed herein comprise amplifying a nucleic acid at least at one temperature. In some instances, methods disclosed herein comprise amplifying a nucleic acid at a single temperature (e.g., isothermal amplification). In some instances, methods disclosed herein comprise amplifying a nucleic acid, wherein the amplifying occurs at not more than two temperatures. Amplifying may occur in one step or multiple steps. Non-limiting examples of amplifying steps include double strand denaturing, primer hybridization, and primer extension.

In some instances, at least one step of amplifying occurs at room temperature. In some instances, all steps of amplifying occur at room temperature. In some instances, at least one step of amplifying occurs in a temperature range. In some instances, all steps of amplifying occur in a temperature range. In some instances, the temperature range is about 0° C. to about 100° C. In some instances, the temperature range is about 15° C. to about 100° C. In some instances, the temperature range is about 25° C. to about 100° C. In some instances, the temperature range is about 35° C. to about 100° C. In some instances, the temperature range is about 55° C. to about 100° C. In some instances, the temperature range is about 65° C. to about 100° C. In some instances, the temperature range is about 15° C. to about 80° C. In some instances, the temperature range is about 25° C. to about 80° C. In some instances, the temperature range is about 35° C. to about 80° C. In some instances, the temperature range is about 55° C. to about 80° C. In some instances, the temperature range is about 65° C. to about 80° C. In some instances, the temperature range is about 15° C. to about 60° C. In some instances, the temperature range is about 25° C. to about 60° C. In some instances, the temperature range is about 35° C. to about 60° C. In some instances, the temperature range is about 15° C. to about 40° C. In some instances, the temperature range is about −20° C. to about 100° C. In some instances, the temperature range is about −20° C. to about 90° C. In some instances, the temperature range is about −20° C. to about 50° C. In some instances, the temperature range is about −20° C. to about 40° C. In some instances, the temperature range is about −20° C. to about 10° C. In some instances, the temperature range is about 0° C. to about 100° C. In some instances, the temperature range is about 0° C. to about 40° C. In some instances, the temperature range is about 0° C. to about 30° C. In some instances, the temperature range is about 0° C. to about 20° C. In some instances, the temperature range is about 0° C. to about 10° C. In some instances, the temperature range is about 15° C. to about 100° C. In some instances, the temperature range is about 15° C. to about 90° C. In some instances, the temperature range is about 15° C. to about 80° C. In some instances, the temperature range is about is about 15° C. to about 70° C. In some instances, the temperature range is about 15° C. to about 60° C. In some instances, the temperature range is about 15° C. to about 50° C. In some instances, the temperature range is about 15° C. to about 30° C. In some instances, the temperature range is about 10° C. to about 30° C. In some instances, methods disclose herein are performed at room temperature, not requiring cooling, freezing or heating. In some instances, amplifying comprises contacting the sample with random oligonucleotide primers. In some instances, amplifying comprises contacting cell-free nucleic acid molecules disclosed herein with random oligonucleotide primers. In some instances, amplifying comprises contacting cell-free fetal nucleic acid molecules disclosed herein with random oligonucleotide primers. In some instances, amplifying comprises contacting the tagged nucleic acid molecules disclosed herein with random oligonucleotide primers. Amplifying with a plurality of random primers generally results in non-targeted amplification of multiple nucleic acids of different sequences or an overall amplification of most nucleic acids in a sample.

In some instances, amplifying comprises targeted amplification (e.g., selector method (described in U.S. Pat. No. 6,558,928), molecular inversion probes). In some instances, amplifying a nucleic acid comprises contacting a nucleic acid with at least one primer having a sequence corresponding to a target chromosome sequence. Exemplary chromosome sequences are disclosed herein. In some instances, amplifying comprises contacting the nucleic acid with at least one primer having a sequence corresponding to a non-target chromosome sequence. In some instances, amplifying comprises contacting the nucleic acid with not more than one pair of primers, wherein each primer of the pair of primers comprises a sequence corresponding to a sequence on a target chromosome disclosed herein. In some instances, amplifying comprises contacting the nucleic acid with multiple sets of primers, wherein each of a first pair in a first set and each of a pair in a second set are all different.

In some instances, amplifying comprises contacting the sample with at least one primer having a sequence corresponding to a sequence on a target chromosome disclosed herein. In some instances, amplifying comprises contacting the sample with at least one primer having a sequence corresponding to a sequence on a non-target chromosome disclosed herein. In some instances, amplifying comprises contacting the sample with not more than one pair of primers, wherein each primer of the pair of primers comprises a sequence corresponding to a sequence on a target chromosome disclosed herein. In some instances, amplifying comprises contacting the sample with multiple sets of primers, wherein each of a first pair in a first set and each of a pair in a second set are all different.

In some instances, amplifying comprises multiplexing (nucleic acid amplification of a plurality of nucleic acids in one reaction). In some instances, multiplexing comprises contacting nucleic acids of the biological sample with a plurality of oligonucleotide primer pairs. In some instances, multiplexing comprising contacting a first nucleic acid and a second nucleic acid, wherein the first nucleic acid corresponds to a first sequence and the second nucleic acid corresponds to a second sequence. In some instances, the first sequence and the second sequence are the same. In some instances, the first sequence and the second sequence are different. In some instances, amplifying does not comprise multiplexing. In some instances, amplifying does not require multiplexing. In some instance, amplifying comprises nested primer amplification. Methods may comprise multiplex PCR of multiple regions, wherein each region comprises a single nucleotide polymorphism (SNP). Multiplexing may occur in a single tube. In some instances, methods comprise multiplex PCR of more than 100 regions wherein each region comprises a SNP. In some instances, methods comprise multiplex PCR of more than 500 regions wherein each region comprises a SNP. In some instances, methods comprise multiplex PCR of more than 1000 regions wherein each region comprises a SNP. In some instances, methods comprise multiplex PCR of more than 2000 regions wherein each region comprises a SNP. In some instances, methods comprise multiplex PCR of more than 300 regions wherein each region comprises a SNP.

In some instances, methods comprise amplifying a nucleic acid in the sample, wherein amplifying comprises contacting the sample with at least one oligonucleotide primer, wherein the at least one oligonucleotide primer is not active or extendable until it is in contact with the sample. In some instances, amplifying comprises contacting the sample with at least one oligonucleotide primer, wherein the at least one oligonucleotide primer is not active or extendable until it is exposed to a selected temperature. In some instances, amplifying comprises contacting the sample with at least one oligonucleotide primer, wherein the at least one oligonucleotide primer is not active or extendable until it is contacted with an activating reagent. By way of non-limiting example, the at least one oligonucleotide primer may comprise a blocking group. Using such oligonucleotide primers may minimize primer dimers, allow recognition of unused primer, and/or avoid false results caused by unused primers. In some instances, amplifying comprises contacting the sample with at least one oligonucleotide primer comprising a sequence corresponding to a sequence on a target chromosome disclosed herein.

In some instances, methods disclosed herein comprise the use of one or more tags. The use of one or more tags may increase at least one of the efficiency, speed and accuracy of methods disclosed herein. In some instances, the oligonucleotide primer comprises a tag, wherein the tag is not specific to a target sequence. Such a tag may be referred to as a universal tag. In some instances, methods comprise tagging a target sequence, or fragment thereof, in the sample with a tag that is not specific to the target sequence. In some instances, the tag that is not specific to a sequence on a human chromosome. Alternatively or additionally, methods comprise contacting the sample with a tag and at least one oligonucleotide primer comprising a sequence corresponding to a target sequence, wherein the tag is separate from the oligonucleotide primer. In some instances, the tag is incorporated in an amplification product produced by extension of the oligonucleotide primer after it hybridizes to the target sequence. The tag may be an oligonucleotide, a small molecule, or a peptide. In some instances, the tag does not comprise a nucleotide. In some instances, the tag does not comprise an oligonucleotide. In some instances, the tag does not comprise an amino acid. In some instances, the tag does not comprise a peptide. In some instances, the tag is not sequence specific. In some instances, the tag comprises a generic sequence that does not correspond to any particular target sequence. In some instances, the tag is detectable when an amplification product is produced, regardless of the sequence amplified. In some instances, at least one of the oligonucleotide primer and tag comprises a peptide nucleic acid (PNA). In some instances, at least one of the oligonucleotide primer and tag comprises a locked nucleic acid (LNA).

In some instances, methods disclosed herein comprise the use of a plurality of tags, thereby increasing at least one of the accuracy of the method, speed of the method and information obtained by the method. In some instances, methods disclosed herein comprise the use of a plurality of tags, thereby decreasing the volume of sample required to obtain a reliable result. In some instances, the plurality of tags comprises at least one capture tag. In some instances, the plurality of tags comprises at least one detection tag. In some instances, the plurality of tags comprises a combination of least one capture tag and at least one detection tag. A capture tag is generally used to isolate or separate a specific sequence or region from other regions. A typical example for a capture tag is biotin (that can be captured using streptavidin coated surfaces for example). Examples of detection tags are digoxigenin and a fluorescent tag. The detection tag may be detected directly (e.g., laser irradiation and/or measuring emitted light) or indirectly through an antibody that carries or interacts with a secondary detection system such as a luminescent assay or enzymatic assay. In some instances, the plurality of tags comprises a combination of least one capture tag (a tag used to isolate an analyte) and at least one detection tag (a tag used to detect the analyte). In some instance, a single tag acts as a detection tag and a capture tag.

In some instances, methods comprise contacting the at least one circulating cell-free nucleic acid in the sample with a first tag and a second tag, wherein the first tag comprises a first oligonucleotide that is complementary to a sense strand of the circulating cell-free nucleic acid, and the second capture tag comprises a second oligonucleotide that is complementary to an antisense strand of the circulating cell-free nucleic acid. In some instances, methods comprise contacting the at least one circulating cell-free nucleic acid in the sample with a first tag and a second tag, wherein the first tag carries the same label as the second tag. In some instances, methods comprise contacting the at least one circulating cell-free nucleic acid in the sample with a first tag and a second tag, wherein the first tag carries a different label than the second tag. In some instances, the tags are the same and there is a single qualitative or quantitative signal that is the aggregate of all probes/regions detected. In some instances, the tags are different. One tag may be used to purify and one tag may be used to detect. In some instances, a first oligonucleotide tag is specific to a region (e.g., cfDNA fragment) and carries a fluorescent label and a second oligonucleotide is specific to an adjacent region and carries the same fluorescent label because only the aggregate signal is desired. In other instances, a first oligonucleotide tag is specific to a region (e.g., cfDNA fragment) and carries a fluorescent label and a second oligonucleotide is specific to an adjacent region and carries a different fluorescent label to detect two distinct regions.

In some instances, methods comprise detecting an amplification product, wherein the amplification product is produced by amplifying at least a portion of a target chromosome disclosed herein, or fragment thereof. The portion or fragment of the target chromosome may comprise at least 5 nucleotides. The portion or fragment of the target chromosome may comprise at least about 10 nucleotides. The portion or fragment of the target chromosome may comprise at least about 15 nucleotides. In some instances, detecting amplification products disclosed herein does not comprise tagging or labeling the amplification product. In some instances, methods detect the amplification product based on its amount. For example, the methods may detect an increase in the amount of double stranded DNA in the sample. In some instances, detecting the amplification product is at least partially based on its size. In some instances, the amplification product has a length of about 50 base pairs to about 500 base pairs.

In some instances, detecting the amplification product comprises contacting the amplification product with a tag. In some instances, the tag comprises a sequence that is complementary to a sequence of the amplification product. In some instances, the tag does not comprise a sequence that is complementary to a sequence of the amplification product. Non-limiting examples of tags are described in the foregoing and following disclosure.

In some instances, detecting the amplification product, whether tagged or not tagged, comprises subjecting the amplification product to a signal detector or assay assembly of a device, system, or kit disclosed herein. In some instances, methods comprise comprises amplifying and detecting on an assay assembly of a device, system, or kit disclosed herein. In some instances, the assay assembly comprises amplification reagents. In some instances, methods comprise applying an instrument or reagent to an assay assembly (e.g., lateral flow assay) disclosed herein to control the flow of a biological sample, solution, or combination thereof, through the lateral flow assay. In some instances, the instrument is a vacuum, a pipet, a pump, or a combination thereof.

Library preparation: In some instances, methods disclosed herein comprise modifying cell-free nucleic acids in the biological sample to produce a library of cell-free nucleic acids for detection. In some instances, methods comprise modifying cell-free nucleic acids for nucleic acid sequencing. In some instances, methods comprise modifying cell-free nucleic acids for detection, wherein detection does not comprise nucleic acid sequencing. In some instances, methods comprise modifying cell-free nucleic acids for detection, wherein detection comprises counting tagged cell-free nucleic acids based on an occurrence of tag detection. In some instances, methods disclosed herein comprise modifying cell-free nucleic acids in the biological sample to produce a library of cell-free nucleic acids, wherein the method comprises amplifying the cell-free nucleic acids. In some instances, modifying occurs before amplifying. In some instances, modifying occurs after amplifying.

In some instances, modifying the cell-free nucleic acids comprises repairing ends of cell-free nucleic acids that are fragments of a nucleic acid. By way of non-limiting example, repairing ends may comprise restoring a 5' phosphate group, a 3' hydroxy group, or a combination thereof to the cell-free nucleic acid. In some instances, repairing comprises 5'-phosphorylation, A-tailing, gap filling, closing nick sites or a combination thereof. In some instances, repairing may comprise removing overhangs. In some instances, repairing may comprise filling in overhangs with complementary nucleotides. In some instances, modifying the cell-free nucleic acids for preparing a library comprises use of an adapter. The adapter may also be referred to herein as a sequencing adapter. In some instances, the adapter aids in sequencing. Generally, the adapter comprises an oligonucleotide. By way of non-limiting example, the adapter may simplify other steps in the methods, such as amplifying, purification and sequencing because it is a sequence that is universal to multiple, if not all, cell-free nucleic acids in a sample after modifying. In some instances, modifying the cell-free nucleic acids comprises ligating an adapter to the cell-free nucleic acids. Ligating may comprise blunt ligation. In some instances, modifying the cell-free nucleic acids comprises hybridizing an adapter to the nucleic acids. In some instances, the sequencing adaptor comprises a hairpin or stem-loop adaptor. In some instances, modifying the cell-free nucleic acids comprises hybridizing a hairpin or stem-loop adaptor to the nucleic acids, thereby generating a circular library product that is sequenced or analyzed. In some instances, the sequencing adaptor comprises a blocked 5' end leaving a nick at the 3' end. Advantages of this configuration include, but are not limited to, an increase in library efficiency and reduction of unwanted byproducts such as adaptor dimers. In further instances the adaptor has a cleavable replication stop to linearize templates.

The efficiency of library preparation steps (e.g., end repair, tailing, and ligation of adaptors) and amplifying may benefit from the addition of crowding agents to the sample or the amplifying reaction. Enzymatic processes in their natural environments (e.g., DNA replication in a cell) often occur in a crowded environment. Some of these enzymatic processes are more efficient in a crowded environment. For example, a crowded environment may enhance the activity of DNA helicase and the sensitivity of DNA polymerase. Thus, crowding agents can be added to mimic the crowded environment. The crowding agent may be a polymer. The crowding agent may be a protein. The crowding agent may be a polysaccharide. Non-limiting examples of crowding agents are polyethylene glycol, dextran and Ficoll. Concentrations that mimic crowding in vivo are often desirable. For example, 4% (40 mg/ml) PEG 1 kDa provides an approximate crowding effect found in vivo. In some instances, the concentration of the crowding agent is about 2% to about 20% w/v in the amplification reaction. In some instances, the concentration of the crowding agent is about 2% to about 15% w/v in the amplification reaction. In some instances, the concentration of the crowding agent is about 2% to about 10% w/v in the amplification reaction. In some instances, the concentration of the crowding agent is about 2% to about 8% w/v in the amplification reaction. In some instances, the concentration of the crowding agent is about 3% to about 6% w/v in the amplification reaction.

In some instances, modifying the cell-free nucleic acids for preparing a library comprises use of a tag. The tag may also be referred to herein as a barcode. In some instances, methods disclosed herein comprise modifying cell-free nucleic acids with a tag that corresponds to a chromosomal region of interest. In some instances, methods disclosed herein comprise modifying cell-free nucleic acids with a tag that is specific to a chromosomal region that is not of interest. In some instances, methods disclosed herein comprise modifying a first portion of cell-free nucleic acids with a first tag that corresponds to at least one chromosomal region that is of interest and a second portion of cell-free nucleic acids with a second tag that corresponds to at least one chromosomal region that is not of interest. In some instances, modifying the cell-free nucleic acids comprises ligating a tag to the cell-free nucleic acids. Ligating may comprise blunt ligation. In some instances, modifying the cell-free nucleic acids comprises hybridizing a tag to the nucleic acids. In some instances, the tags comprise oligonucleotides. In some instances, the tags comprise a non-oligonucleotide marker or label that can be detected by means other than nucleic acid analysis. By way of non-limiting example, a non-oligonucleotide marker or label could comprise a fluorescent molecule, a nanoparticle, a dye, a peptide, or other detectable/quantifiable small molecule.

In some instances, modifying the cell-free nucleic acids for preparing a library comprises use of a sample index, also simply referred to herein as an index. By way of non-limiting example, the index may comprise an oligonucleotide, a small molecule, a nanoparticle, a peptide, a fluorescent molecule, a dye, or other detectable/quantifiable moiety. In some instances, a first group of cell-free nucleic acids from a first biological sample are labeled with a first index, and a first group of cell-free nucleic acids from a first biological sample are labeled with a second index, wherein the first index and the second index are different. Thus, multiple indexes allow for distinguishing cell-free nucleic acids from multiple samples when multiple samples are analyzed at once. In some instances, methods disclose amplifying cell-free nucleic acids wherein an oligonucleotide primer used to amplify the cell-free nucleic acids comprises an index.

While DNA loss can occur at every step of DNA isolation and analysis, the highest loss typically appears at the step of library preparation. Traditional methods show losses of 80% to 90% of material. Often this loss is compensated by a subsequent amplification step to bring the concentration of DNA up to the necessary level required for next generation sequencing, but the amplification cannot compensate for a loss of information that occurred during the prior steps. A library suffering a loss of 80% of initial DNA in the sample can be described as a library with a 20% efficiency or an efficiency of 0.2. In some instances, methods disclosed herein comprise achieving a library with an efficiency of at least about 0.2, at least about 0.3, at least about 0.4, at least about 0.5, at least about 0.6 or at least about 0.8. In some instances, methods disclosed herein comprise producing a library with an efficiency of at least about 0.4. In some instances, methods disclosed herein comprise producing a library with an efficiency of at least about 0.5. Methods that produce a library with such efficiencies may achieve these efficiencies by using crowding agents and repairing cell-free DNA fragment ends, ligation methods, purification methods, cycling parameters and stoichiometric ratios as described herein.

Disclosed herein, in some embodiments are library preparation methods optimized for ultra-low input amounts, the methods comprising: (a) generating ligation competent cell-free DNA by one or more steps comprising: (i) generating a blunt end of the cell-free DNA, In some embodiments, a 5' overhang or a 3' recessed end is removed using one or more polymerase and one or more exonuclease; (ii) dephosphorylating the blunt end of the cell-free DNA; (iii) contacting the cell-free DNA with a crowding reagent thereby enhancing a reaction between the one or more polymerases, one or more exonucleases, and the cell-free DNA; or (iv) repairing or remove DNA damage in the cell-free DNA using a ligase; and (b) ligating the ligation competent cell-free DNA to adaptor oligonucleotides by contacting the ligation competent cell-free DNA to adaptor oligonucleotides in the presence of a ligase, crowding reagent, and/or a small molecule enhancer. In some embodiments, the one or more polymerases comprises T4 DNA polymerase or DNA polymerase I. In some embodiments, the one or more exonucleases comprises T4 polynucleotide kinase or exonuclease III. In some embodiments, the ligase comprises T3 DNA ligase, T4 DNA ligase, T7 DNA ligase, Taq Ligase, Ampligase, *E. coli* Ligase, or Sso7-ligase fusion protein. In some embodiments, the crowding reagent comprises polyethylene glycol (PEG), glycogen, or dextran, or a combination thereof. In some embodiments, the small molecule enhancer comprises dimethyl sulfoxide (DMSO), polysorbate 20, formamide, or a diol, or a combination thereof. In some embodiments, ligating in (b) comprises blunt end ligating, or single nucleotide overhang ligating. In some embodiments, the adaptor oligonucleotides comprise Y shaped adaptors, hairpin adaptors, stem loop adaptors, degradable adaptors, blocked self-ligating adaptors, or barcoded adaptors, or a combination thereof. In some embodiments, the library in (c) is produced with an efficiency of at least 0.5.

Sequencing: In some instances, methods disclosed herein comprise sequencing a nucleic acid. The nucleic acid may be a nucleic acid disclosed herein, such as a tagged nucleic acid, or an amplified nucleic acid, or a combination thereof. In some instances the nucleic acid is DNA. In some instances, the nucleic acid is RNA. In some instances, the DNA is selected from the group consisting of circulating cell-free DNA (cf-DNA), genomic DNA (gDNA), mitochondrial DNA, and pathogenic DNA (e.g., viral genomic DNA (vgDNA), fungal DNA, bacterial DNA). In some instances, the cell-free nucleic acid is RNA (e.g., cf-RNA). In some instances, the cell-free nucleic acid is a nucleic acid from a cell of a fetus, referred to herein as a cell-free fetal nucleic acid. In some instances, the cell-free fetal nucleic acid is cell-free fetal DNA (cff-DNA) or cell-free fetal RNA (cff-RNA). In some instances, the cell-free nucleic acid is in the form of complementary DNA (cDNA), generated by reverse transcription of a cf-RNA or cff-RNA. In some instances, the cf-RNA or cff-RNA is a messenger RNA (mRNA), a microRNA (miRNA), mitochondrial RNA, or a natural antisense RNA (NAS-RNA). In some instances, the cell-free nucleic acid sequence comprises an RNA molecule or a fragmented RNA molecule (RNA fragments) selected from: small interfering RNA (siRNA), a microRNA (miRNA), a pre-miRNA, a pri-miRNA, a mRNA, a pre-mRNA, a viral RNA, a viroid RNA, a virusoid RNA, circular RNA (circRNA), a ribosomal RNA (rRNA), a transfer RNA (tRNA), a pre-tRNA, a long non-coding RNA (lncRNA), a small nuclear RNA (snRNA), a circulating RNA, a cell-free RNA, an exosomal RNA, a vector-expressed RNA, an RNA transcript, and combinations thereof. In some instances, a cell-free nucleic acid, a cell-free fetal nucleic acid, a nucleic acid having a sequence corresponding to a target chromosome, a nucleic acid having a sequence corresponding to a region of a target chromosome, a nucleic acid having a sequence corresponding to a non-target chromosome, or a combination thereof.

In some instances, sequencing comprises targeted sequencing. In some instances, sequencing comprises whole genome sequencing. In some instances, sequencing comprises targeted sequencing and whole genome sequencing. In some instances, whole genome sequencing comprises massive parallel sequencing, also referred to in the art as next generation sequencing or second generation sequencing. In some instances, whole genome sequencing comprises random massive parallel sequencing. In some instances, sequencing comprises random massive parallel sequencing of target regions captured from a whole genome library.

In some instances, methods comprise sequencing amplified nucleic acids disclosed herein. In some instances, amplified nucleic acids are produced by targeted amplification (e.g., with primers specific to target sequences of interest). In some instances, amplified nucleic acids are produced by non-targeted amplification (e.g., with random oligonucleotide primers). In some instances, methods comprise sequencing amplified nucleic acids, wherein the sequencing comprises massive parallel sequencing.

In some instances, nucleic acid sequencing may comprise sequencing at least about 10, 20, 30, 40, 50, 60, 70, 80, 90, 100 or more nucleotides or base pairs of the nucleic acid molecule sequences. In some embodiments, sequencing may comprise sequencing at least about 200, 300, 400, 500, 600, 700, 800, 900, 1,000 or more nucleotides or base pairs of the nucleic acid molecule sequences. In other embodiments, sequencing may comprise sequencing at least about 1,500; 2,000; 3,000; 4,000; 5,000; 6,000; 7,000; 8,000; 9,000; or 10,000 or more nucleotides or base pairs of the nucleic acid molecule sequences.

In some embodiments, nucleic acid sequencing may comprise at least about 200, 300, 400, 500, 600, 700, 800, 900, 1,000 or more sequencing reads per run. In some embodiments, sequencing may comprise sequencing at least about 1,500; 2,000; 3,000; 4,000; 5,000; 6,000; 7,000; 8,000; 9,000; or 10,000 or more sequencing reads per run. In some embodiments, nucleic acid sequencing may comprise at least about 10,000; 20,000; 30,000; 40,000; 50,000; 60,000; 70,000; 80,000; 90,000; or 100,000 or more sequencing reads per run. In some embodiments, nucleic acid sequencing may comprise at least about 250,000; 500,000; 1,000,000; 10,000,000; 100,000,000; or 1,000,000,000 or more sequencing reads per run. In some embodiments, nucleic acid sequencing may comprise less than or equal to about 1,600,000,000 sequencing reads per run. In some embodiments, nucleic acid sequencing may comprise less than or equal to about 200,000,000 reads per run. In some instances, methods comprise performing a genome sequence alignment using an algorithm. By way of non-limiting example, the algorithm may be designed to recognize a chromosome copy number. The algorithm may be designed to reveal an observed number of sequence reads associated with each relevant allele at various SNP loci. The algorithm may use parental genotypes and crossover frequency data to create monosomic, disomic and trisomic fetal genotypes at measured loci in silico, which are then used to predict sequencing data for each genotype. Using a Bayesian model, the sequencing data with the maximum likelihood is selected as the copy number and fetal fraction and the likelihood is the calculated accuracy. Different probability distributions may be expected for each of the two possible alleles for each SNP and compared the observed alleles. This is described by Zimmermann et al., in Prenat Diagn (2012) 32:1233-1241. However, Zimmermann et al. believed that samples containing less than a 4.0% fetal fraction could not be informative and that a volume of at least 20 ml of blood was necessary to get enough cell-free DNA to perform this type of analysis. In contrast, the methods of the instant application may employ this analysis with samples with less than a 4% fetal fraction and samples that do not require nearly as much sample.

Figure 2:
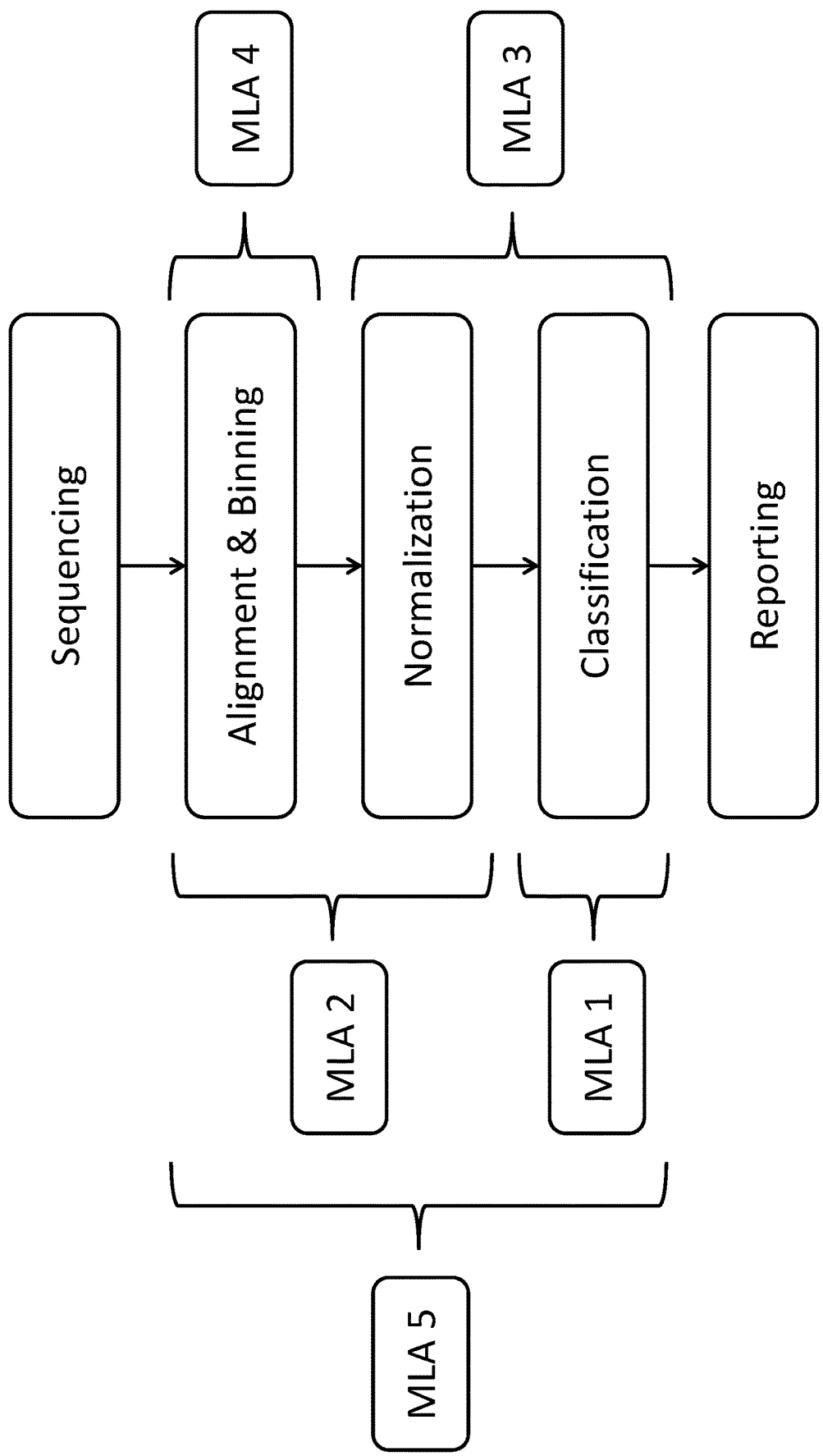
FIG. 2 provides a schematic illustration of the data processing portion of the nucleic acid sequencing-based screening/diagnostic test procedure illustrated in FIG. 1, and also indicates different steps or combinations of steps which may be augmented or replaced through the use of machine learning algorithms as disclosed herein.

Conventional sequence data processing for diagnostic screening & testing procedures: As illustrated in FIG. 2, the data processing stage of a typical nucleic acid sequencing-based diagnostic test procedure may comprise multiple steps including, but not limited to, alignment and binning of sequencing read data relative to a reference sequence (where binning comprises counting the number of sequencing reads that align with each segment of a predetermined number of sequence segments that span the entire genome or region of the genome of interest), normalization of the bin count data to correct for systematic biases in the sequencing process (e.g., GC content bias), and classification of the resulting normalized bin count data to detect, for example, a normal representation, an over-representation, or an under-representation of one or more gene-specific or chromosome-specific regions of the genome.

The disclosed novel methods will be described in more detail in the context of performing non-invasive prenatal testing (NIPT) to determine a copy number variation, but it will be understood by those of skill in the art that the disclosed methods have broader applicability. Examples include, but are not limited to, screening for and diagnosis of cancer, autoimmune disease, neurodegenerative disease, etc., as well as the monitoring of transplant rejection or the monitoring of therapeutic responses, through the analysis of any type of DNA or cDNA, including, but not limited to, genomic DNA, cell-free DNA, circulating tumor DNA, etc., or markers contained therein, e.g., structural mutation or epigenetic/epigenomic changes such as cytosine methylation.

The typical NIPT workflow includes several steps: (i) drawing blood from a subject, (ii) shipping the blood sample to the test lab, (iii) separating plasma from the blood cells, (iv) isolating cell-free DNA (cfDNA) from the plasma, (v) generating a sequencing library, (vi) sequencing the library to yield short sequencing reads (e.g., approximately 25 base-pair (bp) to approximately 100 bp reads) for about 10 million cfDNA molecules per sample, (vii) performing data analysis, and (viii) reporting the result. The present disclosure is primarily concerned with the data analysis part of this process as all other aspects may be performed using conventional approaches.

FIG. 3 provides a non-limiting example of sequencing read data obtained by performing nucleic acid sequencing on all or a portion of the nucleic acid molecules contained in a biological sample. As noted above, a typical NIPT sequencing-based assay yields a collection of sequencing reads (e.g., approximately 25 bp to approximately 100 bp in length) for about 10 million cfDNA molecules per sample. In a conventional process, the individual sequencing reads are then aligned with respect to a reference sequence (FIG. 4) to determine the chromosomal origin of the sequencing fragment. In particular, the sequencing reads are aligned with respect to a set of defined regions or segments of the genome (i.e., "bins"), where the number of bins and their location in the genome are typically pre-defined. Sequencing reads that can be aligned with a plurality of bins (i.e., multiple locations in the genome) are typically discarded from the data set, and the number of sequencing reads that correspond uniquely to each individual bin in a set of, for example, 60,000 bins of approximately 50,000 consecutive base pairs that span the entire genome (the human genome is 3 billion base pairs long) is counted (FIG. 5). The complete set of bin counts may thus be viewed as a vector of length 60,000, where each value in the vector represents the number of sequence reads that uniquely aligned to a pre-defined region.

Figure 6A:
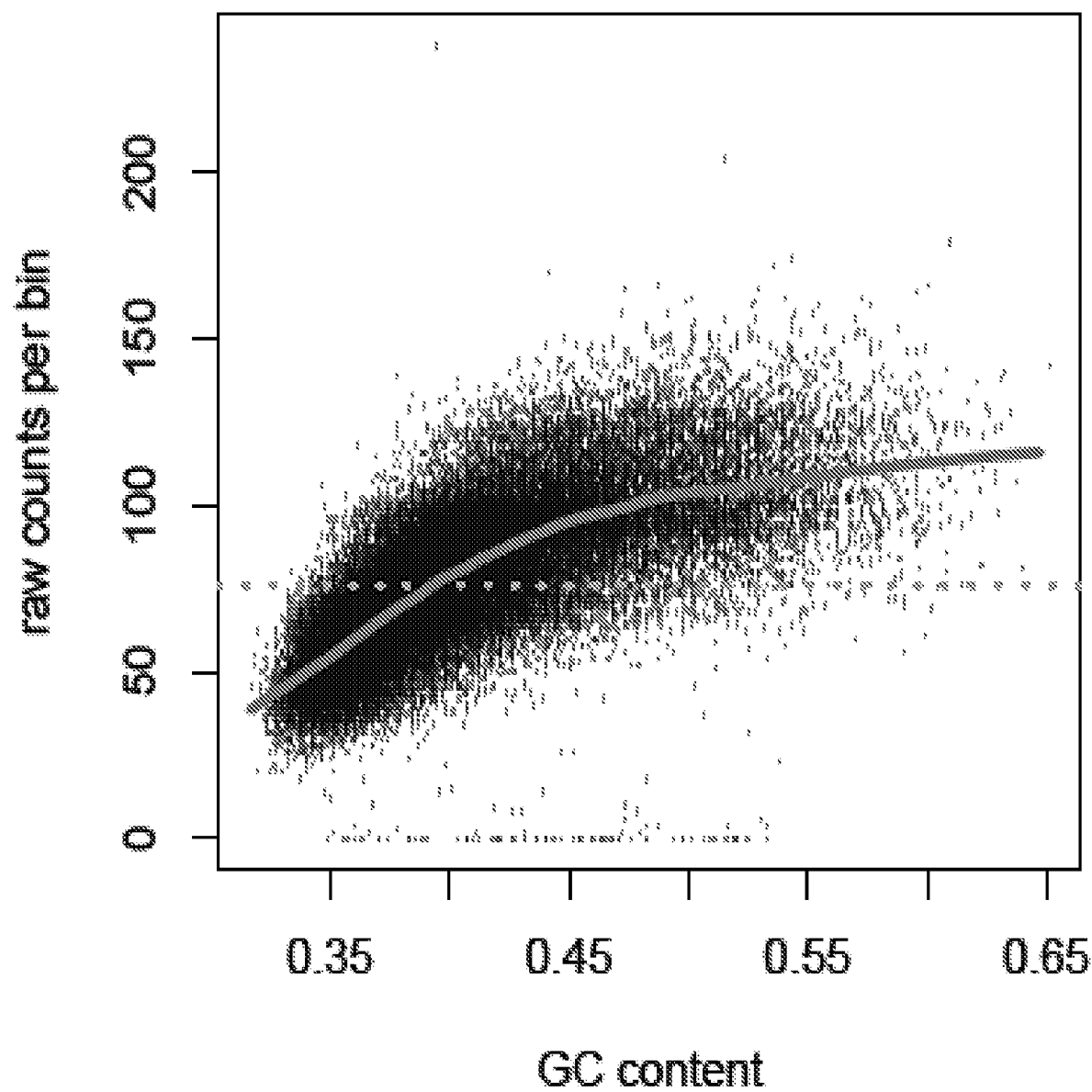
FIG. 6A provides a non-limiting example of raw data for bin count variance as a function of GC content prior to scaling or normalization.

Sources of systematic bias in the library preparation and/or sequencing processes, e.g., in amplification steps, due to any of a variety of factors may lead to over- or under-representation of some sequence regions in the sequencing read dataset compared to their actual presence in the sample genome, and thus errors in the bin count for certain sequence regions. One of the strongest contributors to sequencing bias is the GC content of the sequence region. Sequence regions with a balanced GC content (around 50%) are mostly stable, while regions with extreme GC content (less than 40% or more than 60%) can show large variability, as illustrated in FIG. 6A. In some cases, this variability may lead to an artificial over-representation of a genomic region that is not associated with, for example, chromosomal trisomy. In a sample where the presence of GC rich regions leads to over-amplification, these regions will be over-represented in the sequencing read data set. For example, chromosome 13 has a higher overall GC content compared to the median GC content of the human genome. Hence, in such a sample, the presence of chromosome 13 sequences may appear elevated although the biological sample is known to be euploid.

Figure 6B:
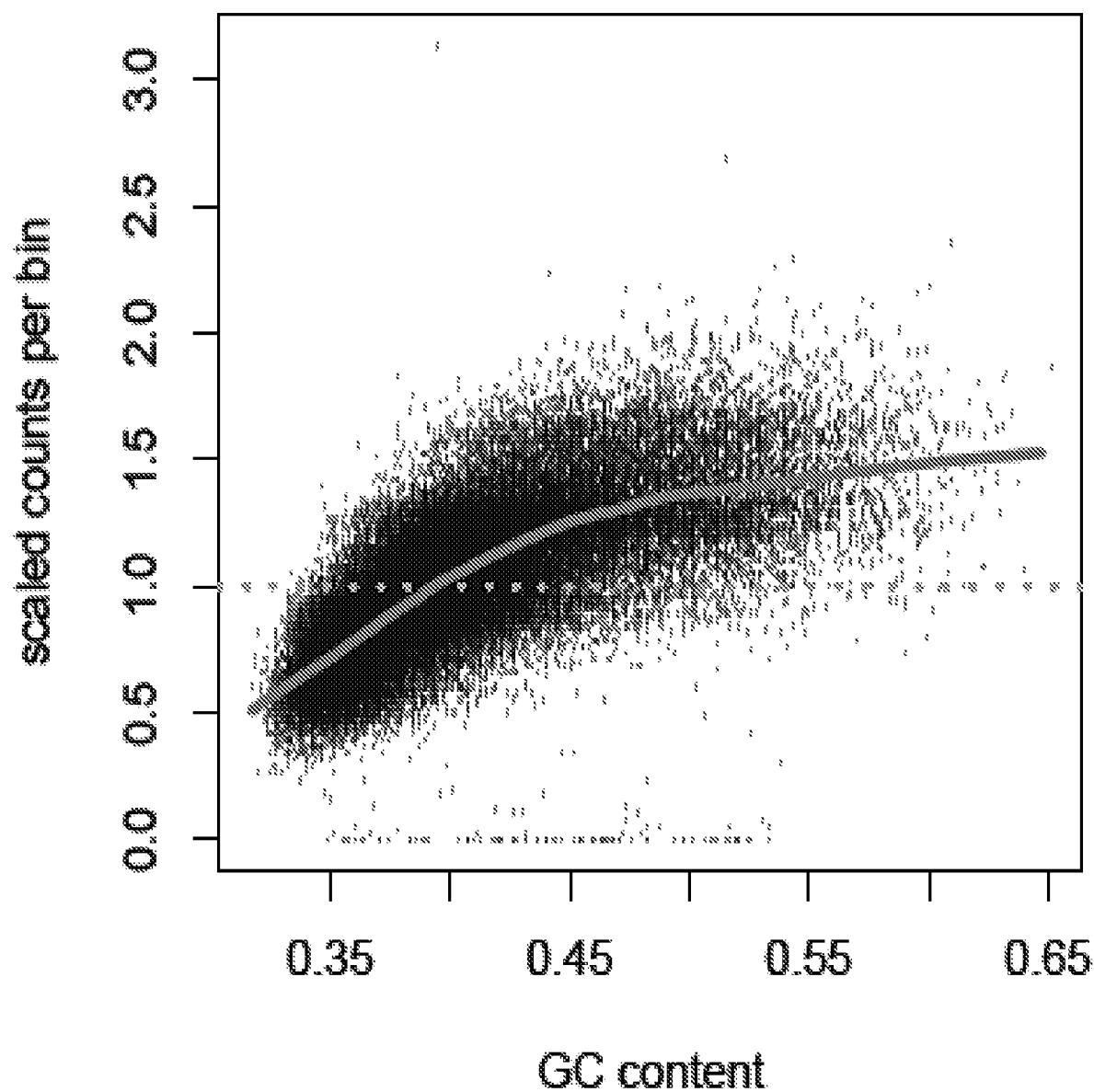
FIG. 6B provides a non-limiting example of data for bin count variance as a function of GC content after scaling.
Figure 6C:
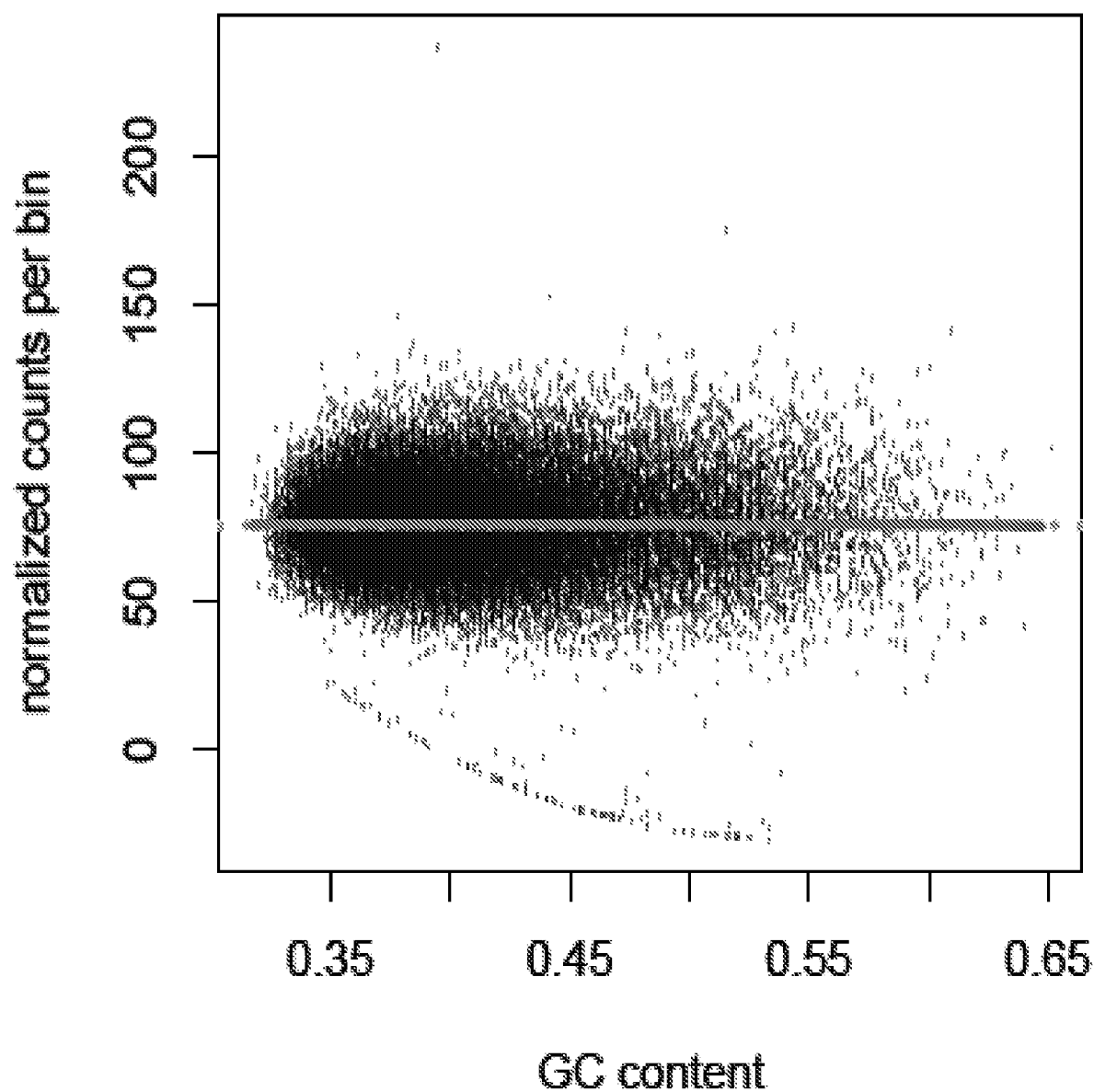
FIG. 6C provides a non-limiting example of data for bin count variance as a function of GC content after normalization.
Figure 6D:
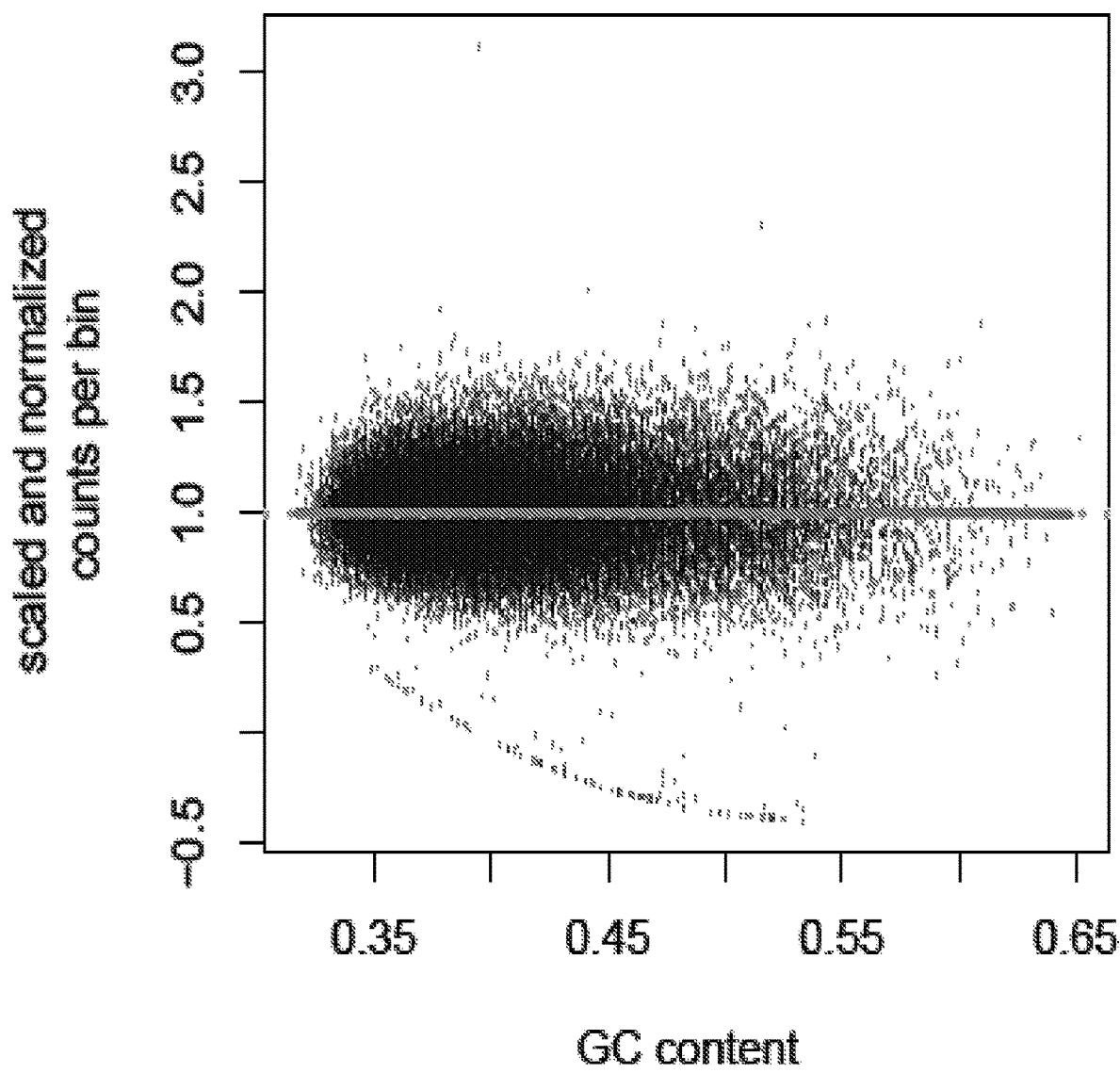
FIG. 6D provides a non-limiting example of data for bin count variance as a function of GC content after first scaling and then normalizing the data.
Figure 7A:
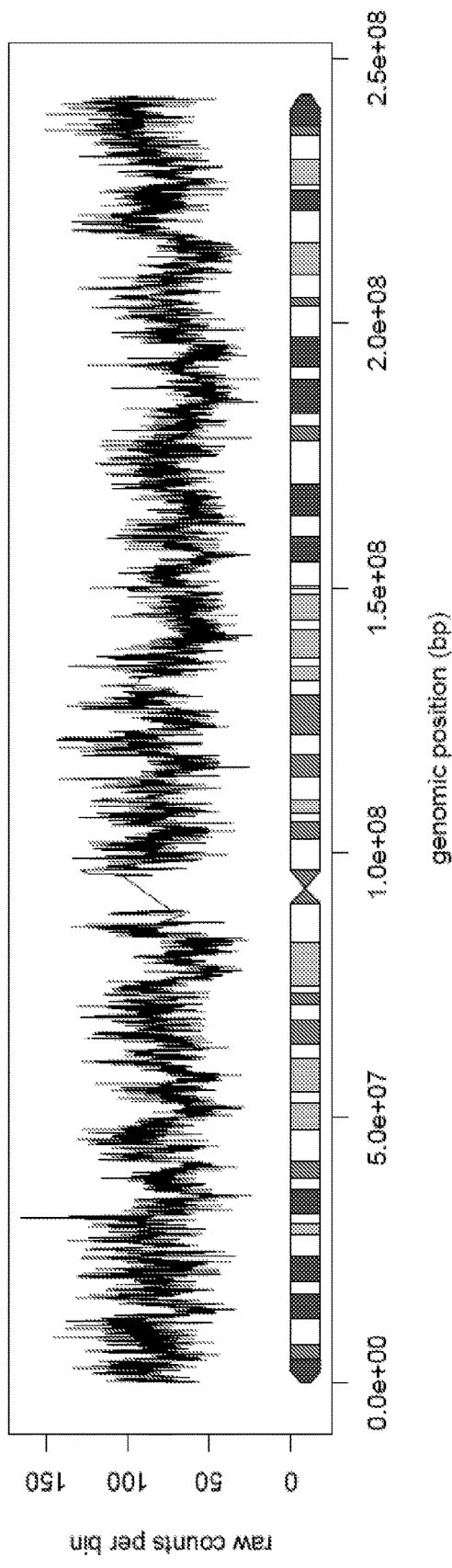
FIGS. 7A-B provide non-limiting examples of bin count data versus genomic location.
Figure 7B:
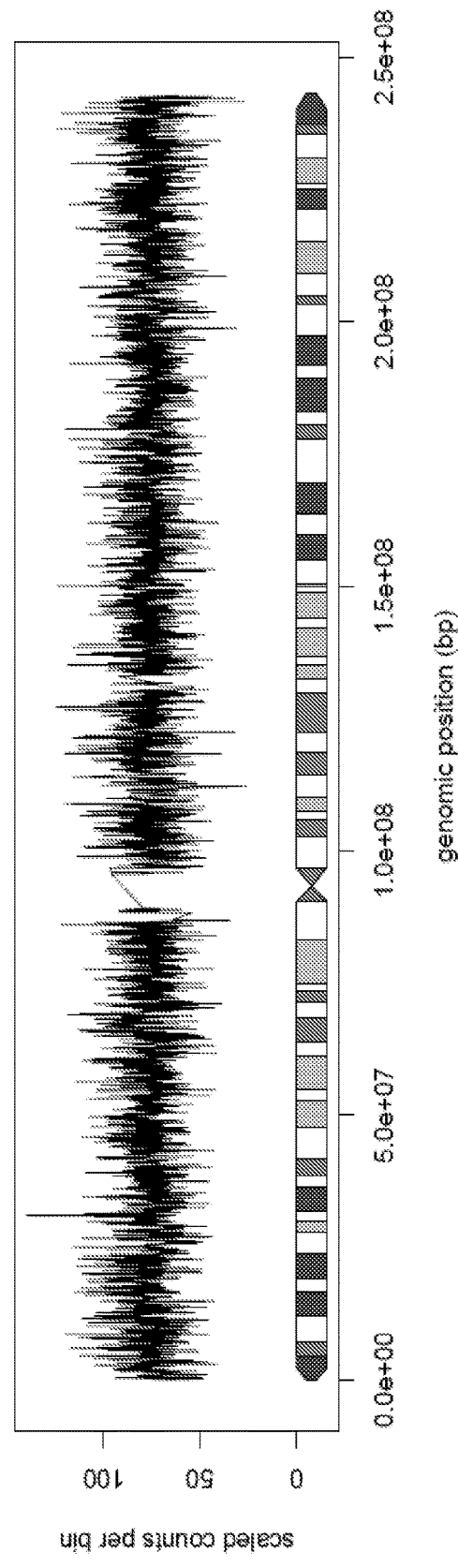

Systematic bias such as that due to GC content may be corrected for through normalization of the bin count data, e.g., by normalization to the local GC content of each bin, thereby resulting in a more accurate representation of the sequence regions present in the biological sample. FIG. 6A shows a plot of raw bin count data that illustrates bin count variance as a function of GC content prior to scaling or normalization. Based on the aligned sequencing files, a count is made of how many of the sequencing reads had a start position located in the genomic interval represented by the bin. In FIG. 6A, the dashed straight line indicates the mean number of counts per bin as averaged over the entire bin count data set. The curved line indicated the mean number of counts per bin as a function of bin number. FIG. 6B shows a plot of bin count data that illustrates bin count variance as a function of GC content after scaling. The raw count values are divided by the median bin count calculated from all available bins. This scaling transformation centers the data on a value of 1. FIG. 6C shows a plot of bin count data that illustrates bin count variance as a function of GC content after normalization. A loess normalization procedure is employed to correct for sequencing bias of different GC rich regions. This transformation results in a normalized value that could be expected when no GC bias occurred during sequencing. FIG. 6D shows a plot of bin count data that illustrates bin count variance as a function of GC content after first scaling and then normalizing the data, thereby combining the data transformations illustrated in FIG. 6B and FIG. 6C. FIGS. 7A-B provide non-limiting examples of bin count data versus genomic location. FIG. 7A shows a plot of bin count data versus genomic location prior to normalization for GC content. FIG. 7B shows a plot of bin count data versus genomic location following normalization for GC content. As can be seen in these figures, normalization to local GC content yields a bin count data set that has a more consistent distribution across the genome, and reduced local variance (i.e., better signal-to-noise ratios). FIG. 8 provides a non-limiting example of bin count data for different sequencing read bins before and after normalization for GC content.

Figure 9:
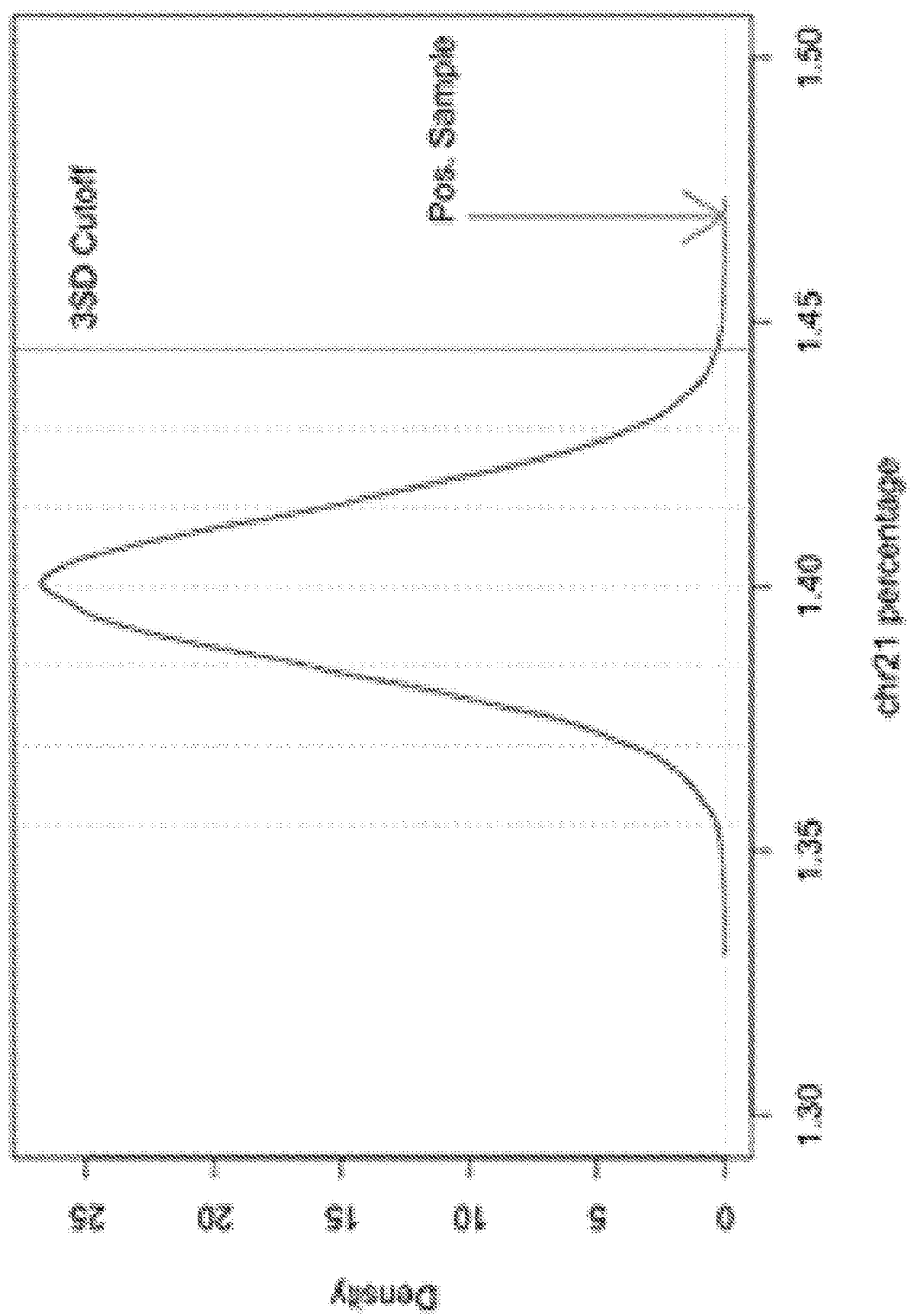
FIG. 9 provides a non-limiting example of the distribution of sequencing read counts versus chromosome 21 percentage in a euploid population.

There are many methods available for using the normalized bin count data to classify the sample, e.g., for trisomy detection. Most methods follow the same general principle, i.e., a population-based approach comprising: (i) establishment of a relative value for the representation of the target region or interest; for example, the percentage of sequence read counts originating from chromosome (chr21) (in a normal sample this is around 1.4 percent); (ii) measuring this value for a large number of euploid samples (typically more than 80) and determining a population average and population variance for this relative representation; for example, average % chr21=1.4%, with a standard deviation of 0.01%; and (iii) measuring the relative value for a test sample and determining how likely it is to be derived from a population of euploid samples. For example, the % chr21 for a test sample is measured at 1.47%, as illustrated in FIG. 9. This is seven standard deviations away from the mean, and therefore unlikely to originate from the euploid population. This sample can thus be interpreted to be trisomic sample. Typically a cutoff value is used to transform likelihood values into a binary classification of the sample for the target region of interest.

Some methods use an internal, sample-based reference rather than a population-based reference for classification. The first step of the procedure is the same as that outlined above for the population-based approach, i.e., the establishment of a relative value for the representation of the target region or interest. Next, a reference value for regions within the test sample is created; some regions are assumed to be euploid. Finally, it is determined whether the relative value for the test region falls in the reference interval of the regions assumed to be euploid.

These methods are almost entirely probabilistic and therefore can be characterized in terms of their statistical performance. For example, the use of a standard deviation cutoff is expected to yield 0.15% false positive results (for NIPT tests, the false negative rate is fetal fraction dependent). Furthermore, the upper limit of test performance is dictated by elementary sampling/counting statistics, and can be derived without experimental verification. Technical noise (i.e., random or systematic error) can only decrease test performance.

Sequence dataprocessing using machine learning algorithms: The presently disclosed methods make use of machine learning algorithms (MLA) to augment or replace one or more of the data processing steps in a sequencing-based diagnostic screening or test procedure. For example, a machine learning algorithm may be used to perform the sample classification step, as illustrated in FIG. 2 (MLA 1), with all other data processing steps performed in a conventional manner. In some embodiments, the machine learning algorithm may optionally perform the normalization step as well (MLA 3). Alternatively, in some embodiments of the disclosed methods a machine learning algorithm may be used to perform the alignment and binning steps (MLA 4), and optionally, the normalization step as well (MLA 2). In some embodiments, the use of a machine learning algorithm may enable the determination of an optimal number of segments of a reference sequence for use in the binning process. In some embodiments, the use of a machine learning algorithm may enable classification of sequencing reads into bins (or "classes") without referring to a reference sequence. In some embodiments of the disclosed methods, a machine learning algorithm may be used to replace all of the conventional data processing steps (MLA 5), wherein raw sequencing read data is used as the input for the machine learning algorithm, and a sample test result, for example, detection of a normal representation, an over-representation, or an under-representation of one or more gene-specific or chromosome-specific regions of the genome is output from the machine learning algorithm. In some embodiments, a combination of two or more machine learning algorithms may be used to augment or replace any one or more of the individual data processing steps discussed above.

Figure 10:
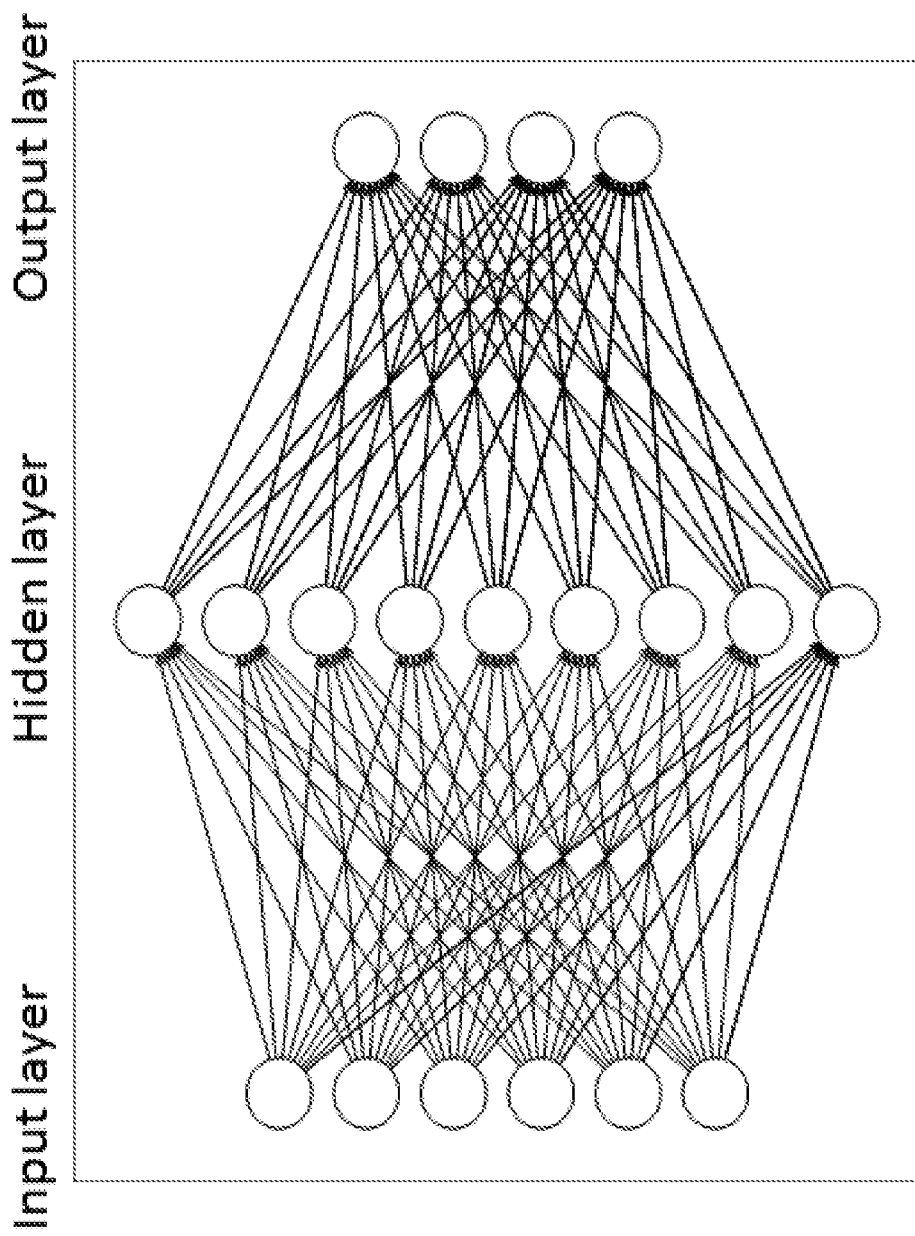
FIG. 10 provides a schematic illustration of a machine learning architecture comprising an artificial neural network with one hidden layer.
Figure 11:
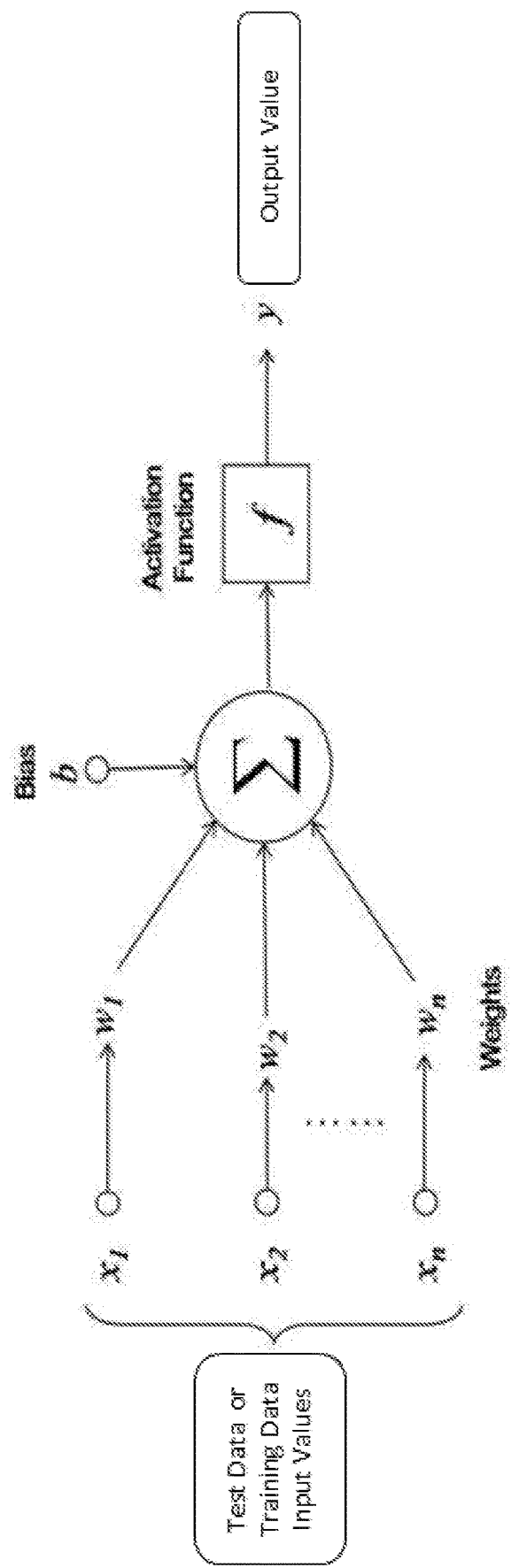
FIG. 11 provides a schematic illustration of a node within a layer of an artificial neural network or deep learning algorithm architecture.
Figure 12:
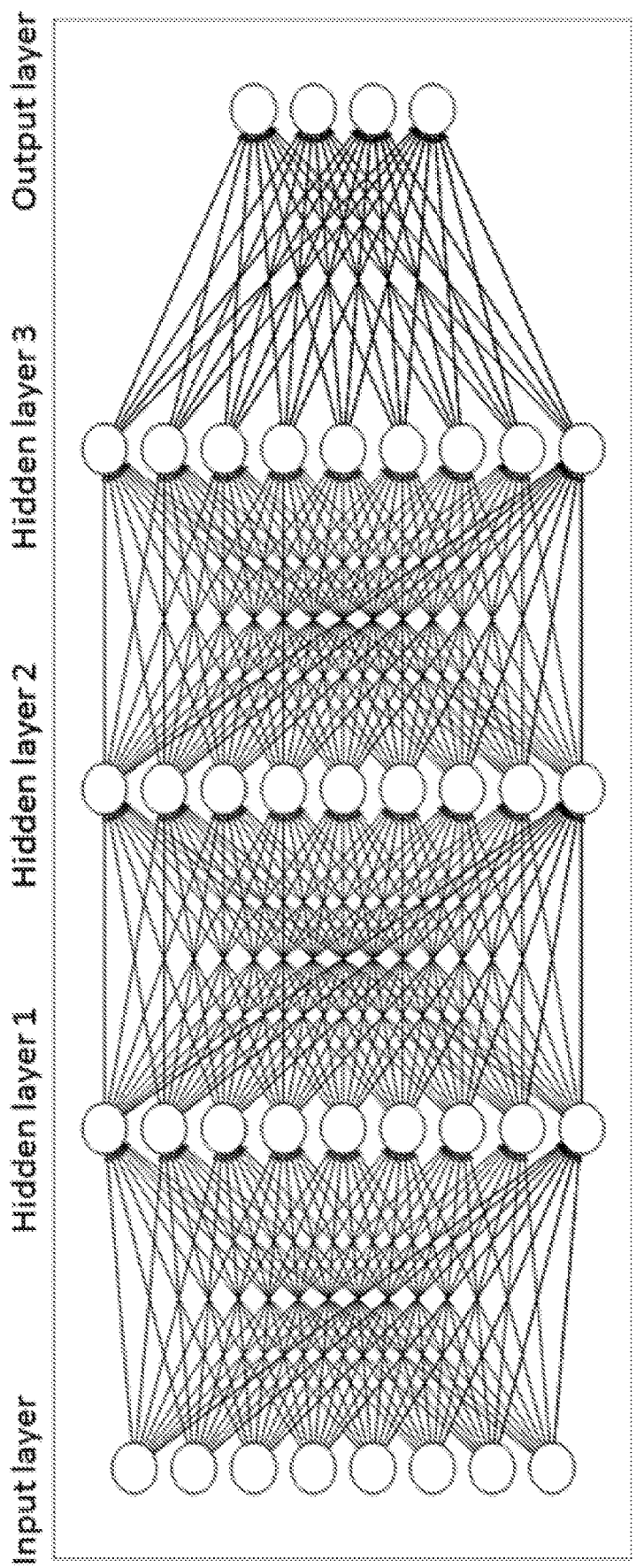
FIG. 12 provides a schematic illustration of a machine learning architecture comprising a deep learning algorithm, e.g., an artificial neural network comprising multiple hidden layers.

As noted above, in some embodiments, a machine learning algorithm (e.g., an artificial neural network or deep learning algorithm) may be used to augment or replace the alignment step of the data analysis process. FIG. 10 provides a schematic illustration of a machine learning architecture comprising an artificial neural network (ANN) with an input layer, one hidden layer, and an output layer. Each layer comprises one or more "nodes", where each node may be configured to perform a mathematical operation on the input data set and generate a result, as will be described in more detail below. Furthermore, each node may be associated with one or more adjustable parameters, e.g., activation thresholds, weighting factors, or offset bias values (FIG. 11), that may be adjusted or "trained" during a training phase. An input data set comprising, e.g., raw sequencing read data, or data derived therefrom, is applied to the input layer of the artificial neural network, and mapped to an output data set (e.g., a set of normalized bin count data, or a set of sequencing read probability vectors) by the ANN after the latter has been trained using one or more training data sets that comprise the appropriate sets of input data for a plurality of known euploid and/or aneuploid samples. FIG. 12 provides a schematic illustration of a machine learning architecture comprising a deep learning algorithm (e.g., an artificial neural network comprising two or more hidden layers). Again, input data comprising the raw sequencing read data, or data derived therefrom (and, in some cases, the GC content for each of a set of pre-defined bins, etc.), is applied to the input layer of the deep learning algorithm, and mapped to an output data set (e.g., a set of normalized bin count data, or a set of sequencing read probability vectors) by the deep learning algorithm after the latter has been trained using one or more training data sets that comprise the raw sequencing read data, or data derived therefrom, for a plurality of known euploid and/or aneuploid samples. In some embodiments, the training data sets may comprise additional input and/or output values, as will be discussed in more detail below.

In some embodiments, the machine learning algorithm may be used to determine an optimal number and/or size of the bins used to align the sequencing reads relative to a reference sequence. In some embodiments, the machine learning algorithm may be used to align the sequencing reads relative to one another without the use of a reference sequence. In some embodiments, the machine learning algorithm may be used to "classify" the sequencing reads into bins/classes without any alignment to a reference sequence or mapping to a specific chromosome. In some embodiments, as will be discussed in more detail below, the machine learning algorithm may be used to map raw input sequencing read data directly to an output value (e.g., a sample classification result) without performing any sequencing read alignment.

Figure 13:
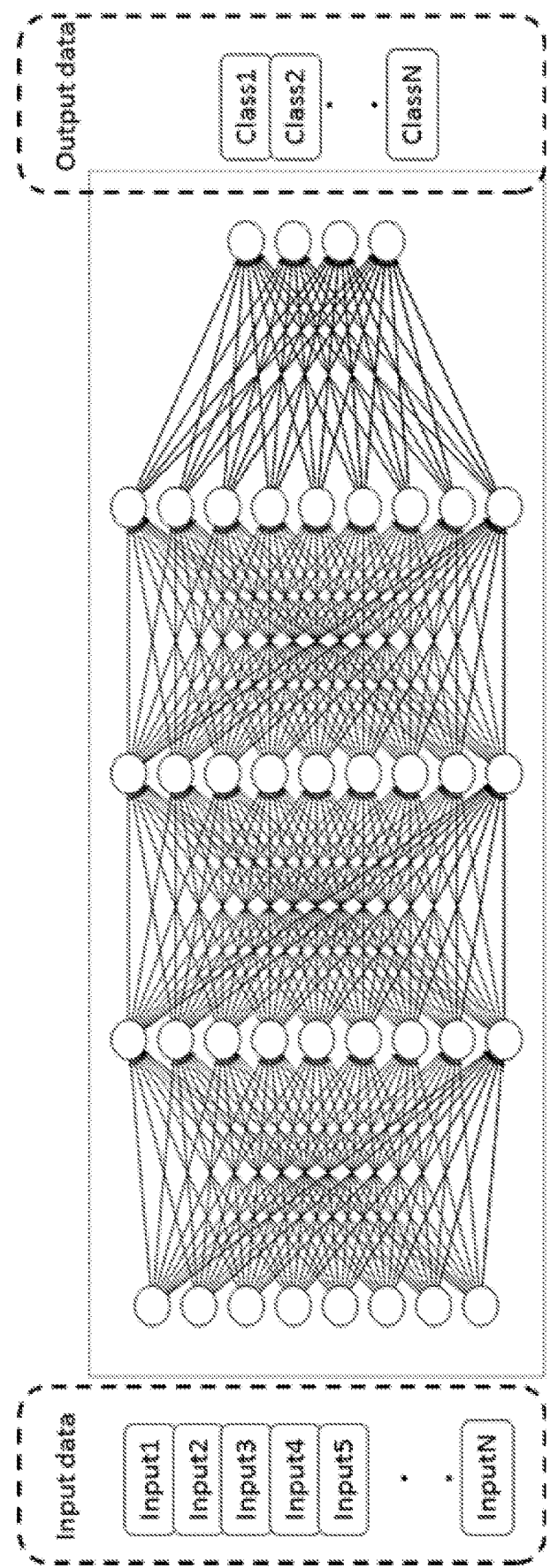
FIG. 13 provides a schematic illustration of the use of a machine learning algorithm such as a deep learning algorithm for processing the data of an input data set comprising one or more input values, e.g., sequencing read data or data derived therefrom, and mapping it to an output data set comprising one or more output values, e.g., probability data for a given sequencing read belonging to a given bin/class and the probability distribution for the entire sequencing read data set across the entire set of bins/classes.

In a first preferred embodiment of the disclosed methods, the sequencing read alignment step (or the sequencing read alignment and normalization steps) of a conventional nucleic acid sequencing-based diagnostic screening or test procedure (e.g., NIPT diagnostic testing) may be replaced by a sequencing read "classification" process performed using a machine learning algorithm such as a deep neural network (DNN), where the classification is based on the probability that an individual sequencing read is associated with a particular "bin" or "class". In this approach, the number of bins/classes may be pre-defined or may be determined on the fly during processing based on any of a variety of criteria, e.g., local GC content, epigenetic modifications, nucleosomal positioning, chromatin structure, sequence read length or other experimental parameters (including, for example, sequence-independent criteria such as electrical signal profiles when using nanopore-based sequencing methods), etc. Furthermore, the bins/classes may or may not reside on contiguous segments of genomic sequence, and may or may not reside on the same chromosome. Rather, the bins/classes are representative of a basis set of "features" that collectively may be used to represent the entire sequencing read data set. Input data comprising, for example, raw sequencing read data, or data derived therefrom, is applied to the input layer, and the machine learning algorithm (e.g., a DNN) maps the input data set to an output data set comprising probability data for a given sequencing read belonging to a given bin/class and for the probability distribution for the entire sequencing read data set across the entire set of bins/classes (FIG. 13).

Figure 14:
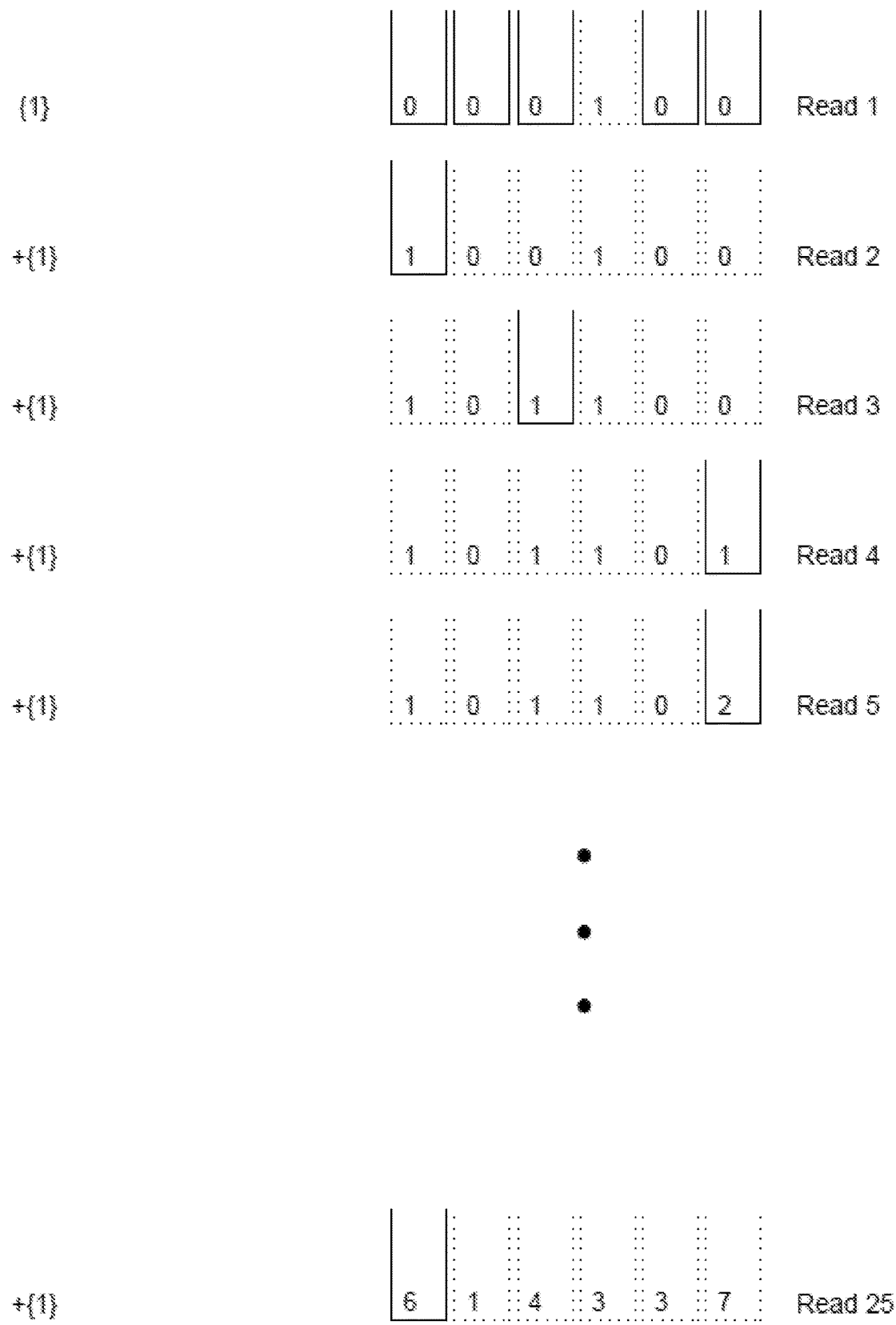
FIG. 14 provides an illustration of the conventional process of counting the number of sequencing reads that align with each of a predetermined number of genome sequence bins to generate bin count data. The dotted lines represent bins that do not change in value by the addition of the value representing the current sequencing read.

FIGS. 14-15 illustrate the difference between the conventional approach of sequencing read alignment to a reference sequence (FIG. 14) and the probabilistic sequencing read classification approach disclosed herein (FIG. 15). As illustrated in FIG. 14, the exact position of each sequencing read within the genome is known following the alignment step, and each sequencing read contributes a value of "1" to the bin count (i.e., the total number of sequencing reads that aligned to a given bin). Sequencing reads that align to more than one bin are either discarded, as noted above, or may be assigned a fractional value according to the number of bins with which they align (e.g., a sequencing read that aligns with two different bins may contribute a value of "½" to each). If the bin count is summed over the entire set of bins, the result is the total number of sequencing reads that have been aligned and counted. FIG. 15 illustrates the use of a machine learning algorithm for classifying sequencing reads according to the probability that they arise from a particular genomic region. No alignment of the individual sequencing reads to a reference sequence is required in this approach. Rather, the machine learning algorithm is used to generate a probability vector for each sequencing read, i.e., a one-dimensional array of probability values corresponding to each of the bins (or "classes") used to describe the entire sequencing read data set, and the sum over all probability values within an individual sequencing read probability vector is equal to 1, while the sum over all probability values for all sequencing read probability vectors equals the total number of sequencing reads in the data set. As noted above, the number of bins/classes used to describe the sequencing read data set may be pre-defined according to any of a variety of criteria, or may be determined on the fly by the machine learning algorithm in order to optimize the bin/class feature set used to describe the sequencing read data. The exact position of the origin of an individual sequencing read within any given bin/class is unknown, e.g., if pre-defined bins/classes that are 50 kb in length are used, there are 50 k possible positions for a sequencing read to have originated within that bin. Furthermore, because a probability value is assigned to each of the bins/classes for each sequencing read, the exact position of the origin of any given individual sequencing read with the genome, or subset of the genome, is also unknown. The sequencing read is most likely to have originated from the bin(s)/class(es) for which the probability is highest. The output of the machine learning algorithm in this case is a sequencing read "class vector" (i.e., the number of sequencing reads belonging to each class, or the total probability for assigning a sequencing read to each class for a given sample) that is used to replace conventional bin count data in the analysis process.

There are several important distinctions to be made between the conventional approach of sequencing read alignment, binning, and counting, and the presently disclosed machine learning-based approach to sequencing read classification. First, the conventional approach of alignment, binning, and counting comprises a pairwise match of a query sequence to a reference sequence. The goal is to determine an exact position within the genome from which the sequencing read originated. The position for which the largest number of nucleotides in the query sequence and the target sequence are identical is determined as the aligned position within the reference sequence. The genomic positions of the individual sequencing reads are then used to perform the counting step in the binning operation. Sequencing reads for which the alignment to the reference sequence cannot be determined unambiguously are typically discarded. In some cases, the alignment software may have an adjustable parameter that specifies how many exact nucleotide matches are required for the sequencing read to be considered "aligned" with the reference sequence, and ambiguity in the alignment, binning, counting operation is introduced through mismatched bases during the alignment step and errors in base calling during sequencing. In some instances of the conventional approach, "aligned" may refer to a sequencing read having no nucleotide mismatches relative to a reference sequence, or to a sequencing read having no more than 1 nucleotide, or no more than 2 nucleotide mismatches relative to a reference sequence. In the machine learning-based classification approach, accurate determination of the origin of the sequencing read within the genome is not the goal. Rather, the goal is to determine the probability that a given sequencing read may be classified within a particular bin/class. If the bins/classes are defined as genomic sequence intervals comprising more nucleotides than the typical sequencing read length, the machine learning algorithm will output a probability (or logit) value of a given read having originated in a given bin/class, but won't map the read to an exact position within the genomic sequence interval. Often, the position of a given bin/class within the genome may not be known, or may only be known in terms of a general region within the genome, and the criteria used to define bins/classes may be independent of genomic sequence position. As one example of the latter situation, in some instances, the bins/classes may be defined based on local sequence composition, e.g., by constructing all possible 30-mer sequences and using those to define the bins/classes into which individual sequencing reads are classified. Thus, there is no alignment of sequencing reads to a reference sequence required, and no mapping of sequencing reads to specific genes, genomic regions, or chromosomes in the sequencing read classification approach of the present disclosure.

A second important distinction between the conventional approach of sequencing read alignment, binning, and counting, and the presently disclosed machine learning-based approach to sequencing read classification is that, for the latter, there is no counting of binned sequencing reads. The machine learning algorithm is used to construct a probability assignment that a given sequencing read falls within a given bin/class. One doesn't know the exact origin of the sequencing read, and may not know the genomic locations of the bins/classes. The replacement of "counts" by "probabilities" when using this machine learning-based approach illustrates a fundamental difference between the deterministic conventional approach and the probabilistic methods disclosed herein.

In some embodiments, the final sample classification step may be replaced by a machine learning algorithm that has been trained for the detection of, for example, a chromosome 21 marker or other CNV marker, where the normalized bin count data generated through the use of conventional analysis is used as an input feature data set. As noted above, FIG. 12 provides a schematic illustration of a machine learning architecture comprising a deep learning neural network (DNN) with an input layer, two or more hidden layers, and an output layer. Each layer comprises one or more "nodes", where each node may be configured to perform a mathematical operation on the input data set and generate a result, as will be described in more detail below. Furthermore, each node may be associated with one or more adjustable parameters, e.g., activation thresholds, weighting factors, or offset bias values, that may be adjusted or "trained" during a training phase. An input vector comprising the normalized bin count data is applied to the input layer of the artificial neural network, and mapped to an output value (e.g., a sample classification result) by the ANN after the latter has been trained using one or more training data sets that comprise the normalized bin count data for a plurality of known euploid and/or aneuploid samples. In some embodiments, the machine learning algorithm may comprise a deep learning neural network that includes two or more hidden layers. In some embodiments, the training data sets may comprise additional input and/or output values, as will be discussed in more detail below.

One main difference between the traditional sample classification approach and a neural network-based sample classification approach is that multilayered neural networks can effectively separate high dimensional nonlinearities in complex datasets without extensive manual feature engineering based on apriori knowledge. More specifically, a Z-score approach such as is used in conventional sequence data processing, requires apriori knowledge of a target region of interest (e.g., at a minimum, where it is located) and knowledge about the underlying distribution of chromosome percentages of the unaffected samples. It is a hypothesis-driven and deterministic approach. In the deep learning approach, no apriori assumption about the relative value of any of the elements in the normalized bin count data is required. The deep learning process will provide a larger weighting factor for the bins/classes with the highest information value, and a lower weighting factor for the bins/classes with low information value, regardless of where they are located in the genome. While this may be trivial, for example, for the detection of trisomy 21, it is of high relevance for the detection of other copy number variations. When training the machine learning algorithm exclusively on euploid and trisomy 21 samples, it may simply identify chromosome 21 bins and assign high weighting factors accordingly. However, a machine learning algorithm may be trained to perform more abstract classification tasks. An analogy would be the use of a machine learning algorithm for cat picture classification. If the algorithm is trained solely using pictures where a cat is shown in the lower left corner, it will only assign high weighting factors to those pixels located in the lower left corner of the image. If the algorithm is trained using various pictures of cats in different positions and locations within the image, it will extract "features" and identify combinations of features that represent a cat. Translated to detection of copy number variation, the equivalent scenario would be that the machine learning algorithm "learns" to identify features of the bin count data set, and to combine features to detect a copy number variation. If the algorithm successfully extracts 'features' of the input data, it may automatically detect copy number variations on a genome-wide basis and genomic markers of variable size. Thus, in some embodiments of the disclosed methods, the detection of copy number variation, for example, may be performed without reference to a specific target chromosome.

In some embodiments of the disclosed methods, the normalization and classification steps of the conventional process may be replaced by a machine learning algorithm that has been trained for the detection of, for example, a chromosome 21 marker or other CNV marker, where the raw (non-normalized) bin count data (or logit/probability data, which may be used in lieu of count data) is used as input data. An input vector comprising the raw bin count data (or logit/probability data) and, in some cases, the GC content for the individual bins, is applied to the input layer of a deep learning neural network (FIG. 12) and mapped to an output value (e.g., a sample classification result) by the deep learning algorithm after the latter has been trained using one or more training data sets that comprise the raw bin count data (or logit/probability data) for a plurality of known euploid and/or aneuploid samples. In some embodiments, the training data sets may comprise additional input and/or output values, as will be discussed in more detail below.

Figure 16:
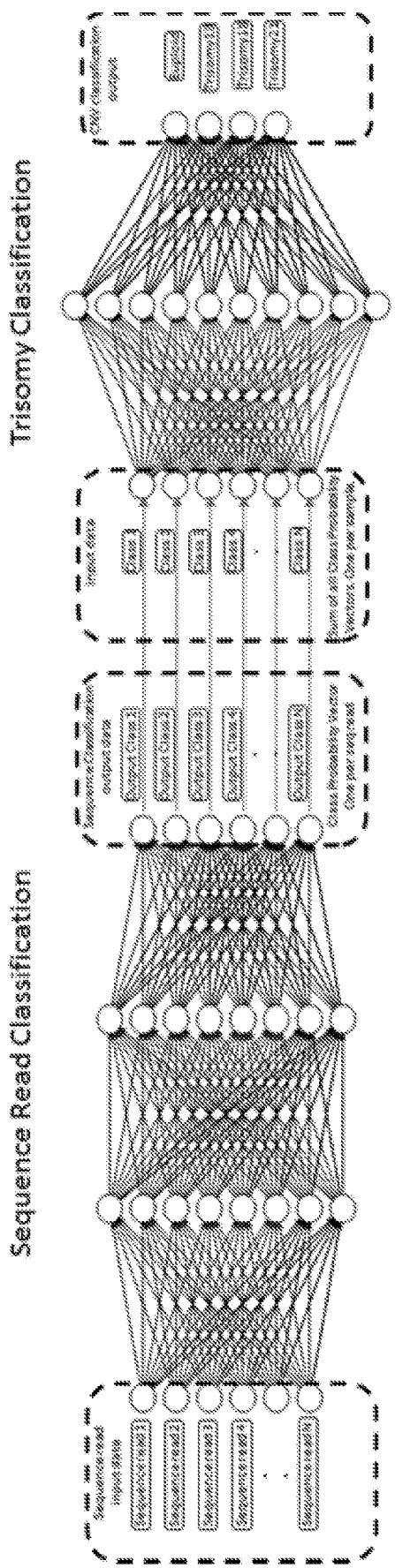
FIG. 16 provides a schematic illustration of the use of a first deep learning neural network (DNN) to classify sequencing read data and generate class probability vectors, followed by the use of a second DNN to map the set of class probability vectors to a sample classification result.

In some embodiments, a first machine learning algorithm (such as a deep learning algorithm) may be used to replace the alignment and/or binning steps, and a second machine learning algorithm (such as a deep learning algorithm) may be used to replace the normalization and/or classification steps (FIG. 16). In these embodiments, an input data set comprising the sequencing read data (e.g., millions of individual sequencing reads derived from a single biological sample) may be applied to the input layer of the first machine learning algorithm, and is mapped to an intermediate data set of sequencing read bin counts (or sequencing read class probabilities, where a class probability data set for the sample is constructed by summing the probabilities for each bin/class over all sequencing reads in the sample), and the intermediate data set of sequencing read bin counts (or sequencing read class probability data set representing the sample) is applied to the input layer of the second machine learning algorithm, and is mapped to an output value (i.e., a sample classification result, e.g., Trisomy 13). In these embodiments, the first machine learning algorithm may be trained using one or more training data sets that comprise, for example, sequencing read data sets and paired bin count data sets or known sequencing read probability distributions across a set of bins/classes for a plurality of known euploid and/or aneuploidy samples, and the second machine learning algorithm may be trained using one or more training data sets that comprise, for example, raw or normalized bin count data sets (or sequencing read class probability data sets) for a plurality of known euploid and/or aneuoploid samples. In some embodiments, the input data set for the first machine learning algorithm may comprise the sequencing read data in the form of a FASTA file (i.e., a text-based format for representing either nucleotide sequences or peptide sequences, in which nucleotides or amino acids are represented using single-letter codes). In some embodiments, the training data sets may comprise additional input and/or output values, as will be discussed in more detail below.

Figure 17:
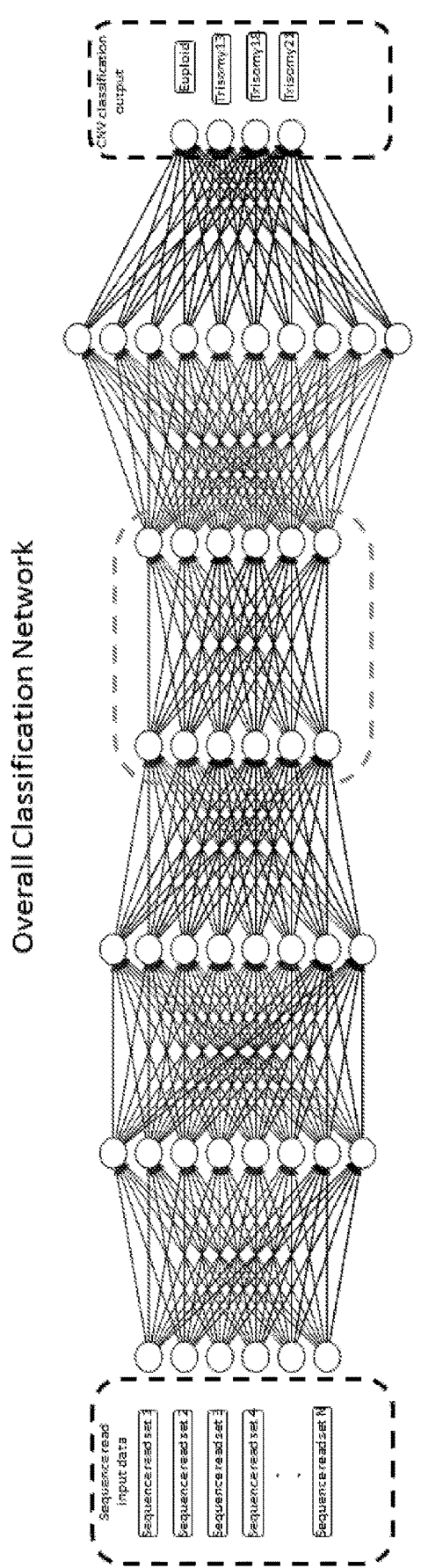
FIG. 17 provides a schematic illustration of the use of a single deep learning neural network to map an input set of sequencing read data directly to a sample classification result.

In some embodiments, a single machine learning algorithm (such as a deep learning algorithm) may be used to replace the entirety of data processing steps from the conventional nucleic acid sequencing-based diagnostic approach. This approach differs from that described in the previous paragraph in that a single machine learning algorithm is trained to map the input sequencing read data directly to a sample classification output result, rather than training two separate machine learning algorithms—the first to perform sequencing read classification and generate an output data set comprising, e.g., probability data, and the second to perform sample classification based on the input data set comprising, e.g., bin count data or sequencing read class probability data. FIG. 17 provides a schematic illustration of the use of a machine learning algorithm (such as a deep learning algorithm) for processing the data of an input data set comprising one or more input values and mapping it to an output data set comprising one or more output values. In some embodiments, an input data set comprising the sequencing read data is applied to the input layer, and mapped to an output value (e.g., a sample classification results) by the machine learning algorithm after the latter has been trained using one or more training data sets that comprise the sequencing read data for a plurality of known euploid and/or aneuploid samples. In some embodiments, the input data set for the machine learning algorithm may comprise the sequencing read data in the form of a FASTA file (i.e., a text-based format for representing either nucleotide sequences or peptide sequences, in which nucleotides or amino acids are represented using single-letter codes). In some embodiments, the training data sets may comprise additional input and/or output values, as will be discussed in more detail below.

Types of machine learning algorithms: Any of a variety of machine learning algorithms known to those of skill in the art may be suitable for use in the disclosed nucleic acid sequencing-based diagnostic methods. Examples include, but are not limited to, supervised learning algorithms, unsupervised learning algorithms, semi-supervised learning algorithms, reinforcement learning algorithms, deep learning algorithms, or any combination thereof. In a preferred embodiment, deep learning algorithms may be applied for use in the disclosed nucleic acid sequencing-based diagnostic methods.

Supervised learning algorithms: In the context of the present disclosure, supervised learning algorithms are algorithms that rely on the use of a set of labeled training data (e.g., sequencing read datasets and the corresponding known sample classification results) to infer the relationship between the set of sequencing reads for a given sample and a classification of the sample. The training data comprises a set of paired training examples, e.g., where each example comprises a set of sequencing read data and the resultant classification of the given sample according to conventional methods.

Unsupervised learning algorithms: In the context of the present disclosure, unsupervised learning algorithms are algorithms used to draw inferences from training datasets consisting of sequencing read datasets that are not paired with labeled sample classification data. The most commonly used unsupervised learning algorithm is cluster analysis, which is often used for exploratory data analysis to find hidden patterns or groupings in process data.

Semi-supervised learning algorithms: In the context of the present disclosure, semi-supervised learning algorithms are algorithms that make use of both labeled and unlabeled subject classification data for training (typically using a relatively small amount of labeled data with a large amount of unlabeled data).

Reinforcement learning algorithms: In the context of the present disclosure, reinforcement learning algorithms are algorithms which are used, for example, to determine a set of sequencing read data processing steps that should be taken so as to maximize a sample classification reward function. Reinforcement learning algorithms are commonly used for optimizing Markov decision processes (i.e., mathematical models used for studying a wide range of optimization problems where future behavior cannot be accurately predicted from past behavior alone, but rather also depends on random chance or probability). Q-learning is an example of a class of reinforcement learning algorithms. Reinforcement learning algorithms differ from supervised learning algorithms in that correct training data input/output pairs are never presented, nor are sub-optimal actions explicitly corrected. These algorithms tend to be implemented with a focus on real-time performance through finding a balance between exploration of possible outcomes based on updated input data and exploitation of past training.

Deep learning algorithms: In the context of the present disclosure, deep learning algorithms are algorithms inspired by the structure and function of the human brain called artificial neural networks (ANNs), and specifically large neural networks comprising multiple hidden layers, that are used to map an input data set (e.g. a sequencing read data set, or a raw or normalized bin count data set) to, for example, a sample classification decision. Artificial neural networks will be discussed in more detail below.

Artificial neural networks & deep learning algorithms: In preferred embodiments, the machine learning algorithm employed in the disclosed methods may be an artificial neural network (ANN) or deep learning algorithm. As noted above, one or more of the data processing steps used in a conventional nucleic acid sequencing-based genomic testing method may be augmented or replaced with the use of one or more artificial neural networks or deep learning algorithms. The artificial neural network may comprise any type of neural network model, such as a feedforward neural network, radial basis function network, recurrent neural network, or convolutional neural network, and the like. In some embodiments, the disclosed methods may employ a pre-trained ANN or deep learning architecture. In some embodiments, the disclosed methods may employ an ANN or deep learning architecture wherein the training data set is continuously updated with real-time sample classification data from a single local system (i.e., a computer system or processor running a software program comprising the disclosed data processing methods), from a plurality of local systems, or from a plurality of geographically-distributed systems that are connected through the internet.

Artificial neural networks generally comprise an interconnected group of nodes organized into multiple layers of nodes (FIG. 10). For example, the ANN architecture may comprise at least an input layer, one or more hidden layers, and an output layer. The ANN may comprise any total number of layers, and any number of hidden layers, where the hidden layers function as trainable feature extractors that allow mapping of a set of input data to an output value or set of output values. As used herein, a deep learning algorithm is an ANN comprising a plurality of hidden layers, e.g., two or more hidden layers (FIG. 12). Each layer of the neural network comprises a number of nodes (or "neurons"). A node receives input that comes either directly from the input data (e.g., sequencing read data, bin count data, normalized bin count data, GC content data, etc., in the presently disclosed methods) or the output of nodes in previous layers, and performs a specific operation, e.g., a summation operation. In some cases, a connection from an input to a node is associated with a weight (or weighting factor). In some cases, the node may sum up the products of all pairs of inputs, xi, and their associated weights (FIG. 11). In some cases, the weighted sum is offset with a bias, b, as illustrated in FIG. 11. In some cases, the output of a node or neuron may be gated using a threshold or activation function, f, which may be a linear or non-linear function. The activation function may be, for example, a rectified linear unit (ReLU) activation function, a Leaky ReLU activation function, or other function such as a saturating hyperbolic tangent, identity, binary step, logistic, arcTan, softsign, parametric rectified linear unit, exponential linear unit, softPlus, bent identity, softExponential, Sinusoid, Sinc, Gaussian, or sigmoid function, or any combination thereof.

The weighting factors, bias values, and threshold values, or other computational parameters of the neural network, can be "taught" or "learned" in a training phase using one or more sets of training data. For example, the parameters may be trained using the input data from a training data set and a gradient descent or backward propagation method so that the output value(s) (e.g., a sample classification result) that the ANN computes are consistent with the examples included in the training data set. The parameters may be obtained from a back propagation neural network training process that may or may not be performed using the same computer system hardware as that used for performing the nucleic acid sequencing based diagnostic methods disclosed herein.

Other specific types of deep machine learning algorithms, e.g., convolutional neural networks (CNNs) (e.g., often used for the processing of image data from machine vision systems) may also be used by the disclosed methods and systems. CNNs are commonly composed of layers of different types: convolution, pooling, upscaling, and fully-connected node layers. In some cases, an activation function such as rectified linear unit may be used in some of the layers. In the CNN architecture, there can be one or more layers for each type of operation performed. The CNN architecture may comprise any number of layers in total, and any number of layers for the different types of operations performed. The simplest convolutional neural network architecture starts with an input layer followed by a sequence of convolutional layers and pooling layers, where each convolution layer may also comprise one or more filters, which in turn may comprise one or more weighting factors or other adjustable parameters. In some instances, the parameters may include biases (i.e., parameters that permit the activation function to be shifted). In some cases, the convolutional layers are followed by a layer of ReLU activation function. Other activation functions can also be used, for example the saturating hyperbolic tangent, identity, binary step, logistic, arcTan, softsign, parametric rectified linear unit, exponential linear unit, softPlus, bent identity, softExponential, Sinusoid, Sinc, Gaussian, the sigmoid function and various others. The convolutional, pooling and ReLU layers may function as learnable features extractors, while the fully connected layers may function as a machine learning classifier.

As with other artificial neural networks, the convolutional layers and fully-connected layers of CNN architectures typically include various computational parameters, e.g., weights, bias values, and threshold values, that are trained in a training phase as described above.

In general, the number of nodes used in the input layer of the ANN (which enable input of data from multiple sequencing reads, sequencing read data sets, and other input data as discussed below) may range from about 10 to about 100,000 nodes. In some instances, the number of nodes used in the input layer may be at least 10, at least 50, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 30,000, at least 40,000, at least 50,000, at least 60,000, at least 70,000, at least 80,000, at least 90,000, or at least 100,000. In some instances, the number of node used in the input layer may be at most 100,000, at most 90,000, at most 80,000, at most 70,000, at most 60,000, at most 50,000, at most 40,000, at most 30,000, at most 20,000, at most 10,000, at most 9000, at most 8000, at most 7000, at most 6000, at most 5000, at most 4000, at most 3000, at most 2000, at most 1000, at most 900, at most 800, at most 700, at most 600, at most 500, at most 400, at most 300, at most 200, at most 100, at most 50, or at most 10. Those of skill in the art will recognize that the number of nodes used in the input layer may have any value within this range, for example, about 512 nodes.

In some instance, the total number of layers used in the ANN (including input and output layers) may range from about 3 to about 20. In some instance the total number of layer may be at least 3, at least 4, at least 5, at least 10, at least 15, or at least 20. In some instances, the total number of layers may be at most 20, at most 15, at most 10, at most 5, at most 4, or at most 3. Those of skill in the art will recognize that the total number of layers used in the ANN may have any value within this range, for example, 8 layers.

In some instances, the total number of learnable or trainable parameters, e.g., weighting factors, biases, or threshold values, used in the ANN may range from about 1 to about 10,000. In some instances, the total number of learnable parameters may be at least 1, at least 10, at least 100, at least 500, at least 1,000, at least 2,000, at least 3,000, at least 4,000, at least 5,000, at least 6,000, at least 7,000, at least 8,000, at least 9,000, or at least 10,000. Alternatively, the total number of learnable parameters may be any number less than 100, any number between 100 and 10,000, or a number greater than 10,000. In some instances, the total number of learnable parameters may be at most 10,000, at most 9,000, at most 8,000, at most 7,000, at most 6,000, at most 5,000, at most 4,000, at most 3,000, at most 2,000, at most 1,000, at most 500, at most 100 at most 10, or at most 1. Those of skill in the art will recognize that the total number of learnable parameters used may have any value within this range, for example, about 2,200 parameters.

In some instances, the total number of learnable or trainable parameters, e.g., weighting factors, biases, or threshold values, used in the ANN may be even larger than that indicated in the previous paragraph, and may range from about $10^3$ to about $10^{10}$. In some instances the total number of learnable or trainable parameters may be at least $10^3$, at least $10^4$, at least $10^5$, at least $10^6$, at least $10^7$, at least $10^8$, at least $10^9$, or at least $10^{10}$. In some instances, the total number of learnable or trainable parameters may be at most $10^{10}$, at most $10^9$, at most $10^8$, at most $10^7$, at most $10^6$, at most $10^5$, at most $10^4$, or at most $10^3$. Any of the lower and upper values described in this paragraph may be combined to form a range included within the present disclosure, for example, the total number of learnable or trainable parameters may range from about $10^5$ to about $10^9$. Those of skill in the art will recognize that in certain embodiments the total number of learnable or trainable parameters may have any value within this range, e.g., about 565,000 trainable parameters.

Training data sets: As noted above, the input data for training of the ANN or deep learning algorithm may comprise a variety of input values depending on which step(s) of the conventional data processing method are being replaced. In general, the input data for training of the ANN or deep learning algorithm will be data comprising the same set of input values, or a similar set of input values, as those used for determining a sample classification or test result for a test subject. Input data values may comprise numeric values (integer values, real values, floating point numbers), alphanumeric values, ascii values, etc., or any combination thereof. In general, the ANN or deep learning algorithm may be trained using one or more training data sets comprising the same or different sets of input and paired output (e.g., sample classification) data.

Examples of suitable input data values include, but are not limited to, sequencing read data in any of a variety of formats, e.g., FASTA, FASTQ, SAM, 2 bit, nibble, and BAM file formats (or any of a number of custom binary file format known to those of skill in the art),, raw bin count data, normalized bin count data, GC content data, sequencing read classification data (or class probability data), etc., for one or more control subjects (i.e., subjects that are known to have a normal genome, subjects that are known to exhibit a genomic abnormality, or any combination thereof).

In some embodiments, the input data for training of the ANN or deep learning algorithm may comprise sequencing read data for one or more control subjects, wherein the one or more control subjects are known euploid subjects, known aneuploid subjects, or any combination thereof.

In some embodiments, the training data set may comprise in silico sequence data obtained from a publically-available database, a private institutional database, a commercial database, or any combination thereof.

In some embodiments, the training data set may comprise simulated sequence data for normal subjects, abnormal subjects, or any combination thereof.

In some embodiments, the training data set may comprise personal health data for one or more control subjects, wherein the personal health data is selected from the group consisting of subject age, sex, weight, blood pressure, number of previous offspring (if female), smoking history, history of alcohol use, family history of disease, or any combination thereof.

In some embodiments, the training data set may comprise any combination of data as outlined in the preceding paragraphs, e.g., the ANN or deep learning algorithm may be trained using a training data set comprising one or more sets of sequencing reads, in silico sequence data, simulated sequence data, personal health data, etc., or any combination thereof.

Distributed data processing systems and cloud-based training databases: In some embodiments, the machine learning-based methods for nucleic acid sequencing-based diagnostic testing disclosed herein may be used for processing sequencing data on one or more computer systems that reside at a single physical/geographical location. In some embodiments, they may be deployed as part of a distributed system of computers that comprises two or more computer systems residing at two or more physical/geographical locations. Different computer systems, or components or modules thereof, may be physically located in different workspaces and/or worksites (i.e., in different physical/geographical locations), and may be linked via a local area network (LAN), an intranet, an extranet, or the internet so that training data and/or data from samples to be processed may be shared and exchanged between the sites.

In some embodiments, training data may reside in a cloud-based database that is accessible from local and/or remote computer systems on which the machine learning-based diagnostic method algorithms are running. As used herein, the term "cloud-based" refers to shared or sharable storage of electronic data. The cloud-based database and associated software may be used for archiving electronic data, sharing electronic data, and analyzing electronic data. In some embodiments, training data generated locally may be uploaded to a cloud-based database, from which it may be accessed and used to train other machine learning-based systems at the same site or a different site. In some embodiments, diagnostic test results generated locally may be uploaded to a cloud-based database and used to update the training data set in real time for continuous improvement of diagnostic test performance.

Devices, Systems, and Kits

In some aspects disclosed herein are devices, systems and kits for implementing the disclosed methods for extracting genetic information from a biological sample. As described herein, devices, systems and kits disclosed herein allow a user to collect and test a biological sample at a location of choice to detect the presence and/or quantity of a target analyte in the sample. In some instances, devices, systems and kits disclosed herein are used in the foregoing methods. In some instances, devices, systems and kits disclosed herein comprise a sample purifier that removes at least one component (e.g., cell, cell fragment, protein) from a biological sample of a subject; a nucleic acid sequencer for sequencing at least one nucleic acid in the biological sample; and a nucleic acid sequence output for relaying sequence information to a user of the device, system or kit.

In general, devices, systems, and kits of the present disclosure, integrate multiple functions, e.g., purification, amplification, and detection of the target analyte (e.g., including amplification products thereof), and combinations thereof. In some instances, the multiple functions are carried out within a single assay assembly unit or a single device. In some instances, all of the functions occur outside of the single unit or device. In some instances, at least one of the functions occurs outside of the single unit or device. In some instances, only one of the functions occurs outside of the single unit or device. In some instances, the sample purifier, nucleic acid amplification reagent, oligonucleotide, and detection reagent or component are housed in a single device. In general, devices, systems, and kits of the present disclosure comprise a display, a connection to a display, or a communication to a display for relaying information about the biological sample to one or more people.

In some instances, devices, systems and kits comprise an additional component disclosed herein. Non-limiting examples of an additional component include a sample transportation compartment, a sample storage compartment, a sample and/or reagent receptacle, a temperature indicator, an electronic port, a communication connection, a communication device, a sample collection device, and a housing unit. In some instances, the additional component is integrated with the device. In some instances, the additional component is not integrated with the device. In some instances, the additional component is housed with the sample purifier, nucleic acid amplification reagent, oligonucleotide, and detection reagent or component in a single device. In some instances, the additional component is not housed within the single device.

In some instances, devices, systems and kits disclosed herein comprise components to obtain a sample, extract cell-free nucleic acids, and purify cell-free nucleic acids. In some instances, devices, systems and kits disclosed herein comprise components to obtain a sample, extract cell-free nucleic acids, purify cell-free nucleic acids, and prepare a library of the cell-free nucleic acids. In some instances, devices, systems and kits disclosed herein comprise components to obtain a sample, extract cell-free nucleic acids, purify cell-free nucleic acids, and sequence cell-free nucleic acids. In some instances, devices, systems and kits disclosed herein comprise components to obtain a sample, extract cell-free nucleic acids, purify cell-free nucleic acids, prepare a library of the cell-free nucleic acids, and sequence the cell-free nucleic acids. By way of non-limiting example, components for obtaining a sample are a transdermal puncture device and a filter for obtaining plasma from blood. Also, by way of non-limiting example, components for extracting and purifying cell-free nucleic acids comprise buffers, beads and magnets. Buffers, beads and magnets may be supplied at volumes appropriate for receiving a general sample volume from a finger prick (e.g., 50-150 μl of blood).

In some instances, devices, systems and kits comprise a receptacle for receiving the biological sample. The receptacle may be configured to hold a volume of a biological sample between 1 µl and 1 ml. The receptacle may be configured to hold a volume of a biological sample between 1 µl and 500 µl. The receptacle may be configured to hold a volume of a biological sample between 1 µl and 200 µl. The receptacle may have a defined volume that is the same as a suitable volume of sample for processing and analysis by the rest of the device/system components. This would preclude the need for a user of the device, system or kit to measure out a specified volume of the sample. The user would only need to fill the receptacle and thereby be assured that the appropriate volume of sample had been delivered to the device/system. In some instances, devices, systems and kits do not comprise a receptacle for receiving the biological sample. In some instances, the sample purifier receives the biological sample directly. Similar to the description above for the receptacle, the sample purifier may have a defined volume that is suitable for processing and analysis by the rest of the device/system components. In general, devices, systems, and kits disclosed herein are intended to be used entirely at point of care. However, in some instances, the user may want to preserve or send the analyzed sample to another location (e.g., lab, clinic) for additional analysis or confirmation of results obtained at point of care. By way of non-limiting example, the device/system may separate plasma from blood. The plasma may be analyzed at point of care and the cells from the blood shipped to another location for analysis. In some instances, devices, systems and kits comprise a transport compartment or storage compartment for these purposes. The transport compartment or storage compartment may be capable of containing a biological sample, a component thereof, or a portion thereof. The transport compartment or storage compartment may be capable of containing the biological sample, portion thereof, or component thereof, during transit to a site remote to the immediate user. The transport compartment or storage compartment may be capable of containing cells that are removed from a biological sample, so that the cells can be sent to a site remote to the immediate user for testing. Non-limiting examples of a site remote to the immediate user may be a laboratory or a clinic when the immediate user is at home. In some instances, the home does not have a machine or additional device to perform an additional analysis of the biological sample. The transport compartment or storage compartment may be capable of containing a product of a reaction or process that result from adding the biological sample to the device. In some instances, the product of the reaction or process is a nucleic acid amplification product or a reverse transcription product. In some instances, the product of the reaction or process is a biological sample component bound to a binding moiety described herein. The biological sample component may comprise a nucleic acid, a cell fragment, an extracellular vesicle, a protein, a peptide, a sterol, a lipid, a vitamin, or glucose, any of which may be analyzed at a remote location to the user. In some instances, the transport compartment or storage compartment comprises an absorption pad, a paper, a glass container, a plastic container, a polymer matrix, a liquid solution, a gel, a preservative, or a combination thereof. An absorption pad or a paper may be useful for stabilizing and transporting a dried biological fluid with a protein or other biomarker for screening.

In some instances, devices and systems disclosed herein provide for analysis of cell-free nucleic acids (e.g., circulating RNA and/or DNA) and non-nucleic acid components of a sample. Analysis of both cell-free nucleic acids and non-nucleic acid components may both occur at a point of need. In some instances, systems and devices provide an analysis of cell-free nucleic acids at a point of need and preservation of at least a portion or component of the sample for analysis of non-nucleic acid components at a site remote from the point of need. In some instances, systems and devices provide an analysis of non-nucleic acid components at a point of need and preservation of at least a portion or component of the sample for analysis of cell-free nucleic acids at a site remote from the point of need. These devices and systems may be useful for carrier testing and detecting inherited diseases, such as those disclosed herein.

In some instances, the transport compartment or storage compartment comprises a preservative. The preservative may also be referred to herein as a stabilizer or biological stabilizer. In some instances, the device, system or kit comprises a preservative that reduces enzymatic activity during storage and/or transportation. In some instances, the preservative is a whole blood preservative. Non-limiting examples of whole blood preservatives, or components thereof, are glucose, adenine, citric acid, trisodium citrate, dextrose, sodium di-phosphate, and monobasic sodium phosphate. In some instances, the preservative comprises EDTA. EDTA may reduce enzymatic activity that would otherwise degrade nucleic acids. In some instances, the preservative comprises formaldehyde. In some instances, the preservative is a known derivative of formaldehyde. Formaldehyde, or a derivative thereof, may cross link proteins and therefore stabilize cells and prevent cell lysis.

Generally, devices and systems disclosed herein are portable for a single person. In some instances, devices and systems are handheld. In some instances, devices and systems have a maximum length, maximum width or maximum height. In some instances, devices and systems are housed in a single unit having a maximum length, maximum width or maximum height. In some instances the maximum length is not greater than 12 inches. In some instances the maximum length is not greater than 10 inches. In some instances the maximum length is not greater than 8 inches. In some instances the maximum length is not greater than 6 inches. In some instances the maximum width is not greater than 12 inches. In some instances the maximum width is not greater than 10 inches. In some instances the maximum width is not greater than 8 inches. In some instances the maximum width is not greater than 6 inches. In some instances the maximum width is not greater than 4 inches. In some instances the maximum height is not greater than 12 inches. In some instances the maximum height is not greater than 10 inches. In some instances the maximum height is not greater than 8 inches. In some instances the maximum height is not greater than 6 inches. In some instances the maximum height is not greater than 4 inches. In some instances the maximum height is not greater than 2 inches. In some instances the maximum height is not greater than 1 inch.

Sample collection: In some instances, devices, systems and kits disclosed herein comprise a sample collector. In some instances, the sample collector is provided separately from the rest of the device, system or kit. In some instances, the sample collector is physically integrated with the device, system or kit, or a component thereof. In some instances, the sample collector is integrated with a receptacle described herein. In some instances, the sample collector may be a cup, tube, capillary, or well for applying the biological fluid. In some instances, the sample collector may be a cup for applying urine. In some instances, the sample collector may comprise a pipet for applying urine in the cup to the device, system or kit. In some instances, the sample collector may be a capillary integrated with a device disclosed herein for applying blood. In some instances, the sample collector may be tube, well, pad or paper integrated with a device disclosed herein for applying saliva. In some instances, the sample collector may be pad or paper for applying sweat. In some instances, the sample collector is configured to discard an initial sample obtained from a subject to remove damaged and/or contaminated nucleic acids.

In some instances, devices, systems and kits disclosed herein comprise a transdermal puncture device. Non-limiting examples of transdermal puncture devices are needles and lancets. In some instances, the sample collector comprises the transdermal puncture device. In some instances, devices, systems and kits disclosed herein comprise a microneedle, microneedle array or microneedle patch. In some instances, devices, systems and kits disclosed herein comprise a hollow microneedle. By way of non-limiting example, the transdermal puncture device is integrated with a well or capillary so that as the subject punctures their finger, blood is released into the well or capillary where it will be available to the system or device for analysis of its components. In some instances, the transdermal puncture device is a push button device with a needle or lancet in a concave surface. In some instances, the needle is a microneedle. In some instances, the transdermal puncture device comprises an array of microneedles. By pressing an actuator, button or location on the non-needle side of the concave surface, the needle punctures the skin of the subject in a more controlled manner than a lancet. Furthermore, the push button device may comprise a vacuum source or plunger to help draw blood from the puncture site.

In some instances, devices, systems and kits disclosed herein comprise a device that does not require transdermal puncture, for e.g., lysing the tight junctions of the skin such that fluid containing the reliable genetic information.

Sample processing and purification: Disclosed herein are devices, systems and kits that comprise a sample processor, wherein the sample processor modifies a biological sample to remove a component of the sample or separate the sample into multiple fractions (e.g., blood cell fraction and plasma or serum). The sample processor may comprise a sample purifier, wherein the sample purifier is configured to remove an unwanted substance or non-target component of a biological sample, thereby modifying the sample. Depending on the source of the biological sample, unwanted substances can include, but are not limited to, proteins (e.g., antibodies, hormones, enzymes, serum albumin, lipoproteins), free amino acids and other metabolites, microvesicles, nucleic acids, lipids, electrolytes, urea, urobilin, pharmaceutical drugs, mucous, bacteria, and other microorganisms, and combinations thereof. In some instances, the sample purifier separates components of a biological sample disclosed herein. In some instances, sample purifiers disclosed herein remove components of a sample that would inhibit, interfere with or otherwise be detrimental to the later process steps such as nucleic acid amplification or detection. In some instances, the resulting modified sample is enriched for target analytes. This can be considered indirect enrichment of target analytes. Alternatively or additionally, target analytes may be captured directly, which is considered direct enrichment of target analytes.

In some instances, the biological sample comprises fetal trophoblasts, that in some cases, contain the genetic information of a fetus (e.g., RNA, DNA). In some instances, fetal trophoblasts are enriched in the biological sample. Non-limiting examples of enriching trophoblasts in a biological sample include, enrichment by morphology (e.g., size) and marker antigens (e.g., cell surface antigens). In some cases, enrichment of trophoblasts is performed using the isolation by size of epithelial tumor cells (ISET) method. In some cases, enrichment of trophoblasts in a biological sample comprises contacting the biological sample with an antibody or antigen-binding fragment specific to a cell-surface antigen of a trophoblast. Non-limiting examples of trophoblast cell-surface antigens include tropomyosin-1 (Trop1), tropomyosin-2 (Trop2), cyto and syncytio-trophoblast marker, GB25, human placental lactogen (HPL), and alpha human chorionic gonadotrophin (alpha HCG). There are many suitable techniques for purifying trophoblasts from a biological sample using the monoclonal antibodies described herein, including but not limited to, fluoresce-activated cell sorting (FACS), column chromatography, magnetic sorting (e.g., Dynabeads). In some instances, the fetal genetic information is extracted from the enriched and/or purified trophoblasts, using any suitable DNA extraction method.

In some instances, the fetal trophoblasts are (1) isolated from the biological sample; (2) the isolated trophoblasts are lysed; (3) the fetal nuclei from the lysed fetal trophoblasts are isolated; (4) lysing the isolated fetal nuclei; and (5) purifying the genomic DNA from the isolated fetal nuclei. In some instances, the fetal nuclei are treated with a DNAase prior to lysing isolation. In some instances. In a non-limiting example, the biological sample contain fetal and maternal cells (e.g., trophoblasts) are centrifuged and resuspended in media. Next, the cells are mechanically separated using a magnetic separation procedure (e.g., magnetic nanoparticles conjugated to a cell surface antigen-specific monoclonal antibody). Cells are washed and suspended in media. Maternal cells (e.g., cell-surface antigen negative) are separated from magnetized (cell-surface antigen positive) fetal trophoblast cells using a DynaMag™ Spin magnet (Life Technologies). The fetal trophoblast cells are washed multiple times using a magnet to remove residual maternal cells. The isolated fetal trophoblast cells are resuspended in a solution. isolated fetal trophoblast cells are lysed by addition of a lysing buffer, followed by centrifugation at low speed to pellet intact fetal trophoblast cell nuclei. The supernatant is removed and the nuclei are washed multiple times. Genomic DNA is extracted from the fetal trophoblast cell nuclei by addition of 25 microliters of 3× concentrated DNA extraction buffer to the fetal trophoblast cell nuclei, and incubated for about 3 hours. Optionally the DNA is still further purified, for example using commercial DNA purification and concentration kits.

In some instances, the sample purifier comprises a separation material for removing unwanted substances other than patient cells from the biological sample. Useful separation materials may include specific binding moieties that bind to or associate with the substance. Binding can be covalent or noncovalent. Any suitable binding moiety known in the art for removing a particular substance can be used. For example, antibodies and fragments thereof are commonly used for protein removal from samples. In some instances, a sample purifier disclosed herein comprises a binding moiety that binds a nucleic acid, protein, cell surface marker, or microvesicle surface marker in the biological sample. In some instances, the binding moiety comprises an antibody, antigen binding antibody fragment, a ligand, a receptor, a peptide, a small molecule, or a combination thereof.

In some instances, sample purifiers disclosed herein comprise a filter. In some instances, sample purifiers disclosed herein comprise a membrane. Generally the filter or membrane is capable of separating or removing cells, cell particles, cell fragments, blood components other than cell-free nucleic acids, or a combination thereof, from the biological samples disclosed herein.

In some instances, the sample purifier facilitates separation of plasma or serum from cellular components of a blood sample. In some instances, the sample purifier facilitates separation of plasma or serum from cellular components of a blood sample before starting a molecular amplification reaction or a sequencing reaction. Plasma or serum separation can be achieved by several different methods such as centrifugation, sedimentation or filtration. In some instances, the sample purifier comprises a filter matrix for receiving whole blood, the filter matrix having a pore size that is prohibitive for cells to pass through, while plasma or serum can pass through the filter matrix uninhibited. In some instances, the filter matrix combines a large pore size at the top with a small pore size at the bottom of the filter, which leads to very gentle treatment of the cells preventing cell degradation or lysis, during the filtration process. This is advantageous because cell degradation or lysis would result in release of nucleic acids from blood cells or maternal cells that would contaminate target cell-free nucleic acids. Non-limiting examples of such filters include Pall Vivid™ GR membrane, Munktell Ahlstrom filter paper (see, e.g., WO2017017314), TeraPore filters.

In some instances devices, systems, and kits disclosed herein employ vertical filtration, driven by capillary force to separate a component or fraction from a sample (e.g., plasma from blood). By way of non-limiting example, vertical filtration may comprise gravitation assisted plasma separation. A high-efficiency superhydrophobic plasma separator is described, e.g., by Liu et al., A High Efficiency Superhydrophobic Plasma Separation, Lab Chip 2015.

The sample purifier may comprise a lateral filter (e.g., sample does not move in a gravitational direction or the sample moves perpendicular to a gravitational direction). The sample purifier may comprise a vertical filter (e.g., sample moves in a gravitational direction). The sample purifier may comprise vertical filter and a lateral filter. The sample purifier may be configured to receive a sample or portion thereof with a vertical filter, followed by a lateral filter. The sample purifier may be configured to receive a sample or portion thereof with a lateral filter, followed by a vertical filter. In some instances, a vertical filter comprises a filter matrix. In some instances, the filter matrix of the vertical filter comprises a pore with a pore size that is prohibitive for cells to pass through, while plasma can pass the filter matrix uninhibited. In some instances, the filter matrix comprises a membrane that is especially suited for this application because it combines a large pore size at the top with a small pore size at the bottom of the filter, which leads to very gentle treatment of the cells preventing cell degradation during the filtration process.

In some instances, the sample purifier comprises an appropriate separation material, e.g., a filter or membrane, that removes unwanted substances from a biological sample without removing cell-free nucleic acids. In some instances, the separation material separates substances in the biological sample based on size, for example, the separation material has a pore size that excludes a cell but is permeable to cell-free nucleic acids. Therefore, when the biological sample is blood, the plasma or serum can move more rapidly than a blood cell through the separation material in the sample purifier, and the plasma or serum containing any cell-free nucleic acids permeates the holes of the separation material. In some instances, the biological sample is blood, and the cell that is slowed and/or trapped in the separation material is a red blood cell, a white blood cell, or a platelet. In some instances, the cell is from a tissue that contacted the biological sample in the body, including, but not limited to, a bladder or urinary tract epithelial cell (in urine), or a buccal cell (in saliva). In some instances, the cell is a bacterium or other microorganism.

In some instances, the sample purifier is capable of slowing and/or trapping a cell without damaging the cell, thereby avoiding the release of cell contents including cellular nucleic acids and other proteins or cell fragments that could interfere with subsequent evaluation of the cell-free nucleic acids. This can be accomplished, for example, by a gradual, progressive reduction in pore size along the path of a lateral flow strip or other suitable assay format, to allow gentle slowing of cell movement, and thereby minimize the force on the cell. In some instances, at least 95%, at least 98%, at least 99%, or up to 100% of the cells in a biological sample remain intact when trapped in the separation material. In addition to or independently of size separation, the separation material can trap or separate unwanted substances based on a cell property other than size, for example, the separation material can comprise a binding moiety that binds to a cell surface marker. In some instances, the binding moiety is an antibody or antigen binding antibody fragment. In some instances, the binding moiety is a ligand or receptor binding protein for a receptor on a blood cell or microvesicle.

In some instances, systems and devices disclosed herein comprise a separation material that moves, draws, pushes, or pulls the biological sample through the sample purifier, filter and/or membrane. In some instances, the material is a wicking material. Examples of appropriate separation materials used in the sample purifier to remove cells include, but are not limited to, polyvinylidene difluoride, polytetrafluoroethylene, acetylcellulose, nitrocellulose, polycarbonate, polyethylene terephthalate, polyethylene, polypropylene, glass fiber, borosilicate, vinyl chloride, silver. Suitable separation materials may be characterized as preventing passage of cells. In some instances, the separation material is not limited as long as it has a property that can prevent passage of the red blood cells. In some instances, the separation material is a hydrophobic filter, for example a glass fiber filter, a composite filter, for example Cytosep (e.g., Ahlstrom Filtration or Pall Specialty Materials, Port Washington, NY), or a hydrophilic filter, for example cellulose (e.g., Pall Specialty Materials). In some instances, whole blood can be fractionated into red blood cells, white blood cells and serum components for further processing according to the methods of the present disclosure using a commercially available kit (e.g., Arrayit Blood Card Serum Isolation Kit, Cat. ABCS, Arrayit Corporation, Sunnyvale, CA).

In some instances the sample purifier comprises at least one filter or at least one membrane characterized by at least one pore size. In some instances, the sample purifier comprises multiple filters and/or membranes, wherein the pore size of at least a first filter or membrane differs from a second filter or membrane. In some instances, at least one pore size of at least one filter/membrane is about 0.05 microns to about 10 microns. In some instances, the pore size is about 0.05 microns to about 8 microns. In some instances, the pore size is about 0.05 microns to about 6 microns. In some instances, the pore size is about 0.05 microns to about 4 microns. In some instances, the pore size is about 0.05 microns to about 2 microns. In some instances, the pore size is about 0.05 microns to about 1 micron. In some instances, at least one pore size of at least one filter/membrane is about 0.1 microns to about 10 microns. In some instances, the pore size is about 0.1 microns to about 8 microns. In some instances, the pore size is about 0.1 microns to about 6 microns. In some instances, the pore size is about 0.1 microns to about 4 microns. In some instances, the pore size is about 0.1 microns to about 2 microns. In some instances, the pore size is about 0.1 microns to about 1 micron.

In some instances, the sample purifier is characterized as a gentle sample purifier. Gentle sample purifiers, such as those comprising a filter matrix, a vertical filter, a wicking material, or a membrane with pores that do not allow passage of cells, are particularly useful for analyzing cell-free nucleic acids. For example, prenatal applications of cell-free fetal nucleic acids in maternal blood are presented with the additional challenge of analyzing cell-free fetal nucleic acids in the presence of cell-free maternal nucleic acids, the latter of which create a large background signal to the former. By way of non-limiting example, a sample of maternal blood may contain about 500 to 750 genome equivalents of total cell-free DNA (maternal and fetal) per milliliter of whole blood when the sample is obtained without cell lysis or other cell disruption caused by the sample collection method. The fetal fraction in blood sampled from pregnant women may be around 10%, about 50 to 75 genome equivalents per ml. The process of obtaining cell-free nucleic acids usually involves obtaining plasma from the blood. If not performed carefully, maternal white blood cells may be destroyed, releasing additional cellular nucleic acids into the sample, creating a lot of background noise to the fetal cell-free nucleic acids. The typical white cell count is around $4*10^6$ to $10*10^6$ cells per ml of blood and therefore the available nuclear DNA is around 4,000 to 10,000 times higher than the overall cell-free DNA (cfDNA). Consequently, even if only a small fraction of maternal white blood cells is destroyed, releasing nuclear DNA into the plasma, the fetal fraction is reduced dramatically. For example, a white cell degradation of 0.01% may reduce the fetal fraction from 10% to about 5%. Devices, systems, and kits disclosed herein aim to reduce these background signals.

In some instances, the sample processor is configured to separate blood cells from whole blood. In some instances, the sample processor is configured to isolate plasma from whole blood. In some instances, the sample processor is configured to isolate serum from whole blood. In some instances, the sample processor is configured to isolate plasma or serum from less than 1 milliliter of whole blood. In some instances, the sample processor is configured to isolate plasma or serum from less than 1 milliliter of whole blood. In some instances, the sample processor is configured to isolate plasma or serum from less than 500 µL of whole blood. In some instances, the sample processor is configured to isolate plasma or serum from less than 400 µL of whole blood. In some instances, the sample processor is configured to isolate plasma or serum from less than 300 µL of whole blood. In some instances, the sample processor is configured to isolate plasma or serum from less than 200 µL of whole blood. In some instances, the sample processor is configured to isolate plasma or serum from less than 150 µL of whole blood. In some instances, the sample processor is configured to isolate plasma or serum from less than 100 µL of whole blood.

In some instances, devices, systems and kits disclosed herein comprise a binding moiety for producing a modified sample depleted of cells, cell fragments, nucleic acids or proteins that are unwanted or of no interest. In some instances, devices, systems and kits disclosed herein comprise a binding moiety for reducing cells, cell fragments, nucleic acids or proteins that are unwanted or of no interest, in a biological sample. In some instances, devices, systems and kits disclosed herein comprise a binding moiety for producing a modified sample enriched with target cell, target cell fragments, target nucleic acids or target proteins.

In some instances, devices, systems and kits disclosed herein comprise a binding moiety capable of binding a nucleic acid, a protein, a peptide, a cell surface marker, or microvesicle surface marker. In some instances, devices, systems and kits disclosed herein comprise a binding moiety for capturing an extracellular vesicle or extracellular microparticle in the biological sample. In some instances, the extracellular vesicle contains at least one of DNA and RNA. In some instances, devices, systems and kits disclosed herein comprise reagents or components for analyzing DNA or RNA contained in the extracellular vesicle. In some instances, the binding moiety comprises an antibody, antigen binding antibody fragment, a ligand, a receptor, a protein, a peptide, a small molecule, or a combination thereof.

In some instances, devices, systems and kits disclosed herein comprise a binding moiety capable of interacting with or capturing an extracellular vesicle that is released from a cell. In some instances, the cell is a fetal cell. In some instances, the cell is a placental cell. The fetal cell or the placental cell may be circulating in a biological fluid (e.g., blood) of a female pregnant subject. In some instances, the extracellular vesicle is released from an organ, gland or tissue. By way of non-limiting example, the organ, gland or tissue may be diseased, aging, infected, or growing. Non-limiting examples of organs, glands and tissues are brain, liver, heart, kidney, colon, pancreas, muscle, adipose, thyroid, prostate, breast tissue, and bone marrow.

By way of non-limiting example, devices, systems and kits disclosed herein may be capable of capturing and discarding an extracellular vesicle or extracellular microparticle from a maternal sample to enrich the sample for fetal/placental nucleic acids. In some instances, the extracellular vesicle is fetal/placental in origin. In some instances, the extracellular vesicle originates from a fetal cell. In some instances, the extracellular vesicle is released by a fetal cell. In some instances, the extracellular vesicle is released by a placental cell. The placental cell may be a trophoblast cell. In some instances, the trophoblast is enriched using the methods described herein. In some instances, devices, systems and kits disclosed herein comprise a cell-binding moiety for capturing placenta educated platelets, which may contain fetal DNA or RNA fragments. These can be captured/enriched for with antibodies or other methods (low speed centrifugation). In such instances, the fetal DNA or RNA fragments may be analyzed as described herein to detect or indicate chromosomal information (e.g., gender). Alternatively or additionally, devices, systems and kits disclosed herein comprise a binding moiety for capturing an extracellular vesicle or extracellular microparticle in the biological sample that comes from a maternal cell.

In some instances, the binding moiety is attached to a solid support, wherein the solid support can be separated from the rest of the biological sample or the biological sample can be separated from the solid support, after the binding moiety has made contact with the biological sample. Non-limiting examples of solid supports include a bead, a nanoparticle, a magnetic particle, a chip, a microchip, a fibrous strip, a polymer strip, a membrane, a matrix, a column, a plate, or a combination thereof Devices, systems and kits disclosed herein may comprise a cell lysis reagent. Non-limiting examples of cell lysis reagents include detergents such as NP-40, sodium dodecyl sulfate, and salt solutions comprising ammonium, chloride, or potassium. Devices, systems and kits disclosed herein may have a cell lysis component. The cell lysis component may be structural or mechanical and capable of lysing a cell. By way of non-limiting example, the cell lysis component may shear the cells to release intracellular components such as nucleic acids. In some instances, devices, systems and kits disclosed herein do not comprise a cell lysis reagent. Some devices, systems and kits disclosed herein are intended to analyze cell-free nucleic acids.

Nucleic acid amplification: Generally, devices, systems and kits disclosed herein are capable of amplifying a nucleic acid. Often devices, systems and kits disclosed herein comprise a DNA polymerase. In some instances, the devices, systems and kits disclosed herein comprise a reverse transcriptase enzyme to produce complementary DNA (cDNA) from RNA in biological samples disclosed herein, wherein the cDNA can be amplified and/or analyzed similarly to genomic DNA as described herein. Devices, systems and kits disclosed herein also often contain a crowding agent which can increase the efficiency enzymes like DNA polymerases and helicases. Crowding agents may increase an efficiency of a library, as described elsewhere herein. The crowding agent may comprise a polymer, a protein, a polysaccharide, or a combination thereof. Non-limiting examples of crowding agents that may be used in devices, systems and kits disclosed herein are dextran, poly(ethylene glycol) and dextran.

A traditional polymerase chain reaction requires thermocycling. This would be possible, but inconvenient for a typical at-home user without a thermocycler machine. In some instances, devices, systems and kits disclosed herein are capable of amplifying a nucleic acid without changing the temperature of the device or system or a component thereof. In some instances, devices, systems and kits disclosed herein are capable of amplifying a nucleic acid isothermally. Non-limiting examples of isothermal amplification are as follows: loop-mediated isothermal amplification (LAMP), strand displacement amplification (SDA), helicase dependent amplification (HDA), nicking enzyme amplification reaction (NEAR), and recombinase polymerase amplification (RPA). Thus, devices, systems and kits disclosed herein may comprise reagents necessary to carry out an isothermal amplification. Non-limiting examples of isothermal amplification reagents include recombinase polymerases, single-strand DNA-binding proteins, and strand-displacing polymerases. Generally, isothermal amplification using recombinase polymerase amplification (RPA) employs three core enzymes, recombinase, single-strand DNA-binding protein, and strand-displacing polymerase, to (1) pair oligonucleotide primers with homologous sequence in DNA, (2) stabilize displaced DNA strands to prevent primer displacement, and (3) extend the oligonucleotide primer using a strand displacing DNA polymerase. Using paired oligonucleotide primers, exponential DNA amplification can take place with incubation at room temperature (optimal at 37° C.).

In some instances, devices, systems and kits disclosed herein are capable of amplifying a nucleic acid at a temperature. In some instances, devices, systems and kits disclosed herein are capable of amplifying a nucleic acid at not more than two temperatures. In some instances, devices, systems and kits disclosed herein are capable of amplifying a nucleic acid at not more than three temperatures. In some instances, devices, systems and kits disclosed herein only require initially heating one reagent or component of the device, system or kit. In some instances, devices, systems and kits disclosed herein are capable of amplifying a nucleic acid at a range of temperatures, such as those disclosed herein. In some instances, devices, systems, kits disclosed herein, including all components thereof, and all reagents thereof, are completely operable at room temperature, not requiring cooling, freezing or heating.

In some instances, at least a portion of the devices, systems and kits disclosed herein operate at about 20° C. to about 50° C. In some instances, at least a portion of the devices, systems, and kits disclosed herein operate at about 37° C. In some instances, at least a portion of the devices, systems and kits disclosed herein operate at about 42° C. In some instances, the devices, systems and kits disclosed herein are advantageously operated at room temperature. In some instances, at least a portion of the devices, systems and kits disclosed herein are capable of amplifying a nucleic acid isothermally at about 20° C. to about 30° C. In some instances, at least a portion of the devices, systems and kits disclosed herein are capable of amplifying a nucleic acid isothermally at about 23° C. to about 27° C.

In some instances, devices, systems and kits disclosed herein comprise at least one nucleic acid amplification reagent and at least one oligonucleotide primer capable of amplifying a first sequence in a genome and a second sequence in a genome, wherein the first sequence and the second sequence are similar, and wherein the first sequence is physically distant enough from the second sequence such that the first sequence is present on a first cell-free nucleic acid of the subject and the second sequence is present on a second cell-free nucleic acid of the subject. In some instances, the at least two sequences are immediately adjacent. In some instances the at least two sequences are separated by at least one nucleotide. In some instances, the at least two sequences are separated by at least two nucleotides. In some instances, the at least two sequences are separated by at least about 5, at least about 10, at least about 15, at least about 20, at least about 30, at least about 40, at least about 50, or at least about 100 nucleotides. In some instances, the at least two sequences are at least about 50% identical. In some instances, the at least two sequences are at least about 60% identical, at least about 60% identical, at least about 60%, at least about 70%, at least about 80%, at least about 90%, at least about 95%, at least about 99%, or 100% identical. In some instances, the first sequence and the second sequence are each at least 10 nucleotides in length. In some instances, the first sequence and the second sequence are each at least about 10, at least about 15, at least about 20, at least about 30, at least about 50, or at least about 100 nucleotides in length. In some instances, the first sequence and the second sequence are on the same chromosome. In some instances, the first sequence is on a first chromosome and the second sequence is on a second chromosome. In some instances, the first sequence and the second sequence are in functional linkage. For example, all CpG sites in the promotor region of gene AOX1 show the same hypermethylation in prostate cancer, so these sites are in functional linkage because they functionally carry the same information but are located one or more nucleotides apart.

In some instances, devices, systems and kits disclosed herein comprise at least one of an oligonucleotide probe or oligonucleotide primer that is capable of annealing to a strand of a cell-free nucleic acid, wherein the cell-free nucleic acid comprises a sequence corresponding to a region of interest or a portion thereof. In some instances, the region of interest is a region of a Y chromosome. In some instances, the region of interest is a region of an X chromosome. In some instances, the region of interest is a region of an autosome. In some instances, the region of interest, or portion thereof, comprises a repeat sequence as described herein that is present in a genome more than once. In some instances, the region of interest is about 10 nucleotides to about 1,000,000 nucleotides in length. In some instances, the region of interest is at least 10 nucleotides in length. In some instances, the region of interest is at least 100 nucleotides in length. In some instances, the region is at least 1000 nucleotides in length. In some instances, the region of interest is about 10 nucleotides to about 500,000 nucleotides in length. In some instances, the region of interest is about 10 nucleotides to about 300,000 nucleotides in length. In some instances, the region of interest is about 100 nucleotides to about 1,000,000 nucleotides in length. In some instances, the region of interest is about 100 nucleotides to about 500,000 nucleotides in length. In some instances, the region of interest is about 100 nucleotides to about 300,000 base pairs in length. In some instances, the region of interest is about 1000 nucleotides to about 1,000,000 nucleotides in length. In some instances, the region of interest is about 1000 nucleotides to about 500,000 nucleotides in length. In some instances, the region of interest is about 1000 nucleotides to about 300,000 nucleotides in length. In some instances, the region of interest is about 10,000 nucleotides to about 1,000,000 nucleotides in length. In some instances, the region of interest is about 10,000 nucleotides to about 500,000 nucleotides in length. In some instances, the region of interest is about 10,000 nucleotides to about 300,000 nucleotides in length. In some instances, the region of interest is about 300,000 nucleotides in length.

In some instances, the sequence corresponding to the region of interest is at least about 5 nucleotides in length. In some instances, the sequence corresponding to the region of interest is at least about 8 nucleotides in length. In some instances, the sequence corresponding to the region of interest is at least about 10 nucleotides in length. In some instances, the sequence corresponding to the region of interest is at least about 15 nucleotides in length. In some instances, the sequence corresponding to the region of interest is at least about 20 nucleotides in length. In some instances, the sequence corresponding to the region of interest is at least about 50 nucleotides in length. In some instances, the sequence corresponding to the region of interest is at least about 100 nucleotides in length. In some instances, the sequence is about 5 nucleotides to about 1000 nucleotides in length. In some instances, the sequence is about 10 nucleotides to about 1000 nucleotides in length. In some instances, the sequence is about 10 nucleotides to about 500 nucleotides in length. In some instances, the sequence is about 10 nucleotides to about 400 nucleotides in length. In some instances, the sequence is about 10 nucleotides to about 300 nucleotides in length. In some instances, the sequence is about 50 nucleotides to about 1000 nucleotides in length. In some instances, the sequence is about 50 nucleotides to about 500 nucleotides in length. In some instances, the sub-region is about 50 to about 250 nucleotides in length. In some instances, the sub-region is about 50 to about 150 nucleotides in length. In some instances, the sub-region is about 100 nucleotides in length.

Any appropriate nucleic acid amplification method known in the art is contemplated for use in the devices and methods described herein, such as those disclosed herein (e.g., sequencing, isothermal amplification, polymerase chain reaction, high throughput versions of the same).

In some instances, devices, systems and kits disclosed herein comprise at least one oligonucleotide primer, wherein the oligonucleotide primer has a sequence complementary to or corresponding to a Y chromosome sequence. In some instances, devices, systems and kits disclosed herein comprise a pair of oligonucleotide primers, wherein the pair of oligonucleotide primers have sequences complementary to or corresponding to a Y chromosome sequence. In some instances, devices, systems and kits disclosed herein comprise at least one oligonucleotide primer, wherein the oligonucleotide primer comprises a sequence complementary to or corresponding to a Y chromosome sequence. In some instances, devices, systems and kits disclosed herein comprise a pair of oligonucleotide primers, wherein the pair of oligonucleotide primers comprise sequences complementary to or corresponding to a Y chromosome sequence. In some instances, devices, systems and kits disclosed herein comprise at least one oligonucleotide primer, wherein the oligonucleotide primer consists of a sequence complementary to or corresponding to a Y chromosome sequence. In some instances, devices, systems and kits disclosed herein comprise a pair of oligonucleotide primers, wherein the pair of oligonucleotide primers consists of sequences complementary to or corresponding to a Y chromosome sequence. In some instances, the sequence(s) complementary to or corresponding to a Y chromosome sequence is at least 75% homologous to a wild-type human Y chromosome sequence. In some instances, the sequence(s) complementary to or corresponding to a Y chromosome sequence is at least 80% homologous to a wild-type human Y chromosome sequence. In some instances, the sequence(s) complementary to or corresponding to a Y chromosome sequence is at least 85% homologous to a wild-type human Y chromosome sequence. In some instances, the sequence(s) complementary to or corresponding to a Y chromosome sequence is at least 80% homologous to a wild-type human Y chromosome sequence. In some instances, the sequence(s) complementary to or corresponding to a Y chromosome sequence is at least 90% homologous to a wild-type human Y chromosome sequence. In some instances, the sequence(s) complementary to or corresponding to a Y chromosome sequence is at least 95% homologous to a wild-type human Y chromosome sequence. In some instances, the sequence(s) complementary to or corresponding to a Y chromosome sequence is at least 97% homologous to a wild-type human Y chromosome sequence. In some instances, the sequence(s) complementary to or corresponding to a Y chromosome sequence is 100% homologous to a wild-type human Y chromosome sequence.

Nucleic acid detector: In some instances, devices, systems and kits disclosed herein comprise a nucleic acid detector. In some instances, the nucleic acid detector comprises a nucleic acid sequencer. In some instances, devices, systems and kits disclosed herein are configured to amplify nucleic acids and sequence the resulting amplified nucleic acids. In some instances, devices, systems and kits disclosed herein are configured to sequence nucleic acids without amplifying nucleic acids. In some instances, devices, systems and kits disclosed herein comprise a nucleic acid sequencer, but do In some instances, devices, systems and kits disclosed herein comprise at least one of an oligonucleotide probe and oligonucleotide primer that is capable of annealing to a strand of a cell-free nucleic acid, wherein the cell-free nucleic acid comprises a sequence corresponding to a sub-region of interest disclosed herein. In some instances, the sub-region is represented by a sequence that is present in the region of interest more than once. In some instances, the sub-region is about 10 to about 1000 nucleotides in length. In some instances, the sub-region is about 50 to about 500 nucleotides in length. In some instances, the sub-region is not comprise a nucleic acid amplifying reagent or nucleic acid amplifying component. In some instances, the nucleic acid sequencer comprises a signal detector that detects a signal that reflects successful amplification or unsuccessful amplification. In some instances, the nucleic acid sequencer is the signal detector. In some instances, the signal detector comprises the nucleic acid sequencer.

In some instances, the nucleic acid sequencer has a communication connection with an electronic device that analyzes sequencing reads from the nucleic acid sequencer. In some instances the communication connection is hard wired. In some instances the communication connection is wireless. For example, a mobile device app or computer software, such as those disclosed herein, may receive the sequencing reads, and based on the sequencing reads, display or report genetic information about the sample (e.g., presence of a disease/infection, response to a drug, genetic abnormality or mutation of a fetus).

In some instances, the nucleic acid sequencer comprises high throughput sequencer. Non-limiting examples of high throughput sequencers include a single-molecule real-time sequencer, an ion semiconductor sequencer, a sequencing-by-synthesis sequencer, a combinatorial probe anchor synthesis sequencer, a sequencing by ligation (e.g. SOLiD) sequencer, a nanopore sequencer, and a chain termination sequencer.

In some instances, the nucleic acid sequencer comprises a nanopore sequencer. In some instances, the nanopore sequencer comprises a nanopore. In some instances, the nanopore sequencer comprises a membrane and solutions that create a current across the membrane and drive movement of charged molecules (e.g., nucleic acids) through the nanopore. In some instances, the nanopore sequencer comprises a transmembrane protein, a portion thereof, or a modification thereof. In some instances, the transmembrane protein is a bacterial protein. In some instances, the transmembrane protein is not a bacterial protein. In some instances, the nanopore is synthetic. In some instances, the nanopore performs solid state nanopore sequencing. In some instances, the nanopore sequencer is described as pocket-sized, portable, or roughly the size of a cell phone. In some instances, the nanopore sequencer is configured to sequence at least one of RNA and DNA. Non-limiting examples of nanopore sequencing devices include Oxford Nanopore Technologies MinION and SmidgION nanopore sequencing USB devices. Both of these devices are small enough to be handheld. Nanopore sequencing devices and components are further described in reviews by Howorka (Nat Nanotechnol. 2017 Jul. 6; 12(7):619-630), and Garrido-Cardenas et al. (Sensors (Basel). 2017 Mar. 14; 17(3)), both incorporated herein by reference. Other non-limiting examples of nanopore sequencing devices are offered by Electronic Biosciences, Two Pore Guys, Stratos, and Agilent (technology originally from Genia).

In some instances, the nucleic acid detector comprises reagents and components required for bisulfite sequencing to detect epigenetic modifications. For instance, a long region with many methylation markers can be fragmented. Here, each fragment carrying a methylation marker can be an independent signal. Signals from all the fragments are sufficient in combination to obtain useful genetic information.

In some instances, the nucleic acid detector does not comprise a nucleic acid sequencer. In some instances, the nucleic acid detector is configured to count tagged nucleic acids, wherein the nucleic acid detector quantifies a collective signal from one or more tags.

Capture and detection: In some instances, devices, systems and kits disclosed herein comprise at least one of a nucleic acid detector, capture component, signal detector, a detection reagent, or a combination thereof, for detecting a nucleic acid in the biological sample. In some instances, the capture component and the signal detector are integrated. In some instances, the capture component comprises a solid support. In some instances the solid support comprises a bead, a chip, a strip, a membrane, a matrix, a column, a plate, or a combination thereof.

In some instances, devices, systems and kits disclosed herein comprise at least one probe for an epigenetically modified region of a chromosome or fragment thereof. In some instances, the epigenetic modification of the epigenetically modified region of a chromosome is indicative of gender or a marker of gender. In some instances, devices, systems and kits disclosed herein comprise at least one probe for a paternally inherited sequence that is not present in the maternal DNA. In some instances, devices, systems and kits disclosed herein comprise at least one probe for a paternally inherited single nucleotide polymorphism. In some instances, the chromosome is a Y chromosome. In some instances, the chromosome is an X chromosome. In some instances, the chromosome is a Y chromosome. In some instances, the chromosome is an autosome. In some instances, the probe comprises a peptide, an antibody, an antigen binding antibody fragment, a nucleic acid or a small molecule.

In some instances, devices, systems and kits comprise a sample purifier disclosed herein and a capture component disclosed herein. In some instances, the sample purifier comprises the capture component. In some instances, the sample purifier and the capture component are integrated. In some instances, the sample purifier and the capture component are separate.

In some instances, the capture component comprises a binding moiety described herein. In some instances, the binding moiety is present in a lateral flow assay. In some instances, the binding moiety is added to the sample before the sample is added to the lateral flow assay. In some instances, the binding moiety comprises a signaling molecule. In some instances, the binding moiety is physically associated with a signaling molecule. In some instances, the binding moiety is capable of physically associating with a signaling molecule. In some instances, the binding moiety is connected to a signaling molecule. Non-limiting examples of signaling molecules include a gold particle, a fluorescent particle, a luminescent particle, and a dye molecule. In some instances the capture component comprises a binding moiety that is capable of interacting with an amplification product described herein. In some instances the capture component comprises a binding moiety that is capable of interacting with a tag on an amplification product described herein.

In some instances, devices, systems and kits disclosed herein comprise a detection system. In some instances, the detection system comprises a signal detector. Non-limiting examples of a signal detector include a fluorescence reader, a colorimeter, a sensor, a wire, a circuit, a receiver. In some instances, the detection system comprises a detection reagent. Non-limiting examples of a detection reagent include a fluorophore, a chemical, a nanoparticle, an antibody, and a nucleic acid probe. In some instances, the detection system comprises a pH sensor and a complementary metal-oxide semiconductor, which can be used to detect changes in pH. In some instances, production of an amplification product by devices, systems, kits or methods disclosed herein changes the pH, thereby indicating genetic information.

In some instances, the detection system comprises a signal detector. In some instances, the signal detector is a photodetector that detects photons. In some instances, the signal detector detects fluorescence. In some instances, the signal detector detects a chemical or compound. In some instances, the signal detector detects a chemical that is released when the amplification product is produced. In some instances, the signal detector detects a chemical that is released when the amplification product is added to the detection system. In some instances, the signal detector detects a compound that is produced when the amplification product is produced. In some instances, the signal detector detects a compound that is produced when the amplification product is added to the detection system.

In some instances, the signal detector detects an electrical signal. In some instances, the signal detector comprises an electrode. In some instances, the signal detector comprises a circuit a current, or a current generator. In some instances, the circuit or current is provided by a gradient of two or more solutions or polymers. In some instances, the circuit or current is provided by an energy source (e.g., battery, cell phone, wire from electrical outlet). In some instances, nucleic acids, amplification products, chemicals or compounds disclosed herein provide an electrical signal by disrupting the current and the signal detector detects the electrical signal.

In some instances, the signal detector detects light. In some instances, the signal detector comprises a light sensor. In some instances, the signal detector comprises a camera. In some instances, the signal detector comprises a cell phone camera or a component thereof.

In some instances, the signal detector comprises a nanowire that detects the charge of different bases in nucleic acids. In some instances, the nanowire has a diameter of about 1 nm to about 99 nm. In some instances, the nanowire has a diameter of about 1 nm to about 999 nm. In some instances, the nanowire comprises an inorganic molecule, e.g., nickel, platinum, silicon, gold, zinc, graphene, or titanium. In some instances, the nanowire comprises an organic molecule (e.g., a nucleotide).

In some instances, the devices, systems and kits disclosed herein comprise a detector, wherein the detector comprises a graphene biosensor. Graphene biosensors are described, e.g., by Afsahi et al., in the article entitled, "Novel graphene-based biosensor for early detection of Zika virus infection, Biosensor and Bioelectronics," (2018) 100:85-88.

In some instances, a detector disclosed herein comprises a nanopore, a nanosensor, or a nanoswitch. For instance, the detector may be capable of nanopore sequencing, a method of transporting a nucleic acid through a nanpore based on an electric current across a membrane, the detector measuring disruptions in the current corresponding to specific nucleotides. A nanoswitch or nanosensor undergoes a structural change upon exposure to the detectable signal. See, e.g., Koussa et al., "DNA nanoswitches: A quantitative platform for gel-based biomolecular interaction analysis," (2015) Nature Methods, 12(2): 123-126.

In some instances, the detector comprises a rapid multiplex biomarker assay where probes for an analyte of interest are produced on a chip that is used for real-time detection. Thus, there is no need for a tag, label or reporter. Binding of analytes to these probes causes a change in a refractive index that corresponds to a concentration of the analyte. All steps may be automated. Incubations may be not be necessary. Results may be available in less than an hour (e.g., 10-30 minutes). A non-limiting example of such a detector is the Genalyte Maverick Detection System.

Additional tests: In some instances, devices, systems and kits disclosed herein comprise additional features, reagents, tests or assays for detection or analysis of biological components besides nucleic acids. By way of non-limiting example, the biological component may be selected from a peptide, a lipid, a fatty acid, a sterol, a carbohydrate, a viral component, a microbial component, and a combination thereof. The biological component may be an antibody. The biological component may be an antibody produced in response to a peptide in the subject. These additional assays may be capable of detecting or analyzing biological components in the small volumes or sample sizes disclosed herein and throughout. An additional test may comprise a reagent capable of interacting with a biological component of interest. Non-limiting examples of such reagents include antibodies, peptides, oligonucleotides, aptamers, and small molecules, and combinations thereof. The reagent may comprise a detectable label. The reagent may be capable of interacting with a detectable label. The reagent may be capable of providing a detectable signal.

Additional tests may require one or more antibodies. For instance, the additional test may comprise reagents or components that provide for performing Immuno-PCR (IPCR). IPCR is a method wherein a first antibody for a protein of interest is immobilized and exposed to a sample. If the sample contains the protein of interest, it will be captured by the first antibody. The captured protein of interest is then exposed to a second antibody that binds the protein of interest. The second antibody has been coupled to a polynucleotide that can be detected by real-time PCR. Alternatively or additionally, the additional test may comprise reagents or components that provide for performing a proximity ligation assay (PLA), wherein the sample is exposed to two antibodies specific for a protein of interest, each antibody comprising an oligonucleotide. If both antibodies bind to the protein of interest, the oligonucleotides of each antibody will be close enough to be amplified and/or detected.

Performance parameters: In some instances, the devices, systems and kits disclosed herein are operable at one or more temperatures. In some instances, the temperature of a component or reagent of the device system, or kit needs to be altered in order for the device system, or kit to be operable. Generally, devices, systems and kits are considered "operable" when they are capable of providing information conveyed by biomarkers (e.g., RNA/DNA, peptides) in the biological sample. In some instances, temperature(s) at which the devices, systems, kits, components thereof, or reagents thereof are operable are obtained in a common household. By way of non-limiting example, temperature(s) obtained in a common household may be provided by room temperature, a refrigerator, a freezer, a microwave, a stove, an electric hot pot, hot/cold water bath, or an oven.

In some instances, devices, systems, kits, components thereof, or reagents thereof, as described herein, are operable at a single temperature. In some instances, devices, systems, kits, components thereof, or reagents thereof, as described herein, only require a single temperature to be operable. In some instances, devices, systems, kits, components thereof, or reagents thereof, as described herein, only require two temperatures to be operable. In some instances, devices, systems, kits, components thereof, or reagents thereof, as described herein, only require three temperatures to be operable.

In some instances, devices, systems, kits disclosed herein comprises a heating device or a cooling device to allow a user to obtain the at least one temperature. Non-limiting examples of heating devices and cooling devices are pouches or bag of material that can be cooled in a refrigerator or freezer, or microwaved or boiled on a stove top, or plugged into an electrical socket, and subsequently applied to devices disclosed herein or components thereof, thereby transmitting heat to the device or component thereof or cooling the device or component thereof. Another non-limiting example of a heating device is an electrical wire or coil that runs through the device or portion thereof. The electrical wire or coil may be activated by external (e.g. solar, outlet) or internal (e.g., battery, cell phone) power to convey heat to the device or portion thereof. In some instances, devices, systems, kits disclosed herein comprise a thermometer or temperature indicator to assist a user with assessing a temperature within the range of temperatures. Alternatively, or additionally, the user employs a device in a typical home setting (e.g., thermometer, cell phone, etc.) to assess the temperature.

In some instances, temperature at which the devices, systems, kits, components thereof, or reagents thereof are operable at a range of temperatures or at least one temperature that falls within a range of temperatures. In some instances, the range of temperatures is about −50° C. to about 100° C. In some instances, the range of temperatures is about −50° C. to about 90° C. In some instances, the range of temperatures is about −50° C. to about 80° C. In some instances, the range of temperatures is about is about −50° C. to about 70° C. In some instances, the range of temperatures is about −50° C. to about 60° C. In some instances, the range of temperatures is about −50° C. to about 50° C. In some instances, the range of temperatures is about −50° C. to about 40° C. In some instances, the range of temperatures is about −50° C. to about 30° C. In some instances, the range of temperatures is about −50° C. to about 20° C. In some instances, the range of temperatures is about −50° C. to about 10° C. In some instances, the range of temperatures is about 0° C. to about 100° C. In some instances, the range of temperatures is about 0° C. to about 90° C. In some instances, the range of temperatures is about 0° C. to about 80° C. In some instances, the range of temperatures is about 0° C. to about 70° C. In some instances, the range of temperatures is about 0° C. to about 60° C. In some instances, the range of temperatures is about 0° C. to about 50° C. In some instances, the range of temperatures is about 0° C. to about 40° C. In some instances, the range of temperatures is about 0° C. to about 30° C. In some instances, the range of temperatures is about 0° C. to about 20° C. In some instances, the range of temperatures is about 0° C. to about 10° C. In some instances, the range of temperatures is about 15° C. to about 100° C. In some instances, the range of temperatures is about 15° C. to about 90° C. In some instances, the range of temperatures is about 15° C. to about 80° C. In some instances, the range of temperatures is about is about 15° C. to about 70° C. In some instances, the range of temperatures is about 15° C. to about 60° ° C. In some instances, the range of temperatures is about 15° C. to about 50° C. In some instances, the range of temperatures is about 15° C. to about 40° C. In some instances, the range of temperatures is about 15° C. to about 30° C. In some instances, the range of temperatures is about 10° C. to about 30° C. In some instances, devices, systems, kits disclosed herein, including all components thereof, and all reagents thereof, are completely operable at room temperature, not requiring cooling, freezing or heating.

In some instances, devices, systems and kits disclosed herein detect components of the biological sample or products thereof (e.g., amplification products, conjugation products, binding products) within a time range of receiving the biological sample. In some instances, detecting occurs via a signaling molecule described herein. In some instances, the time range is about one second to about one minute. In some instances, the time range is about ten seconds to about one minute. In some instances, the time range is about ten seconds to about one minute. In some instances, the time range is about thirty seconds to about one minute. In some instances, the time range is about 10 seconds to about 2 minutes. In some instances, the time range is about 10 seconds to about 3 minutes. In some instances, the time range is about 10 seconds to about 5 minutes. In some instances, the time range is about 10 seconds to about 10 minutes. In some instances, the time range is about 10 seconds to about 15 minutes. In some instances, the time range is about 10 seconds to about 20 minutes. In some instances, the time range is about 30 seconds to about 2 minutes. In some instances, the time range is about 30 seconds to about 5 minutes. In some instances, the time range is about 30 seconds to about 10 minutes. In some instances, the time range is about 30 seconds to about 15 minutes. In some instances, the time range is about 30 seconds to about 20 minutes. In some instances, the time range is about 30 seconds to about 30 minutes. In some instances, the time range is about 1 minute to about 2 minutes. In some instances, the time range is about 1 minute to about 3 minutes. In some instances, the time range is about 1 minute to about 5 minutes. In some instances, the time range is about 1 minute to about 10 minutes. In some instances, the time range is about 1 minute to about 20 minutes. In some instances, the time range is about 1 minute to about 30 minutes. In some instances, the time range is about 5 minutes to about 10 minutes. In some instances, the time range is about 5 minutes to about 15 minutes. In some instances, the time range is about 5 minutes to about 20 minutes. In some instances, the time range is about 5 minutes to about 30 minutes. In some instances, the time range is about 5 minutes to about 60 minutes. In some instances, the time range is about 30 minutes to about 60 minutes. In some instances, the time range is about 30 minutes to about 2 hours. In some instances, the time range is about 1 hour to about 2 hours. In some instances, the time range is about 1 hour to about 4 hours.

In some instances, devices, systems and kits disclosed herein detect a component of the biological sample or a product thereof (e.g., amplification product, conjugation product, binding product) in less than a given amount of time. In some instances, devices, systems and kits disclosed herein provide an analysis of a component of a biological sample or product thereof in less than a given amount of time. In some instances, the amount of time is less than 1 minute. In some instances, the amount of time is less than 5 minutes. In some instances, the amount of time is less than 10 minutes. In some instances, the amount of time is 15 minutes. In some instances, the amount of time is less than 20 minutes. In some instances, the amount of time is less than 30 minutes. In some instances, the amount of time is less than 60 minutes. In some instances, the amount of time is less than 2 hours. In some instances, the amount of time is less than 8 hours.

Processors and computer systems: One or more processors may be employed to implement the machine learning-based methods disclosed herein. The one or more processors may comprise a hardware processor such as a central processing unit (CPU), a graphic processing unit (GPU), a general-purpose processing unit, or computing platform. The one or more processors may be comprised of any of a variety of suitable integrated circuits (e.g., application specific integrated circuits (ASICs) designed specifically for implementing deep learning network architectures, or field-programmable gate arrays (FPGAs) to accelerate compute time, etc., and/or to facilitate deployment), microprocessors, emerging next-generation microprocessor designs (e.g., memristor-based processors), logic devices and the like. Although the disclosure is described with reference to a processor, other types of integrated circuits and logic devices may also be applicable. The processor may have any suitable data operation capability. For example, the processor may perform 512 bit, 256 bit, 128 bit, 64 bit, 32 bit, or 16 bit data operations. The one or more processors may be single core or multi core processors, or a plurality of processors configured for parallel processing.

The one or more processors or computers used to implement the disclosed diagnostic test methods may be part of a larger computer system and/or may be operatively coupled to a computer network (a "network") with the aid of a communication interface to facilitate transmission of and sharing of training data and test results. The network may be a local area network, an intranet and/or extranet, an intranet and/or extranet that is in communication with the Internet, or the Internet. The network in some cases is a telecommunication and/or data network. The network may include one or more computer servers, which in some cases enables distributed computing, such as cloud computing. The network, in some cases with the aid of the computer system, may implement a peer-to-peer network, which may enable devices coupled to the computer system to behave as a client or a server.

The computer system may also include memory or memory locations (e.g., random-access memory, read-only memory, flash memory, Intel® Optane™ technology), electronic storage units (e.g., hard disks), communication interfaces (e.g., network adapters) for communicating with one or more other systems, and peripheral devices, such as cache, other memory, data storage and/or electronic display adapters. The memory, storage units, interfaces and peripheral devices may be in communication with the one or more processors, e.g., a CPU, through a communication bus, e.g., as is found on a motherboard. The storage unit(s) may be data storage unit(s) (or data repositories) for storing data.

The one or more processors, e.g., a CPU, execute a sequence of machine-readable instructions, which are embodied in a program (or software). The instructions are stored in a memory location. The instructions are directed to the CPU, which subsequently program or otherwise configure the CPU to implement the methods of the present disclosure. Examples of operations performed by the CPU include fetch, decode, execute, and write back. The CPU may be part of a circuit, such as an integrated circuit. One or more other components of the system may be included in the circuit. In some cases, the circuit is an application specific integrated circuit (ASIC).

The storage unit stores files, such as drivers, libraries and saved programs. The storage unit stores user data, e.g., user-specified preferences and user-specified programs. The computer system in some cases may include one or more additional data storage units that are external to the computer system, such as located on a remote server that is in communication with the computer system through an intranet or the Internet.

Some aspects of the methods and systems provided herein, such as the disclosed methods for nucleic acid sequencing-based diagnostic testing, are implemented by way of machine (e.g., processor) executable code stored in an electronic storage location of the computer system, such as, for example, in the memory or electronic storage unit. The machine executable or machine readable code is provided in the form of software. During use, the code is executed by the one or more processors. In some cases, the code is retrieved from the storage unit and stored in the memory for ready access by the one or more processors. In some situations, the electronic storage unit is precluded, and machine-executable instructions are stored in memory. The code may be pre-compiled and configured for use with a machine having one or more processors adapted to execute the code, or may be compiled at run time. The code may be supplied in a programming language that is selected to enable the code to execute in a pre-compiled or as-compiled fashion.

Various aspects of the technology may be thought of as "products" or "articles of manufacture", e.g., "computer program or software products", typically in the form of machine (or processor) executable code and/or associated data that is stored in a type of machine readable medium, where the executable code comprises a plurality of instructions for controlling a computer or computer system in performing one or more of the methods disclosed herein. Machine-executable code may be stored in an optical storage unit comprising an optically readable medium such as an optical disc, CD-ROM, DVD, or Blu-Ray disc. Machine-executable code may be stored in an electronic storage unit, such as memory (e.g., read-only memory, random-access memory, flash memory) or on a hard disk. "Storage" type media include any or all of the tangible memory of the computers, processors or the like, or associated modules thereof, such as various semiconductor memory chips, optical drives, tape drives, disk drives and the like, which may provide non-transitory storage at any time for the software that encodes the methods and algorithms disclosed herein.

All or a portion of the software code may at times be communicated via the Internet or various other telecommunication networks. Such communications, for example, enable loading of the software from one computer or processor into another, for example, from a management server or host computer into the computer platform of an application server. Thus, other types of media that are used to convey the software encoded instructions include optical, electrical and electromagnetic waves, such as those used across physical interfaces between local devices, through wired and optical landline networks, and over various atmospheric links. The physical elements that carry such waves, such as wired or wireless links, optical links, or the like, are also considered media that convey the software encoded instructions for performing the methods disclosed herein. As used herein, unless restricted to non-transitory, tangible "storage" media, terms such as computer or machine "readable medium" refer to any medium that participates in providing instructions to a processor for execution.

The computer system typically includes, or may be in communication with, an electronic display for providing, for example, images captured by a machine vision system. The display is typically also capable of providing a user interface (UI). Examples of UI's include but are not limited to graphical user interfaces (GUIs), web-based user interfaces, and the like.

Applications for machine learning-based diagnostic screening & testing procedures: The machine learning-based diagnostic methods disclosed herein may be applied to the detection of a variety of genomic conditions and abnormalities. Examples include, but are not limited to, screening for and diagnosis of cancer, autoimmune disease, neurodegenerative disease, etc., as well as the monitoring of transplant rejection or the monitoring of therapeutic responses, through the analysis of any type of nucleic acid including, but not limited to, DNA, genomic DNA, cell-free DNA, circulating tumor DNA, cDNA, RNA, mRNA, cell-free RNA, circulating tumor RNA, exosomal RNA, etc., or markers contained therein, e.g., structural mutations or epigenetic/epigenomic changes such as cytosine methylation.

In some embodiments of the disclosed methods, machine learning algorithms may be applied to the analysis of nucleic acid sequencing data to detect a normal representation, over-representation, or under-representation of a subset of sequencing reads that correlate with one state versus another, for example, a normal genomic condition versus a genomic abnormality within a given population of subjects, where there is no requirement for alignment of the sequencing reads to a reference sequence, and no requirement for determining a normal representation, over-representation, or under-representation of a subset of sequencing reads with respect to a specific target chromosome.

In some instances, the methods disclosed herein comprise determining that there is an aneuploidy of at least one target chromosome in the sample. In some instances, the methods disclosed herein comprise determining that there is a fetal aneuploidy of at least one target chromosome in a sample collected from a pregnant female. In some instances, the methods disclosed herein comprise determining that there is a fetal aneuploidy of the at least one target chromosome when a quantity of sequencing reads is detected in a sample disclosed herein. In some instances, the quantity of sequencing reads corresponds to sequences from a chromosome or chromosome region that is known to present aneuploidy in the human population, as described herein.

In some instances, the methods disclosed herein comprise determining that there is an aneuploidy of at least one target chromosome when a ratio of sequencing reads corresponding to the at least one target chromosome to sequencing reads corresponding to at least one non-target chromosome is different from a respective ratio in a control biological sample from a control euploid subject. In some instances, the methods disclosed herein comprise determining that there is a fetal aneuploidy of at least one target chromosome when a ratio of sequencing reads corresponding to the at least one target chromosome to sequencing reads corresponding to at least one non-target chromosome is different from a respective ratio in a control biological sample from a control pregnant subject with a euploid fetus. In some instances, methods disclosed herein comprise determining that there is a fetal aneuploidy of the at least one target chromosome because a ratio of sequencing reads corresponding to the at least one target chromosome to sequencing reads corresponding to the at least one non-target chromosome is different from a respective ratio in a control biological sample from a control pregnant subject with a euploid fetus. In some instances, the methods disclosed herein comprise determining that there is not an aneuploidy or fetal aneuploidy of the at least one target chromosome because a ratio of sequencing reads corresponding to at least one target chromosome to sequencing reads corresponding to at least one non-target chromosome is not different from a respective ratio in a control biological sample from a control euploid subject or a control pregnant subject with a euploid fetus.

In some instances, the sequencing reads corresponding to the at least one target chromosome comprises sequencing reads corresponding to a chromosome region of the at least one target chromosome. In some instances, the sequencing reads corresponding to the at least one non-target chromosome comprises sequencing reads corresponding to a chromosome region of the non-target chromosome. In some instances, the chromosome region may range from about 10 base pairs in length to about 500,000 base pairs in length. In some instances, the chromosome region may be at least 10 base pairs in length, at least 50 base pairs in length, at least 100 base pairs in length, at least 1,000 base pairs in length, at least 50,000 base pairs in length, at least 100,000 base pairs in length, at least 200,000 base pairs in length, at least 300,000 base pairs in length, at least 400,000 base pairs in length, or at least 500,000 base pairs in length. In some instances, the chromosomal region may be at most 500,000 base pairs in length, at most 400,000 base pairs in length, at most 300,000 base pairs in length, at most 200,000 base pairs in length, at most 100,000 base pairs in length, at most 50,000 base pairs in length, at most 1,000 base pairs in length, at most 100 base pairs in length, at most 50 base pairs in length, or at most 10 base pairs in length. Any of the lower and upper values described in this paragraph may be combined to form a range included within the present disclosure, for example, the chromosomal region may range from about 50 base pairs to about 400,000 base pairs in length. Those of skill in the art will recognize that the length of the chromosomal region may have any value within this range, e.g., about 265,000 base pairs.

In some instances, the at least one target chromosome, or chromosomal region(s) derived therefrom, is at least one of chromosome 4, chromosome 5, chromosome 7, chromosome 9, chromosome 11, chromosome 13, chromosome 16, chromosome 18, chromosome 21, chromosome 22, chromosome X, or chromosome Y. in some instances, the at least one target chromosome, or chromosomal region(s) derived therefrom, may comprise any combination of chromosome 4, chromosome 5, chromosome 7, chromosome 9, chromosome 11, chromosome 13, chromosome 16, chromosome 18, chromosome 21, chromosome 22, chromosome X, or chromosome Y. In some instances, the at least one target chromosome is at least one of chromosome 13, chromosome 18, and chromosome 21. In some instances, the at least one target chromosome is at least one of chromosome 13, chromosome 18, chromosome 21, and chromosome X. In some instances, the at least one target chromosome is at least one of chromosome 13, chromosome 18, chromosome 21, and chromosome Y. In some instances, the at least one target chromosome is at least one of chromosome 13, chromosome 18, chromosome 21, chromosome X, and chromosome Y. In some instances, the at least one target chromosome is chromosome 13. In some instances, the at least one target chromosome is chromosome 16. In some instances, the at least one target chromosome is chromosome 18. In some instances, the at least one target chromosome is chromosome 21. In some instances, the target chromosome is chromosome 22. In some instances, the at least one target chromosome is a sex chromosome. In some instances, the at least one target chromosome is chromosome X. In some instances, the at least one target chromosome is chromosome Y. In some instances, the at least one target chromosome may be any chromosome, or portion thereof, known to be correlated with a known microdeletion or microduplication syndrome. Non-limiting examples of the latter are listed in A. Weise, et al., "Microdeletion and Microduplication Syndromes", J. Histochem Cytochem, 2012 May; 60(5): 346-

358, and in the Decipher database (https://decipher.sanger.ac.uk/syndromes#syndromes/overview).

In some instances, the at least one non-target chromosome is at least one of a chromosome other than chromosome 13, chromosome 16, chromosome 18, chromosome 21, chromosome 22, chromosome X, or chromosome Y. In some instances, the at least one non-target chromosome is not chromosome13, chromosome 16, chromosome 18, chromosome 21, chromosome 22, chromosome X, or chromosome Y. In some instances, the at least one non-target chromosome is selected from chromosome 1, chromosome 2, chromosome 3, chromosome 4, chromosome 5, chromosome 6, chromosome 7, chromosome 8, chromosome 9, chromosome 10, chromosome 11, chromosome 12, chromosome 14, chromosome 15, chromosome 17, chromosome 19, and chromosome 20. In some instances, the non-target chromosome is chromosome 1. In some instances, the at least one non-target chromosome is chromosome 2. In some instances, the at least one non-target chromosome is chromosome 3. In some instances, the non-target chromosome is chromosome 4. In some instances, the at least one non-target chromosome is chromosome 5. In some instances, the at least one non-target chromosome is chromosome 6. In some instances, the at least one non-target chromosome is chromosome 7. In some instances, the at least one non-target chromosome is chromosome 8. In some instances, the at least one non-target chromosome is chromosome 9. In some instances, the at least one non-target chromosome is chromosome 10. In some instances, the at least one non-target chromosome is chromosome 11. In some instances, the at least one non-target chromosome is chromosome 12. In some instances, the at least one non-target chromosome is chromosome 14. In some instances, the at least one non-target chromosome is chromosome 15. In some instances, the at least one non-target chromosome is chromosome 17. In some instances, the at least one non-target chromosome is chromosome 19. In some instances, the at least one non-target chromosome is chromosome 20.

In some instances, the at least one target chromosome is chromosome 13, and the at least one non-target chromosome is a chromosome other than chromosome 13. In some instances, the at least one target chromosome is chromosome 16, and the at least one non-target chromosome is a chromosome other than chromosome 16. In some instances, the at least one target chromosome is chromosome 18, and the at least one non-target chromosome is a chromosome other than chromosome 18. In some instances, the at least one target chromosome is chromosome 21, and the at least one non-target chromosome is a chromosome other than chromosome 21. In some instances, the at least one target chromosome is chromosome 22, and the at least one non-target chromosome is a chromosome other than chromosome 22. In some instances, the at least one target chromosome is chromosome X, and the at least one non-target chromosome is a chromosome other than chromosome X. In some instances, the at least one target chromosome is chromosome Y, and the at least one non-target chromosome is a chromosome other than chromosome Y.

In some instances, methods disclosed herein comprise determining that the subject, or the fetus of the pregnant subject, has a chromosomal abnormality. In some instances, the chromsomal abnormality is due to insertion of at least one nucleotide in a target chromosomal region. In some instances, the chromosomal abnormality is due to deletion of at least one nucleotide in a target chromosomal region. In some instances, the chromosomal abnormality is due to translocation of nucleotide between a first target chromosomal region and a second chromosomal target region. Generally, the first target chromosomal region and a second chromosomal target region are located on different chromosomes.

In some instances, the target chromosomal region is defined by a minimal length. In some instances, the minimal length of the target chromosomal region is at least about 10 base pairs, at least about 50 base pairs, at least about 100 base pairs, at least about 200 base pairs, at least about 300 base pairs, at least about 400 base pairs, at least about 500 base pairs, at least about 600 base pairs, at least about 700 base pairs, at least about 800 base pairs, at least about 900 base pairs, or at least about 1,000 base pairs in length.

In some instances, the target chromosomal region is defined by a maximum length. In some instances, the target chromosomal region is as long as about 100,000 base pairs. In some instances, the target chromosomal region is as long as about 500,000 base pairs. In some instances, the target chromosomal region is as long as about 1,000,000 base pairs. In some instances, the target chromosomal region is as long as about 10,000,000 base pairs. In some instances, the target chromosomal region is as long as about 100,000,000 base pairs. In some instances, the target chromosomal region is as long as about 200,000,000 base pairs.

In some instances, the chromosomal abnormality is a copy number variation. In some instances, the copy number variation comprises a deletion of a genomic region or a portion thereof on at least one chromosome. In some instances, the copy number variation comprises a duplication of a genomic region or a portion thereof on at least one chromosome. In some instances, the copy number variation comprises a triplication of a genomic region or a portion thereof on at least one chromosome. In some instances, the copy number variation comprises more than three copies of a genomic region or a portion thereof. In some instances, the copy number variation comprises a deletion of a non-protein coding sequence on at least one chromosome. In some instances, the copy number variation comprises a duplication of a non-protein coding sequence on at least one chromosome. In some instances, the copy number variation comprises a triplication of a non-coding region on at least one chromosome. In some instances, the copy number variation comprises more than three copies of a non-coding region on at least one chromosome.

In some instances, the chromosomal abnormality results in at least about 0.001% of a chromosomal arm being duplicated. In some instances, the chromosomal abnormality results in at least about 0.01% of a chromosomal arm being duplicated. In some instances, the chromosomal abnormality results in at least about 0.1% of a chromosomal arm being duplicated. In some instances, the chromosomal abnormality results in at least about 1% of a chromosomal arm being duplicated. In some instances, the chromosomal abnormality results in at least about 10% of a chromosomal arm being duplicated. In some instances, at least about 20% of a chromosomal arm is duplicated. In some instances, at least about 30% of a chromosomal arm is duplicated. In some instances, at least about 50% of a chromosomal arm is duplicated. In some instances, at least about 70% of a chromosomal arm is duplicated. In some instances, at least about 90% of a chromosomal arm is duplicated. In some instances, an entire chromosomal arm is duplicated.

In some instances, the chromosomal abnormality results in at least about 0.001% of a chromosomal arm being deleted. In some instances, the chromosomal abnormality results in at least about 0.01% of a chromosomal arm being deleted. In some instances, the chromosomal abnormality results in at least about 0.1% of a chromosomal arm being deleted. In some instances, the chromosomal abnormality results in at least about 1% of a chromosomal arm being deleted. In some instances, the chromosomal abnormality results in at least about 10% of a chromosomal arm being deleted. In some instances, at least about 20% of a chromosomal arm is deleted. In some instances, at least about 30% of a chromosomal arm is deleted. In some instances, at least about 50% of a chromosomal arm is deleted. In some instances, at least about 70% of a chromosomal arm is deleted. In some instances, at least about 90% of a chromosomal arm is deleted. In some instances, an entire chromosomal arm is deleted.

In some instances, the disclosed methods comprise determining that the subject, or the fetus of a pregnant female subject, has a genomic abnormality when a quantity of sequencing reads corresponding to the target chromosomal region are detected, wherein the quantity is indicative of the genomic abnormality.

In some instances, the methods disclosed herein comprise sequencing nucleic acids. In some instances, the nucleic acids are cell free nucleic acids. In some instances, the nucleic acids comprise cell-free fetal nucleic acids. In some instances, the nucleic acids are cell-free fetal nucleic acids. In some instances methods disclosed herein comprise sequencing said nucleic acids to produce a number or range of sequencing reads per sample. In some instances, the number of sequencing reads generated per sample may range from about 1,000 to about 10,000,000. In some instances, the number of sequencing reads generated per sample may be at least 1,000, at least 10,000, at least 100,000, at least 500,000, at least 1,000,000, at least 5,000,000, or at least 10,000,000. In some instances, the number of sequencing reads generated per sample may be at most 10,000,000, at most 5,000,000, at most 1,000,000, at most 500,000, at most 100,000, at most 10,000, or at most 1,000. Any of the lower and upper values described in this paragraph may be combined to form a range included within the present disclosure, for example, the number of sequencing reads generated per sample may range from about 10,000 to about 500,000. Those of skill in the art will recognize that the number of sequencing reads generated per sample may have any value within this range, e.g., about 245,000 sequencing reads.

In some instances, methods comprise determining that the subject, or the fetus of a pregnant female subject, has a genomic abnormality when a ratio of (1) sequencing reads corresponding to the target chromosomal region to (2) sequencing reads corresponding to the at least one non-target chromosomal region is different from a respective ratio in a control biological sample from a control subject or a control pregnant female subject with a fetus not having the genomic abnormality. In some instances, methods comprise determining that the subject, or the fetus of a pregnant female subject, has a genomic abnormality because a ratio of (1) sequencing reads corresponding to the target chromosomal region to (2) sequencing reads corresponding to the at least one non-target chromosomal region is different from a respective ratio in a control biological sample from a control subject or a control pregnant female subject with a fetus not having the genomic abnormality. In some instances, the methods comprise determining that the subject, or the fetus of a pregnant female subject, does not have a genomic abnormality when a ratio of (1) sequencing reads corresponding to the target chromosomal region to (2) sequencing reads corresponding to the at least one non-target chromosomal region is not different from a respective ratio in a control biological sample from a control subject or a control pregnant female subject with a fetus not having the genomic abnormality. In some instances the chromosomal region and the non-target chromosomal region are on the same chromosome. In some instances the chromosomal region and the non-target chromosomal region are on different chromosomes. In some instances, the disclosed methods comprise determining that the subject, or the fetus of a pregnant subject, has a genomic abnormality without referring to a specific target chromosome.

In some instances, subject aneuploidy or genomic abnormality, e.g., fetal aneuploidy or genomic abnormality is determined with at least about 90% accuracy, at least about 95% accuracy, at least about 96% accuracy, at least about 97% accuracy, at least about 98% accuracy, at least about 99% accuracy, at least about 99.5% accuracy, at least about 99.9% accuracy, or at least about 99.99% accuracy.

Reads from each chromosome are roughly represented according to the length of the chromosome. Most reads are obtained from chromosome 1, while the fewest reads from an autosome will originate from chromosome 21. A common method for detecting a trisomic sample is to measure the percentage of reads originating from a chromosome in a population of euploid samples. Next a mean and a standard deviation for this set of chromosome percentage values are calculated. A cutoff value is determined by adding three standard deviations to the mean. If a new sample has a chromosome percentage value above the cutoff value, an overrepresentation of that chromosome can be assumed, which is often consistent with a trisomy of the chromosome.

In some instances, subject aneuploidy, e.g., fetal aneuploidy, is determined when the ratio of (1) sequencing reads corresponding to the at least one target chromosome to (2) sequencing reads corresponding to the at least one non-target chromosome differs from a respective ratio in a control biological sample from a control euploid subject or a control pregnant subject with a euploid fetus by at least about 0.1%. In some instances, the ratios differ by at least 1%.

In some instances, the control subject is a euploid subject. In some instances, the control pregnant subject is a euploid pregnant subject. In some instances the control is a mean or median value from a group of subjects, e.g., pregnant subjects. In some instances the control is a mean or median value from a pool of plasma samples from subjects, e.g., pregnant subjects. In some instances, the control is a similarly obtained value from an artificial mixture of nucleic acids mimicking a euploid subject or a pregnant subject with a euploid fetus. In some instances, the control subject or control pregnant subject is a euploid subject or a euploid pregnant subject carrying a fetus with a euploid chromosome set. In some instances, the control subject or the control pregnant subject does not have a genomic abnormality, e.g., copy number variation. In some instances, the fetus carried by the control pregnant subject does not have a genomic abnormality, e.g., copy number variation. In some instances, the control subject or control pregnant subject does not have a genomic abnormality in a target chromosome disclosed herein. In some instances, the fetus carried by the control pregnant subject does not have a genomic abnormality in a target chromosome disclosed herein. In some instances, at least one of the control subject or the control pregnant subject and her fetus has an aneuploidy. In some instances, at least one of the control subject or the control pregnant subject and her fetus has a genomic abnormality disclosed herein. In some instances, at least one of the control subject or the control pregnant subject and her fetus has a genomic abnormality in a target chromosome disclosed herein. In some instances, the methods disclosed herein comprise use of a respective ratio in a control biological sample from a control population, e.g., a control pregnant population. In some instances, the respective ratio is from a respective mean ratio in the control population, e.g., the control pregnant population. In some instances, the respective ratio is from a respective median ratio in the control population, e.g., the control pregnant population.

Paternity testing: In some instances of the disclosed methods, devices, systems, and kits, machine learning algorithms may be applied to the analysis of nucleic acid sequencing data to prenatal paternity testing. For example, disclosed herein are prenatal paternity testing methods comprising: (a) obtaining a biological sample from a subject pregnant with a fetus (in some instances, the biological sample comprises cell-free nucleic acids); (b) optionally tagging at least a portion of the cell-free nucleic acids to produce a library of optionally tagged cell-free nucleic acids; (c) optionally amplifying the optionally tagged cell-free nucleic acids; (d) sequencing at least a portion of the optionally tagged cell-free nucleic acids to generate sequencing reads; (e) receiving paternal genotype information from an individual suspected to be a paternal father of the fetus; and (f) comparing the paternal genotype information with an machine learning-based analysis of the cell-free nucleic acid sequencing reads to determine whether there is a genotypic match between the fetal component and paternal genotype. The use of a machine learning-based analysis of nucleic acid sequence data may allow, e.g., identification of unique sets of small copy number variation sequences that serve as unique identity markers for individuals. In some embodiments, the biological sample comprises blood, plasma, serum, urine, interstitial fluid, vaginal cells, vaginal fluid, cervical cells, buccal cells, or saliva. In some embodiments, the blood comprises capillary blood. In some embodiments, the capillary blood comprises not more than 1 milliliter of blood. In some embodiments, the capillary blood comprises not more than 100 microliters of blood. In some embodiments, the capillary blood comprises not more than 40 microliters of blood. In some embodiments, the methods further comprise pooling two or more biological samples, each sample obtained from a different subject. In some embodiments, the methods further comprise contacting the biological sample with a white blood cell stabilizer following obtaining the biological sample from the subject. In some embodiments, the biological sample obtained from the subject was collected by transdermal puncture. In some embodiments, the biological sample obtained from the subject was not collected by transdermal puncture. In some embodiments, the biological sample obtained from the subject was collected using a device configured to lyse intercellular junctions of an epidermis of the subject. In some embodiments, the biological sample obtained from the subject was collected by a process of: (a) inducing a first transdermal puncture to produce a first fraction of a biological sample; (b) discarding the first fraction of the biological sample; and (c) collecting a second fraction of the biological sample, thereby reducing or eliminating contamination of the biological sample due to white blood cell lysis. In some embodiments, the tagging of (c) comprises: (a) generating ligation competent cell-free DNA by one or more steps comprising: (i) generating a blunt end of the cell-free DNA, In some embodiments, a 5' overhang or a 3' recessed end is removed using one or more polymerase and one or more exonuclease; (ii) dephosphorylating the blunt end of the cell-free DNA; (iii) contacting the cell-free DNA with a crowding reagent thereby enhancing a reaction between the one or more polymerases, one or more exonucleases, and the cell-free DNA; or (iv) repairing or remove DNA damage in the cell-free DNA using a ligase; and (b) ligating the ligation competent cell-free DNA to adaptor oligonucleotides by contacting the ligation competent cell-free DNA to adaptor oligonucleotides in the presence of a ligase, crowding reagent, and/or a small molecule enhancer. In some embodiments, the one or more polymerases comprises T4 DNA polymerase or DNA polymerase I. In some embodiments, the one or more exonucleases comprises T4 polynucleotide kinase or exonuclease III. In some embodiments, the ligase comprises T3 DNA ligase, T4 DNA ligase, T7 DNA ligase, Taq Ligase, Ampligase, *E. coli* Ligase, or Sso7-ligase fusion protein. In some embodiments, the crowding reagent comprises polyethylene glycol (PEG), glycogen, or dextran, or a combination thereof. In some embodiments, the small molecule enhancer comprises dimethyl sulfoxide (DMSO), polysorbate 20, formamide, or a diol, or a combination thereof. In some embodiments, ligating in (b) comprises blunt end ligating, or single nucleotide overhang ligating. In some embodiments, the adaptor oligonucleotides comprise Y shaped adaptors, hairpin adaptors, stem loop adaptors, degradable adaptors, blocked self-ligating adaptors, or barcoded adaptors, or a combination thereof. In some embodiments, the library in (c) is produced with an efficiency of at least 0.5. In some embodiments, the target cell-free nucleic acids are cell-free nucleic acids from a tumor. In some embodiments, the target cell-free nucleic acids are cell-free nucleic acids from a fetus. In some embodiments, the target cell-free nucleic acids are cell-free nucleic acids from a transplanted tissue or organ. In some embodiments, the target cell-free nucleic acids are genomic nucleic acids from one or more pathogens. In some embodiments, the pathogen comprises a bacterium or component thereof. In some embodiments, the pathogen comprises a virus or a component thereof. In some embodiments, the pathogen comprises a fungus or a component thereof. In some embodiments, the cell-free nucleic acids comprise one or more single nucleotide polymorphisms (SNPs), insertion or deletion (indel), or a combination thereof. In some embodiments, the massively multiplex amplification assay is isothermal amplification. In some embodiments, the massively multiplex amplification assay is polymerase chain reaction (mmPCR). In some embodiments, the biological sample comprises a cell type or tissue type in which fetal cell-free nucleic acids are present in low quantities as compared to peripheral blood.

Proliferative disease (cancer): In some instances, the disclosed methods, devices, systems comprising a machine learning-based analysis of nucleic acid sequencing data may be applied to the detection of various genetic or epigenetic markers indicative of proliferative diseases, e.g., cancer, from any of a variety of samples including liquid biopsy samples. In some instances, the genetic markers are those described herein (e.g., over representation or under representation of a target chromosome, or other chromosomal aberration). In some instances, the epigenetic markers are those described herein (e.g., DNA methylation, histone modifications, and the like). In the oncology field, liquid biopsy is a viable alternative to tissue-based biopsy methods in many cases. In particular, liquid biopsy is advantageous when the procedure is too costly, presents an unjustifiable risk to the patient, is inconvenient for the patient, or impractical as is the case in metastatic disease, neurological diseases and in monitoring settings, where there is no tissue to be biopsied.

In some embodiments, the disclosed methods (and devices and systems designed to implement the disclosed methods) may be useful for early cancer detection (screening), disease monitoring and characterization, determining a disease burden, and/or deriving a precision treatment regimen.

The disease or condition may comprise an abnormal cell growth or proliferation. The disease or condition may comprise leukemia. Non-limiting types of leukemia include acute lymphoblastic leukemia (ALL), chronic lymphocytic leukemia (CLL), acute myelogenous leukemia (AML), chronic myelogenous leukemia (CML), and hairy cell leukemia (HCL). The disease or condition may comprise a lymphoma. The lymphoma may be a non-Hodgkin's lymphoma (e.g., B cell lymphoma, diffuse large B-cell lymphoma, T cell lymphoma, Waldenstrom macroglobulinemia) or a Hodgkin's lymphoma. The disease or condition may comprise a cancer. The cancer may be breast cancer. The cancer may be lung cancer. The cancer may be esophageal cancer. The cancer may be pancreatic cancer. The cancer may be ovarian cancer. The cancer may be uterine cancer. The cancer may be cervical cancer. The cancer may be testicular cancer. The cancer may be prostate cancer. The cancer may be bladder cancer. The cancer may be colon cancer. The cancer may be a sarcoma. The cancer may be an adenocarcinoma. The cancer may be isolated, that is it has not spread to other tissues besides the organ or tissue where the cancer originated. The cancer may be metastatic. The cancer may have spread to neighboring tissues. The cancer may have spread to cells, tissues or organs in physical contact with the organ or tissue where the cancer originated. The cancer may have spread to cells, tissues or organs not in physical contact with the organ or tissue where the cancer originated. The cancer may be in an early stage, such as Stage 0 (abnormal cell with the potential to become cancer) or Stage 1 (small and confined to one tissue). The cancer may be intermediate, such as Stage 2 or Stage 3, grown into tissues and lymph nodes in physical contact with the tissue of the original tumor. The cancer may be advanced, such as Stage 4 or Stage 5, wherein the cancer has metastasized to tissues that are distant (e.g., not adjacent or in physical contact) to the tissue of the original tumor. In some instances, the cancer is not advanced. In some instances, the cancer is not metastatic. In some instances, the cancer is metastatic.

EXAMPLES

These examples are provided for illustrative purposes only and not to limit the scope of the claims provided herein.

Example 1—Trisomy Detection in Ultra-Low (~20 μl) Amounts of Maternal Blood

Trisomy detection relies on the accurate representation of genetic material originating on a chromosome compared to genetic material originating from other chromosomes. This ratio is compared to the distribution of ratios in the euploid population. A trisomy is called when the ratio of ((chr21/chr.all)-MEDIAN(chr21))/MAD(chr21) is statistically sufficiently different from that distribution.

While 10% fetal fraction is the median of a typical population at 9 weeks gestational age and above, not all samples will have fetal fraction levels as high as 10% and some might have even higher levels. A typical cutoff for fetal fraction is 4%. A model that takes the distribution of fetal fraction in a typical population into account and requires the more common cutoff values for specificity (99.9%) and sensitivity (99%) can help to illustrate the input requirements for this method. With around 5 million marker counts (sequence reads), this sensitivity can be accomplished. However, if one analyzes one marker per chromosome, this would require 30,000 cell equivalents, which is not feasible.

Methods and systems disclosed herein are based on the fact that each genome equivalent is essentially divided into 20 million cfDNA fragments through the process of apoptosis (3 billion base pairs per genome divided by 150 base pairs average size of cfDNA). The implication is that if every single molecule of cfDNA can be transferred from blood to sequencer, the equivalent of a quarter of a euploid genome is sufficient for analysis.

However, in reality every step in the process is impaired by various amounts of DNA loss. Therefore much higher amounts are being sampled and moved through the library generation and sequencing process. While DNA loss occurs at every step of the process, the highest loss typically appears at the step of library preparation. Traditional methods show losses of 80% to 90% of material. Often this loss is compensated by a subsequent amplification step (Universal PCR), to bring the concentration of DNA up to the necessary level required for next generation sequencing. While amplification is a good method to increase the overall nucleic acid material available for sequencing, under specific conditions the amplification cannot compensate for a loss of information that occurred during the prior steps. To understand the loss of information a simple thought experiment can help. Assume one starts with 1000 genome equivalents, which represents $20*10^9$ cfDNA fragments. If one assumes an enormous loss and only two fragments are available for amplification. One fragment from the reference region and one from the target region. Two fragments alone are not sufficient to load sequencing equipment, but via amplification (PCR) each fragment can easily be copied billions of times. Now after amplification enough material is available to start the sequencing process but the information in the sample had been reduced to the information held in those two copies. And in this case the information is insufficient for classification of euploid and trisomic samples, because both sample type will show an indistinguishable 50% fraction.

Figure 18:
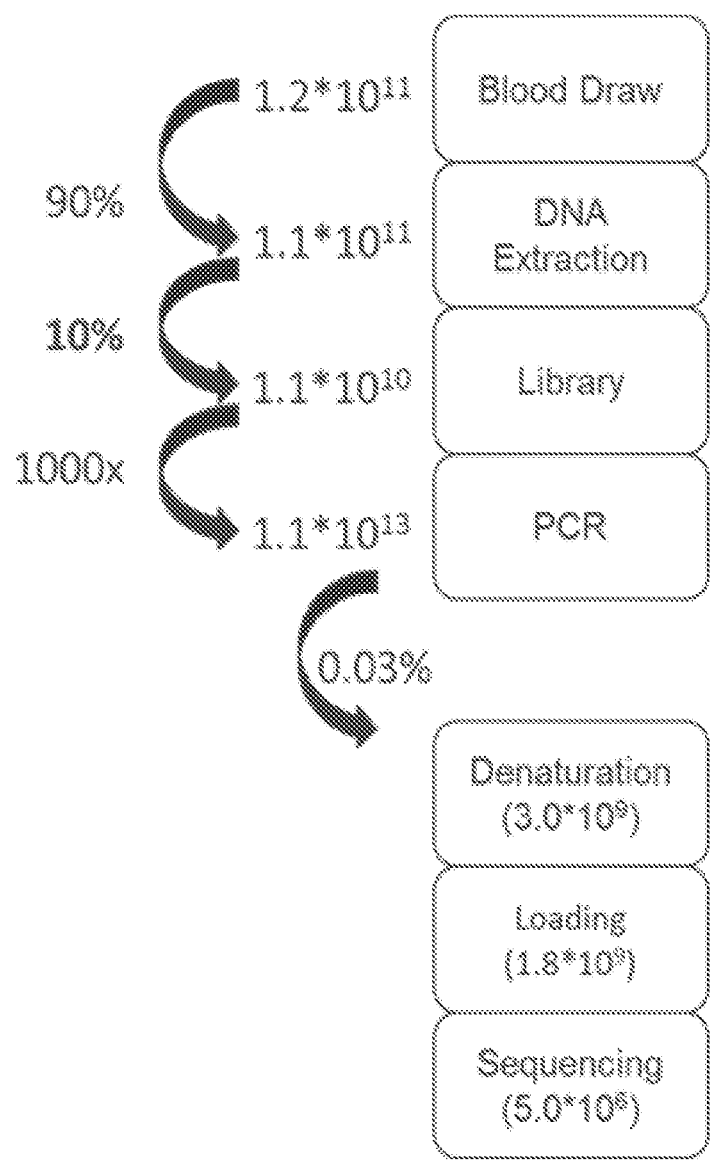
FIG. 18 shows typical amounts of cfDNA fragments expected in different process steps of low-coverage whole genome sequencing using 8-10 ml of venous blood as a starting amount.

Specifications for a typical next generation sequencer require that 5 μl of a 4 nM solution is diluted in 995 μl NaOH to make a 20 pM solution of which 600 μl are loaded on the sequencer. Consequently, a total of $1.2*10^{10}$ DNA fragments is needed, to create 20 million sequencing counts. As demonstrated above, 20 million counts are sufficient for 4 samples and therefore each sample has to contribute $\sim 3*10^9$ DNA fragments. (Because each genome equivalent contributes 20 million DNA fragments a total of 150 genome equivalents would be needed when no loss and no amplification occurs). This is outlined in FIG. 18.

Typical NIPT protocols start with a high amount of cfDNA (6000 genome equivalents), which allows for a high amount of loss during the library preparation. The material is then amplified and highly diluted to be suitable for sequencing. The problem with typical NIPT protocols is that high amount of loss during library preparation that are subsequently highly diluted lead to an inaccurate representation of the genetic material originating on a chromosome.

For example, a typical sample contains 1500 genome equivalents of cfDNA in ml of blood plasma. A regular blood draw of 8 to 10 ml of blood yields around 4 ml of plasma, resulting in 6000 available genome equivalents of cfDNA. Assuming typical numbers for DNA extraction efficiency (90%) and library preparation efficiency (10%) about 540 genome equivalents moved into amplification (typically 8 to 10 cycles, here for the example 1000 fold amplification). After amplification a total of 540000 genome equivalents or $1.08*10^{13}$ DNA fragments are available for sequencing. More than 1000-fold dilution is performed to adjust the amplified library to the required 4 nM (see Table 1).

TABLE 1

Standard 8-10 ml blood draw

| 4 ml plasma @ 1500 GE/ml | cfDNA Genome Equivalents | cfDNA Fragments | Efficiency |
|---|---|---|---|
| Blood Draw | 6000 | 1.20E+11 | |
| DNA Extraction | 5400 | 1.08E+11 | 0.9 |
| Library Prep | 540 | 1.08E+10 | 0.1 |
| Amplification | 540000 | 1.08E+13 | 1000 |
| Normalization and Multiplexing | 150 | 3.00E+09 | 0.0003 |
| Denaturation | 90 | 1.80E+09 | 0.6 |
| Sequencing | 0.25 | 5.00E+06 | 0.003 |

Figure 19:
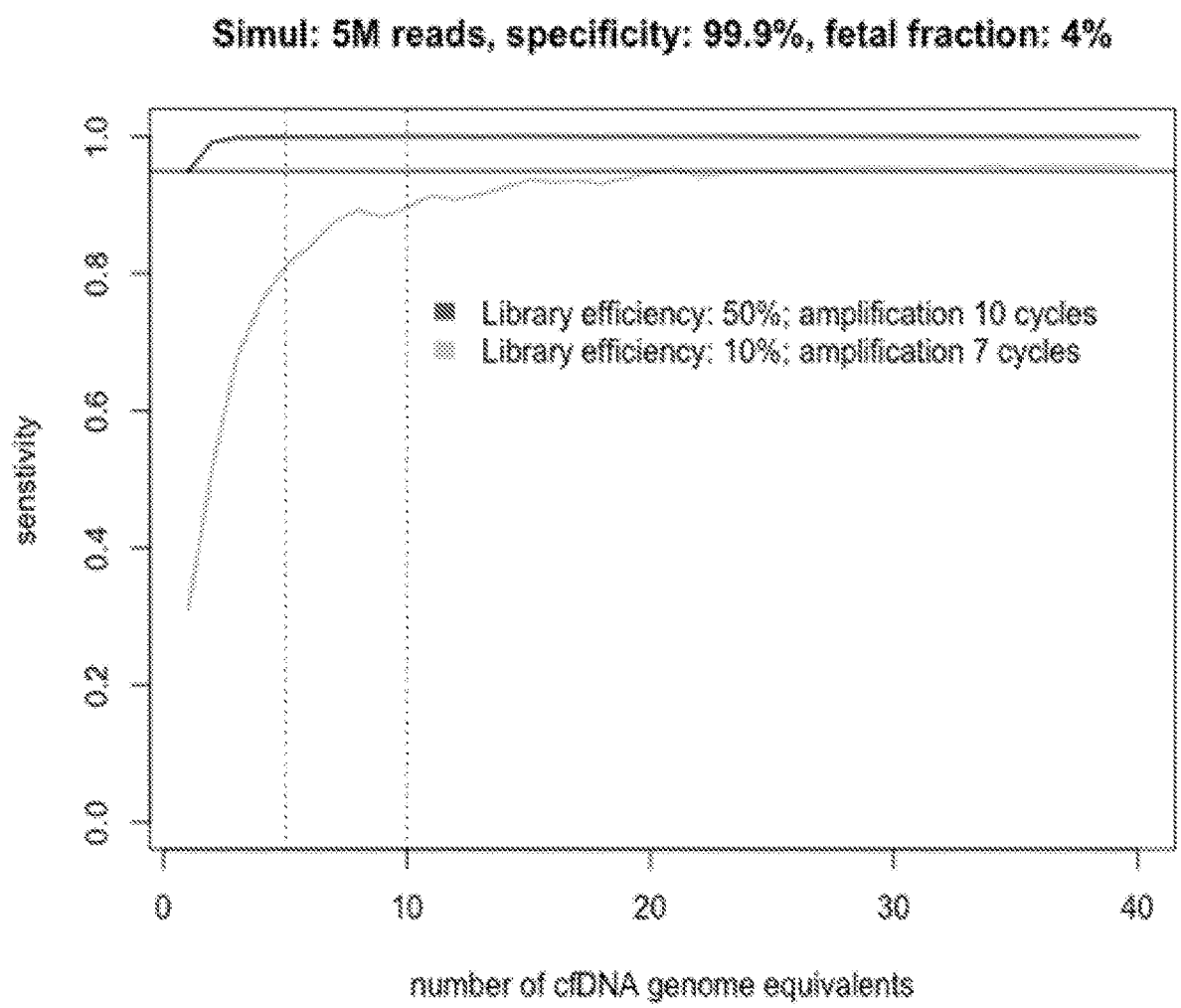
FIG. 19 shows the importance of increasing sequencing library efficiency to significantly improve sensitivity for applications using ultra-low cfDNA input amounts.

This data might mistakenly imply that because of the vast excess of DNA fragments created in the process, one could simply be scaled down the reactions to accommodate a blood volume of less than 100 µl. However, because of the aforementioned loss in information this is not possible (see Table 1). Performing a simulation at lower limit of fetal fraction (4%) that takes into account the losses during DNA extraction (efficiency 90%) and library preparation (efficiency10%) as well as the PCR amplification (10 cycles) shows that sensitivity decreases below 25 (inflection point at 10) copies of input DNA material. Sensitivity at 10 copies is reduced to 89% and at 5 copies to 81%, both values would not be acceptable in a market that requires 95% theoretical sensitivity for samples at 4% fetal fraction (see FIG. 19).

Example 2—Existing Non-Optimized Library Preparation and Sequencing Protocols Fail to Adequately Represent Total and Fetal Cell-Free DNA Fractions in Maternal Samples A standard protocol (e.g., library preparation unoptimized for ultra-low input amounts and ion semiconductor sequencing methodologies) for detecting cell-free DNA in a maternal sample and an optimized protocol (e.g., library preparation optimized for ultra-low input amounts and sequencing by synthesis), as described herein, were compared. Sequencing data from both protocols were analyzed in the context of trisomy detection in order to evaluate if the standard library preparation protocol would provide equivalent accuracy to the optimized protocols of the present disclosure.

In this study, 8 cell-free DNA (cfDNA) samples were analyzed, including 4 samples obtained from women carrying a euploid fetus and 4 samples obtained from women carrying a fetus with trisomy 21. These 8 samples were processed using two sets of experimental conditions. In the first set, an optimized library preparation kit was used (NEB Next Ultra II library kit) with optimized volumes and ratios for low input amounts of cfDNA to create the sequencing libraries, and a fluorescence-based next generation sequencer was used to perform the sequencing. In the second set, a non-optimized library preparation kit was used (NEB Next DNA Library Prep Set for IonTorrent kit) to create the sequencing libraries and the ion semiconductor sequencer was used to perform the sequencing. In both conditions, 10 genome equivalents (GE) of cfDNA were used as input to the library preparation process.

Methods: Circulating cell-free DNA was isolated from blood plasma using paramagnetic beads to capture the cfDNA. Briefly, plasma was separated from whole blood by centrifugation and lysed/bound to the beads in a solution of protease K, guanidine hydrochloride, beads and glycogen. The beads were then washed in three steps using Triton X-100, guandindine hydrochloride and sodium chloride. Elution of cfDNA was conducted with water containing sodium azide. All samples were then quantified to determine the yield of cfDNA for downstream testing.

Prior to sequencing library generation, all samples were normalized to 10 GEs of cfDNA for input into the library reactions.

Method 1: Standard Protocol

Libraries were generated for the ion semiconductor sequencer using the NEBNext Fast DNA Library Prep Set for Ion Torrent with modifications to the standard protocol. Library generation consisted of end repair, Ion Torrent-specific adaptor ligation, reaction clean-up with Ampure XP beads, library amplification with Ion Torrent-specific primers, purification of amplified library with Ampure XP beads and final elution of the amplified library. Adaptors were diluted 1:10 for all libraries, amplification was conducted with 15 cycles and all libraries were eluted in 25 ul of molecular-grade water. Following library generation all samples were sized and quantified using an Agilent Bioanalyzer 2100 high-sensitivity DNA chip.

Quantification was then repeated using a ThermoFisher Qubit 3.0. Libraries were further size-selected to eliminate adaptor-dimer products from the sequencing process. Purity and concentration of the size-selected libraries were confirmed as above.

Ion torrent S5 sequencing template and chip generation were conducted using an Ion Chef with the Ion 540 Kit and Ion 540 chip. Runs generated approximately 100 million reads in general with a minimum of 20 million reads per sample in the data generated.

Method 2: Optimized for Low-Input Amounts

DNA libraries were prepared using the NEBNext Ultra II DNA Library Prep Kit with the NEBNext Multiplex Oligos for Illumina (Index Set Primers 1) (New England Biolabs). Libraries were generated using reduced volumes to account for the stoichiometry of the lower template amounts. The volumes used depended on the input amount of template. Library preparation consisted of:
1. End-repair, 5-phophphorylation and A-tailing with incubation at 20° C. for 30 minutes followed by 65° C. for 30 minutes.
2. Adaptor ligation with incubation at 20° C. for 15 minutes followed by cleavage of the ligated adaptor loop with incubation at 37° C. for 15 minutes. Adaptors were diluted 1:25 to a 0.6 uM working concentration. The cleaved, adaptor-ligated library was then subjected to bead-based purification using SPRISelect beads. The volume of beads was increased to 116 ul to further enhance binding of highly-fragmented, low concentration cfDNA following adaptor ligation.
3. Library amplification/indexing with initial denaturation at 98° C. for 1 minute followed by 13 cycles of 98° C. denaturation for 10 seconds and annealing/extension at 65° C. for 75 seconds with final extension at 65° C. for 5 minutes. Amplified library was then purified using SPRISelect beads (45 ul).

All libraries were sized and characterized using Agilent Bioanalyzer 2100 with a High-Sensitivity DNA Chip (Agilent Technologies). Concentrations were determined using Qubit v3.0 (Life Technologies) for library dilutions prior to sequencing. Each library was normalized to a concentration of 2 nM and pooled for denaturation and dilution prior to sequencing. Sequencing-by-synthesis was conducted using an Illumina NextSeq 550 at a loading concentration of 1.5 pM. Seventy-five cycle paired-end sequencing (2×75) was conducted for each index/sample. In general, each sample generated approximately 4 million passed-filter.

Based on the amount of input material (normalized to 10 genome equivalents of circulating cell-free DNA), the theoretical lower limit of cfDNA fragments that should be available for analysis is around 10 M (or 0.5GE). To have 10 M cfDNA fragments available for sequencing requires that a higher number has to be sampled from blood, because most process steps during sample preparation will be accompanied with some sample loss. It is generally accepted that library preparation efficiency is one of the most affected/least efficient process steps. It is important to control how many cfDNA fragments participate in the reaction and ultimately are being sequenced. In short 1 GE is represented by about 20M cfDNA fragments (3B base pairs; 150 bp fragment length). When the efficiency from blood draw to adapter ligation is only 1%, then the starting material before PCR is only 200,000 cfDNA fragments. During the PCR step these 200,000 fragments can be amplified to a sufficient degree for next generation sequencing. When these 200,000 cfDNA fragments are sequenced 2M times, the majority of cfDNA fragments are sequenced multiple times. In contrast the same sample processed with an efficiency of 100% provides 20M potential cfDNA fragments for sequencing and at the same 2M sequence reads only a small subset will have been sequenced more than once.

The sequencing data was analyzed in the context of trisomy detection in order to evaluate if a standard library preparation protocol as previously used on a ion semiconductor sequencer would have been able to provide equivalent accuracy to methods optimized for ultra-low input amounts.

Figure 20:
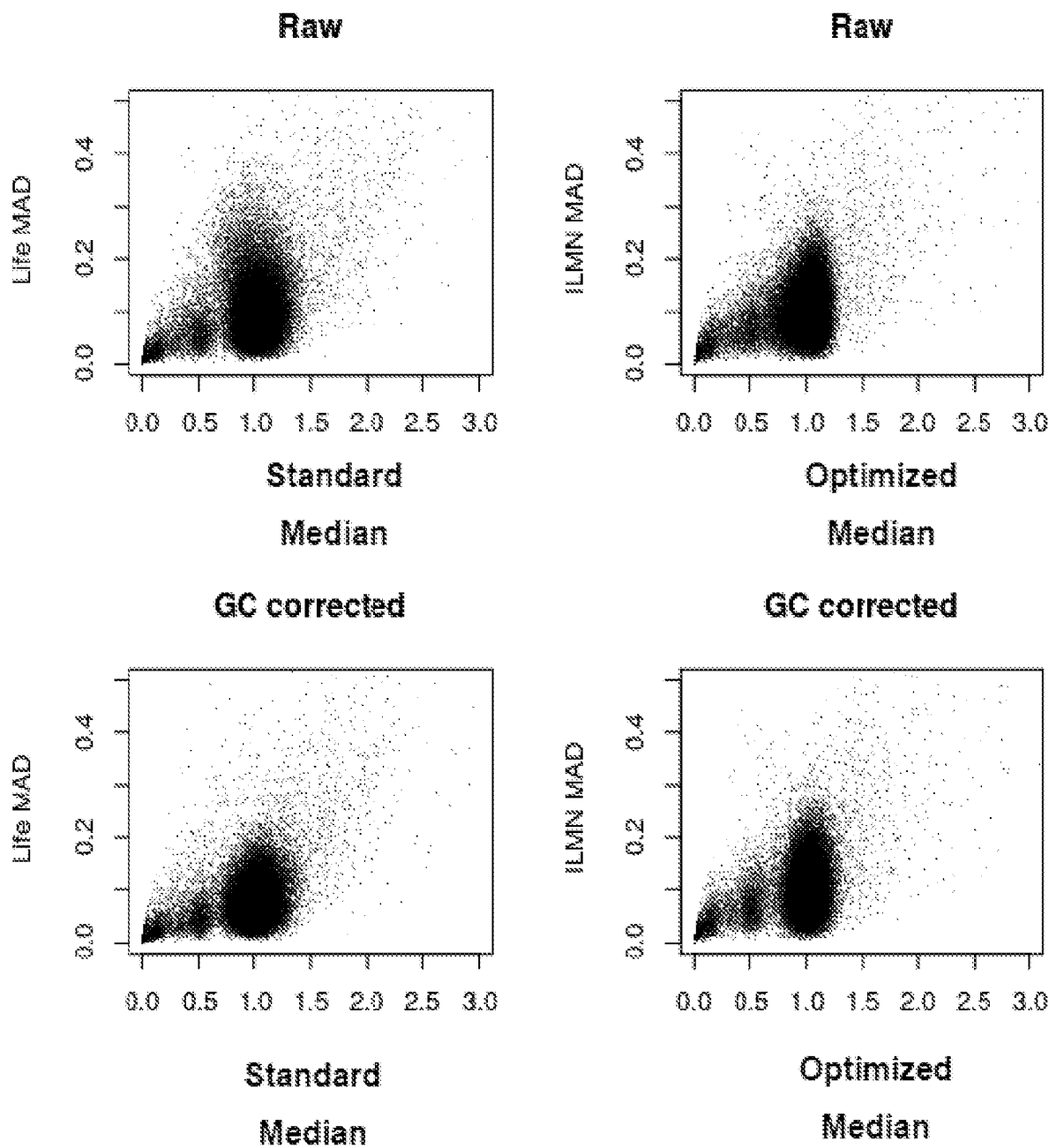
FIG. 20 shows the relationship between median bin count and median absolute deviation (MAD) per bin for the standard protocol data set that is not optimized for ultra-low cfDNA input amounts.
Figure 21:
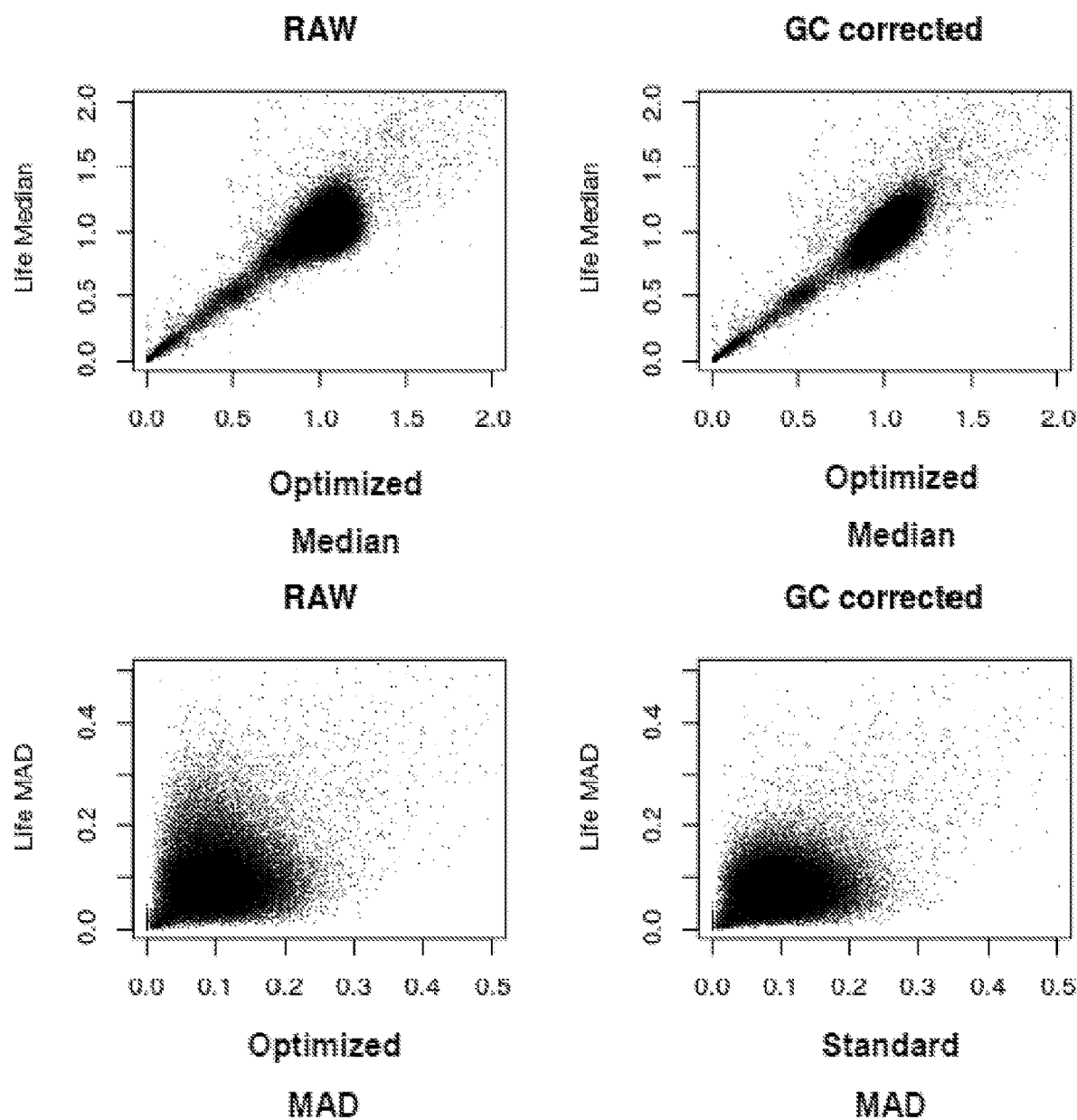
FIG. 21 shows the relationship between median bin count and median absolute deviation (MAD) per bin for the optimized protocol data set that is optimized for ultra-low cfDNA input amounts.
Figure 22:
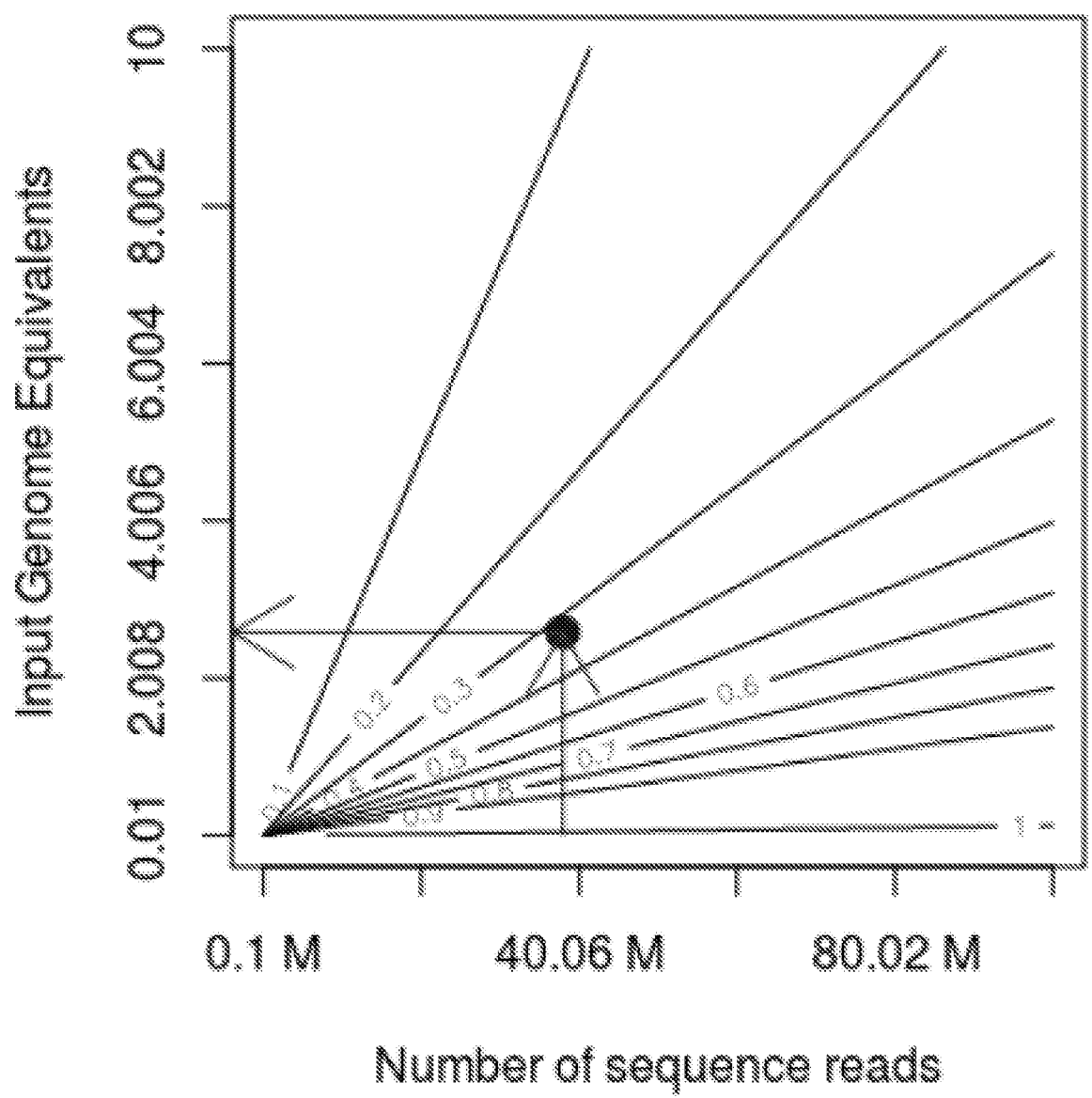
FIG. 22 shows a matrix that allows one to correlate sequence reads and genome equivalents for different library preparation efficiencies

Median and Median variances: The relationship between median bin count and median absolute deviation (MAD) per bin for the two data sets was explored. Median counts were positively correlated with MAD. In addition there is a subset of bins with higher MADs. This effect is present in the raw and the GC corrected data indicating that the higher MAD are not caused by GC bias introduced during processing, but instead represent true biological variation. FIGS. 20-22 show that a standard library preparation and sequencing method results in a lower representation of fetal cell-free DNA, as compared to a low-input optimized protocol, when ten (10) genomic equivalents are tested. Comparing the two library preparation/sequencing methods confirms previous observations (FIG. 20, FIG. 21). Median normalized GC corrected bin counts are similar between the two different datasets (p-value=0.31, t-test). Bin specific MADs are lower in the standard protocol dataset (p-value <2.2e-16, t-test), potentially indicating better performance in CNV classification for the standard protocol data. The lower bin specific median might be a result of the significantly higher sequence counts that were available in the standard protocol dataset.

FIG. 20 and FIG. 21 show the relationship between median bin count and median absolute deviation (MAD) per bin for the standard versus optimized protocol data sets. Median normalized GC corrected bin counts are similar between the two different datasets (p-value=0.31, t-test). Bin specific MADs are lower in the standard protocol dataset (p-value <2.2e-16, t-test), potentially indicating better performance in CNV classification for the standard protocol data. The lower bin specific median might be a result of the significantly higher sequence counts that were available in the standard protocol dataset.

Duplicates: The analysis of duplicate sequence reads was used to estimate the number of genome equivalents (and therefore cfDNA fragments) that were avaiable for sequencing after library preparation. The calculation is complex and will be outlined hereafter. In theory, the amount of duplicate reads are dependent on: a) how many cfDNA fragments participated in the reaction and b) how many sequence reads are generated.

To calculate the expected value the expected lambda value for the Poisson distribution was determined, which is sequence reads/cfDNA fragments. The expected duplication rate is not simply the probability to observe two or more. Because we do not have a measure for 0 counts we need to exclude those. Hence our expected duplication rate is the probability to observe 2 or more counts over the probability to observe 1 or more counts [(1−P(0)−P(1))/(1−P(0))]. We can use this matrix of expected values as a lookup table to identify the input genome equivalents by matching the number of sequence read to the duplication rate.

poom<−1-dpois(,seq.count.vec/cpy.tmp) # P(>=1) probability one or more
peo<-dpois(1,seq.count.vec/cpy.tmp) # P(1) probability exactly one
ptom<-poom-peo # P(>2) probability two or more
mat.dup.rate [i,]<-ptom/poom#/#(peo+ptom)   #   bit unclean could also be ptom/poom FIG. 22 shows library preparation and sequencing with the standard protocol yields fewer Genome Equivalents for sequencing, as compared to the optimized protocol of the present disclosure (median for Standard=1.355, median for Optimized=6.065).

A starting amount of 10GE was used for library preparation of each sample. FIG. 22 shows library preparation and sequencing with the standard protocol yields fewer Genome Equivalents for sequencing, as compared to the optimized protocol of the present disclosure (median for Standard=1.355, median for Optimized=6.065).

The number of available cfDNA fragment is a determining factor for classification accuracy and this data shows standard processing with the standard protocol results in a significant reduction of available cfDNA fragments.

Figure 23:
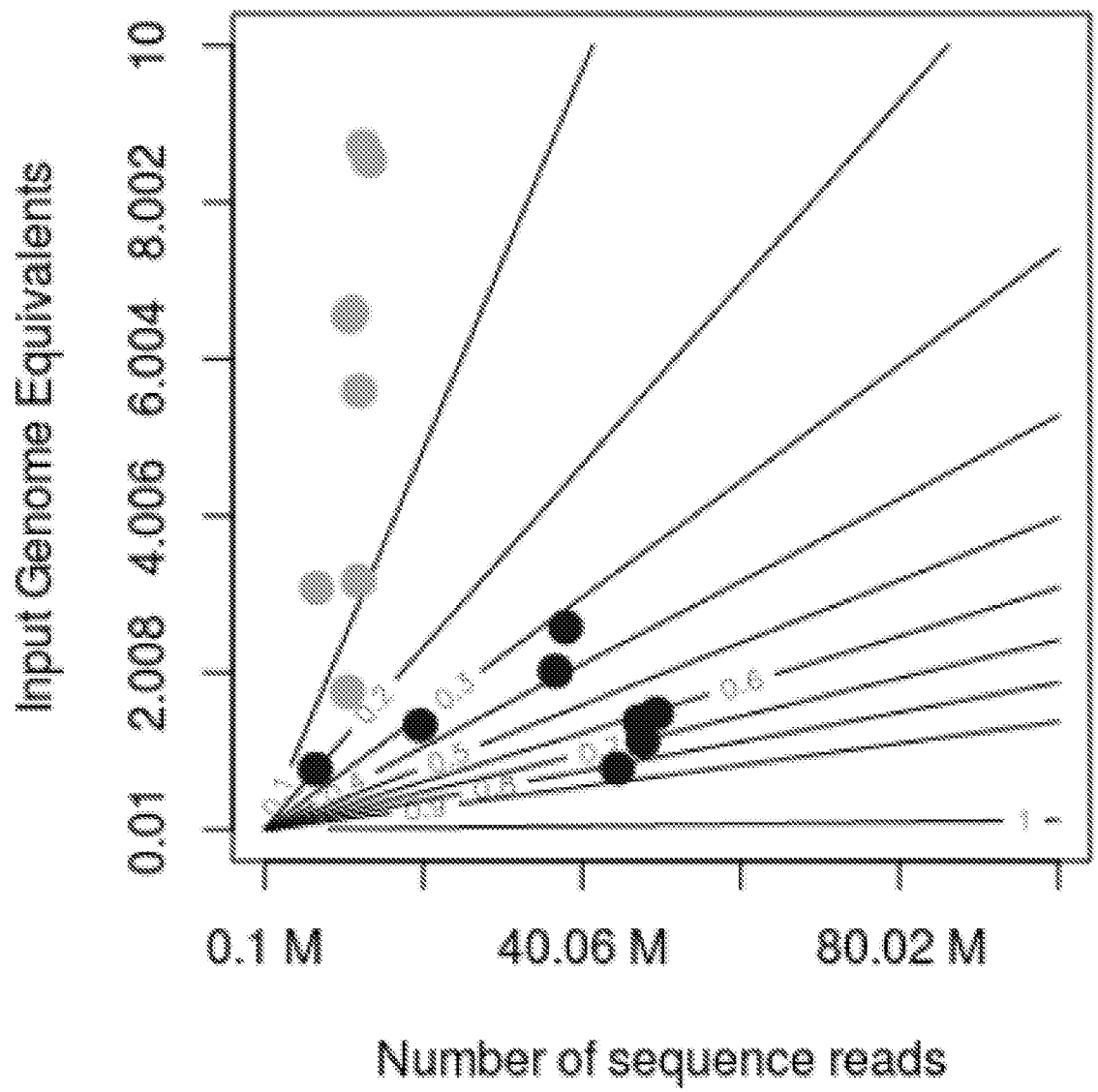
FIG. 23 shows optimized protocol data points in yellow, standard protocol points in blue. Library preparation and sequencing with the standard protocol yields fewer effective sampled Genome Equivalents in sequencing, as compared to the optimized protocol of the present disclosure (median for Standard=1.355, median for Optimzed=6.065).

FIG. 23 shows optimized protocol data points in yellow, standard protocol points in blue Chromosome representation percentages and Z-score: The percentage representation of fragments originating from chromsome 21 over the representation of all qualifying autosomes (excluding chromosome 21 and 19) were calculated for both protocols. The percentage for chrY and chrX was also calculated. The percentage representation of the sex chromosomes can be used to determine the sex of the fetus. For male samples percentage of sex chromosome representation can also be used to estimate the fraction of cfDNA originating from the fetus (fetal fraction). For chromosome 21 we calculated a Z-score according to well established methods. The median and MAD for a set of euploid reference samples were calculated. Next, the difference in median for each sample from that reference median was calculated. Finally, the difference was divided by the reference MAD to derive the Z-score. A score greater than 3 indicates the presence of a trisomy 21.

Figure 24:
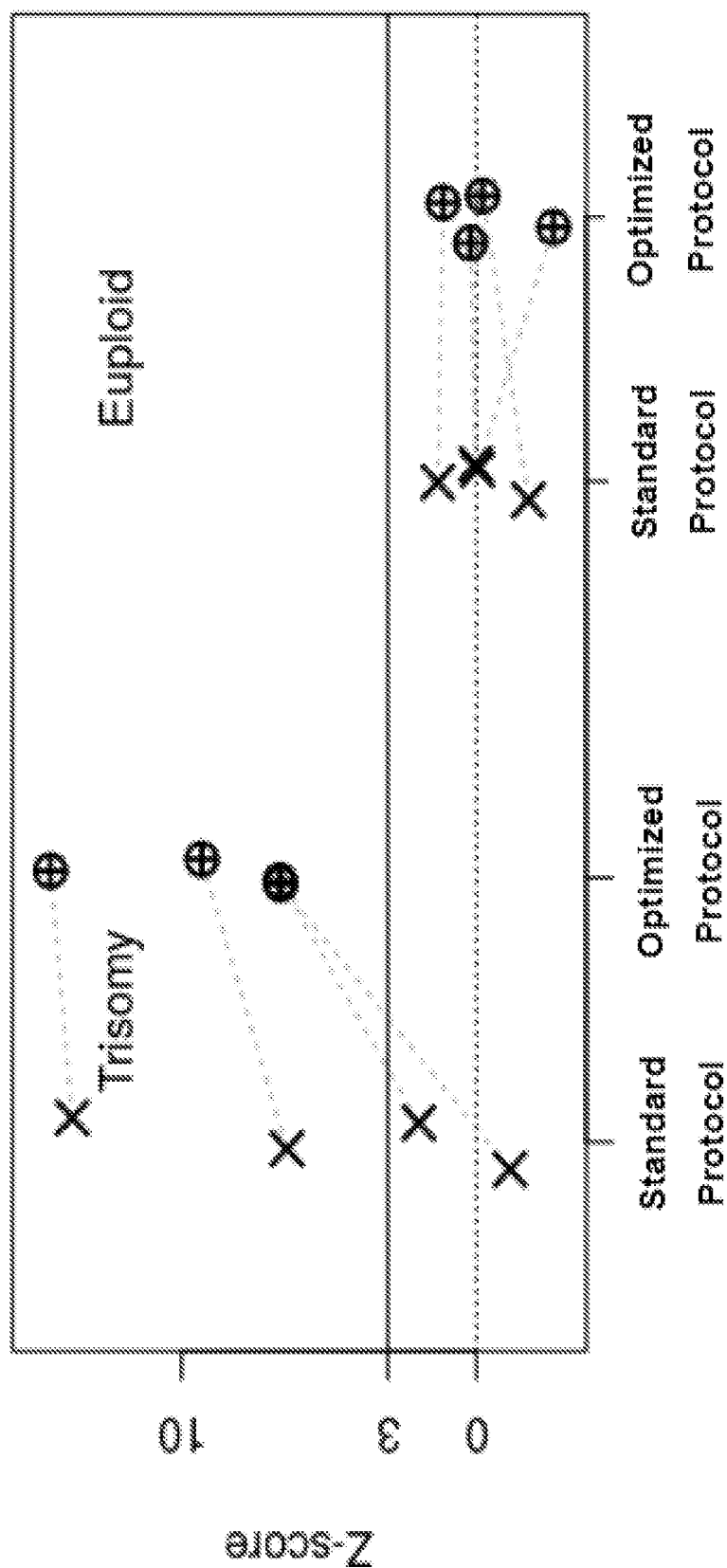
FIG. 24 shows that the standard protocol data showed good specificity (0 false positives, 100% specificity) but poor sensitivity (2 false negatives, 50% sensitivity).

FIG. 24 shows that the data derived from the standard protocol library preparation and sequencing is noisy and does not allow for an easy delineation of samples carrying a male versus female fetus.

However, the data from the optimized and more efficient library preparation and sequencing protocol of the present disclosure for chrY representation is clear and shows that the set comprises three (3) male and five (5) female samples. In addition, there is not a good consensus between the two data sets for chrY measurements. Consequently chrX representation was used for the estimation of fetal fraction in male samples for the remaining analysis.

Figure 25:
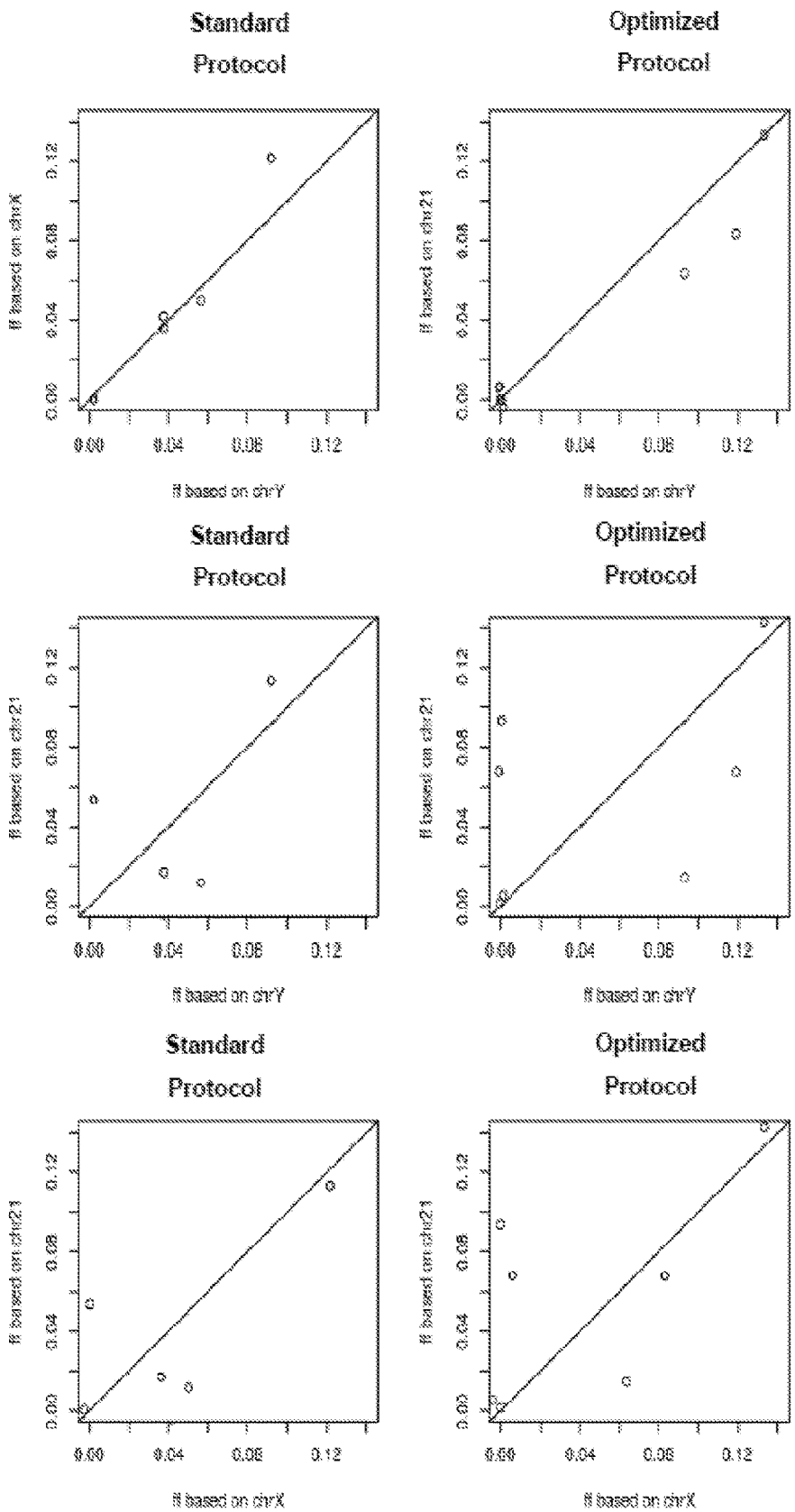
FIG. 25 shows that the data derived from the standard protocol library preparation and sequencing is noisy and does not allow for an easy delineation of samples carrying a male versus female fetus.

Performance comparison between standard library preparation and sequencing protocol vs optimized library preparation and sequencing protocol data: After correction for outlier bins, the Z-score analysis shows that the optimized library preparation and Optimized sequencing data performed as expected. FIG. 25 shows that the standard protocol data showed good specificity (0 false positives, 100% specificity) but poor sensitivity (2 false negatives, 50% sensitivity). Both datasets contain exactly the same samples and were given the exact same amount of input material. The standard protocol data has significantly more sequence reads per sample. However, as noted above, the number of sequence reads does not necessarily correlate with an accurate representation of cell-free DNA in the original sample. Next, the relationship between available cfDNA fragments, fetal fraction, and Z-score, was examined.

To explore the relationship between fetal fraction, copy numbers and Z-scores, the percentage representation for chr21 and chrY was calculated. These percentages were used to estimate the fraction of fetal genetic material in the sample (herein referred to as fetal fraction). Female samples will not have an elevated chrY representation. For those female samples that show chr21 overrepresentation a fetal fraction was calculated from the chr21 overrepresentation. Samples were identified as female if their chrY representation in the optimized protocol dataset was less than $8.2*10^{-4}$.

Figure 26:
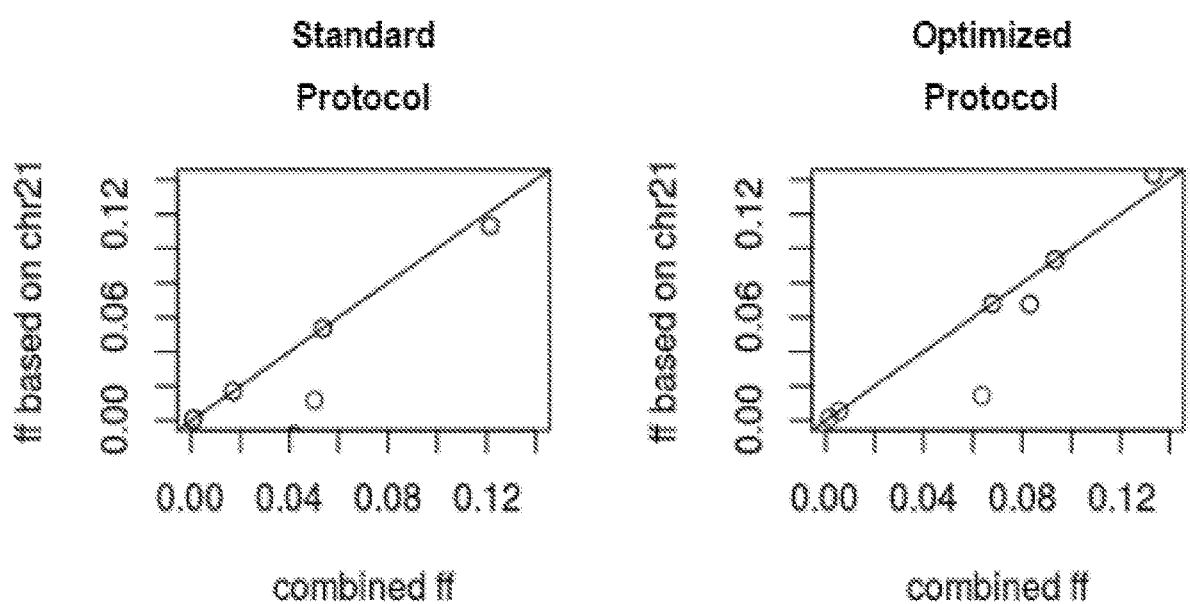
FIG. 26 shows that a combined fetal fraction measurement for all samples correlated well with the observed effect introduced by chr21 using the standard protocol (left) and the optimized protocol (right)).

FIG. 26 shows plots indicating samples with a fetal trisomy (red) and euploid fetus (black).

After transforming the chromosome representation percentage measurements into fetal fraction estimates, the value for chrY, chrX and chr 21 were on the same scale. All male samples had a fetal fraction estimate available. Also all trisomy 21 had an estimation available. As seen before, the optimized protocol data clearly delineates between male/female and euploid/trisomic samples. The standard protocol data is noisy and does not allow for a clear separation. We then constructed a fetal fraction measurement that uses the chrX measure for all male samples and the chr21 measure for all female samples with Trisomy 21. Fetal fraction for female euploid samples was not available.

FIG. 26 shows a combined fetal fraction measurement for all samples correlated well with the observed effect introduced by chr21 using the standard protocol (left) as compared to the optimized protocol (right)).

Z-scores, copy numbers and fetal fraction: The relationship between copy numbers, fetal fraction and Z-scores, was plotted. Euploid samples are distributed on the copy number/fetal fraction plane but their z-scores are not correlated to those parameters. This behavior is expected, but complicates the visualization. The protocol data is distinct from the standard protocol data with respect to copy numbers.

Figure 27:
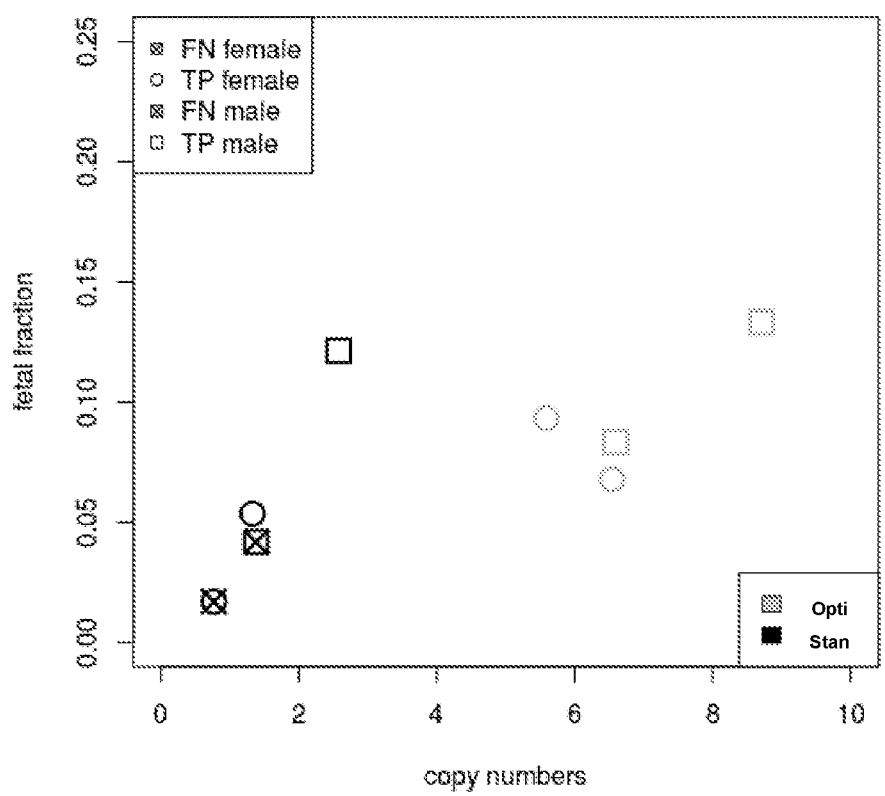
FIG. 27 shows that higher effective copy numbers resulted from the optimized protocol as compared to the standard protocol causing even wrong results on fetal sex for the standard protocol.

FIG. 27 shows that correctly classified samples (True Positives, TP) separate from incorrectly classified samples (False Negatives, FN) for both protocols. Also shown are more copy numbers resulting from the optimized protocol as compared to the standard protocol.

Figure 28:
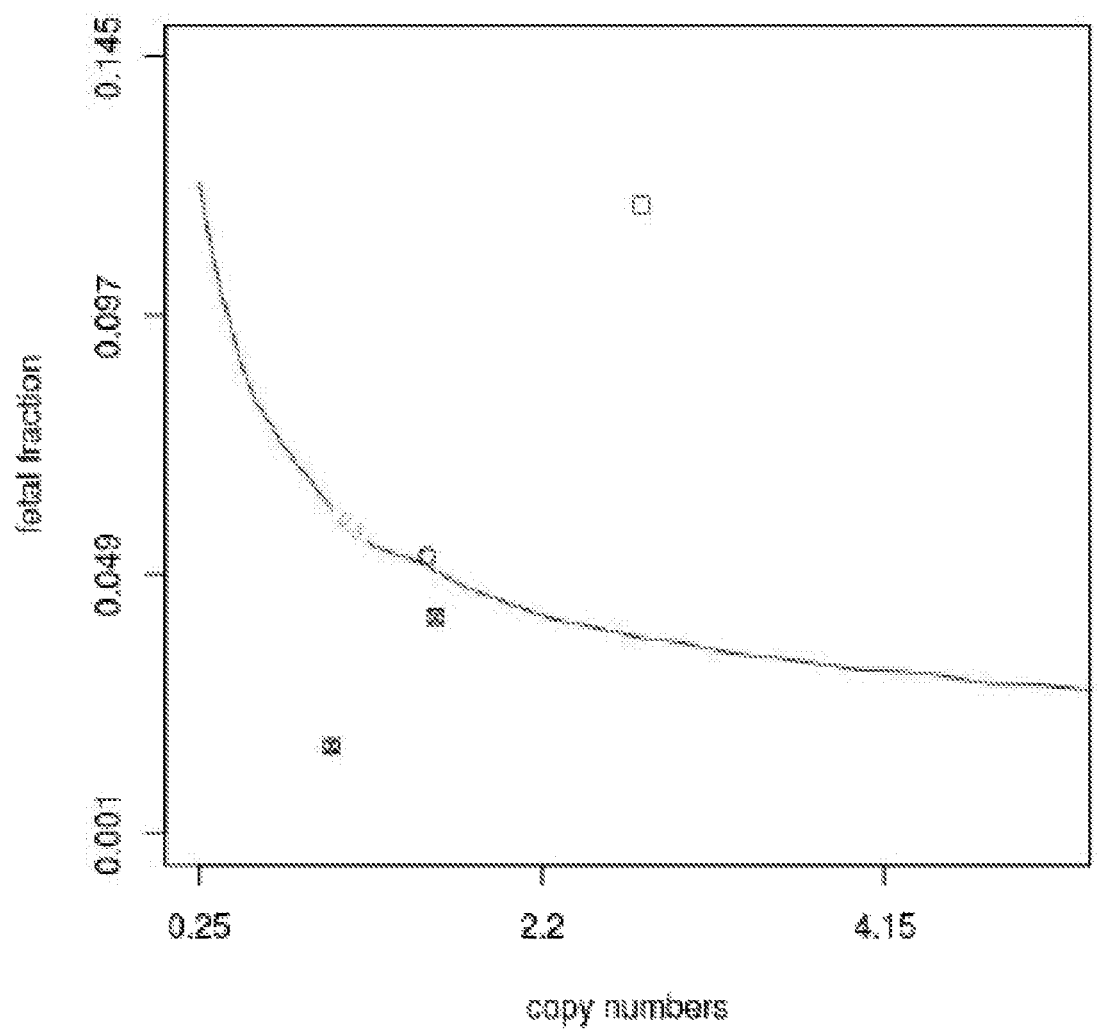
FIG. 28 provides an explanation for the poor sensitivity (2 false negatives) of the standard protocol, with the red line simulating a 50% sensitivity using an estimated PCR efficiency of 90%, a library efficiency of only 5% and 36M sequence reads, in line with the actual data plotted from the 4 samples analyzed with the standard protocol.

Using a computer simulation that takes into account sampling error at all stages of the library preparation process, we can build a model to predict performance for each combination of available cfDNA fragments and fetal fraction. At an estimated PCR efficiency of 90%, library efficiency of 5% and 36M sequence reads, the resulting line that indicates 50% sensitivity perfectly separates the True Positives from the False Negative samples (FIG. 28).

Conclusion: This results of this study demonstrate that a standard library preparation and sequencing method that is not optimized for low input amounts of nucleic acid leads to a reduced number of copies of cell-free DNA as compared to that obtained using an optimized protocol when the same low input amount is used. The resulting reduced copy number representation is a result of a higher noise in the chromosome representations and therefore leads to lower performance in detection of aberrations. In some instances, the use of the machine learning-based approaches to nucleic acid sequence data processing disclosed herein may overcome the noise limitations inherent in the analysis of small quantities of nucleic acid and enable more accurate detection of genomic aberrations.

Example 3—Exemplary Method for Reduction in Contamination

To investigate the effect of different collection methods on the contribution of non-apoptotic genomic DNA we compared a standard finger prick blood collection protocol to one that we have optimized. The standard protocol includes thorough cleaning of the fingertip with ethanol, puncture the skin with a onetime use lancet and collect the blood into an EDTA container (hereafter referred to as the "non-wiped" condition). In the optimized protocol an additional step is performed before the blood is collected. After the skin is punctured with the one time use lancet the first drop of blood is wiped away with gauze pad (hereafter referred to as the "wiped" condition). Only the blood following this first drop is collected in the EDTA container.

Method: The collected blood was processed into plasma and DNA extracted within 2 hours of collection. DNA quantity was assessed using real time PCR. Fragment length distributions were established by paired end sequencing on a ILMN Next-Seq. Venous blood was collected as a reference using a standard method.

Figure 29:
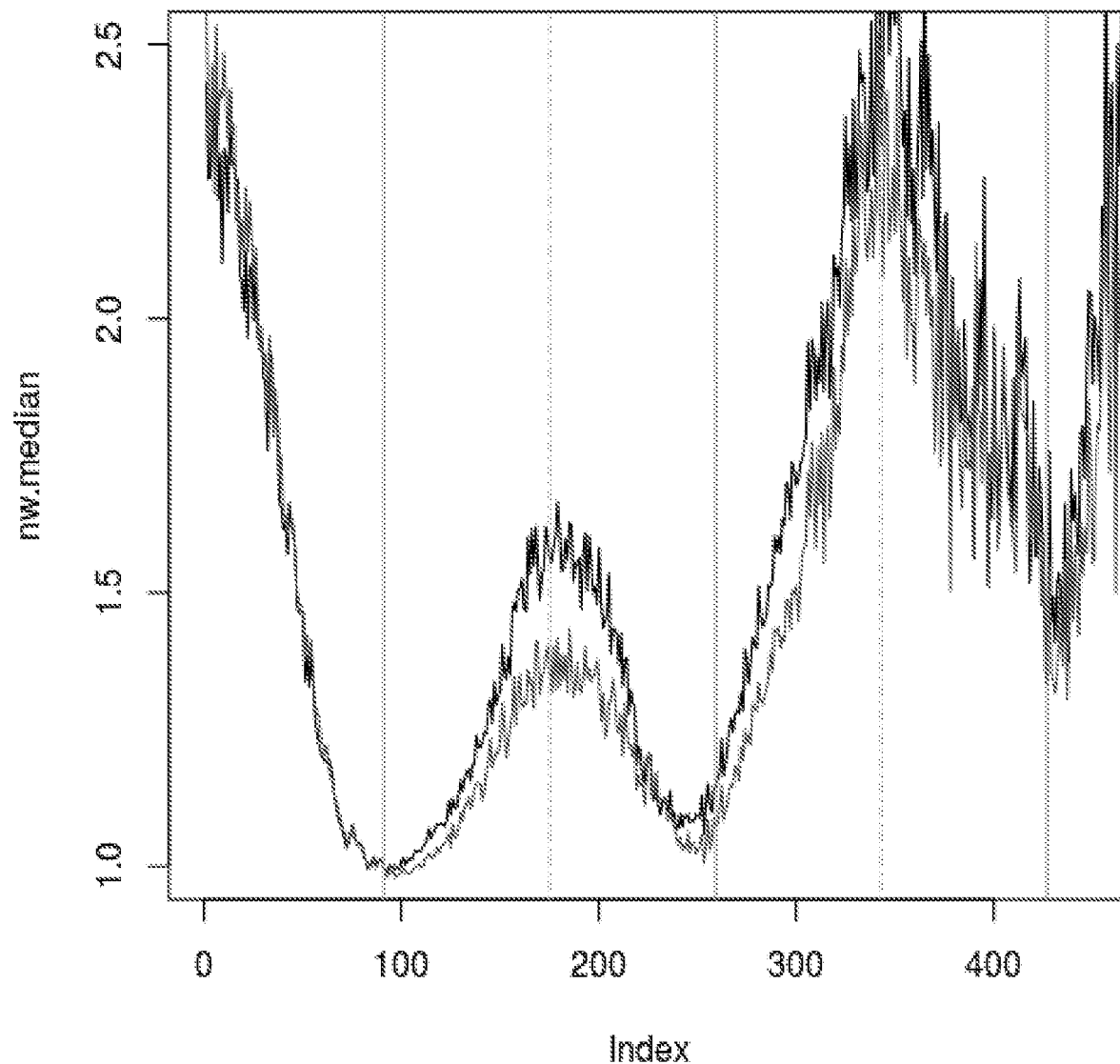
FIG. 29 shows a comparison of "wiped" and "non-wiped" capillary blood collection samples for differences in DNA fragment size distributions.

DNA quantity: The DNA quantity for samples collected with the non-wiped condition is approximately 50% higher compared to the wiped collection protocol. Higher DNA yields are generally regarded as favorable for NIPT analysis. However, the analysis of fragment length distributions revealed a stronger overrepresentation of fragments lengths indicative for cell damage in the non-wiped condition (FIG. 29).

Without being bound by any particular theory, wiping away the first drop of blood reduced the contribution of DNA derived from cell damage. Alternatively or in addition, solutions to the issue of DNA originating from damage and contamination may include: (1) capture methods that select against longer DNA fragments, (2) electrophoretic methods, (3) selection of library products by size, and (4) bioinformatics and/or machine learning-based methods to account for, remove, or differentially analyze DNA samples or data derived therefrom (e.g., DNA sequence data) based on fragment size information.

Example 4—Deep Neural Inference from Deep Sequencing

Summary: We describe a set of novel computational methods utilizing deep neural networks for performing genomic diagnostics. Our first method uses a deep neural network (DNN) to assign nucleic acid sequences to a set of classes (e.g., genomic regions) for generation of logits or probabilities. Our second method utilizes DNNs for inferring genomic state from GC-normalized sequence count data originating from a genome sequence alignment. Our third method adapts DNNs for inferring genomic state from either non-GC-normalized count data or from the logits/probabilities obtained from our first method. The methods we describe here are useful for robust genomic diagnostic applications including inferring the probability of disease states.

Background: In recent years, advances in DNA sequencing technologies have enabled the development of a wide variety of diagnostic applications. High-throughput DNA sequencing, in particular, has enabled precise and sensitive diagnoses of genomic maladies involving copy number variation (CNV) conditions. With a large enough sample, genomic conditions can even be detected from cell-free DNA (cfDNA) circulating in blood, thereby enabling non-invasive prenatal testing (NIPT) for conditions such as Down's syndrome and early detection of cancer (Canick, et al. (2012), "DNA Sequencing of Maternal Plasma to Identify Down Syndrome and Other Trisomies in Multiple Gestations", Prenat. Diagn. 32, 730-734; Ellison, et al. (2016), "Using Targeted Sequencing of Paralogous Sequences for Noninvasive Detection of Selected Fetal Aneuploidies", Clin. Chem. 62, 1621-1629; Porreco, et al. (2014), "Noninvasive Prenatal Screening for Fetal Trisomies 21, 18, 13 and the Common Sex Chromosome Aneuploidies from Maternal Blood Using Massively Parallel Genomic Sequencing of DNA", Am. J. Obstet. Gynecol. 211, 365.e1-12; Lefkowitz, et al. (2016), "Clinical Validation of a Noninvasive Prenatal Test for Genome-Wide Detection of Fetal Copy Number Variants", Am. J. Obstet. Gynecol. 215, 227.e1-227.e16).

Conventionally, researchers or technicians will extract nucleotide samples from the sample being queried, amplify those nucleotides using polymerase chain reaction (PCR) type techniques, and then sequence the amplified nucleotide samples to obtain a digital representation of the nucleotide sequence. These sequence samples are typically short fragments of the genome or genomes of the origin specimen which are then computationally aligned to a reference genome to determine the ordering and counts of the sequences in question. Conventional short-read, whole genome sequence alignment techniques will typically use hash tables and/or the Burrows-Wheeler transform to precisely align a given read to the closest matching sequence in a reference genome (Li, et al. (2008), "Mapping Short DNA Sequencing Reads and Calling Variants Using Mapping Quality Scores", Genome Res. 18, 1851-1858; Li, et al. (2009), "Fast and Accurate Short Read Alignment with Burrows-Wheeler Transform", Bioinformatics 25, 1754-1760; Langmead, et al. (2009), "Ultrafast and Memory-Efficient Alignment of Short DNA Sequences to the Human Genome", Genome Biology 10, R25).

Aligned sequence data typically requires additional processing before it can be used to effectively make inferences on genomic state. One common technique for performing genomic diagnosis on imbalanced large-scale insertions, deletions, substitutions, or aneuploidies is to use deep sequencing to count up the number of reads that fall into each genomic region bin. Researcher can infer the presence of genomic anomalies by comparing a binned count data vector from an experimental sample to the variance present in baseline samples.

For example, a common technique is to calculate a Z-score measuring the deviation of observed sequence counts from the distribution of sequence counts in non-aneuploid samples. For example given a vector of $x_i$ values representing the averaged counts across a trisomy bin interval for unaffected samples ($x_{neg}$) we can simply calculate a Z-score representing how strongly a sample $x_{eval}$ deviates from $x_{neg}$:

$$Z = \frac{x_{eval_i} - mean(x_{neg})}{\sigma(x_{neg})} \quad (1)$$

where $\sigma(x_{neg})$ is the standard deviation of the mean.

A Z-score can also be calculated using median absolute deviation in cases where greater robustness to outliers in the unaffected samples distribution is desired:

$$MAD = median(|x_{neg} - median(x_{neg})|) \quad (2)$$

$$Z = \frac{x_{eval_i} - median(x_{neg})}{MAD} \quad (3)$$

Figure 30A:
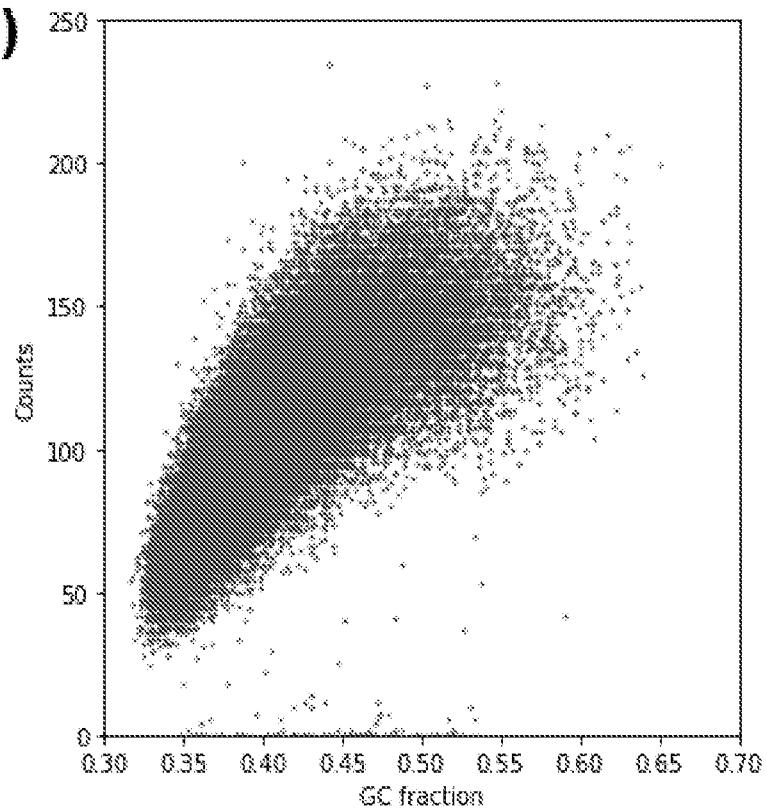
FIGS. 30A-B provide examples of human sequencing count data. Each point in both panels represents a count value per genomic bin.
Figure 30B:
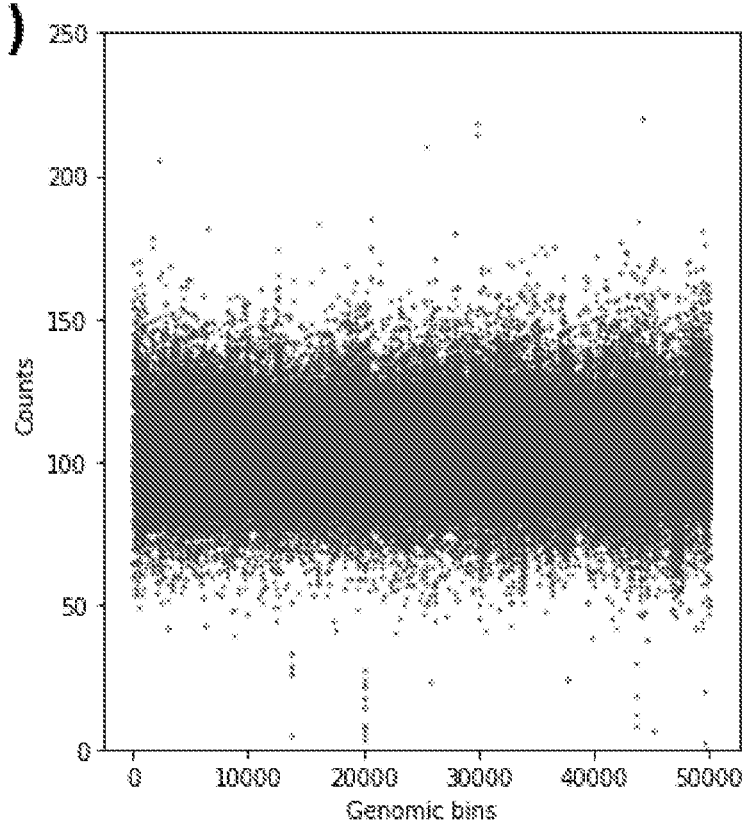

In practice, normalization of binned count data is necessary to make reliable inferences from whole-genome high throughput sequencing data. For example, the bias inherent in PCR amplification can favor the amplification of genomic regions rich with GC nucleotide sequences (Benjamini, et al. (2012), "Summarizing and Correcting the GC Content Bias in High-Throughput Sequencing", Nucleic Acids Res 40, e72-e72). Regions of the genome that are low or extremely high in GC frequency have a tendency to be amplified at a lower frequency in a manner that is highly variable between different amplification and sequencing runs (FIG. 30A). In order to circumvent this bias, most bioinformaticians normalize mapped sequence count data to the underlying GC frequency of the reference genome for a given organism in order to correct for GC bias before performing any inferences from binned sequence count data (FIG. 30B).

There are multiple ways of performing the GC normalization procedure, but one of the most commonly utilized procedures works by fitting a LOESS regression (Cleveland, et al. (1981), "LOWESS: A Program for Smoothing Scatterplots by Robust Locally Weighted Regression", The American Statistician 35, 54-54) or polynomial fit line through points on the GC versus sequencing counts axis, and then correcting for the difference between the median of the resulting fit from the fitted value in each bin:

$$y_{counts} = (x_1, x_2, x_3, \ldots, x_n)$$

$$y_{fit} = f_{LOESS}(z_{GC_{frac}}, y_{counts})$$

$$y_{norm} = y_{counts} + (median(y_{fit}) - y_{fit}) \quad (4)$$

We have developed a set of methods to make inferences from genomic sequencing data using deep neural networks without performing a conventional sequence alignment or performing conventional GC normalization steps. Our method consists of three phases which can be used together, or independently using data processed in more conventional ways. The first phase replaces conventional sequence alignment with a deep neural network which outputs logits or probabilities by treating each pre-defined genomic region as a set of classes. The second phase encompasses deep neural networks that can perform inferences of genomic state using binned genomic count data or the output of our first method. The third phase describes how we adapted our second phase to work with non-GC-normalized data and the logit/probability data originating from the first phase.

Method 1: Replacing Alignment with Probabilistic Bin Assignment Using Deep Neural Networks For our first method, we use deep neural networks in lieu of conventional sequence alignment. Instead of aligning a given sequence to the best matching sequence in a reference genome, we use a neural network to probabilistically classify each sequence read as belonging to a particular genomic region or set of sequences.

When defining our classes as genomic intervals, the output vector of our neural network represents the logits or probabilities of a given sequence belonging to each pre-defined genomic region. By performing an element-wise sum for each genomic class of the logit/probability vectors generated for all nucleotide sequences from a sequencing run, and normalizing for the number of sequence counts from that run, we can use our "probabilistic bin assignment" technique to construct feature vectors which can be used for making inferences of genomic copy number variation (CNV). Logits (domain [−infinity, +infinity]) can be converted to probabilities (domain [0.0, 1.0]) via the softmax function. Either may be used as input for method 2 and method 3 described below.

For our network, we first convert our nucleotide sequences into a n×4 "one-hot" style matrix encoding wherein each column represents one of the 4 canonical nucleotides (C, A, T (or U in the case of RNA sequence classification), and G) and each row represents a nucleotide position (FIG. 31). For ambiguous nucleotide positions (typically represented as N) we fill each item in a column with the value 0.25 representing the equal probability weight of belonging to any of the four nucleotide classes. This input matrix can then be passed into a convolutional or fully connected deep neural network, and can be constructed from non-discrete data formats.

We note that our input feature encoding is not strictly a "one-hot" encoding because each position isn't strictly binary, but rather can represent floating point probability values. This opens up our technique to potentially noisy input sources. For example, rather than constructing our one-hot style input features from discrete nucleotide sequences, we could convert the raw optical data from a fluorescence imaging based nucleotide sequencer into our input matrix format by assigning probabilities to each column such that each row adds up to 1.0. This approach could account for any ambiguities in the base-call process, and could be also be adapted for non-optical sequencing technologies such as ion semiconductor sequencing (Rothberg, et al. (2011), "An Integrated Semiconductor Device Enabling Non-Optical Genome Sequencing", Nature 475, 348).

For a convolutional neural network (CNN) architecture, the training procedure is analogous to the approaches commonly used for training on two-dimensional RGB images. The nucleotide dimension of our input matrix is treated the same way as rgb_channels dimension for a height×width×rgb_channels 2D image tensor. In the same manner, filter tensors are defined in the same way as height×width×rgb_channels×output_channels used for 2D image convolution. For nucleotides, we change the height dimension to 1, the width to the length of the nucleotide sequence, the rgb_channels to 4, and output_channels to the number of outputs we want from each filter tensor (output_channels are effectively the number of filters applied to each sequence in the current convolutional layer). Convolution is particularly well suited for nucleotide data as recurring sequence motifs are efficiently encoded by each convolutional filter used. For fully connected neural networks, or convolutional networks joined with fully connected layers, we flatten or unravel our input matrix (or convolved input data) into a one-dimensional vector.

With the input format described above, we then train a large neural network using every possible position from a reference genome. For example, if our input consists of 25 bp long sequences, we will sample from our reference genome every possible 25 bp read on every training epoch. Each sample would consist of a sequence read and its corresponding class label. For example, for a 50,000 bp genome divided into 10,000 bp bins, each bin could represent one of five classes, and every read from position 0 to 10,000 in the reference genome would be labeled class 0. Known or simulated single nucleotide polymorphisms (SNPs) or common insertion-deletions (indels) can also be randomly inserted into this training set to make our classifier robust to common population variation.

The neural network in question can take on a variety of forms, but must have a final layer that outputs a vector logits of logits where each value in the vector corresponds to a labeled class. These logits can be mapped to the domain 0.0 to 1.0 using a softmax function or other mapping function (e.g., by dividing each logit by the sum of the logit vector) and interpreted as the probability of an input sequence read belonging to each class.

For our cost function, J(W), we used cross-entropy (log loss):

$$J(W) = \frac{1}{n}\sum_{i=1}^{n} [y^{(i)}\log(h_w(x^{(i)})) + (1 - y^{(i)})\log(1 - h_w(x^{(i)}))] \quad (5)$$

We also used a softmax function to generate multi-class classification probabilities (here j is the class index, K is the number of classes, and z is the logit value for a given index):

$$softmax(z)_j = \frac{e^z}{\sum_{k=1}^{K} e^{zK}} \text{ for } j = 1, \ldots, K \quad (6)$$

This neural bin assignment procedure does not necessarily need each genomic bin/region to contain similar information due to the fact that a network overfitted to a particular genome can effectively assign sequence reads to arbitrarily defined bins. Our experiments have shown that any neural network that contains a reasonably large number of weights proportional to the queried genome can effectively embed a representation of the query genome even when overfitted.

Example 4(a)—Convolutional Network for Sequence Read Classification to Genomic Bins Our general approach can be implemented using many different network architectures. Here we detail the convolutional neural network (CNN) and training parameters we developed to classify raw sequence read data to the reference bacteriophage PhiX174 genome (accession NC_001422.1; Sanger, et al. (1978), "The Nucleotide Sequence of Bacteriophage φX174", Journal of Molecular Biology 125, 225-246). The CNN architecture used for inference is summarized in Table 2.

TABLE 2

PhiX174 bin assignment network (fw = filter width; nf = number of filters)

Conv (fw: 8; nf: 128)
Relu
MaxPool (fw: 2)
Flatten
Linear (64)
Relu
Linear (32)
Relu
Linear (16)
Relu
Readout We implemented the above model using the Tensorflow™ API. We divided the PhiX174 genome into 11 bins (500 bp wide for the first 10 bins, and 386 bp wide for the last bin). We then defined each bin as a class (We also implemented an option to include an additional class for each training set representing completely random sequence to encompass unassignable sequence. This option was not enabled in the described example). To construct our training data set, we wrote an input sampling module for our program that would randomly draw "one-hot" encoded representations of nucleotides from the PhiX174 reference genome, and label those sequences according to the bin location of the leftmost base of each sequence (We have included code for random mutation and targeted mutation of sampled sequences to improve the robustness of any trained models to nucleotide sequence polymorphisms, but we did not enable this feature for this example).

For our example model, we used a mini-batch size of 3000, an initial learning rate of 0.04, and an ADAM optimizer (beta1=0.9, beta2=0.999, epsilon=0.1) for gradient descent (Kingma, et al. (2014), "Adam: A Method for Stochastic Optimization", arXiv:1412.6980 [cs]). We validated our training on 7.8 million Illumina sequencing reads from SRR2057028 (Accession: PRJNA285951), achieving an average (across all classes) alignment accuracy of 98.0 percent and average F1 score of 0.981.

Figure 32:
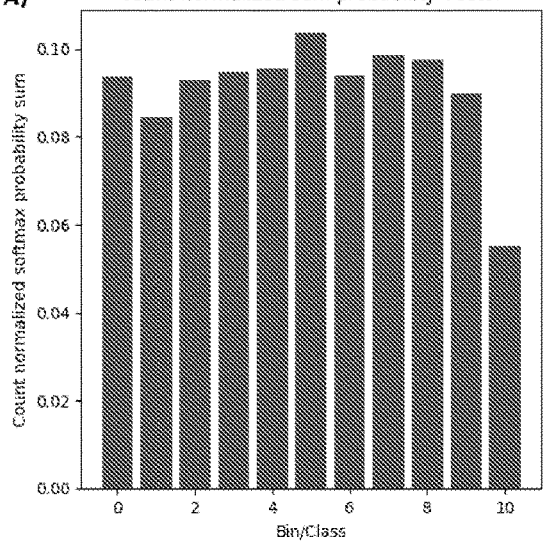
FIGS. 32A-C show a comparison of neural network-based bin assignment versus processed sequence alignment for 7.8 million PhiX174 sequencing reads.
Figure 32:
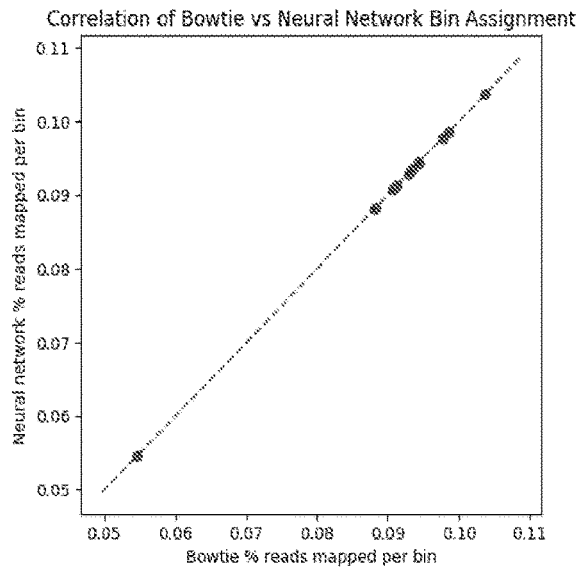
Figure 32:
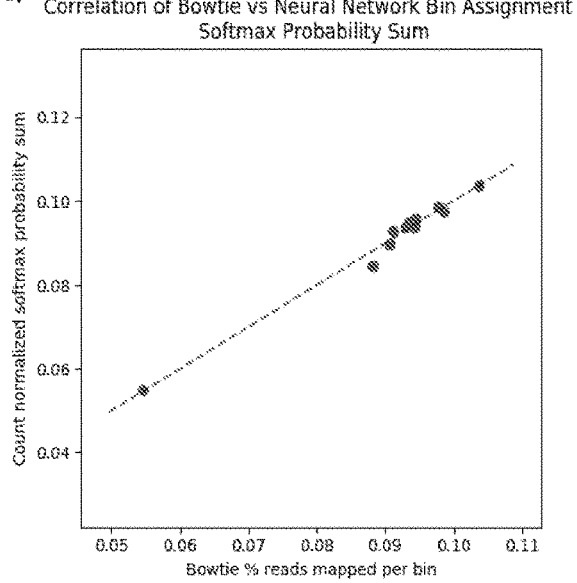

Although we can use our network to select the most probable bin location for each sequence read by discretely selecting the bin class with the highest probability for a given read, we can leverage the power of neural networks to our advantage by simply using the entire output probability vector for downstream analyses. To construct a single probability vector for a given genome sequencing run, we use our network to calculate probability vectors for every sequence obtained in our run with or without filtering criteria applied. We then perform an element-wise sum of all probability vectors or each input sequence, and then normalize this summed vector by the number of reads in the sequencing run. This resulting "combined probability vector" format has advantages over conventional formats in that more granularity regarding ambiguous sequence reads is reflected in our output format (FIGS. 32A-C). For example, we would expect that reads mapping to multiple locations in a genome would generate similarly weighted probability values for different class bins. Additionally, probability values can also be GC-normalized using the same technique conventionally used for sequence count vectors (see above).

Method 2: Inference From Normalized Sequence Count Data

For our second method, we utilize deep neural networks to classify processed sequencing data in the form of GC-normalized binned count vectors or a similarly GC-normalized "combined probability vector" generated from method 1.

In order to classify a given genomic state, we first define our baseline and aberrant states as classes. For example, if we were interested in detecting a pair of human aneuploidies on two separate chromosomes, we would define three classes—baseline, aneuploidy one, and aneuploidy two. Our training data set would consist of binned count data from deep sequencing runs of examples for each class. Each sample in the training data set would be a count vector generated from a whole genome sequencing run alongside a label of its class.

Due to the general scarcity publically available datasets— particularly for certain rare diseases—we developed a simulator for generating GC-normalized training samples of aneuploidies and large scale indels. Our simulator takes the expected value of counts (λ) for a given sequencing run, and then simulates every baseline genomic bin by drawing from a Poisson distribution with a specified lambda value determined by the total number of sequenced values (a negative binomial distribution where r=expected value, and p=0.5 also achieves similar results; r is interchangeable with λ for the most part). We simulate aneuploidies by seeding aneuploid bins with a different λ value ($\lambda_{aneu}$) which takes into account the change in expected count value from having a trisomy or monosomy. We can convert our simulator output to the "combined probability sum" vector format described in method 1 by simple rescaling.

Figure 33:
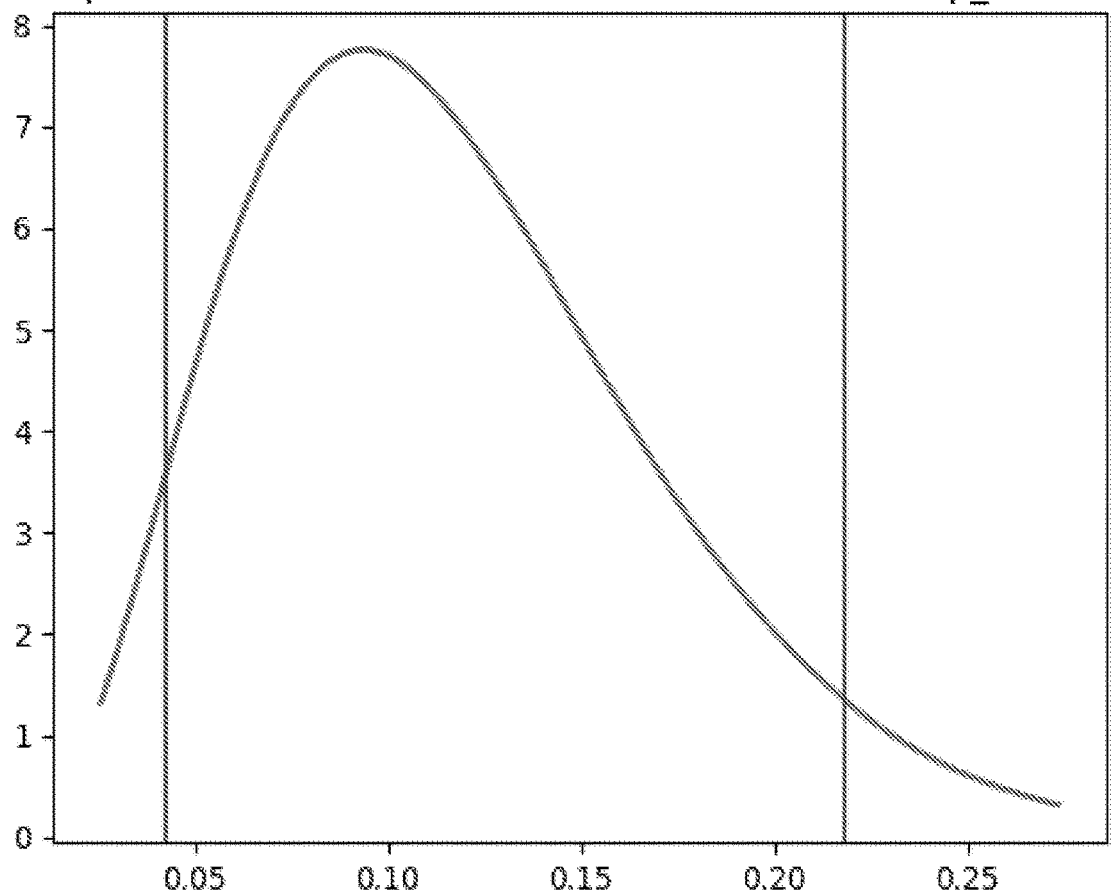
FIG. 33 illustrates a Beta distribution example for fetal fraction calculation. The vertical lines indicate the 0.01 and 0.99 quantiles.
Figure 34:
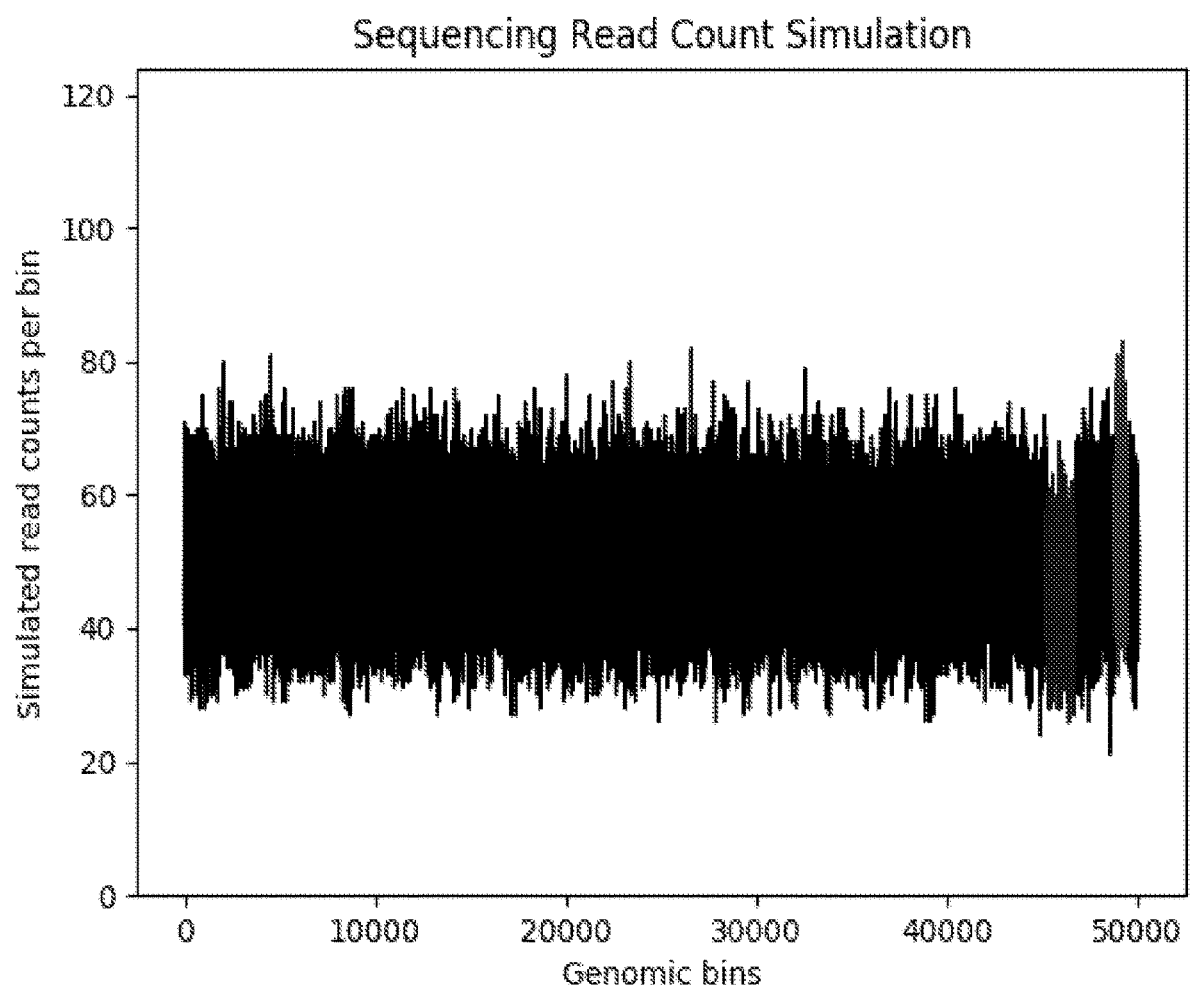
FIG. 34 provides an example of simulator output for monosomy 18 (blue) and trisomy 21 (red) samples.

Our simulator can also take into account aneuploidies in fetal DNA or other sources of cell-free DNA for NIPT testing or other sorts of disease diagnoses. Fetal fractions are simulated by drawing from a beta distribution (FIG. 33), and $\lambda_{aneu}$ is calculated by multiplying the cell-free nucleotide fraction ($f_{cellfree}$) by the expected counts (λ) and direction (−1 for monosomy, +1 for trisomy) for each aneuploid chromosome (FIG. 34):

$$\lambda_{aneu} = \lambda + \frac{d\lambda f_{cellfree}}{2} \quad (7)$$

Example 4(b)—Fully Connected Network for Inference of Trisomy 21 from GC-Normalized Sequence Count Data Here we describe our neural network for performing inferences on GC-normalized sequence count data. We simulated 100,000 baseline (non-aneuploid) examples and 100,000 trisomy 21 examples using the technique described above with a Poisson distribution. We randomly selected 20,000 positive and 20,000 negative examples to evaluate our model.

For our example trisomy 21 model, we used a simple two layer neural network with a dropout layer for regularization (Table 3). For our network input, we included an option to include not only sequence count vector data as feature inputs, but also other features as well. For this example, we used fetal fraction as an additional input. To accelerate training, all input was min-max normalized using the minimum and maximum values of the combined training and test datasets.

TABLE 3

CNN architectures used for sequencing counts and fetal fraction data
Network A

Linear (1000)
Relu
Linear (100)
Relu
Dropout (0.5)
Readout

We trained our example using a mini-batch size of 100, a learning rate of 0.00001, 200 epochs, dropout retention probability of 50%, and an ADAM optimizer for gradient descent (beta1=0.9, beta 2=0.999, epsilon=0.1) (Kingma, et al. (2014), "Adam: A Method for Stochastic Optimization", arXiv:1412.6980 [cs]). We achieved an accuracy of 95.6%, an F1-score of 0.956, an auROC of 0.990, an auPRC of 0.992, a precision of 0.952, and a recall/sensitivity of 0.959.

As a prophetic example, we further validated our technique on 100 human samples (50 baseline and 50 trisomy 21 samples). We obtained one false positive and three false negatives to achieve an accuracy of 0.96, an F1 score of 0.96, a precision of 0.980, and a recall of 0.941.

Method 3: Inference From Non-GC-Normalized Data

In order to perform inferences directly on non-GC-normalized data, we altered our techniques to take into account the wide range of ways GC bias could transform our input data. We adapted our simulator from method 2 to generate samples of both baseline and aberrant sequencing count vectors with artificial GC bias.

Figure 35:
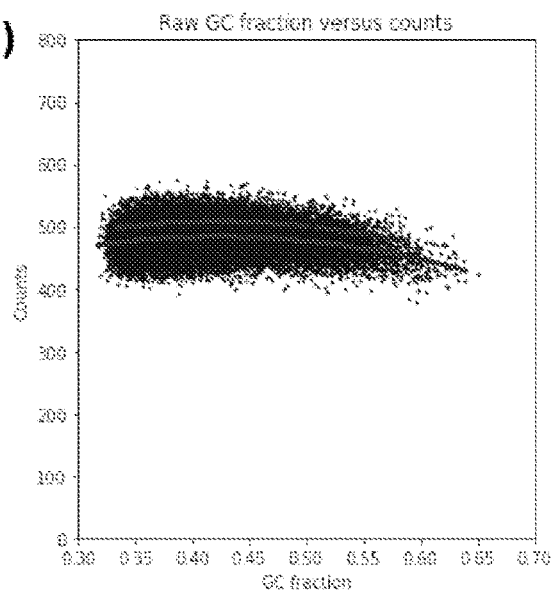
FIGS. 35A-C show examples of simulated sequencing count data for the human genome.
Figure 35:
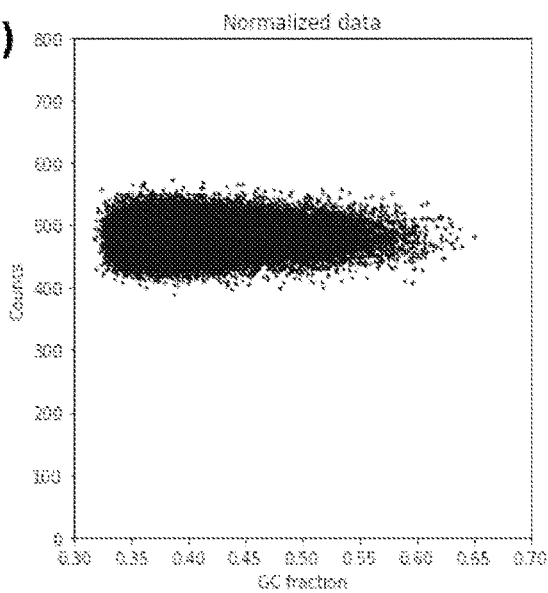
Figure 35:
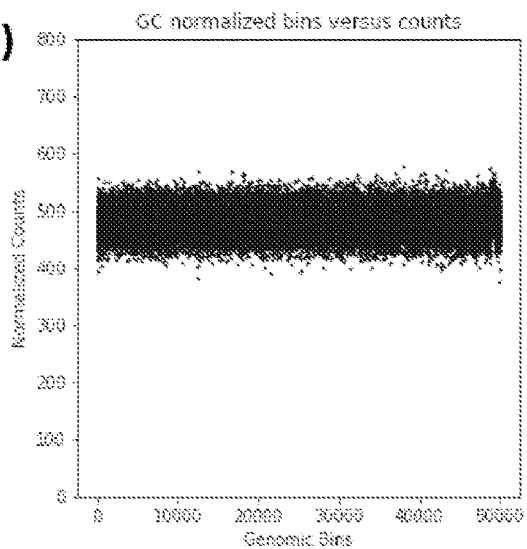

Our simulator robustly generates artificial non-GC-normalized samples of both baseline and aberrant count vectors by seeding a polynomial curve on the GC versus bin count axis for every genomic bin/class. The resulting curve represents the expected value of counts for each bin, given the GC content of each bin (FIGS. 35A-C).

We constrained our polynomial curve generator such that in a baseline (non CNV) sample, we select coefficients which will produce a curve that adds up to a specified number of total counts. For a second order polynomial, we construct our curve such that:

$$x \in gc\_bins$$

$$\text{total\_counts} = \Sigma_{i=1}^{n}(c_1 x_i^2 + c_2 x_i + c_3) \quad (8)$$

where n=num_bins.
Factoring out the coefficients, we obtain:

$$t_c = c_1 \Sigma_{i=1}^{n} x_i^2 + c_2 \Sigma_{i=1}^{n} x_i + c_3 n \quad (9)$$

Because the summation terms over $x_i^2$ and $x_i$ are constants, we can treat this as a linear equation. To select the c coefficients for our polynomial, we only need to select two coefficient values randomly, and then solve the above equation to get the value of the third coefficient.

For example, we could select a $c_1$ and a $c_3$ value at random:

$$k_1 = \sum_{i=1}^{n} x_i^2 \quad (10)$$

$$k_2 = \sum_{i=1}^{n} x_i$$

$$k_3 = n$$

$$t_c = k_1 c_1 + k_2 c_2 + k_3 c_3$$

and then solve the above equation to obtain a $c_2$ that satisfies a specified number of total counts ($t_c$). For this example, we used random second order polynomials, but the same general idea can be used with higher order polynomials.

To simulate copy number variation, we then elevate or decrease any segments of our seeded polynomial to represent elevations (e.g., duplications) or decreases (e.g., deletions) of genomic material. For aneuploid samples, we use the same correction factor $\lambda_{aneu}$ described in method 2. To simulate the variability observed in real data, we then sample from Poisson or negative binomial distributions at each point on our polynomial curve, using the expected value at each point on our generated curve to choose parameters for the aforementioned distributions (see method 2).

Example 4(c)—Fully Connected Neural Network for Inference of Trisomy 21 (Down's Syndrome) from Non-GC-Normalized Sequence Count Data We tested our method by constructing a model for detecting trisomy 21 aneuploidies from cell-free DNA. For our trisomy 21 detection case, we simulated 250,000 trisomy positive and 250,000 negative training examples with simulation parameters set to generate random count polynomials with a mean of 3 million total counts and a standard deviation of 1 million total counts. We set aside 20% of these simulated samples to use for model testing in addition to validating our model on a much smaller set of actual genomic data (see below).

Thanks to the flexibility of our approach, we were also able to include fetal fraction as both an optional feature in our simulator as well as our classification network. Fetal fraction is the percentage of fetal DNA circulating in a mother's bloodstream. Detecting abnormalities in fetal fraction DNA is crucial for modern NIPT for aneuploidies such as Down's syndrome. Low fetal fractions can greatly increase the signal to noise ratio for NIPT, but the statistical properties of fetal fractions from maternal blood draws are well known. We incorporated the variability of fetal fraction noise by selecting a fetal fraction value from a beta distribution (beta_a=4, beta_b=30) reflecting variability observed from clinical sampling.

For our neural network model, we used a learning rate of 0.00001, 100 epochs, and an ADAM optimizer for gradient descent (beta1=0.9, beta2=0.999, epsilon=0.1) (Kingma, et al. (2014), "Adam: A Method for Stochastic Optimization", arXiv:1412.6980 [cs]). We also min-max normalize all inputs (training and experimental samples) using the minimum and maximum values of the combined training and test datasets. For regularization we used dropout with a retention probability of 50%.

Figure 36A:
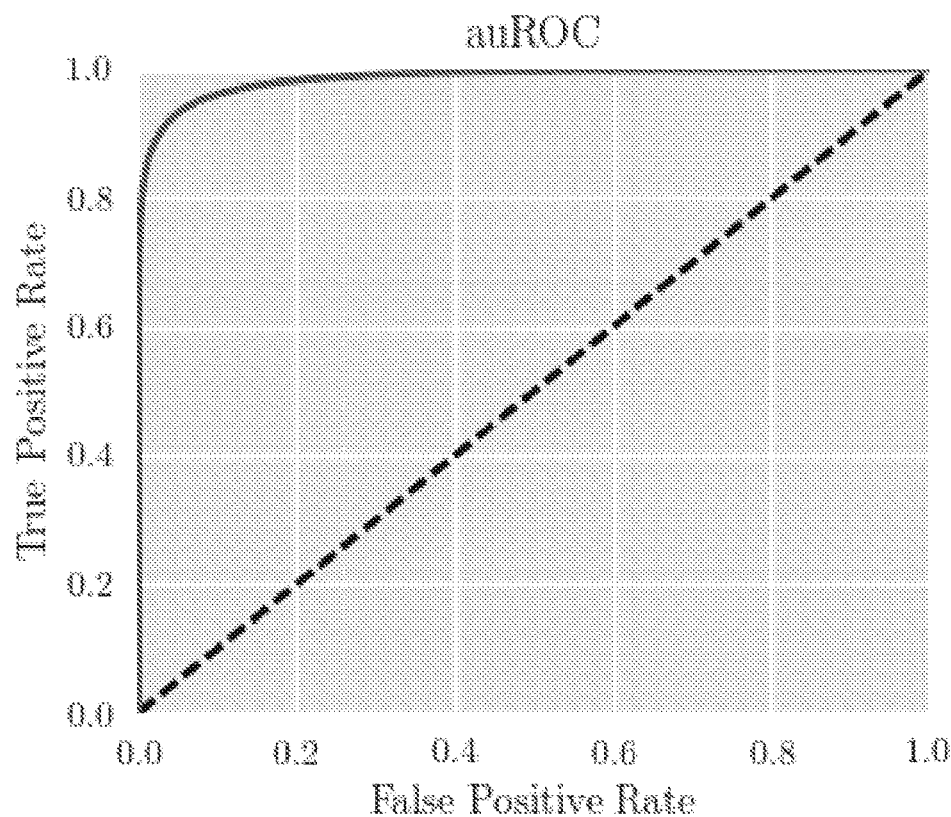
FIGS. 36A-B show plots of the area under the Receiver Operator Characteristic curve (auROC) (FIG. 36A) and the area under the Precision Recall Curve (auPRC) (FIG. 36B) for trisomy classification of a simulated test data set.
Figure 36B:
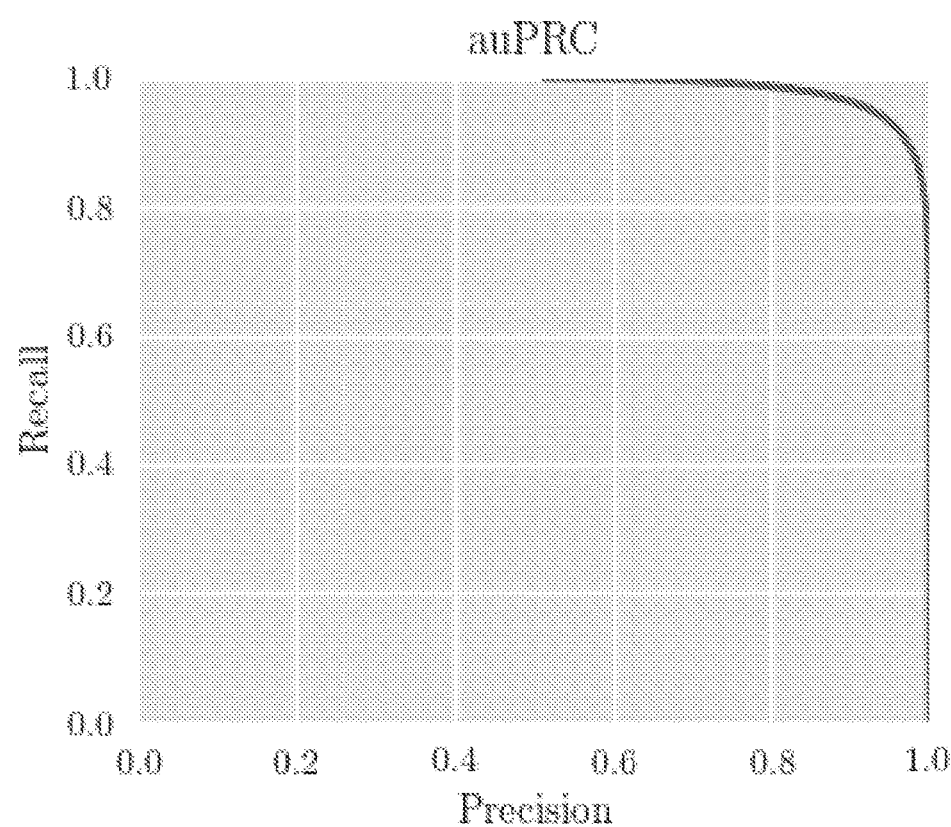

We achieved an accuracy of 0.941, an F1 score of 0.940, an auROC of 0.986, an auPRC of 0.988, a false-positive rate (FPR) of 0.047, a precision of 0.952, and a recall of 0.929 on a non-GC-normalized simulated test set consisting of 100,000 samples (FIGS. 36A-B). This compared favorably to using a median absolute deviation Z-score method for the same dataset (accuracy: 63.3%, F1 score 0.432). We were also able to further improve our model's metrics when allowing for discarding of test set samples at intermediate softmax values. For example, eliminating test set samples which achieved between 0.1 and 0.9 softmax probability values (representing 25.4% of test data) elevated the accuracy and F1 scores to greater than 99.1% and greater than 0.991 respectively.

Figure 37:
FIG. 37 illustrates a process by which different steps of the standard workflow for nucleic acid sequencing-based copy number variation (CNV) testing may be replaced through the use of neural networks and probability vectors.
Figure 37:
Figure 37:
Figure 37:
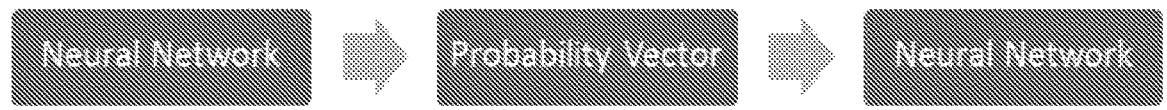

Example 5—Deep Learning Classification for the Detection of Copy Number Variation Overview: Non-invasive prenatal testing methods include collection of blood from pregnant women, separation of plasma from blood, extraction of cell free DNA (cfDNA) from plasma, generating a sequencing library from extracted cfDNA, sequencing the library, aligning the sequence reads to the human reference genome, counting the number of sequence reads which have aligned to a predetermined sequence region (in some methods these predefined regions include whole chromosomes, in some methods these regions are consecutive stretches of 50,000 bp called bins), calculating the percentage of reads that originate from chromosome 21, comparing this percentage to a reference, and classification of the sample based on a previously determined cutoff value for the percentage representation (or a normalized value derived from the percentage). These counting methods rely on the determination of the genomic origin of the sequence read during alignment. Once the origin of a sequence read has been determined it is added to the count of the predetermined region that includes its origin. A common method for determining if a sample contains an overrepresentation of chromosome 21 is the calculation of Z-scores. The counts for all bins located on chromosome 21 are summed up and divided by the sum of all counts from bins in the reference regions (often chromosomes 1 to 18, 20 and 22). This percentage is calculated for a set of known euploid samples and the median and median absolute deviation (MAD) are recorded for this set. To calculate a Z-score the median is substrate from the percentage and the result is divided by the MAD. A cutoff is established (typically between 3 and 4) and samples with a Z-score higher than the cutoff and classified as expressing an overrepresentation of genetic material from chromosome 21, consistent a trisomy 21. The data analysis part of this process can be summarized by the following steps:
1) Alignment of sequence reads to a human reference genome
2) Counting of sequence reads in each preassigned region (bin, chromosome, etc.)
3) Classification by Z-score In this set of examples, we show that each of these sections can be replaced with novel methods which ultimately lead to a workflow that eliminates the need for sequence read alignment and counting of alignments. These steps are illustrated in FIG. 37.

Part I. Novel method for classification of non-invasive prenatal sequencing results derived from ultralow plasma inputs: A set of 8 samples was used for evaluation of non-invasive prenatal testing from minimal blood volume amounts. The set contained 4 samples from pregnant women carrying a euploid fetus and 4 samples from women carrying a fetus with trisomy 21. For these 8 samples cell free DNA (cfDNA) extraction was performed from 10 ul of plasma. The DNA was processed into a sequencing library according to standard protocols. One set of 8 aliquots of 10 ul were processed using the NEBNext® Ultra™ II DNA Library Prep Kit for Illumina sequencing to make libraries and sequenced on a Illumina NextSeq instrument (hereafter referred to as the Illumina dataset). Another set of 8 aliquots of 10 ul were processed using the NEBNext® Fast DNA Library Prep Set for Ion Torrent™ sequencing to make the libraries and sequenced on a Life Technologies Ion GeneStudio S5 Sequencer (hereafter referred to as the Life Tech dataset).

On average the Illumina dataset generated 11M sequence reads and the Life Tech dataset generated 36 M sequence reads. It is has been well described that in general NIPT performance (measured by sensitivity and specificity) increases with increasing the number of available sequence reads. Consequently, it was expected that the Life Tech dataset should perform as well or better than the Illumina dataset. In these datasets, this assumption was not confirmed. A standard method for trisomy detection was used for identification of samples from women carrying a fetus with trisomy 21. In brief, the percentage of chr21 representation was calculated for a set of samples (p21). The median of chr21 percentages was then calculated across a set of known euploid samples (med21), as was the median absolute deviation of chr21 percentages (mad21). Finally, the Z-score was calculated by calculating the difference from the median and dividing this difference by the median absolute deviation (Z-score=(p21-med21)/mad21). A Z-score greater than 3 indicates a sample with an overrepresentation of genetic material originating from chromosome 21, which is concordant with a trisomy 21.

All samples in the Illumina dataset were correctly classified as euploid or trisomic. In the Life Tech dataset, all euploid samples were identified as euploid samples but only two of the trisomy samples were correctly classified as trisomic. The remaining two samples were incorrectly classified as euploid (false negatives). The cause for misclassification has been described in detail elsewhere (U.S. Provisional Patent Application No. 62/824,757). In brief, because of the inefficient library preparation method used a low amount of input copies is insufficient to provide the necessary random sampling to enable classification via Z-score methods. In this study, we train a neural network to perform classification based on an input vector of normalized sequence bin counts. We show that a neural network can accurately classify the Life Tech dataset. The study has previously demonstrated that NIPT from ultra-low input amounts has unanticipated negative effects, leading to a reduced performance in trisomy classification, which had not been foreseen by those skilled in the art. In this study we show that by using a novel method for classification that does not rely on the randomness assumption, these negative effects can be minimized and classification performance can be restored.

Count vector generation: After sequencing, the resulting fastq files are aligned using the Bowtie aligner. Each sequence read is assigned a position in the genome annotated by the chromosome of origin and the bp position (the best match to the human reference genome). We divide the human reference genome into consecutive sections of 50,000 bp called "bins". We then determine for each bin how many sequence reads in the bam file have a starting position located in that bin. This provides a vector of sequence read counts (total of 64,455 bins). It is expected that in a euploid sample most bins have similar number of sequence counts indicating an equal representation of genomic material. While this expectation is generally true, there are exceptions. Exceptions can be based on biology. For example, bins located on sex chromosomes are expected to be represented according to the sex of the test sample. In another example, variations could be introduced by maternal copy number variations. In general a network can be trained to identify these and either report or ignore those regions. Other causes for unequal representation can include technical reason such as GC bias, where bin counts show a correlation to the average GC content in the bin. To perform trisomy detection, most methods use one or more normalization and filter techniques to guarantee a representation in euploid samples that is as close to an even distribution as possible. In this study we perform GC correction based on the LOESS algorithm, normalization to the median count of all bins, exclude high variance bins (>90% percentile). Resulting data is a bin count vector of length 56332 (55401 bins from chromosomes 1 to 18, 20 and 22; 931 bins from chromosome 21). For each bin we calculate the mean and standard deviation across the set of euploid samples.

Simulated sample set: Next, we built a set of simulated count vectors representing a simulated sample set (n=100,000). The values in each bin were simulated based on the previously recorded mean and standard deviation. The simulated sample set was split in half where one half is simulating a euploid sample. The other half was representing samples from women carrying a fetus with trisomy 21. To accurately represent bin count vectors from pregnancies with trisomy 21, the bin counts for the bins originating from chromosome 21 need to be elevated. The elevation is dependent on the fraction of fetal DNA in the sample. We assigned a fetal fraction value to every bin count vector by sampling from a distribution known to represent fetal fraction in large patient populations well (i.e., the beta distribution: ffvec=beta.rvs(3.7, 30, size=<total number of samples>). For the set of samples representing pregnancy with a trisomic fetus, additional counts were added to the bins originating from chromosome 21 based on their assigned fetal fraction value. We also included a noise factor, representing "measurement noise" when assessing fetal fractions, ff meas. with "error"=abs(np.random.normal (ffvec, 0.01, <total number of samples>)), which resulted in a modifier for the chr21 bins for affected samples: amod=1+ (<ff meas. with "error">*0.5). Additionally, a minimum boundary of 0.04 was set on the amount of elevation.

Network training: The complete set of simulated samples was randomized and assigned into a set of training samples (n=90,000) and a set of test samples (n=10,000). We trained a neural network on the assigned trisomy status using a set of bins originating from chromosome 21 (n=830). The network contained three fully connected hidden layers (number of nodes: 256, 64, 16) and a softmax evaluation to report classification. After training the network for 100 epochs the test data showed good accuracy (0.9829), good precision (0.9886) and good recall (0.9770).

Network model: A model was created using the keras API and Tensorflow backend as summarized in Table 4.

TABLE 4

Network model architecture.

| Layer (type) | Output Shape | Parameter # |
|---|---|---|
| dense_5 (Dense) | (None, 256) | 212736 |
| dropout_4 (Dropout) | (None, 256) | 0 |
| leaky_re_lu_2 (LeakyReLu) | (None, 256) | 0 |
| dense_6 (Dense) | (None, 64) | 16448 |
| dropout_5 (Dropout) | (None, 64) | 0 |
| dense_7 (Dense) | (None, 16) | 1040 |
| dropout_6 (Dropout) | (None, 16) | 0 |
| dense_8 (Dense) | (None, 2) | 34 |

Total parameters: 230,258
Trainable parameters: 230,258
Non-trainable parameters: 0

Fit parameters: The model was trained using keras' categorical cross-entropy loss, and an Adam optimizer with a learning rate of 0.001, a decay of 0.001, and a batch size of 1000. Training was run for 100 epochs and a validation split of 0.2.

Test set accuracy: 1.0

Test set precision: 1.0

Test set recall: 1.0

Life Tech datasetperformance: As summarized in Table 5, the network accurately classified all 8 samples in the Life Tech dataset. Therefore, it performs better than standard Z-score classification and reduces the negative effects of inefficient library preparation. This result is unanticipated and demonstrates that this classification method enables trisomy detection in samples that previously could not be classified.

TABLE 5

Classification results for Life Tech dataset.

| Sample Name | Known Class | Z-score based on Illumina data | Class based on Illumina data (Z-score) | Z-score based on Life Tech data | Class based on Life Tech data (Z-score) | Class based on Life Tech data with NN classification |
|---|---|---|---|---|---|---|
| 16C96777 | euploid | −2.6 | euploid | 0.0 | euploid | euploid |
| 16C93462 | euploid | 1.1 | euploid | 1.3 | euploid | euploid |
| 16C93455 | euploid | 0.2 | euploid | 0.0 | euploid | euploid |
| 16C49581 | euploid | −0.2 | euploid | −1.8 | euploid | euploid |
| 13X80747 | trisomy21 | 14.4 | trisomy21 | 13.7 | trisomy21 | trisomy21 |
| 13X43308 | trisomy21 | 9.3 | trisomy21 | 6.4 | trisomy21 | trisomy21 |
| 13X34110 | trisomy21 | 6.6 | trisomy21 | −1.1 | euploid | trisomy21 |
| 13X20530 | trisomy21 | 6.7 | trisomy21 | 2.0 | euploid | trisomy21 |

Part I. Neural network based classification of non-invasive prenatal testing data using probability vectors: The counting methods described above rely on the accurate determination of a sequence read to determine its genomic origin during alignment. Once the origin of a sequence read has been determined it is added to the count of that predetermined region which includes its origin. The method described herein is fundamentally different because it does not require an allocation of the sequence read to a location and therefore does not require the alignment step. Instead the described method utilizes the positional ambiguity. Given a set of bins, a probability is calculated for each bin in the set that the read originates from. This creates a probability vector for each sequence read, which describes the probability of originating from each bin. The probability vectors for all reads can be summed to create a combined probability vector. This combined probability vector is the used to perform trisomy classification. Here we demonstrate that classification is possible using a vector of summed bin probabilities as input to a neural network.

Probability vectors: A combined probability vector for each sample was created by using bowtie2 to determine 10 most likely genomic positions in the human genome (hg19). Next a probability for read locations was determined by converting the mapping quality and alignment score to a relative probability for each possible position. The individual read probability were summed for a set of 57,461 sequence bins (each 50 kb in length), thereby creating a combined probability vector of length 57,461, representing all 24 chromosomes.

Data processing: The combined probability vectors were processed using a GC correction method (LOWESS), followed by normalization to the median value across all bins. Across a set of 1916 samples the mean and standard deviation are calculated for each bin. Bins with high variance are excluded from further analysis. Also, bins located on chromosome 19, chromosome X and chromosome Y are excluded.

Simulated dataset: We created a large dataset of simulated samples for training and testing the neural network. First, we used the calculated means and standard deviation for each bin to samples a vector of values representing 631 bins from chromosome 21 and 3465 bins randomly chosen from chromosomes 1 to 18, 20 and 22. We also assigned a hypothetical fetal fraction to each sample, by sampling a value from a distribution well known to be representative for fetal fraction in clinical samples. Half of these samples we assigned to represent euploid samples, and the other half was assigned to represent a sample with trisomy 21. To accurately simulate overrepresentation of genetic material from chromosome 21, the bins representing chromosome were elevated based on their assigned fetal fraction (see Part I, minimum boundary on the amount of elevation was set to 0.07)

Neural network model: A model was created using the keras API and Tensorflow backend as summarized in Table 6.

TABLE 6

Network model architecture.

| Layer (type) | Output Shape | Parameter # |
|---|---|---|
| dropout_16 (Dropout) | (None, 4096) | 0 |
| reshape_4 (Reshape) | (None, 4096, 1) | 0 |
| conv1d_7 (Conv1D) | (None, 4096, 32) | 2080 |
| conv1d_8 (Conv1D) | (None, 4096, 16) | 5136 |
| max_pooling1d_4 (MaxPooling1) | (None, 2048, 16) | 0 |
| dropout_17 (Dropout) | (None, 2048, 16) | 0 |
| flatten_4 (Flatten) | (None, 32768) | 0 |

TABLE 6-continued

Network model architecture.

| Layer (type) | Output Shape | Parameter # |
|---|---|---|
| dense_15 (Dense) | (None, 32) | 1048608 |
| dropout_18 (Dropout) | (None, 32) | 0 |
| dense_16 (Dense) | (None, 2) | 66 |

Total parameters: 1,055,890
Trainable parameters: 1,055,890
Non-trainable parameters: 0

Fit parameters: The model was trained using keras' categorical crossentropy loss, and an Adam optimizer with a learning rate of 0.001, a decay of 0.001, and a batch size of 100. Training was run for 3 epochs and a validation split of 0.2.

Training and test: Model validation accuracy reached 0.99990 after the first epoch and did not improve further. The 10,000 holdout set predictions had an accuracy of 0.9998 and a precision of 0.9995 (from 2 false positives) and a recall of 1.0.
  Test set accuracy: 0.9999
  Test set precision: 0.9998
  Test set recall: 1.0
Test Set Confusion Matrix:

|  | Prediction: Euploid | Prediction: Trisomy 21 |
|---|---|---|
| True: Euploid | 5008 | 1 |
| True: Trisomy 21 | 0 | 4991 |

Comparison to Z-score classification: After the network model had been trained on the simulated data set we tested its performance on a set of sequencing results from 1916 NIPT samples. Confirmation of NIPT results by invasive testing was not available for this set of samples. Hence, the sample class is determined by traditional Z-score analysis. Samples with a Z-score of 4 or higher were class labeled trisomic, while samples with a Z-score lower than 4 were class labeled euploid. The network achieved high concordance with the traditional Z-score classification. Out of 1916 samples 7 had a Z-score of 4 or higher, 6 of these were labeled Trisomy 21 by the network. All but one of the 1909 samples with a Z-score of less than 4 were labeled euploid by the network. The final test set predictions for the 1916 samples (using z-score as ground truth) had an accuracy of 0.999, a precision and a recall of 0.86 (from 1 false negative and one false positive).
  Validation set accuracy: 0.999
  Validation set precision: 0.857
  Validation set recall: 0.857
Test Confusion Matrix:

|  | Probability vector-based prediction: Euploid | Probability vector-based prediction: Trisomy 21 |
|---|---|---|
| Z-Score: Euploid | 1908 | 1 |
| Z-Score: Trisomy 21 | 1 | 6 |

Comparison to count vector-based classification: These samples were also classified by a neural network using count based vectors for simulation, training and classification. The results

|  | Count vector-based prediction: Euploid | Count vector-based prediction: Trisomy 21 |
|---|---|---|
| Z-Score: Euploid | 1909 | 0 |
| Z-Score: Trisomy 21 | 2 | 5 |

|  | Probability vector-based prediction: Euploid | Probability vector-based prediction: Trisomy 21 |
|---|---|---|
| Count vector-based prediction: Euploid | 1909 | 2 |
| Count vector-based prediction: Trisomy 21 | 0 | 5 |

Summary: Classification using a probability vectors and neural network show comparable performance to Z-score based classification and classification using count vectors and neural networks. This work demonstrated that an alignment step to deterministically assign a genomic position of a sequence read is not necessary for accurate detection of trisomy 21 in non-invasive prenatal testing.

Part Ia: Sequence read allocation without using alignment algorithms: We have previously shown that these count vectors can be replaced with combined probability vectors. That method utilizes the positional ambiguity. Given a set of bins, a probability is calculated for each bin in the set, that describes how likely it is that the sequence read originates from that bin. This creates a probability vector for each sequence read, which describes the probability of originating from each of the bins. The probability vectors for all reads can be summed to create a combined probability vector. This combined probability vector is used to perform trisomy classification.

The previous example used quantitative measurements from the bowtie2 output to create the likelihood of a read originating from a bin. Here we show that a probability vector for a sequence read can be created without using any alignment steps.

In brief, we transform the sequence bins to class labels. Then we train a neural network to assign these class labels based on encoded sequence reads. Inherent in this method is that the network assigns a probability for each of the classes. Therefore, providing a full probability vector for each sequence read. The network is used to create a set of probability vectors from a set of sequence reads (typically from one sample). This set of probability vectors can be summed to create one combined probability vector for each sample. Using the combined probability vector as input for another classification network enables for classification of samples with local overrepresentation in a set of bins, analogous to trisomy detection in NIPT (as previously described).

Phix174 genome: The 5,386 base pair genome of the *E. coli* phage Phix174 was divided into 10 sequence "bins" of 538 bases each (with the remaining 6 bases left out). Simulated 25 bp reads were generated by defining a random start point in the Phix174 genome and selecting the 25 downstream bases from that start point. The assigned class label for each is determined from the start point. A neural network model was then trained using the simulated sequence reads and the assigned bin class labels.

Reads to Location Probability: One hundred thousand sequence read/bin class label pairs were generated from the Phix174 genome. From this set 90,000 were randomly chosen to be used for training the neural network model (Training Set). The remaining 10,000 were held back as an independent test set.

Neural network architecture: A neural network model was created using the keras API and Tensorflow backend as summarized in Table 7.

TABLE 7

Network model architecture.

| Layer (type) | Output Shape | Parameter # |
|---|---|---|
| dropout_40 (Dropout) | (None, 25, 4) | 0 |
| conv1d_11 (Conv1D) | (None, 25, 32) | 8224 |
| conv1d_12 (Conv1D) | (None, 25, 16) | 5136 |
| max_pooling1d_6 (MaxPooling1) | (None, 12, 16) | 0 |
| dropout_41 (Dropout) | (None, 12, 16) | 0 |
| flatten_12 (Flatten) | (None, 192) | 0 |
| dense_28 (Dense) | (None, 32) | 6176 |
| dropout_42 (Dropout) | (None, 32) | 0 |
| dense_29 (Dense) | (None, 10) | 330 |

Total parameters: 19,866
Trainable parameters: 19,866
Non-trainable parameters: 0

Fit parameters: The model was trained using keras' categorical cross-entropy loss, and an Adam optimizer with a learning rate of 0.001, a decay of 0.001, and a batch size of 10. Training was run for 10 epochs and a validation split of 0.2.

Test set sequence read to bin classification results: The neural network model was used to classify the independent set of 10,000 samples (Table 8). The classification worked well and showed an accuracy of 0.992 and a precision of 0.992 and a recall of 0.992.

TABLE 8

Classification results.

|  | Pred bin 1 | Pred bin 2 | Pred bin 3 | Pred bin 4 | Pred bin 5 | Pred bin 6 | Pred bin 7 | Pred bin 8 | Pred bin 9 | Pred bin 10 |
|---|---|---|---|---|---|---|---|---|---|---|
| Bin 1 | 996 | 0 | 0 | 0 | 0 | 0 | 0 | 4 | 0 | 0 |
| Bin 2 | 0 | 941 | 0 | 0 | 0 | 0 | 0 | 0 | 0 | 0 |
| Bin 3 | 0 | 0 | 1006 | 7 | 0 | 0 | 0 | 0 | 0 | 0 |
| Bin 4 | 0 | 2 | 26 | 950 | 0 | 1 | 0 | 9 | 0 | 0 |
| Bin 5 | 3 | 0 | 0 | 0 | 970 | 0 | 0 | 0 | 0 | 0 |
| Bin 6 | 0 | 0 | 0 | 0 | 0 | 1018 | 0 | 2 | 0 | 0 |
| Bin 7 | 0 | 0 | 0 | 0 | 0 | 0 | 1007 | 0 | 0 | 0 |
| Bin 8 | 0 | 0 | 0 | 0 | 0 | 4 | 0 | 1053 | 0 | 0 |
| Bin 9 | 0 | 0 | 0 | 0 | 0 | 0 | 0 | 0 | 1034 | 0 |
| Bin 10 | 0 | 0 | 0 | 0 | 0 | 0 | 24 | 0 | 0 | 943 |

Test set accuracy: 0.992
Test set precision: 0.992
Test set recall: 0.992

Conclusion: We have shown that accurate bin allocation can be performed without using an alignment step.

Part IIb: Detection of over represented genomic region from sequence reads without sequence alignment using combined probability vectors: In previous work we have shown that (a) combined probability vectors can be generated from sequence reads and that (b) combined probability vectors can be used to enable trisomy classification. In this study we will combine these approaches into an end to end solution. This approach enables classification of samples with local genomic overrepresentation, while completely eliminating the need for genomic sequence alignment.

Sample sets: We created a set of 20,000 simulated samples, based on the Phix174 genome. For each sample 1000 sequence reads were generated. To create each sequence read a random position in the Phix174 genome was defined and the next 25 downstream bases were selected.

The samples generated were randomly assigned an "affected" or "unaffected" status. In the affected samples, read numbers for a bin #5 were elevated by 50%. The amount of reads that was added to bin #5 was subtracted in random chunks randomly such that the total read number for every sample was unchanged. Therefore, every sample is represented by random set of exactly 1,000 sequence reads.

The first set of 10,000 samples was designated to be the set of unaffected samples. The second set was assigned to be the affected set. For the affected set, the sequence reads allocated to bin #5 were elevated by 20%. To compensate for the elevation, the equivalent number of sequence reads was subtracted from the other bins. Therefore, every sample is represented by random set of exactly 1000 sequence reads.

Conversion of sequence reads to combined probability vectors: The previously described model for the classification of sequence reads (Part IIIa) reported a one-hot encoded class assignment. In this study we changed the output function of the final softmax evaluation from reporting classes to reporting class probabilities (in keras). This change allowed us to simply sum up the output for all 1000 sequence reads to create the combined probability vector for each sample. Finally, the combined probability vectors were normalized. Analogous to normalization in NIPT assays, the median from bins 1 to 4 and 6 to 10 was calculated and all bin values were divided by this median value. This normalized combined probability vector was used as the input tensor for the neural network.

Neural network model: The simulated samples randomized and split into a training set (n=18,000) and an independent test set (n=2,000). The test set contained 1,003 samples from the unaffected sample set and 997 samples from the affected sample set.

Network model architecture: A model was created using the keras API and Tensorflow backend as summarized in Table 9.

TABLE 9

| Network model architecture. | | |
|---|---|---|
| Layer (type) | Output Shape | Parameter # |
| dense_54 (Dense) | (None, 256) | 2816 |
| dropout_74 (Dropout) | (None, 256) | 0 |
| leaky_re_lu_5 (LeakyReLu) | (None, 256) | 0 |
| dense_55 (Dense) | (None, 64) | 16448 |
| dropout_75 (Dropout) | (None, 64) | 0 |
| dense_56 (Dense) | (None, 16) | 1040 |
| dropout_76 (Dropout) | (None, 16) | 0 |
| dense_57 (Dense) | (None, 2) | 34 |

Total parameters: 20,338
Trainable parameters: 20,338
Non-trainable parameters: 0

Fit parameters: The model was trained using keras' categorical crossentropy loss, and an Adam optimizer with a learning rate of 0.001, a decay of 0.001, and a batch size of 100. Training was run for 100 epochs and a validation split of 0.2.

Test set classification results: Out of 2,000 samples, a total of 1,977 samples in the test set were classified correctly. Consequently, accuracy, precision, and recall were 0.989. Test Confusion Matrix:

| | Prediction: unaffected | Prediction: affected |
|---|---|---|
| True: unaffected | 991 | 12 |
| True: affected | 11 | 986 |

Test set accuracy: 0.989
Test set precision: 0.989
Test set recall: 0.989

CONCLUSION

Detection of genomic copy number variations is possible, without genomic sequence alignment. Furthermore, detection of genomic copy number variations is possible, without any deterministic bin assignment of sequence reads. This method exclusively uses probabilistic modeling to assign each sequence read to al sequence bins. The resulting values from this assignment contain sufficient information to be used in another classification model to accurately determine overrepresentation of genomic regions. The presented work is enabled by using neural networks for creating probability vectors and sample classification.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in any combination in practicing the invention. It is intended that the following claims define the scope of the invention and that methods and structures within the scope of these claims and their equivalents be covered thereby.

What is claimed is:
1. A method comprising:
a) obtaining or providing a biological sample obtained from a subject, wherein the biological sample comprises circulating cell-free nucleic acid molecules;
b) amplifying at least a portion of the circulating cell-free nucleic acid molecules to generate amplified cell-free nucleic acid molecules;
c) sequencing at least a portion of the amplified cell-free nucleic acid molecules to produce a set of sequencing reads;

d) processing each sequencing read in the set of sequencing reads to generate one or more probability values using a machine learning algorithm, wherein the machine learning algorithm is trained using an input data set comprising one or more sets of sequencing reads from subjects of different classes, and wherein the one or more probability values represents a probability that the set of sequencing reads corresponds to a particular class of the different classes;

e) classifying the set of sequencing reads as belonging to a particular class when the one or more probability values comprise at least one probability of the particular class; and f) detecting a presence or an absence of at least one genetic abnormality in the subject, or fetus if the subject is pregnant, based on the classifying of e).

2. The method of claim 1, wherein the processing of d) does not include alignment of the set of sequencing reads to a reference genome or reference sequence.

3. The method of claim 1, wherein the processing of d) comprises a calculation of the length of each sequencing read in the set of sequencing reads, the GC content of each sequencing read in the set of sequencing reads, a value corresponding to the number and ordering of nucleotide bases in each sequencing read in the set of sequencing reads, a feature weighting factor, or any combination thereof.

4. The method of claim 1, wherein the machine learning algorithm is a deep learning algorithm.

5. The method of claim 4, wherein the deep learning algorithm comprises a feedforward neural network, a convolutional neural network, or a recurrent neural network.

6. The method of claim 4, wherein the input data set comprises one or more sets of sequencing reads from one or more control subjects comprising known euploid subjects, known aneuploid subjects, or any combination thereof.

7. The method of claim 4, wherein the input data set comprises in silico sequence data obtained from a publicly-available database, a private institutional database, a commercial database, or any combination thereof.

8. The method of claim 4, wherein the input data set comprises simulated sequence data for normal subjects, abnormal subjects, or any combination thereof.

9. The method of claim 4, wherein the input data set comprises personal health data for one or more control subjects, wherein the personal health data is selected from the group consisting of subject age, gestational age, sex, weight, blood pressure, number of previous offspring (if female), ultrasound markers, biochemical screening results, smoking history, history of alcohol use, family history of disease, or any combination thereof.

10. The method of claim 1, wherein the input data set further comprises values corresponding to personal health data for the subject that is selected from the group consisting of subject age, gestational age, sex, weight, blood pressure, number of previous offspring (if female), ultrasound markers, biochemical screening results, smoking history, history of alcohol use, family history of disease, or any combination thereof.

11. The method of claim 4, wherein the input data set resides in a cloud-based database that is periodically or continuously updated with sets of sequencing reads, input data sets, and previously-performed deep learning analysis results that are generated locally or remotely.

12. The method of claim 1, wherein the at least one genomic abnormality comprises a copy number variation, a full or partial duplication of at least one chromosomal arm, a full or partial deletion of at least one chromosomal arm, or any combination thereof.

13. The method of claim 1, wherein the biological sample is blood, plasma, serum, urine, interstitial fluid, vaginal cells, vaginal fluid, buccal cells, or saliva.

14. The method of claim 1, wherein the particular class of the set of sequencing reads in d) is not determined with respect to a specific target chromosome.

15. The method of claim 1, wherein the one or more probability values represents a probability that a sequencing read of the set of sequencing reads corresponds to a particular genomic region.

16. The method of claim 1, wherein the machine learning algorithm generates a probability vector for each sequencing read of the set of sequencing reads.

* * * * *